(12) United States Patent
Wittenbreder, Jr.

(10) Patent No.: US 6,507,176 B2
(45) Date of Patent: Jan. 14, 2003

(54) SYNTHESIS METHODS FOR ENHANCING ELECTROMAGNETIC COMPATIBILITY AND AC PERFORMANCE OF POWER CONVERSION CIRCUITS

(75) Inventor: Ernest H. Wittenbreder, Jr., Flagstaff, AZ (US)

(73) Assignee: Technical Witts, Inc., Flagstaff, AZ (US)

( * ) Notice: Subject to any disclaimer, the term of this patent is extended or adjusted under 35 U.S.C. 154(b) by 0 days.

(21) Appl. No.: 09/946,691

(22) Filed: Sep. 4, 2001

(65) Prior Publication Data

US 2002/0121881 A1 Sep. 5, 2002

(51) Int. Cl.⁷ .................................................. G05F 1/24
(52) U.S. Cl. .......................... 323/259; 323/225; 363/40
(58) Field of Search ............................. 363/39, 40, 41, 363/42, 43, 16, 17; 323/222–225, 259, 262, 271, 282, 284, 131, 133, 134

(56) References Cited

U.S. PATENT DOCUMENTS 5,977,754 A * 11/1999 Cross ......................... 323/222
6,198,260 B1 * 3/2001 Wittenbreder ............... 323/271
6,232,752 B1 * 5/2001 Bissell ........................ 323/225
6,304,065 B1 * 10/2001 Wittenbreder ............... 323/259

* cited by examiner

Primary Examiner—Jessica Han

(57) ABSTRACT

Five circuit synthesis methods, for forming new power conversion circuits with enhanced electromagnetic compatibility and improved AC performance from old circuits with AC performance and/or electromagnetic compatibility deficiencies, are revealed. The new synthesis methods achieve performance improvements without requiring the addition of magnetic cores. In all cases a simple toroidal magnetic core structure is not precluded. In all cases splitting or adding magnetic windings is required, and, in many cases, additional capacitors are required. Many new circuits formed by applying the synthesis methods are revealed. The results achieved by application of the synthesis methods include zero ripple current at all terminals without adding magnetic cores or requiring a complex magnetic circuit element, cancellation of common mode currents, improved control loop bandwidth, and faster transient response.

26 Claims, 101 Drawing Sheets

(d)

(e)

(d)

(e)

(f)

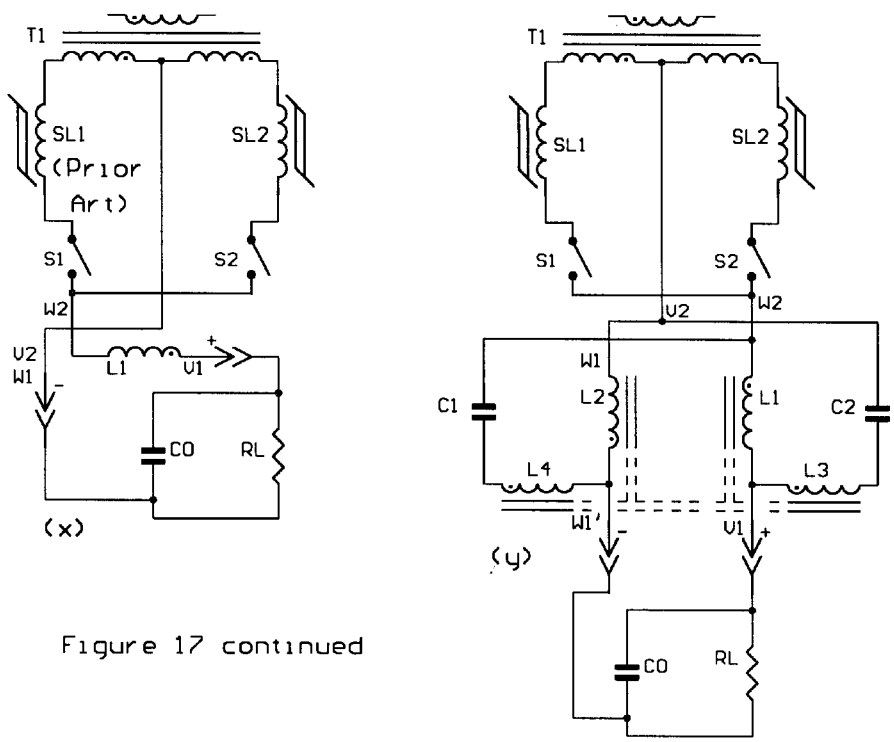
Figure 17 continued
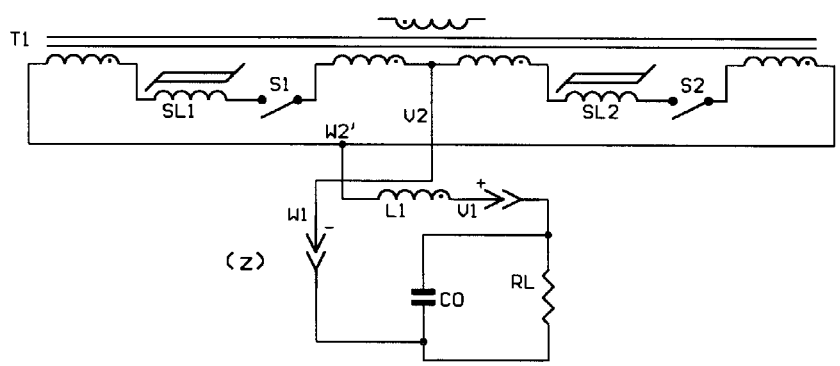
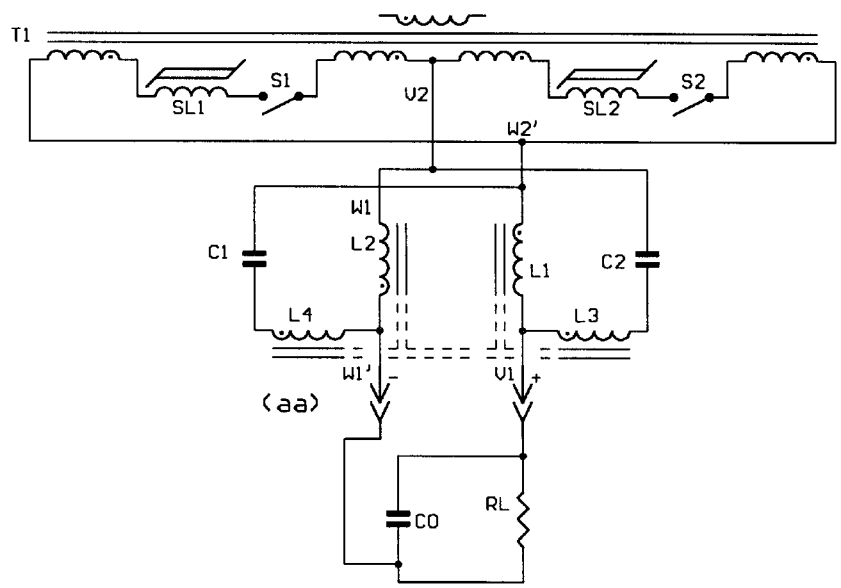

(g)

(h)

(i)

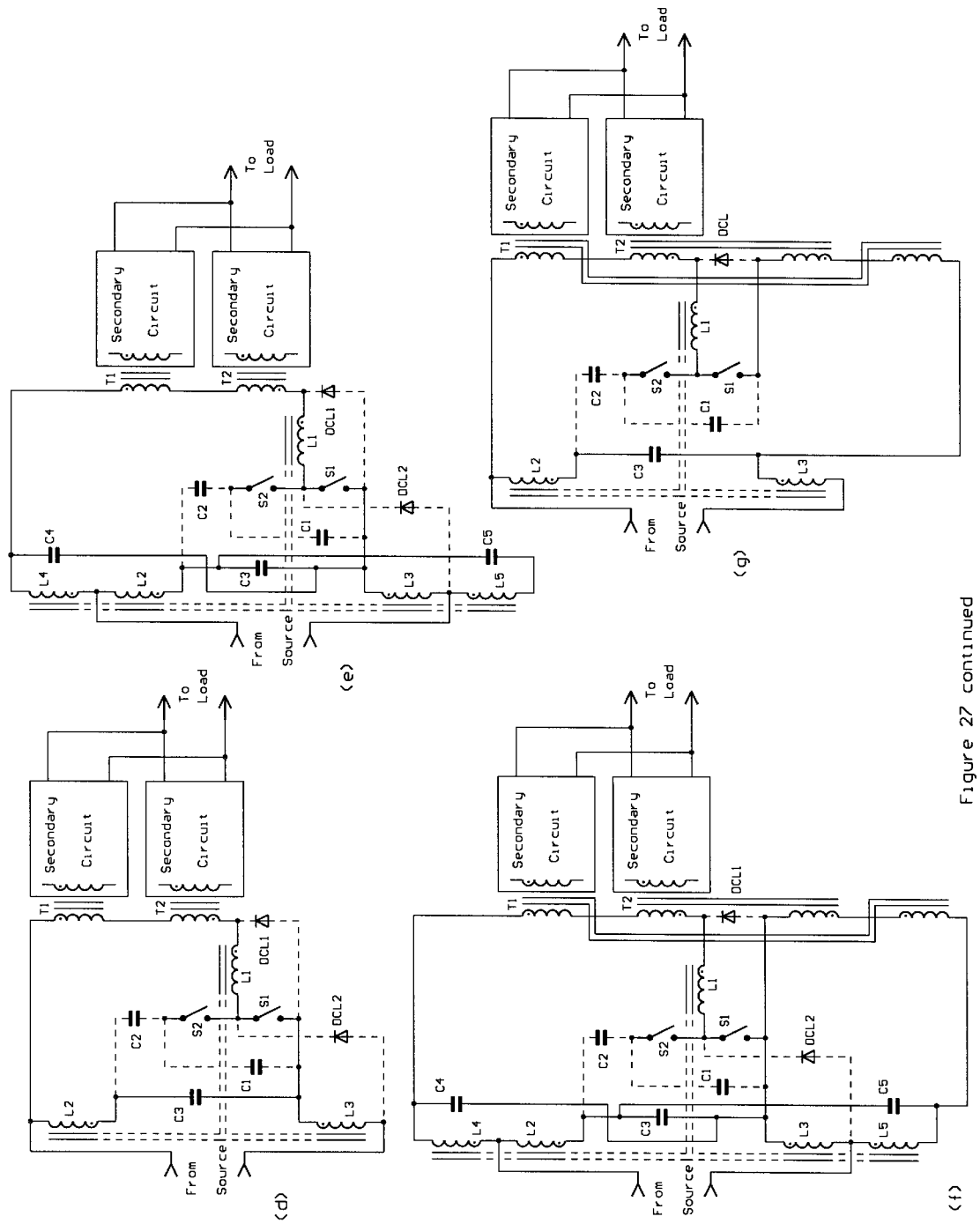

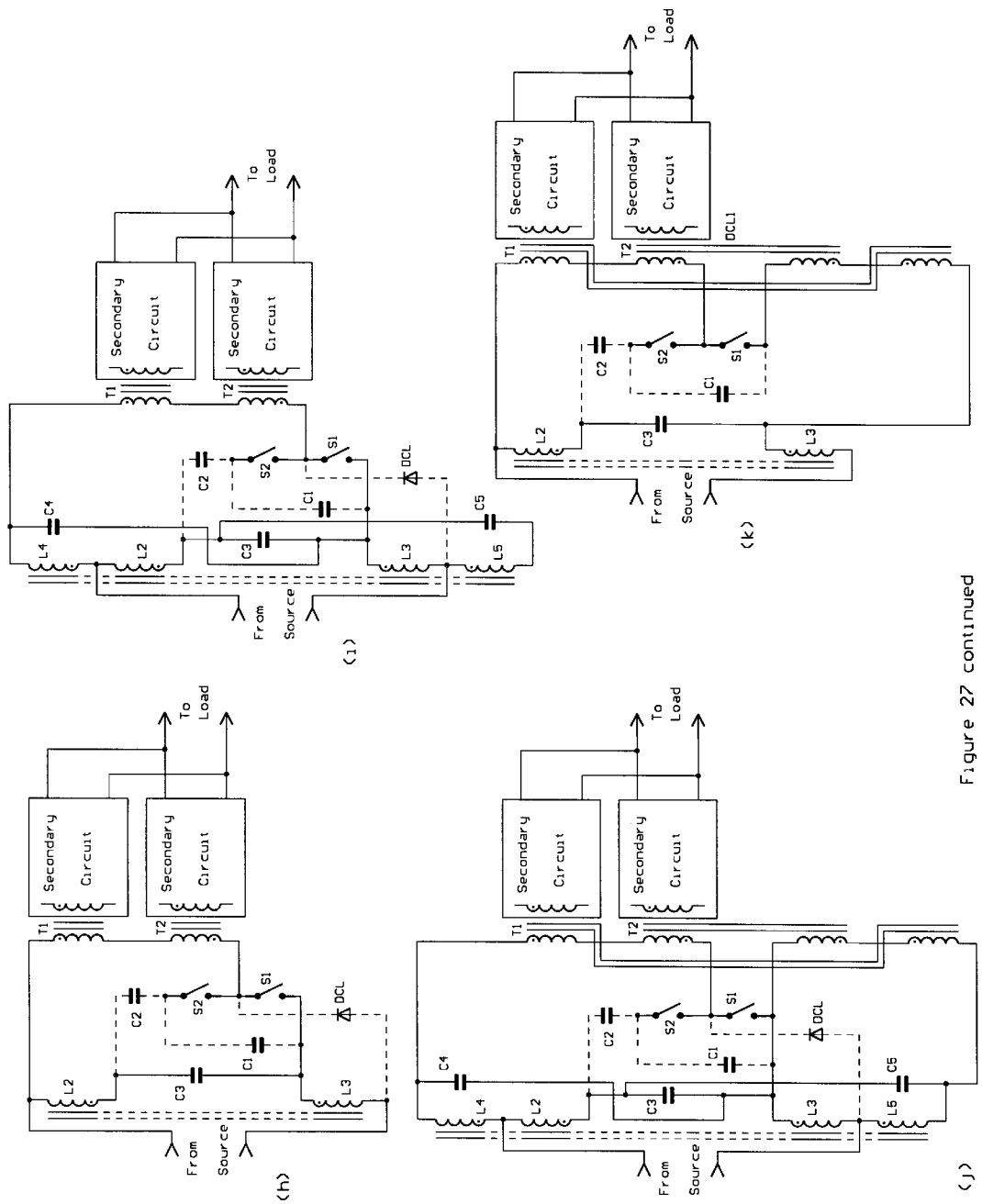

(d)

(e)

(f)

(g)

(d)

(e)

(h)

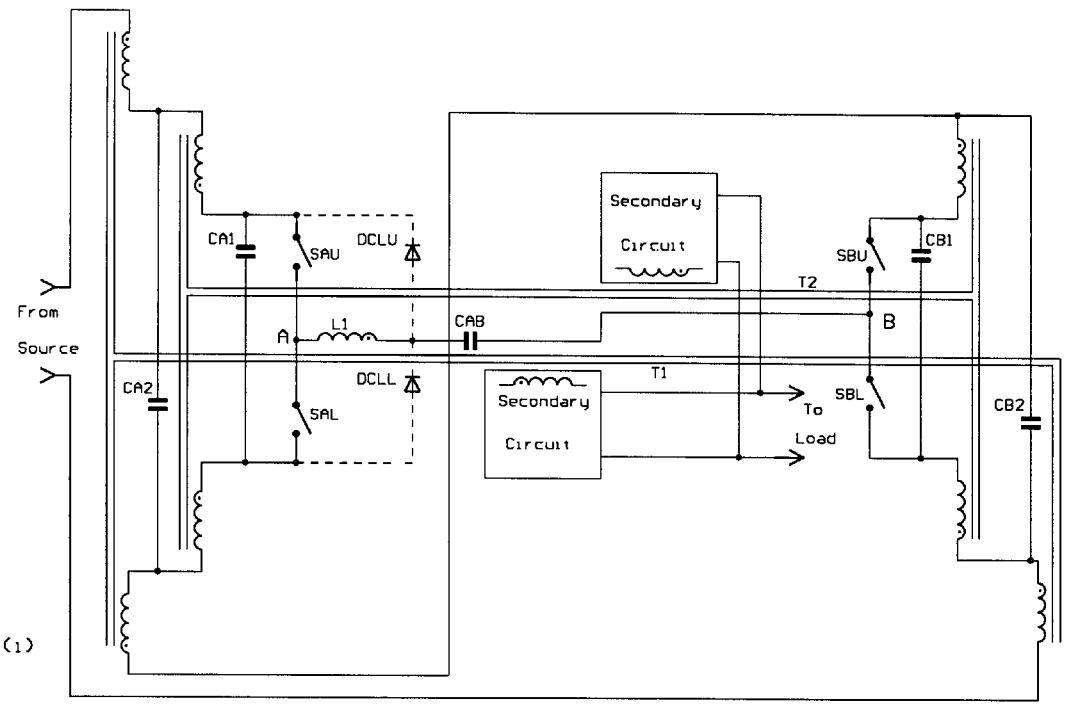
(i)
Figure 42 continued
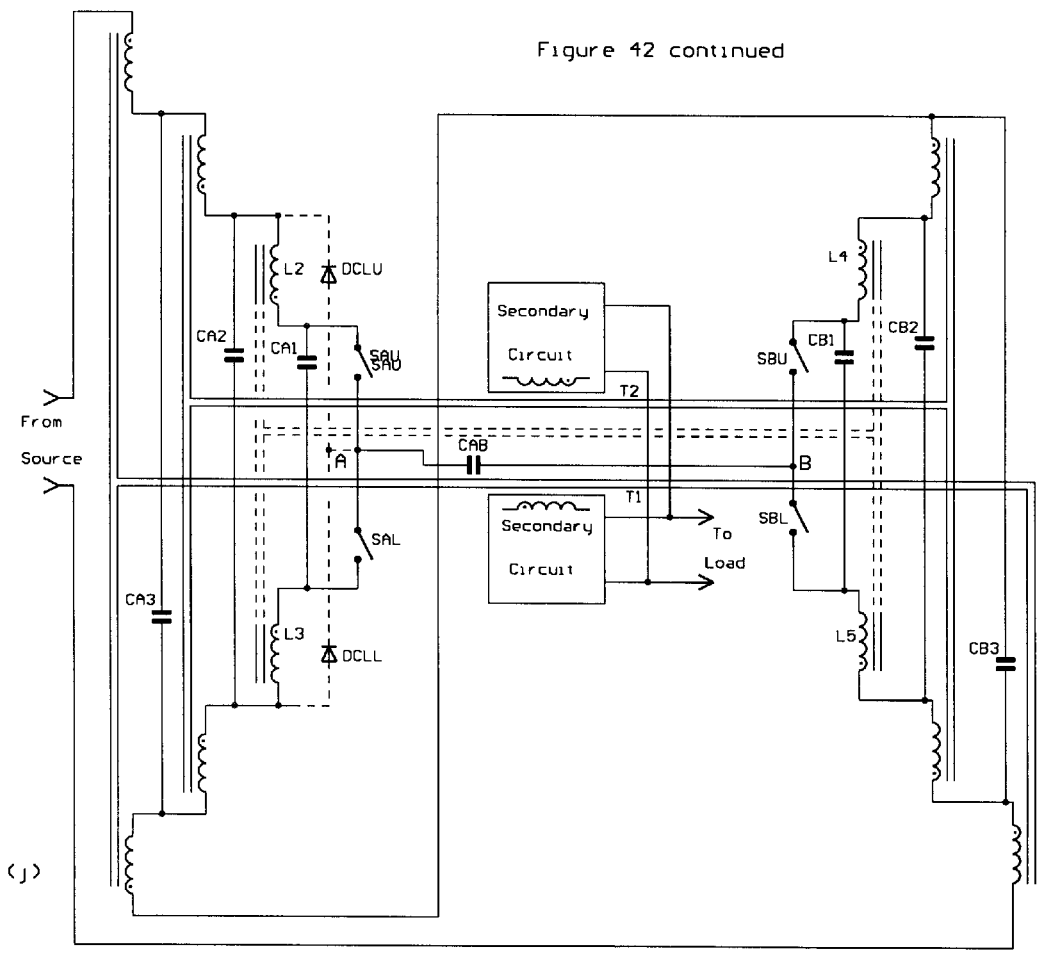
(j)

SYNTHESIS METHODS FOR ENHANCING ELECTROMAGNETIC COMPATIBILITY AND AC PERFORMANCE OF POWER CONVERSION CIRCUITS

BACKGROUND OF THE INVENTION

1. Field of the Invention

The subject invention generally pertains to electronic power conversion circuits, and more specifically to high frequency, switched mode power electronic converter circuits.

2. Description of Related Art

Power conversion circuits, in general, create either a pulsed current wave form or a continuous triangular wave form at the terminals of the circuit. To provide an electromagnetically compatible interface, filters are often provided at the terminals. The size and cost of the filters depends on the frequency content and magnitude of the AC ripple components of the terminal currents. A terminal with a pulsed current wave form almost always requires a filter. A triangular terminal current wave form may require a filter although one smaller than would be required by a pulsating current. In addition to the terminal filtering schemes there are ripple current steering schemes that add windings to the chokes and transformers and capacitors to provide a preferred path for AC currents away from the terminals. There are some circuits with enhanced electromagnetic compatibility (EMC) that have been known for some time, but to date there has been no revelation of universally applicable defined methods that describe how to synthesize EMC enhanced circuits from equivalent circuits with no EMC enhancements.

One example of an EMC enhanced circuit is the Cuk converter, illustrated in FIG. 2. The Cuk converter has the same input-to-output transfer function as the non-isolated flyback converter, illustrated in FIG. 1. No universally applicable synthesis method has been described that allows a designer to transform the flyback converter into the Cuk converter. The Cuk converter also provides improved AC performance by comparison to the flyback converter. The description of universally applicable synthesis methods that enable a designer to transform known circuits into circuits with EMC and AC performance enhancements is the subject matter of this invention.

OBJECTS AND ADVANTAGES

One object of the subject invention is to provide a simple universally applicable synthesis method that can convert any three terminal network with one terminal current non-pulsating into an equivalent three terminal network with all terminal currents non-pulsating.

Another object of the subject invention is to provide a simple universally applicable synthesis method that can convert three terminal networks with an inductor winding in series with one terminal into equivalent three terminal networks with ripple current cancellation at all terminals.

Another object of the subject invention is to provide a simple universally applicable synthesis method that can convert a magnetically coupled two terminal network containing at least one switch and one coupled winding into an equivalent network in which the common mode currents into or out of the subject coupled winding is significantly reduced or eliminated.

Another object of the subject invention is to provide a simple universally applicable synthesis method that can convert a magnetically coupled two terminal network containing at least one switch and one coupled winding into an equivalent network in which the common mode currents into or out of the subject coupled winding is significantly reduced or eliminated and the terminal ripple currents are canceled.

Another object of the subject invention is to provide a simple universally applicable synthesis method that can convert a full bridge circuit with pulsating terminal currents into an equivalent full bridge circuit with non-pulsating terminal currents with terminal ripple current cancellation.

Another object of the subject invention is to provide a simple universally applicable synthesis method that can convert a half bridge circuit with pulsating terminal currents into an equivalent half bridge circuit with non-pulsating terminal currents with terminal ripple current cancellation.

Another object of the subject invention is to provide a simple universally applicable synthesis method that can convert a stacked full bridge circuit with pulsating terminal currents into an equivalent stacked full bridge circuit with non-pulsating terminal currents.

Another object of the subject invention is to provide a simple universally applicable synthesis method that can convert a stacked full bridge circuit with pulsating terminal currents into an equivalent stacked full bridge circuit with non-pulsating terminal currents with terminal ripple current cancellation.

Another object of the subject invention is to provide simple universally applicable synthesis methods that can improve the AC performance characteristics of the circuits to which the synthesis methods are applied.

BRIEF DESCRIPTION OF THE DRAWINGS

The present invention is illustrated by reference to the drawings.

FIG. 17(a) illustrates a current doubler rectifier type secondary circuit.

FIG. 17(b) illustrates a full bridge rectifier type secondary circuit.

FIG. 17(c) illustrates a full bridge rectifier with output choke type secondary circuit.

FIG. 17(d) illustrates a push-pull rectifier type secondary circuit.

FIG. 17(e) illustrates a push-pull rectifier with output choke type secondary circuit.

FIG. 17(f) illustrates a new full bridge rectifier with output choke secondary circuit with ripple current cancellation achieved by application of the synthesis method illustrated by FIG. 5(k) applied to the FIG. 17(c) circuit.

FIG. 17(g) illustrates a new push-pull rectifier secondary circuit with ripple current cancellation achieved by application of the synthesis method illustrated by FIG. 5(i) to the FIG. 17(d) circuit.

FIG. 17(h) illustrates a new push-pull rectifier with output choke secondary circuit with ripple current cancellation achieved by applying the synthesis method illustrated by FIG. 5(k) to the FIG. 17(e) circuit.

FIG. 17(i) illustrates a half wave rectifier type secondary circuit.

FIG. 17(j) illustrates a half wave rectifier type secondary circuit with common mode current cancellation achieved by applying the synthesis method illustrated by FIG. 5(j) to the FIG. 17(i) circuit.

FIG. 17(k) illustrates a half wave rectifier type secondary circuit with ripple current cancellation achieved by applying the synthesis method illustrated by FIG. 5(k) to the FIG. 17(j) circuit.

FIG. 17(l) illustrates a half wave rectifier with output choke type secondary circuit.

FIG. 17(m) illustrates a half wave rectifier with output choke type secondary circuit with common mode current cancellation achieved by applying the synthesis method illustrated by FIG. 5(j) to the FIG. 17(l) circuit.

FIG. 17(n) illustrates a half wave rectifier with output choke type secondary circuit with ripple current cancellation achieved by applying the synthesis method illustrated by FIG. 5(k) to the FIG. 17(l) circuit.

FIG. 17(o) illustrates a half wave rectifier with output choke type secondary circuit with common mode current cancellation achieved by applying the synthesis method illustrated by FIG. 5(j) to the FIG. 17(n) circuit.

FIG. 17(p) illustrates a half wave rectifier type secondary circuit with a saturable reactor for secondary switch timing delay.

FIG. 17(q) illustrates a half wave rectifier type secondary circuit with common mode current cancellation achieved by applying the synthesis method illustrated by FIG. 5(j) to the FIG. 17(p) circuit.

FIG. 17(r) illustrates a half wave rectifier type secondary circuit with ripple current cancellation achieved by applying the synthesis method illustrated in FIG. 5(k) to the FIG. 17(p) circuit.

FIG. 17(s) illustrates a current doubler rectifier type secondary circuit with saturable reactors to delay the timing of the secondary switches.

FIG. 17(t) illustrates a half wave rectifier with output choke type secondary circuit with a saturable reactor to delay switch timing.

FIG. 17(u) illustrates a half wave rectifier with output choke type secondary circuit with ripple current cancellation achieved by applying the synthesis method illustrated by FIG. 5(k) to the FIG. 17(t) circuit.

FIG. 17(v) illustrates a half wave rectifier with output choke type secondary circuit with common mode current cancellation achieved by applying the synthesis method illustrated in FIG. 5(j) to the FIG. 17(t) circuit.

FIG. 17(w) illustrates a half wave rectifier with output choke type secondary circuit with common mode current cancellation achieved by applying the synthesis method illustrated by FIG. 5(j) to the FIG. 17(u) circuit.

FIG. 17(x) illustrates a push-pull rectifier with output choke type secondary circuit with saturable reactors for timing delay of the switches.

FIG. 17(y) illustrates a push-pull rectifier with output choke type secondary circuit with output current ripple cancellation achieved by applying the synthesis method illustrated by FIG. 5(k) to the FIG. 17(x) circuit.

FIG. 17(z) illustrates a push-pull rectifier with output choke type secondary circuit which achieves common mode current cancellation by applying the synthesis method illustrated by FIG. 5(j) to the FIG. 17(x) circuit.

FIG. 17(ab) is a half wave rectifier with choke type secondary circuit.

FIG. 17(ac) is a half wave rectifier with choke type secondary circuit which achieves common mode current cancellation by applying the synthesis method illustrated by FIG. 5(j) to the FIG. 17(ab) circuit.

FIG. 17(ad) illustrates a half wave rectifier with choke type secondary circuit with ripple current cancellation achieved by applying the synthesis method illustrated by FIG. 5(k) to the FIG. 17(ab) circuit.

FIG. 17(ae) illustrates a half wave rectifier with choke type secondary circuit with improved ripple current cancellation achieved by applying the synthesis method illustrated by FIG. 5(k) to the FIG. 17(ab) circuit.

FIG. 17(af) illustrates a half wave rectifier with choke type secondary circuit with ripple current cancellation achieved by applying the synthesis method illustrated by FIG. 5(k) to the FIG. 17(ab) circuit.

FIG. 17(ag) illustrates a full bridge rectifier with choke type secondary circuit.

FIG. 17(ah) illustrates a push-pull rectifier with chokes type secondary circuit.

FIG. 17(ai) illustrates a push-pull rectifier with chokes type secondary circuit with ripple current cancellation achieved by applying the synthesis method illustrated by FIG. 5(i) to the FIG. 17(ah) circuit.

FIG. 17(aj) illustrates a push-pull rectifier with chokes type secondary circuit with improved ripple current cancellation achieved by applying the synthesis method illustrated by FIG. 5(k) to the FIG. 17(ah) circuit.

FIG. 17(ak) illustrates a half bridge voltage doubler type rectifier secondary circuit.

FIG. 17(al) illustrates a half bridge voltage doubler type rectifier secondary circuit with ripple current cancellation achieved by applying the synthesis method illustrated by FIG. 8(d) to the FIG. 17(ak) circuit.

FIG. 17(am) illustrates a half bridge voltage doubler type rectifier secondary circuit with ripple current cancellation achieved by applying the synthesis method illustrated by FIG. 8(e) to the FIG. 17(ak) circuit.

FIG. 17(an) illustrates a full bridge rectifier type secondary circuit with ripple current cancellation achieved by applying the synthesis method illustrated by FIG. 9(d) to the FIG. 17(b) circuit.

FIG. 17(ao) illustrates a full bridge rectifier type secondary circuit with ripple current cancellation achieved by applying the synthesis method illustrated by FIG. 9(f) to the FIG. 17(b) circuit.

FIG. 17(ap) illustrates a stacked full bridge voltage doubler type secondary circuit.

FIG. 17(aq) illustrates a stacked full bridge voltage doubler type secondary circuit with non-pulsating terminal currents achieved by applying the synthesis method illustrated by FIG. 10(d) to the FIG. 17(ap) circuit.

FIG. 17(ar) illustrates a stacked full bridge voltage doubler type secondary circuit with non-pulsating terminal currents achieved by applying the synthesis method illustrated by FIG. 10(f) to the FIG. 17(ap) circuit.

FIG. 17(as) illustrates a stacked full bridge voltage doubler type secondary circuit with ripple current cancellation achieved by applying the synthesis method illustrated by FIG. 10(e) to the FIG. 17(ap) circuit.

FIG. 17(at) illustrates a stacked full bridge voltage quadrupler secondary circuit.

FIG. 17(au) illustrates a full bridge with series inductor type secondary with common mode current and ripple current cancellation achieved by applying the fourth synthesis method, as illustrated in FIG. 9(f), to the secondary winding of the FIG. 17(ag) circuit.

FIG. 17(av) illustrates a full bridge with series inductor type secondary with ripple current cancellation achieved by applying the fourth synthesis method, as illustrated in FIG. 9(f), to the series inductor of the FIG. 17(ag) circuit.

FIG. 17(aw) illustrates a full bridge with series inductor type secondary with common mode current and ripple current cancellation achieved by applying the fourth synthesis method, as illustrated in FIG. 9(f), to the winding network comprising the series connection of the series inductor and secondary winding of the FIG. 17(ag) circuit.

FIG. 17(ax) illustrates a push pull rectifier type secondary circuit with ripple current cancellation achieved by applying the synthesis method illustrated by FIG. 9(g) to the FIG. 17(b) circuit.

FIG. 18(a) illustrates a flyback type primary circuit.

FIG. 18(b) illustrates a flyback type primary circuit with common mode current cancellation achieved by applying the synthesis method illustrated by FIG. 5(j) to the FIG. 18(a) circuit.

FIG. 18(c) illustrates a flyback type primary circuit with ripple current cancellation achieved by applying the synthesis method illustrated by FIG. 5(k) to the FIG. 18(b) circuit.

FIG. 19(a) illustrates a forward type primary circuit.

FIG. 19(b) illustrates a forward type primary circuit with common mode current cancellation achieved by applying the synthesis method illustrated by FIG. 5(j) to the FIG. 19(a) circuit.

FIG. 19(c) illustrates a forward type primary circuit with ripple current cancellation achieved by applying the synthesis method illustrated by FIG. 5(k) to the FIG. 19(b) circuit.

Figure 20:
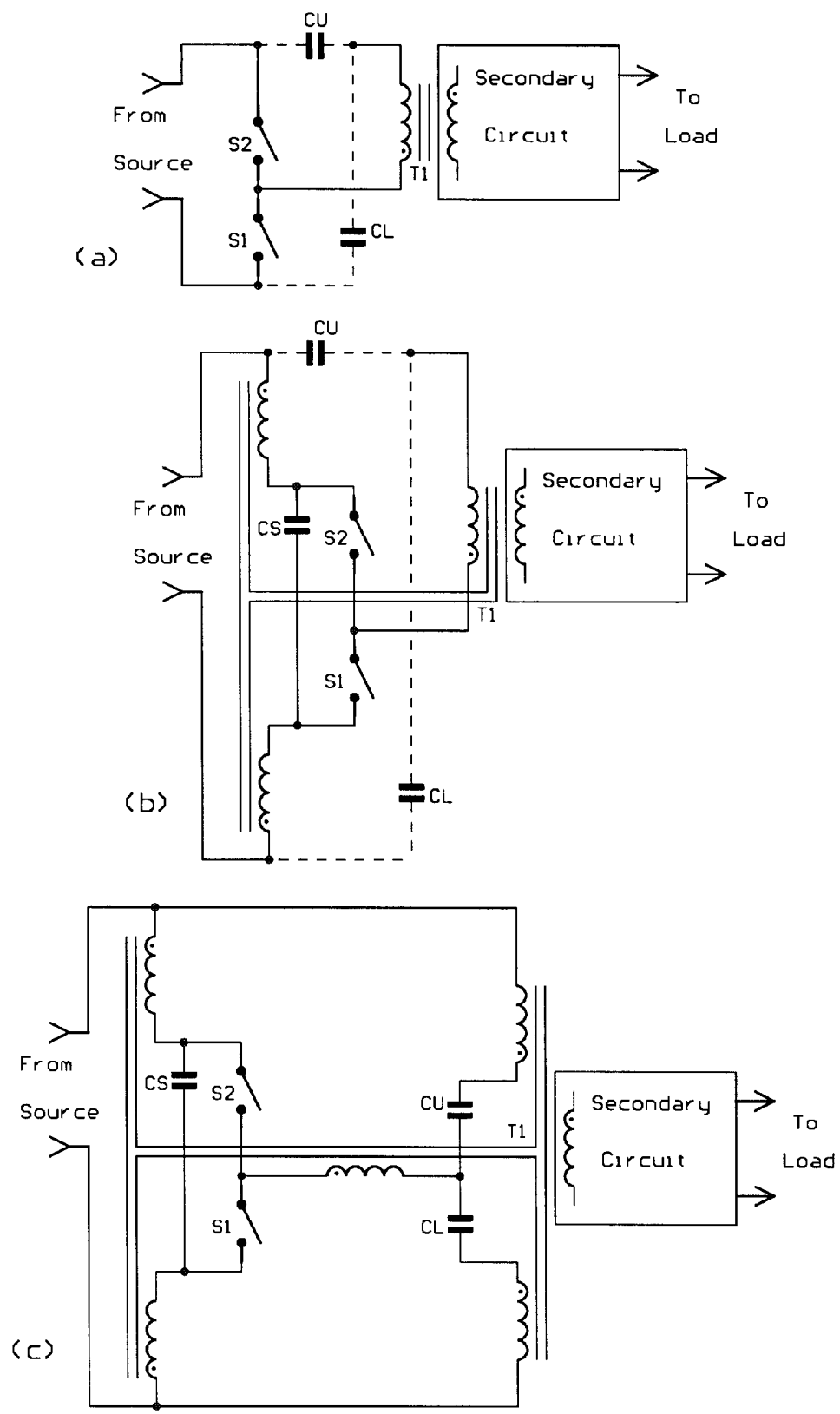
Figure 20:
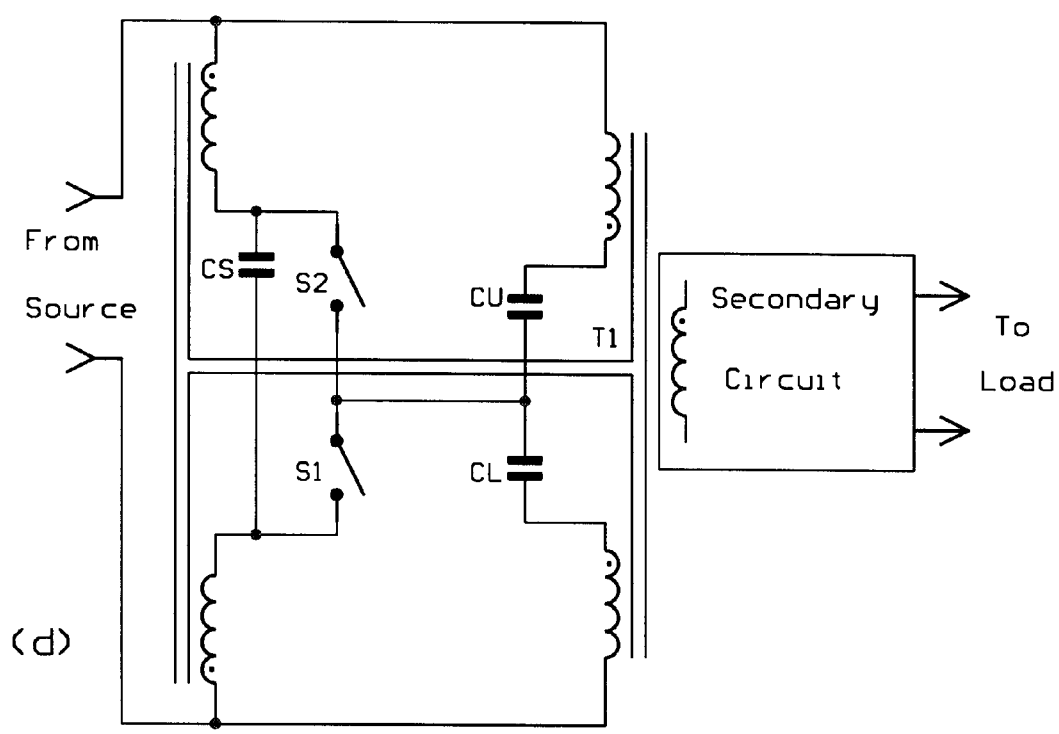

FIG. 20(a) illustrates a coupled inductor buck type primary circuit.

Figure 3:
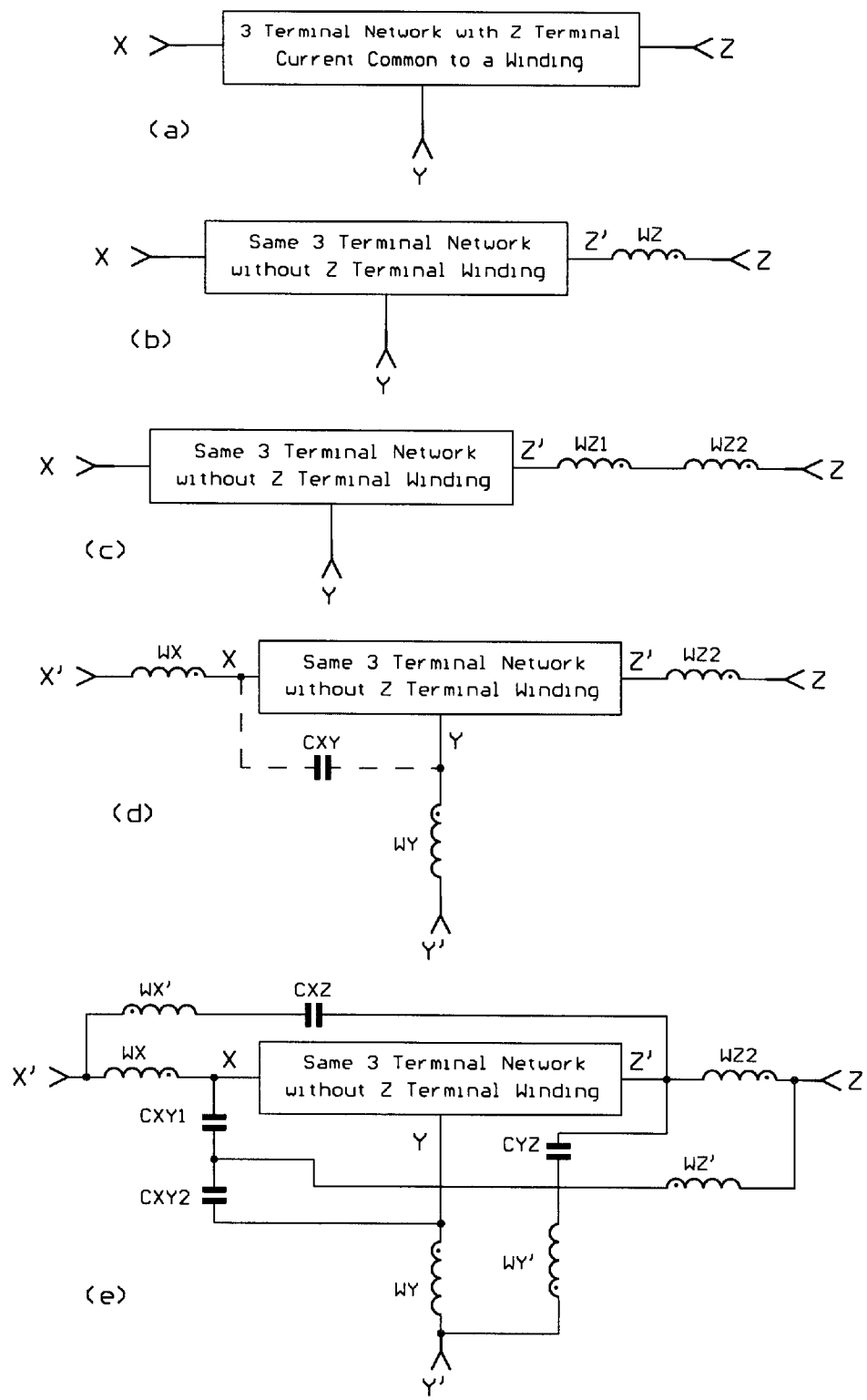
FIG. 3(a) illustrates a three terminal power conversion network with a winding in series with the Z terminal according to the prior art.
FIG. 3(b) illustrates the three terminal power conversion network of FIG. 3(a) with the Z terminal winding separated from the rest of the original three terminal power conversion network.
FIG. 3(c) illustrates the three terminal network of FIG. 3(a) with the Z terminal winding separated from the rest of the original three terminal power conversion network and split into two windings.
FIG. 3(d) illustrates a new three terminal power conversion network similar to the FIG. 3(c) network but with one of the two Z terminal windings moved through the network to the X and Y terminals and with a capacitor added connecting the X and Y terminals to form a three terminal power conversion network with all terminal currents non-pulsating.
FIG. 3(e) illustrates a new three terminal power conversion network with mutual cancellation of all terminal ripple currents.

FIG. 20(b) illustrates a coupled inductor buck type primary circuit with non-pulsating terminal current achieved by applying the synthesis method illustrated in FIG. 3(d) to the FIG. 20(a) circuit.

Figure 8:
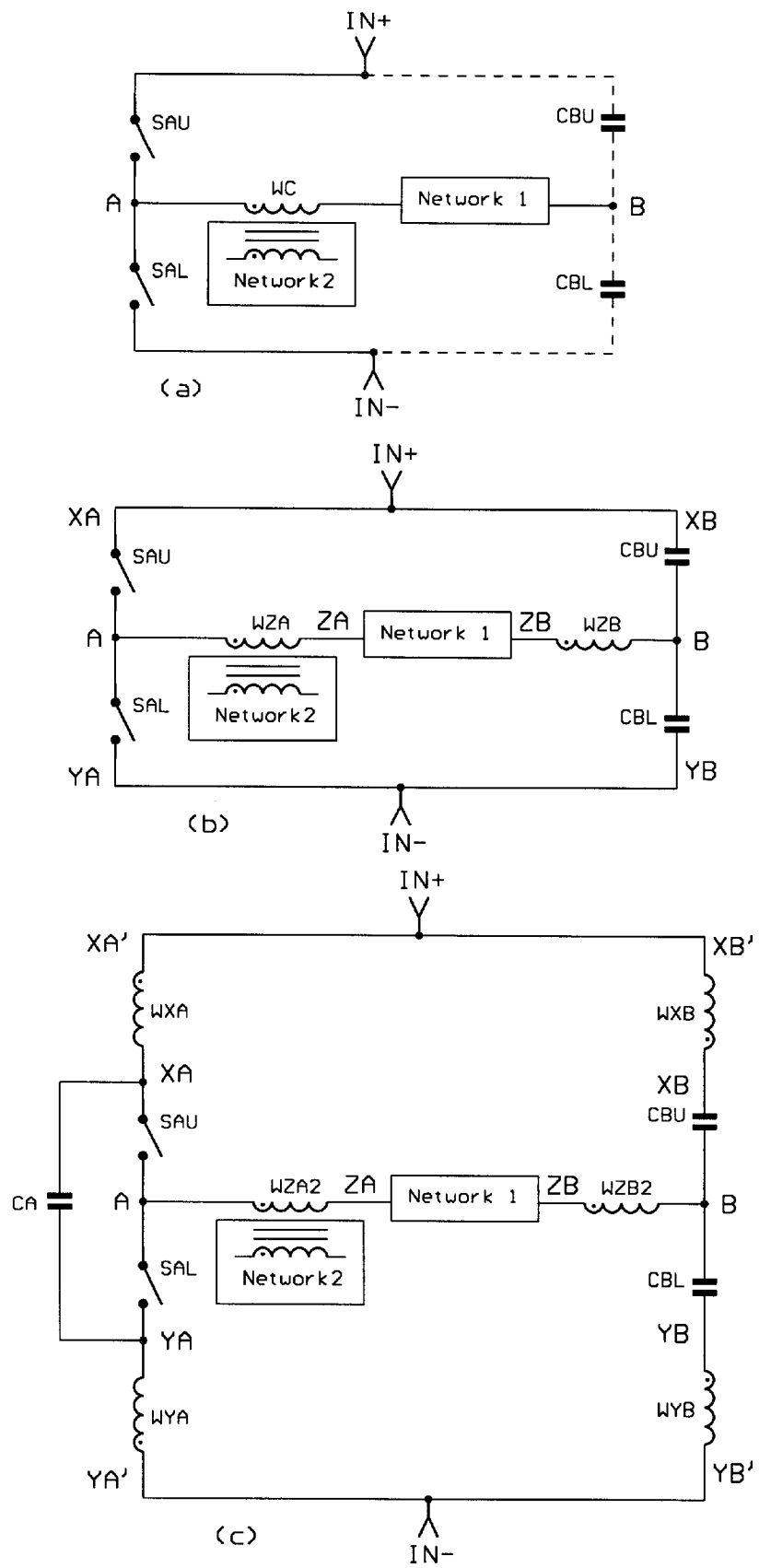
FIG. 8(a) illustrates a generalized half bridge power conversion network.
FIG. 8(b) illustrates the FIG. 8(a) network with the center leg winding split into two windings and arranged to create two three terminal networks of the type illustrated in FIG. 3(a).
FIG. 8(c) illustrates the FIG. 8(b) network with the synthesis method illustrated in FIGS. 3(a) through 3(d) applied to form a new half bridge power conversion network with mutual ripple current cancellation at the two network terminals.
FIG. 8(d) illustrates the FIG. 8(c) network with the two center leg windings combined into a single center leg winding.
FIG. 8(e) illustrates the FIG. 8(d) network with the center leg winding reduced to the point of elimination.
Figure 8:
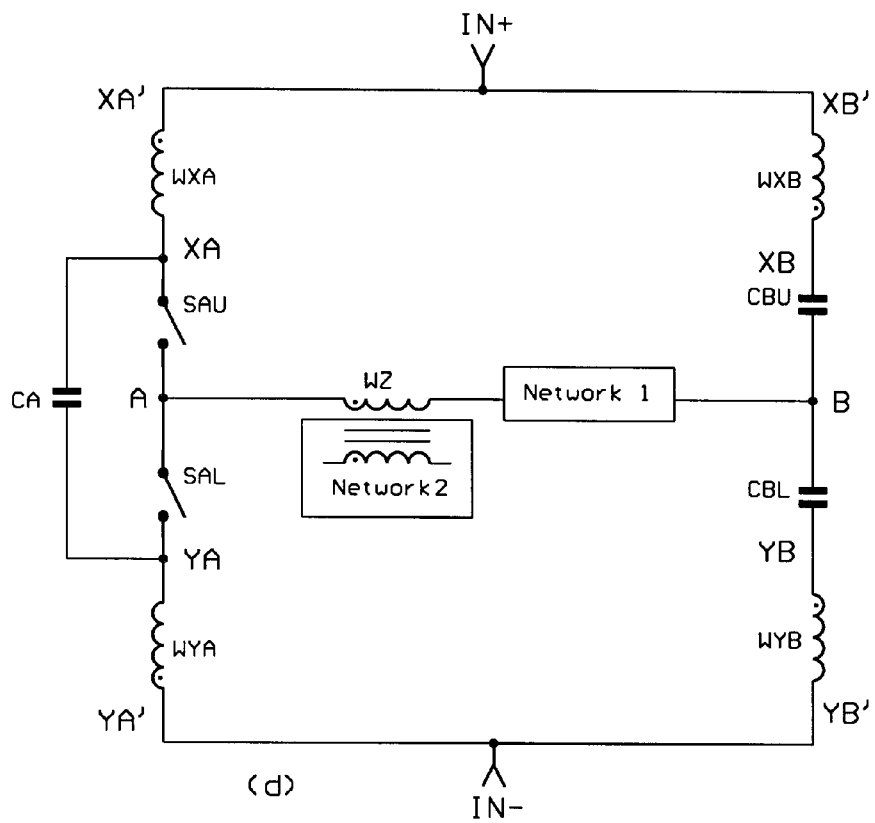
Figure 8:
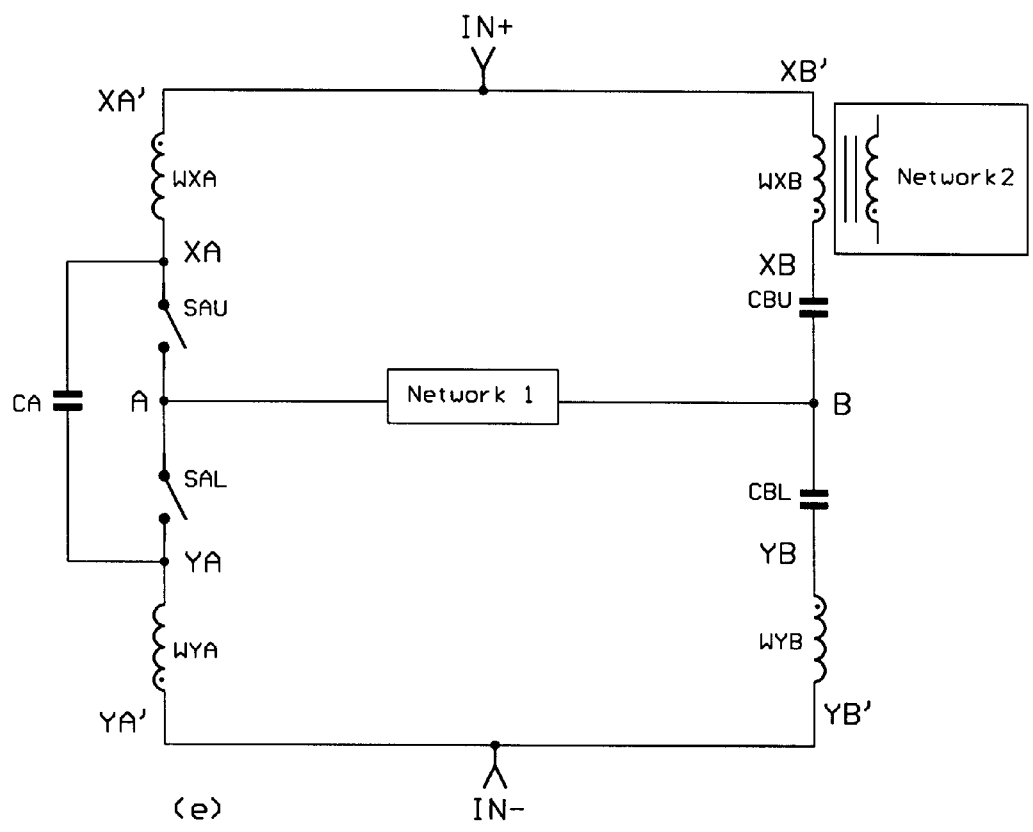

FIG. 20(c) illustrates a coupled inductor buck type primary circuit with ripple current cancellation achieved by applying the synthesis method illustrated in FIG. 8(d) to the FIG. 20(a) circuit.

FIG. 20(d) illustrates a coupled inductor buck type primary circuit with ripple current cancellation achieved by applying the synthesis method illustrated in FIG. 8(e) to the FIG. 20(a) circuit.

Figure 21:
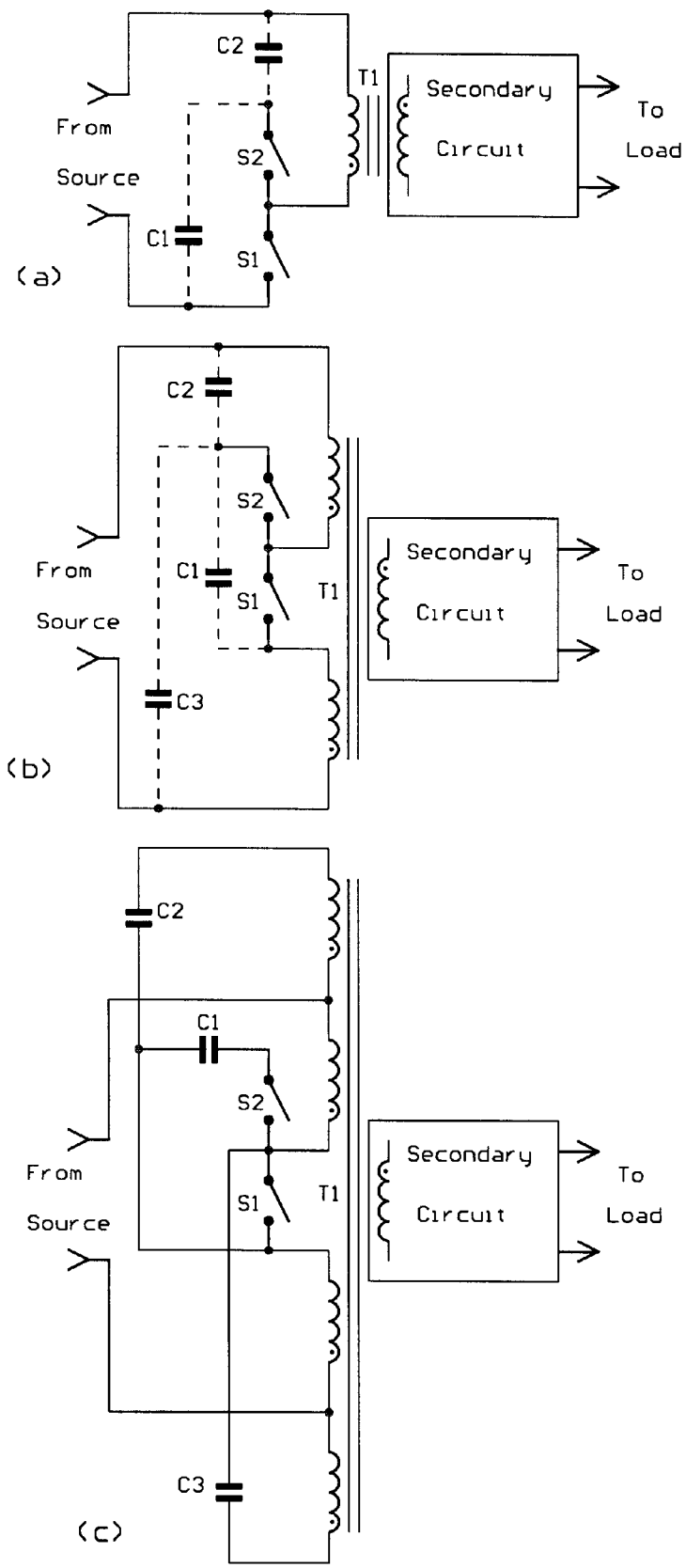

FIG. 21(a) illustrates an active clamp flyback type primary circuit.

Figure 5:
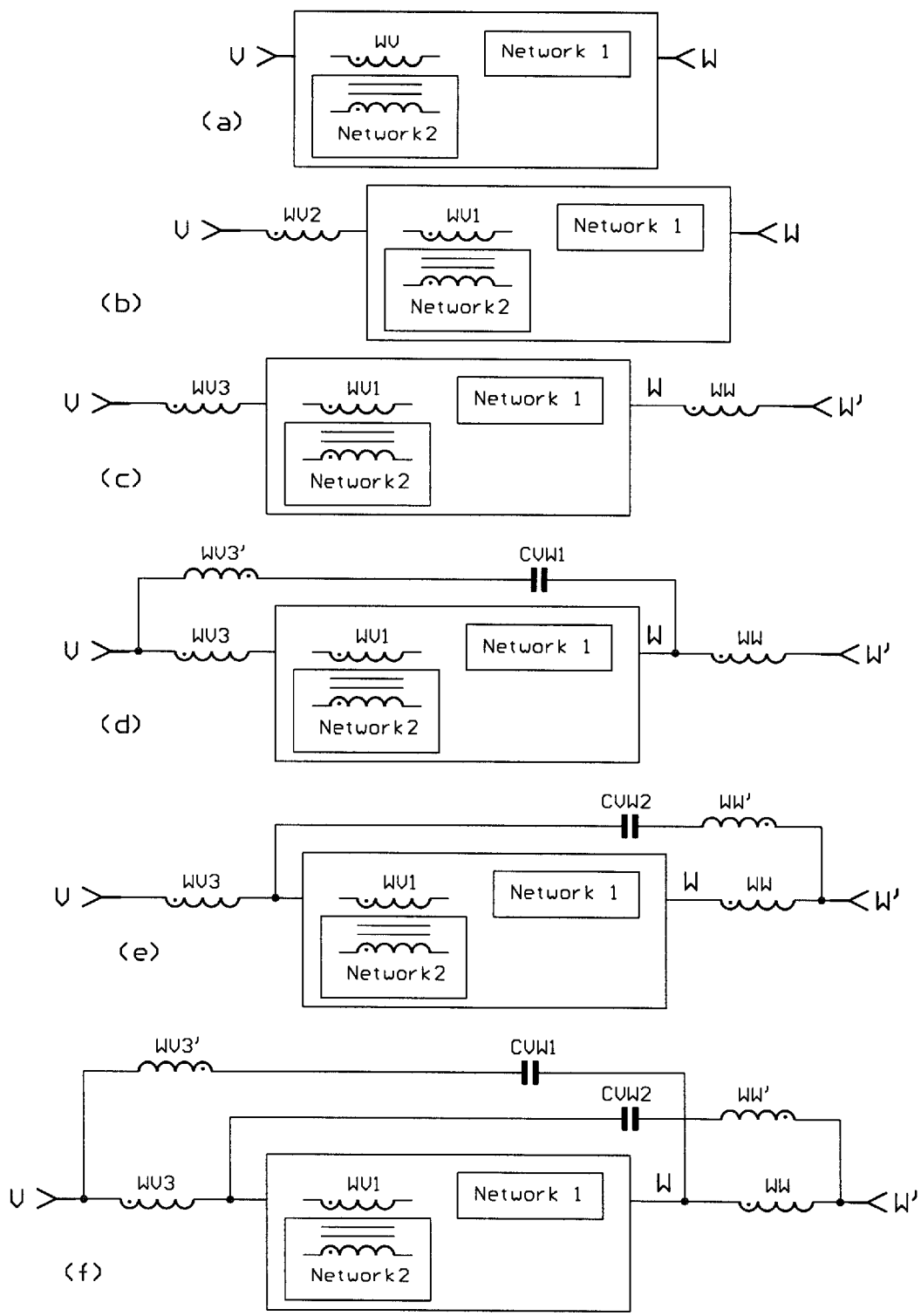
FIG. 5(a) illustrates a general two terminal power conversion network comprising, at a minimum, a winding and an electronic circuit network comprising, at a minimum, a switch.
FIG. 5(b) illustrates the network of FIG. 5(a) with the winding split into two windings.
FIG. 5(c) illustrates a more balanced network equivalent to the network of FIG. 5(a) and FIG. 5(b) in which the winding is split into three windings with one winding directly connected to each terminal of the network.
FIG. 5(d) illustrates the FIG. 5(c) network with an added winding and capacitor connected to provide mutual ripple current cancellation at the V terminal.
FIG. 5(e) illustrates the FIG. 5(c) network with an added winding and capacitor connected to provide mutual ripple current cancellation at the W' terminal.
FIG. 5(f) illustrates the FIG. 5(c) network with added windings and capacitors connected to provide mutual ripple current cancellation at both the V and W' terminals.
FIG. 5(g) illustrates a two terminal network comprising two FIG. 5(a) type networks, an A network and a B network, connected in parallel and operated mutually out of phase in a push pull manner.
FIG. 5(h) illustrates the FIG. 5(g) network with the windings split and moved to the terminals.
FIG. 5(i) illustrates the FIG. 5(h) network with capacitors added to provide mutual terminal ripple current cancellation and common mode current cancellation.
FIG. 5(j) illustrates the FIG. 5(c) network with the WV1 winding reduced to the point of elimination.
FIG. 5(k) illustrates the FIG. 5(f) network with the WV1 winding reduced to the point of elimination.
Figure 5:
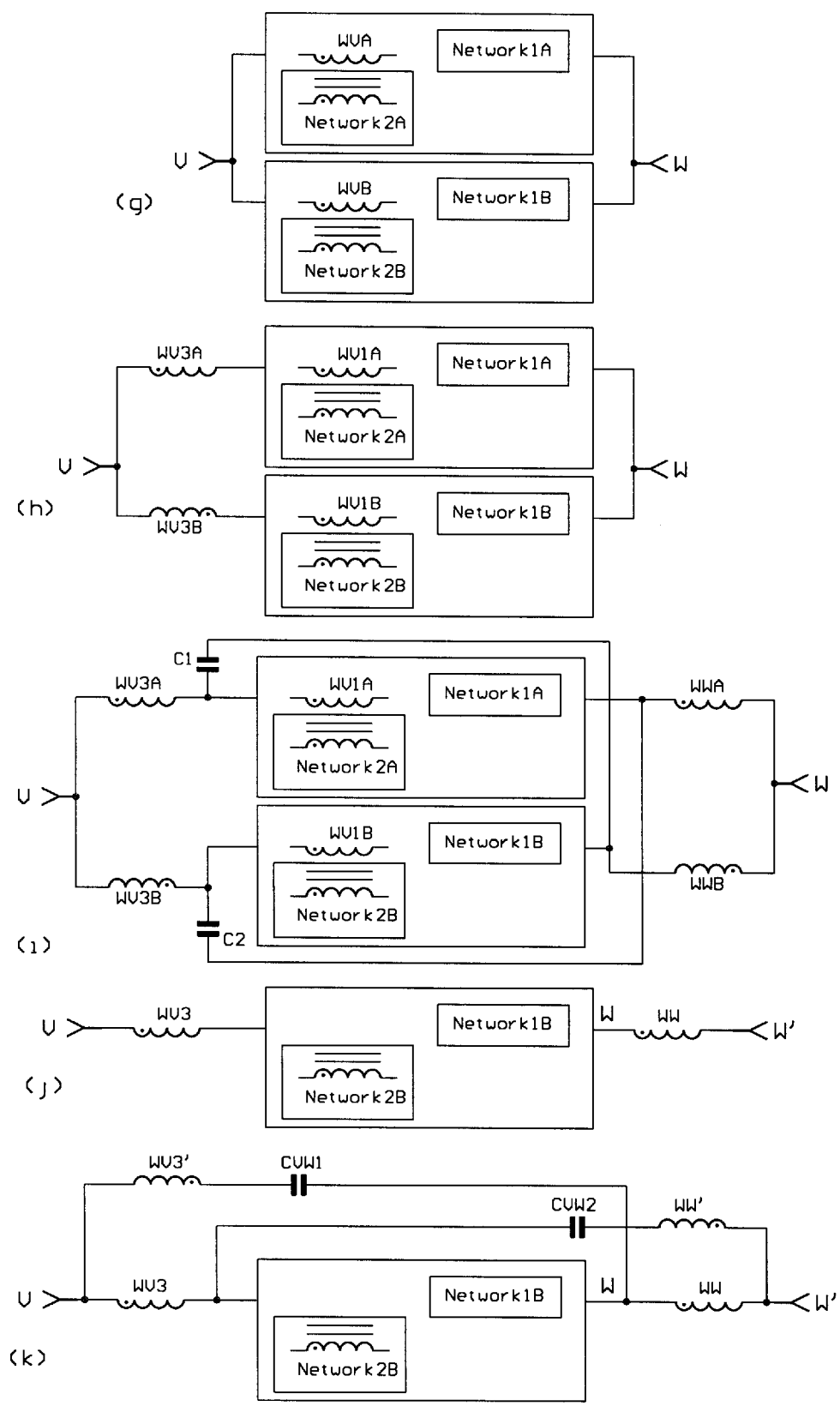

FIG. 21(b) illustrates an active clamp flyback type primary circuit with common mode current cancellation achieved by applying the synthesis method illustrated in FIG. 5(j) to the FIG. 21(a) circuit.

FIG. 21(c) illustrates an active clamp flyback type primary circuit with ripple current cancellation achieved by applying the synthesis method illustrated in FIG. 5(k) to the FIG. 21(b) circuit.

Figure 22:
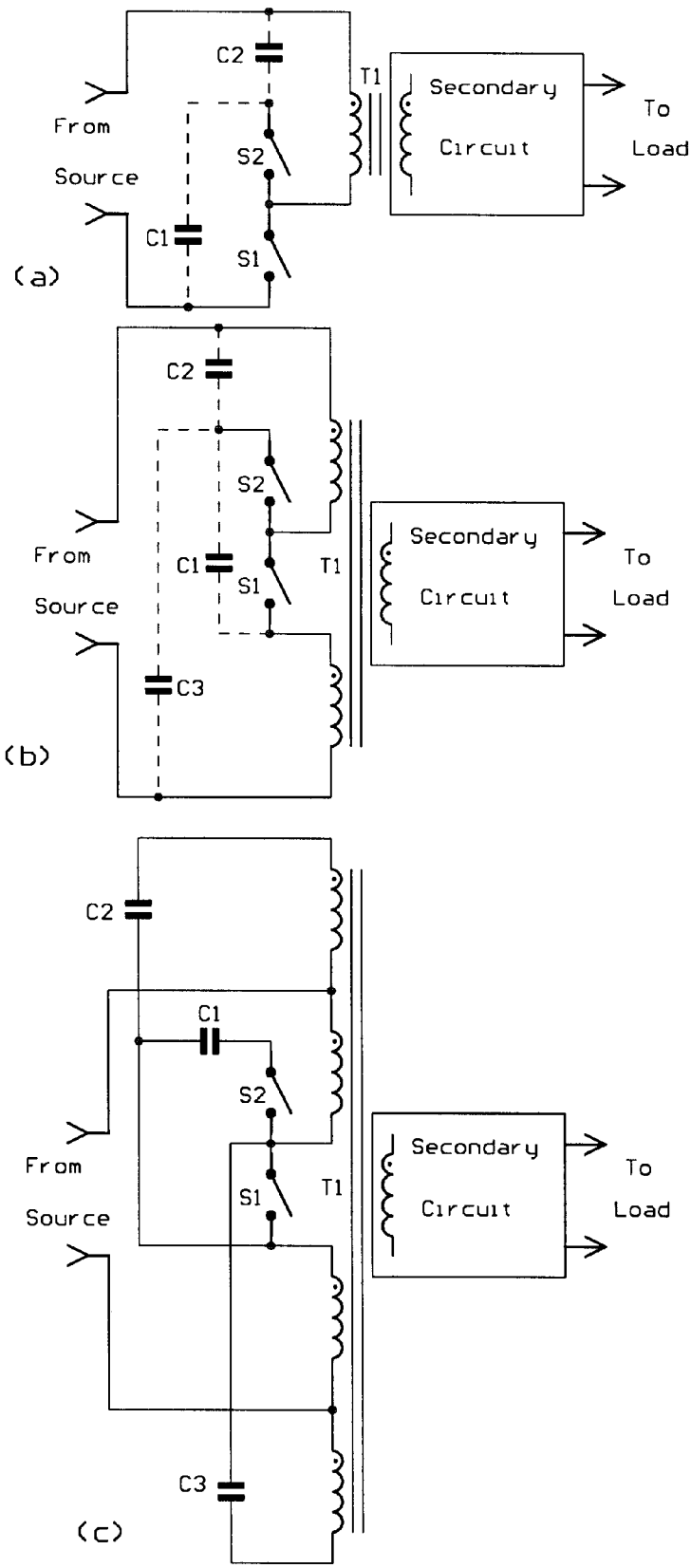

FIG. 22(a) illustrates an active clamp forward type primary circuit.

FIG. 22(b) illustrates an active clamp forward type primary circuit with common mode current cancellation achieved by applying the synthesis method illustrated in FIG. 5(j) to the FIG. 22(a) circuit.

FIG. 22(c) illustrates an active clamp forward type primary circuit with ripple current cancellation achieved by applying the synthesis method illustrated in FIG. 5(k) to the FIG. 22(b) circuit.

Figure 23:
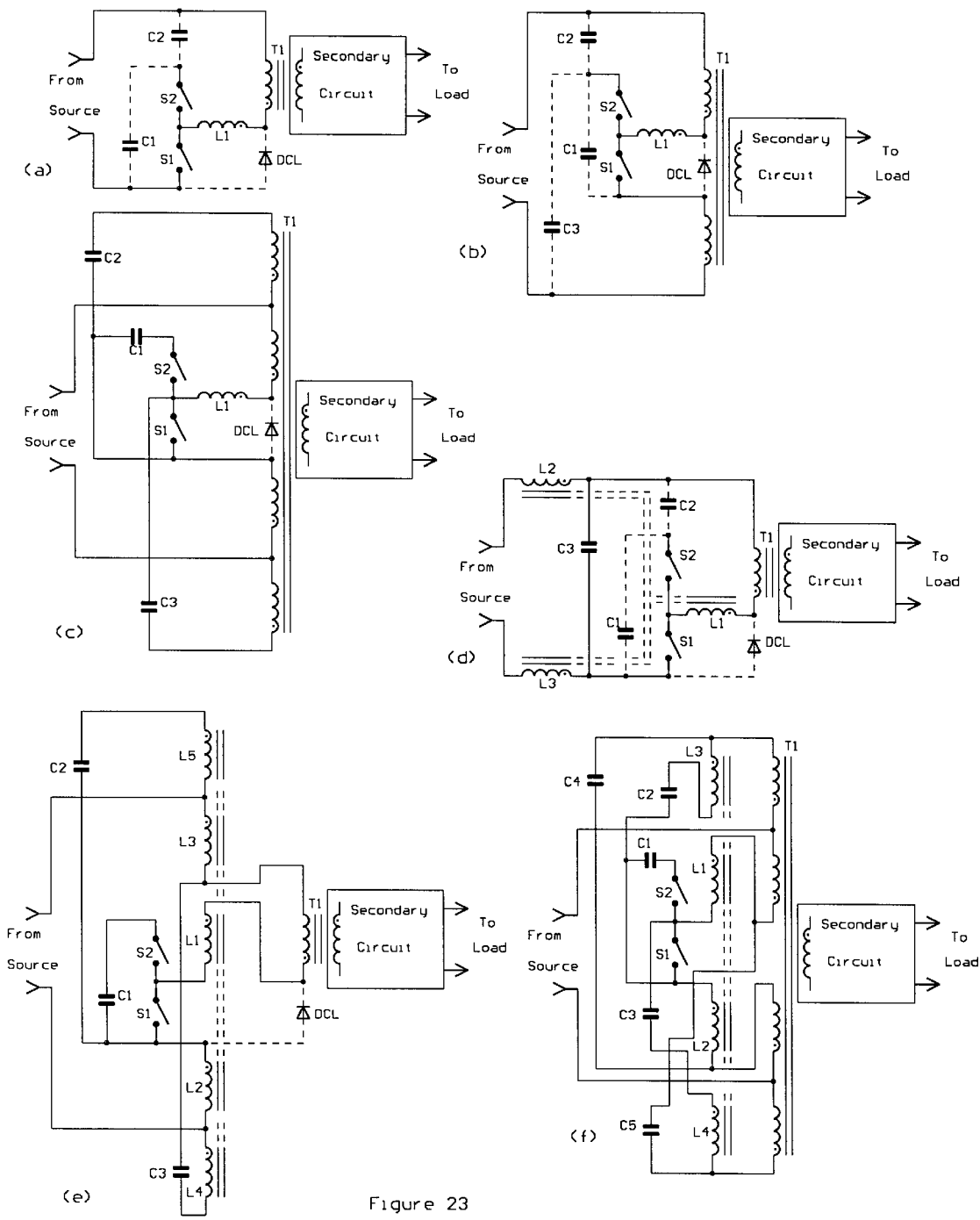

FIG. 23(a) illustrates a zero voltage switching (ZVS) active clamp flyback type primary circuit.

FIG. 23(b) illustrates a ZVS active clamp flyback type primary circuit with common mode current cancellation achieved by applying the synthesis method illustrated in FIG. 5(j) to the FIG. 23(a) circuit.

FIG. 23(c) illustrates a ZVS active clamp flyback type primary circuit with ripple current cancellation achieved by applying the synthesis method illustrated in FIG. 5(k) to the FIG. 23(b) circuit.

FIG. 23(d) illustrates a ZVS active clamp flyback type primary circuit with non-pulsating terminal current achieved by application of the synthesis method illustrated in FIG. 3(d) to the FIG. 23(a) circuit.

FIG. 23(e) illustrates a ZVS active clamp flyback type primary circuit with ripple current cancellation achieved by applying the synthesis method illustrated in FIG. 5(f) to the FIG. 23(a) circuit.

FIG. 23(f) illustrates a ZVS active clamp flyback type primary circuit with improved ripple current cancellation achieved by applying the synthesis method illustrated in FIG. 5(k) to the FIG. 23(a) circuit.

Figure 24:
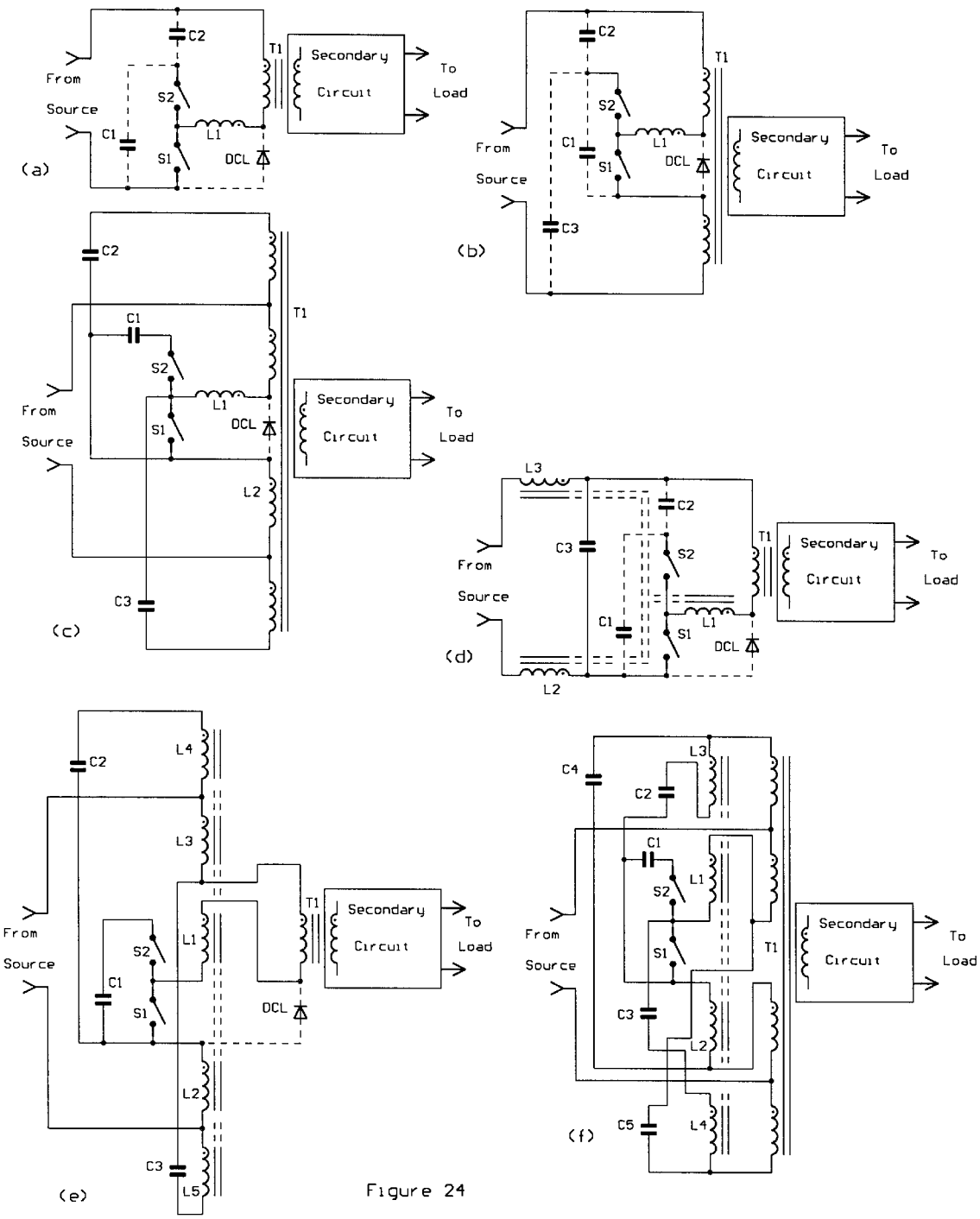

FIG. 24(a) illustrates a ZVS active clamp forward type primary circuit.

FIG. 24(b) illustrates a ZVS active clamp forward type primary circuit with common mode current cancellation achieved by applying the synthesis method illustrated in FIG. 5(j) to the FIG. 24(a) circuit.

FIG. 24(c) illustrates a ZVS active clamp forward type primary circuit with ripple current cancellation achieved by applying the synthesis method illustrated in FIG. 5(k) to the FIG. 24(b) circuit.

FIG. 24(d) illustrates a ZVS active clamp forward type primary circuit with non-pulsating terminal current achieved by application of the synthesis method illustrated in FIG. 3(d) to the FIG. 24(a) circuit.

FIG. 24(e) illustrates a ZVS active clamp forward type primary circuit with ripple current cancellation achieved by applying the synthesis method illustrated in FIG. 5(f) to the FIG. 24(a) circuit.

FIG. 24(f) illustrates a ZVS active clamp forward type primary circuit with improved ripple current cancellation achieved by applying the synthesis method illustrated in FIG. 5(k) to the FIG. 24(a) circuit.

Figure 25:
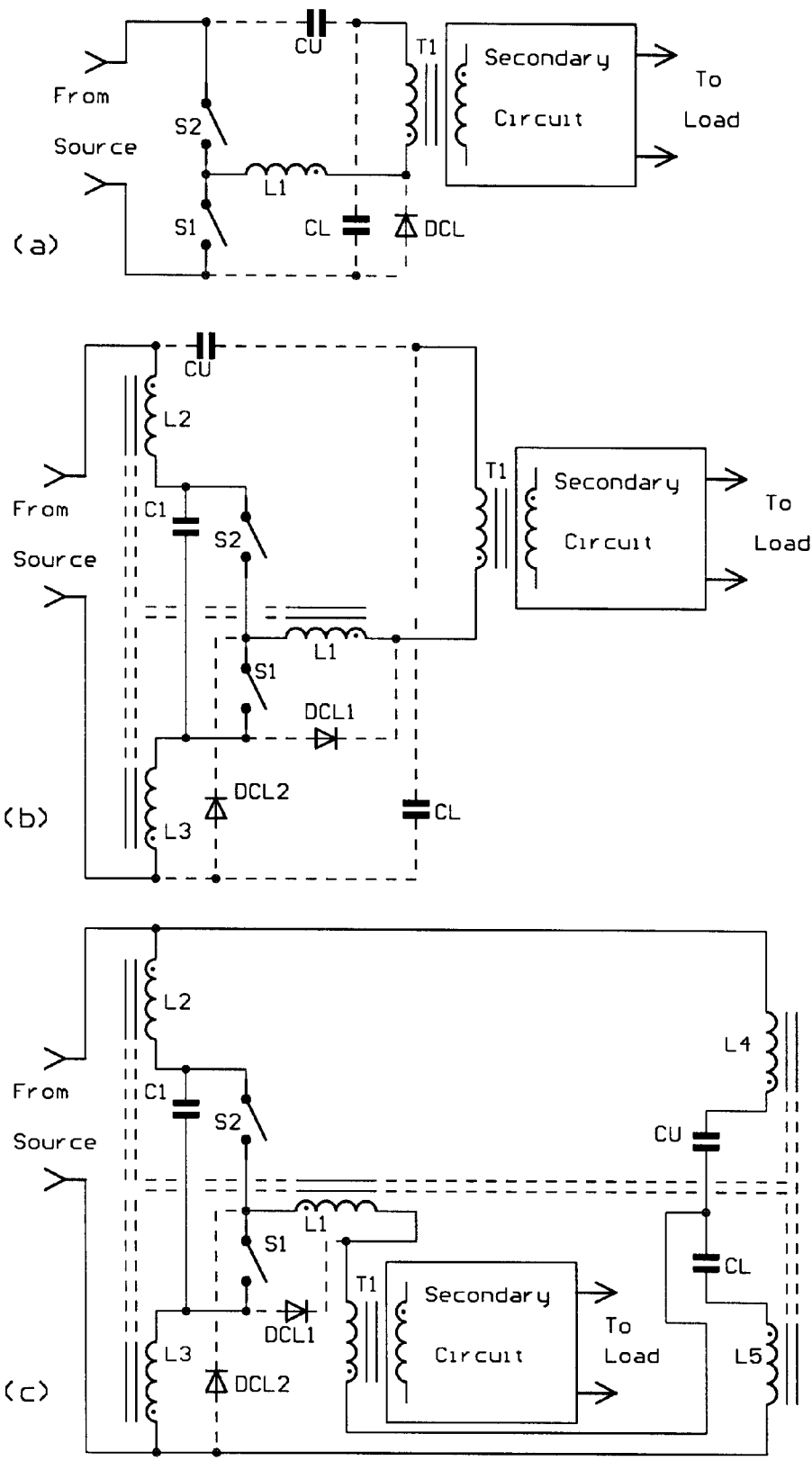
Figure 25:
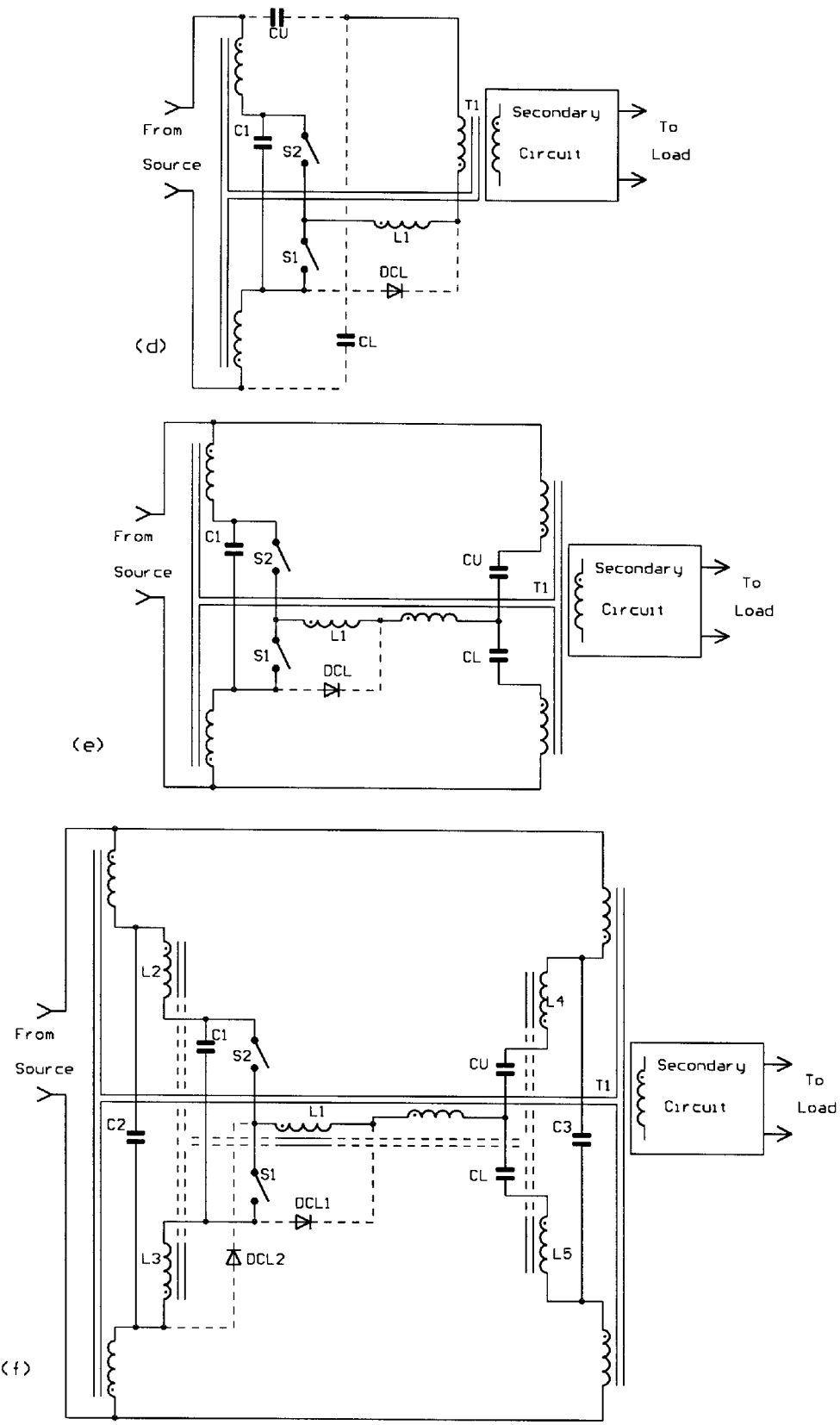
Figure 25:
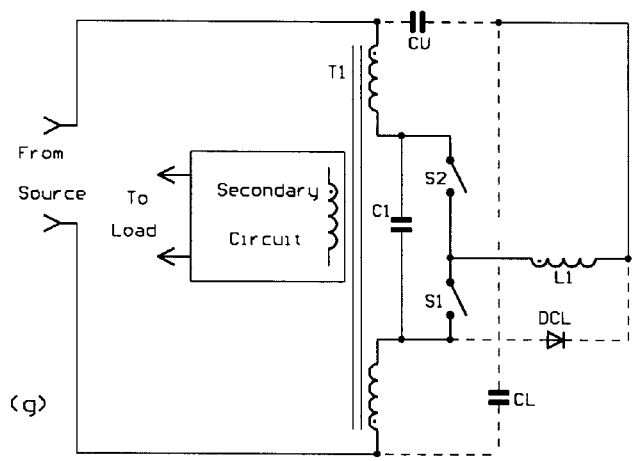
Figure 25:
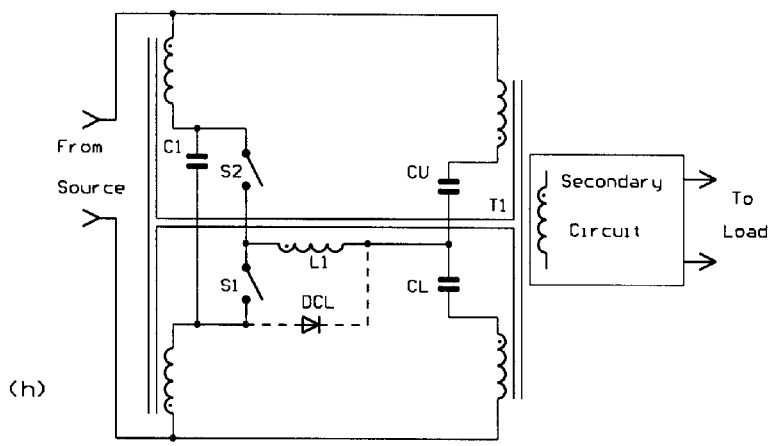
Figure 25:
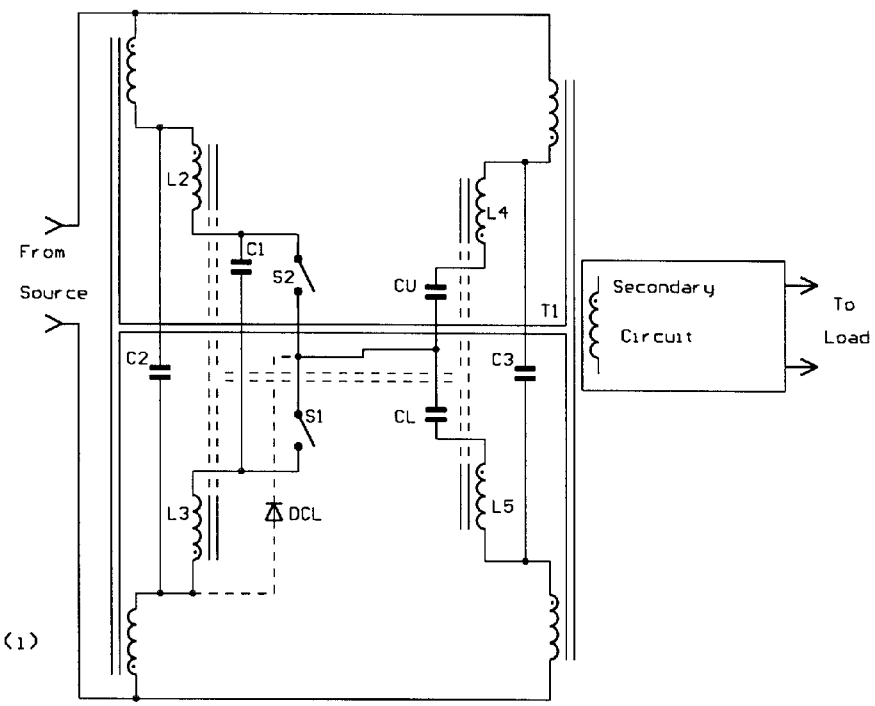

FIG. 25(a) illustrates a ZVS coupled inductor buck type primary circuit.

FIG. 25(b) illustrates a ZVS coupled inductor buck type primary circuit with non-pulsating terminal current achieved by applying the synthesis method illustrated in FIG. 3(d) to the FIG. 25(a) circuit.

FIG. 25(c) illustrates a ZVS coupled inductor buck type primary circuit with ripple current cancellation achieved by applying the synthesis method illustrated in FIG. 8(d) to the FIG. 25(a) circuit.

FIG. 25(d) illustrates a ZVS coupled inductor buck type primary circuit with non-pulsating terminal current achieved by applying the synthesis method illustrated in FIG. 3(d) to the FIG. 25(a) circuit.

FIG. 25(e) illustrates a ZVS coupled inductor buck type primary circuit with ripple current cancellation achieved by applying the synthesis method of FIG. 8(d) to the FIG. 25(a) circuit.

FIG. 25(f) illustrates a ZVS coupled inductor buck type primary circuit with improved ripple current cancellation achieved by applying the third synthesis method illustrated in FIG. 8(d) to the FIG. 25(a) circuit.

Figure 4:
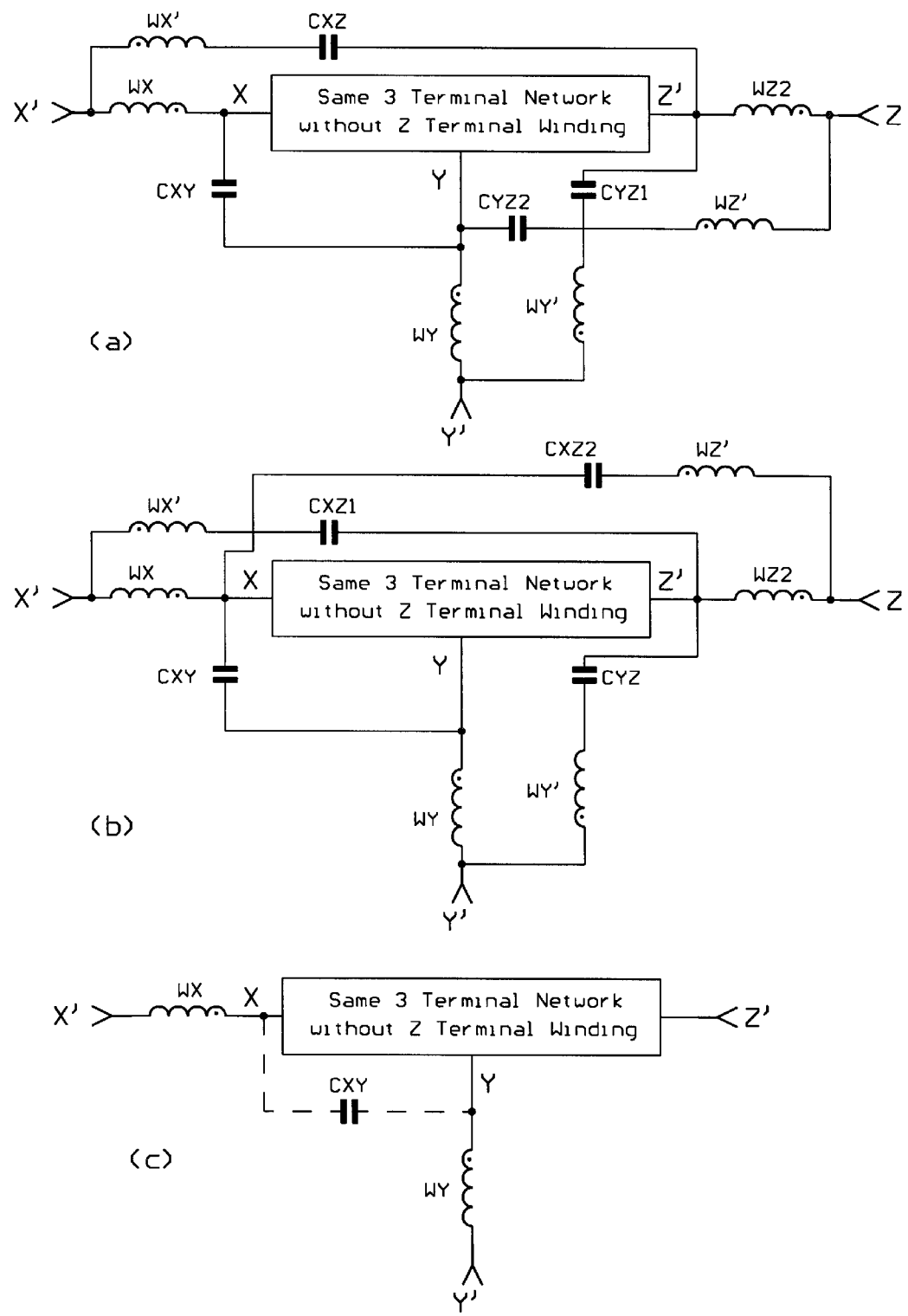
FIG. 4(a) illustrates an alternate arrangement of the FIG. 3(e) three terminal power conversion network with mutual cancellation of all terminal ripple currents.
FIG. 4(b) illustrates another alternate arrangement of the FIG. 3(e) and FIG. 4(a) three terminal power conversion networks with mutual cancellation of all terminal ripple currents.
FIG. 4(c) illustrates a new three terminal power conversion network equivalent to the FIG. 3(d) network but with the entire Z terminal winding moved to the X and Y terminals to achieve improved terminal current ripple performance.

FIG. 25(g) illustrates a ZVS coupled inductor buck type primary circuit with non-pulsating terminal currents achieved by applying the first synthesis method illustrated by FIG. 4(c) to the FIG. 25(a) circuit.

FIG. 25(h) illustrates a ZVS coupled inductor buck type primary circuit with ripple current cancellation and common mode current cancellation achieved by applying the synthesis method illustrated in FIG. 8(e) to the FIG. 25(a) circuit.

FIG. 25(i) illustrates a ZVS coupled inductor buck type primary circuit with ripple current cancellation and common mode current cancellation achieved by applying the synthesis method illustrated in FIG. 8(e) to the FIG. 25(a) circuit.

Figure 26:
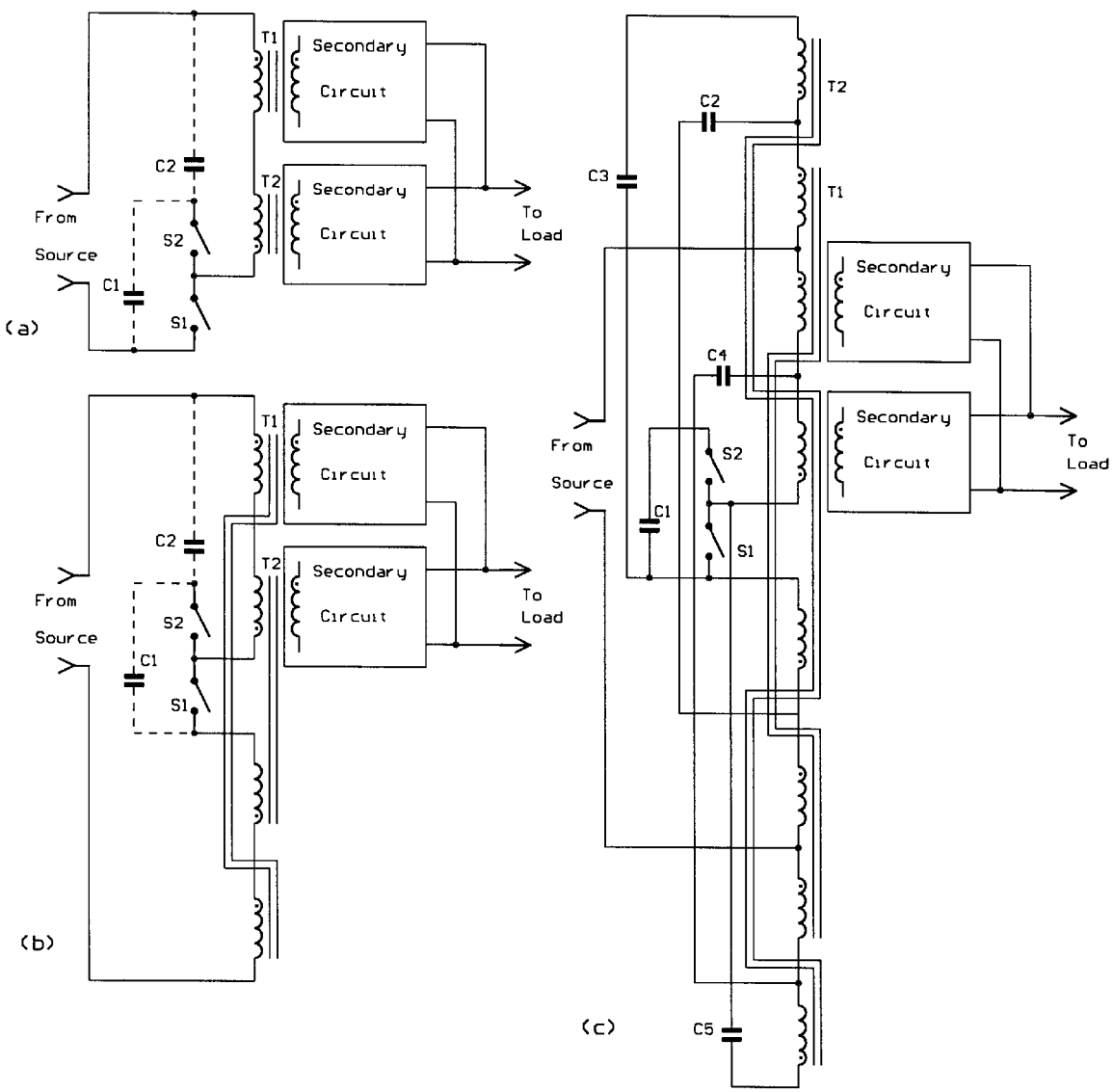

FIG. 26(a) illustrates an active clamp interleaved coupled inductor buck type primary circuit.

FIG. 26(b) illustrates an active clamp interleaved coupled inductor buck type primary circuit with common mode current cancellation achieved by applying the synthesis method illustrated in FIG. 5(j) to the FIG. 26(a) circuit.

FIG. 26(c) illustrates an active clamp interleaved coupled inductor buck type primary circuit with ripple current cancellation achieved by applying the synthesis method illustrated in FIG. 5(k) to the FIG. 26(b) circuit.

Figure 27:
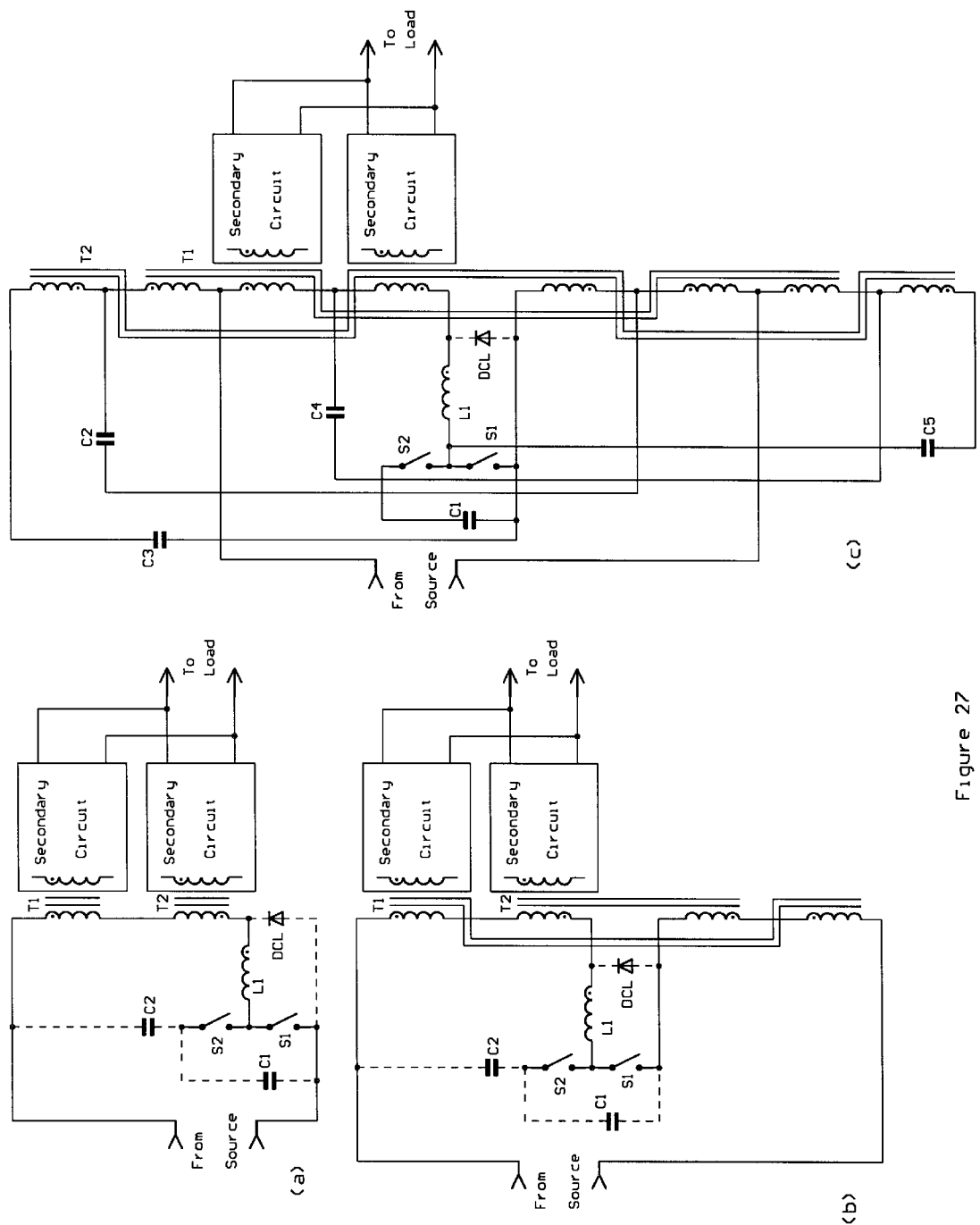
Figure 27:
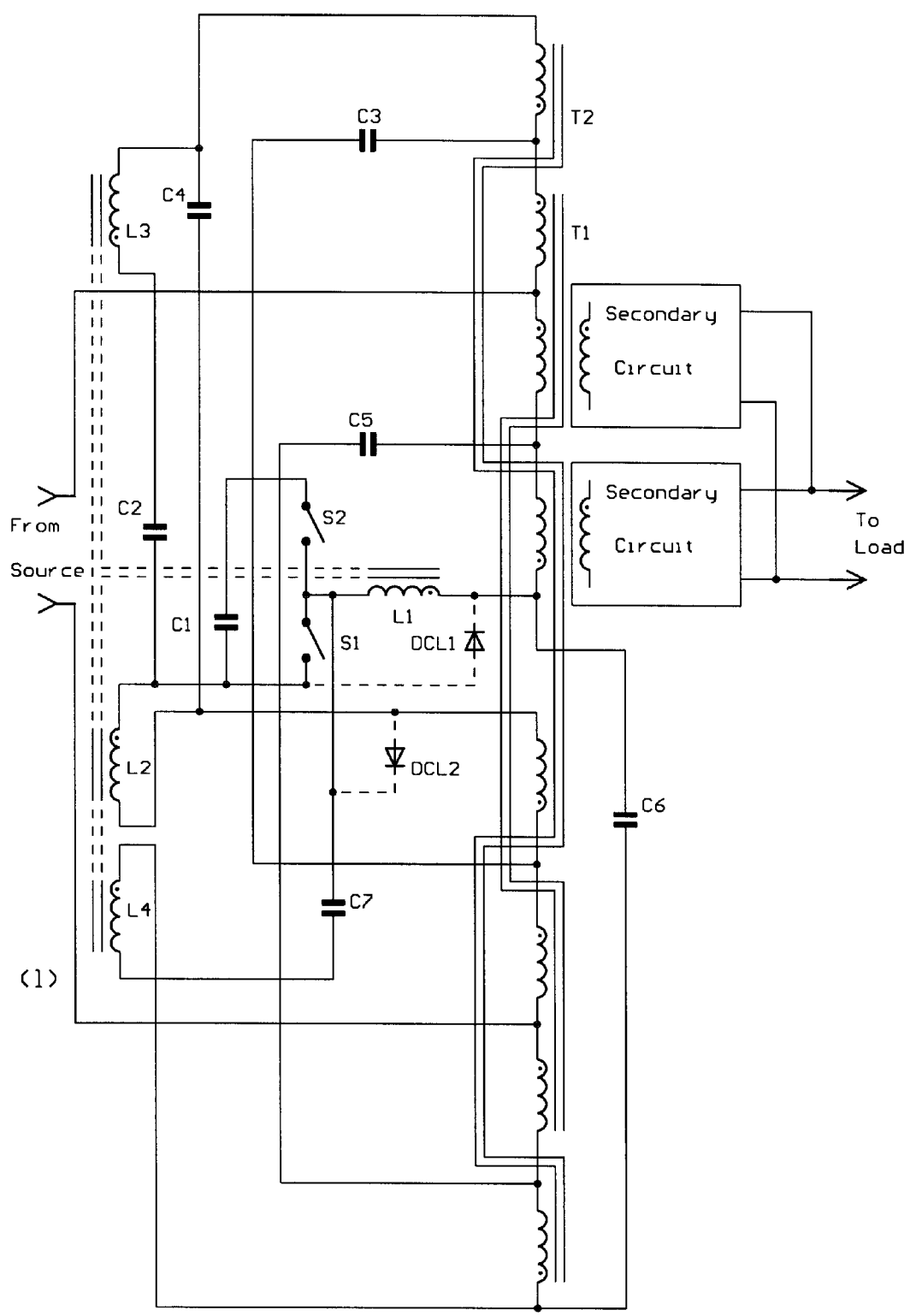

FIG. 27(a) illustrates a ZVS active clamp interleaved coupled inductor buck type primary circuit.

FIG. 27(b) illustrates a ZVS active clamp interleaved coupled inductor buck type primary circuit with common mode current cancellation achieved by applying the synthesis method illustrated in FIG. 5(j) to the FIG. 27(a) circuit.

FIG. 27(c) illustrates a ZVS active clamp interleaved coupled inductor buck type primary circuit with ripple current cancellation achieved by applying the synthesis method illustrated in FIG. 5(k) to the FIG. 27(b) circuit.

FIG. 27(d) illustrates a ZVS active clamp interleaved coupled inductor buck type primary circuit with non-pulsating terminal current achieved by applying the synthesis method illustrated in FIG. 3(d) to the FIG. 27(a) circuit.

FIG. 27(e) illustrates a ZVS active clamp interleaved coupled inductor buck type primary circuit with ripple current cancellation achieved by applying the synthesis method illustrated in FIG. 5(f) to the FIG. 27(a) circuit.

FIG. 27(f) illustrates a ZVS active clamp interleaved coupled inductor buck type primary circuit with ripple current cancellation achieved by applying the synthesis method illustrated in FIG. 5(f) to the FIG. 27(b) circuit.

FIG. 27(g) illustrates a ZVS active clamp interleaved coupled inductor buck type primary circuit with non-pulsating terminal current achieved by applying the synthesis method illustrated in FIG. 3(d) to the FIG. 27(b) circuit.

FIG. 27(h) illustrates a ZVS active clamp interleaved coupled inductor buck type primary circuit with non-pulsating terminal currents achieved by applying the synthesis method illustrated in FIG. 4(c) to the FIG. 27(a) circuit.

FIG. 27(i) illustrates a ZVS active clamp interleaved coupled inductor buck type primary circuit with ripple current cancellation achieved by applying the synthesis method illustrated in FIG. 5(k) to the FIG. 27(a) circuit.

FIG. 27(j) illustrates a ZVS active clamp interleaved coupled inductor buck type primary circuit with common mode current cancellation achieved by applying the synthesis method illustrated in FIG. 5(j) to the FIG. 27(i) circuit.

FIG. 27(k) illustrates a ZVS active clamp interleaved coupled inductor buck type primary circuit with common mode current cancellation achieved by applying the synthesis method illustrated in FIG. 5(j) to the FIG. 27(h) circuit.

FIG. 27(l) illustrates a ZVS active clamp interleaved coupled inductor buck type primary circuit with terminal ripple current cancellation and common mode current cancellation achieved by applying the synthesis method illustrated in FIG. 5(k) to the FIG. 27(a) circuit.

Figure 28:
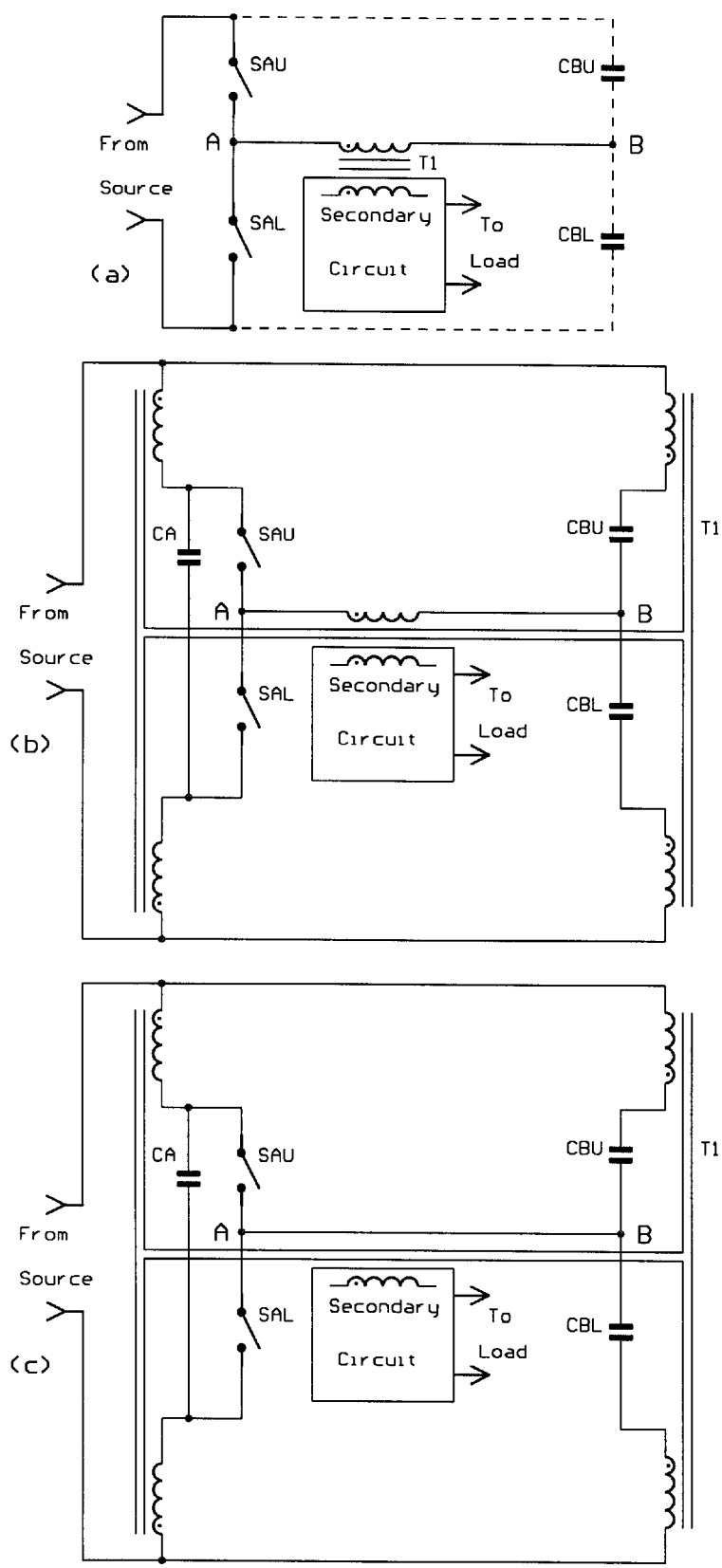

FIG. 28(a) illustrates a half bridge transformer coupled type primary circuit.

FIG. 28(b) illustrates a half bridge transformer coupled type primary circuit with ripple current cancellation achieved by applying the synthesis method illustrated in FIG. 8(d) to the FIG. 28(a) circuit.

FIG. 28(c) illustrates a half bridge transformer coupled type primary circuit with common mode current cancellation achieved by applying the synthesis method illustrated in FIG. 8(e) to the FIG. 28(b) circuit.

Figure 29:
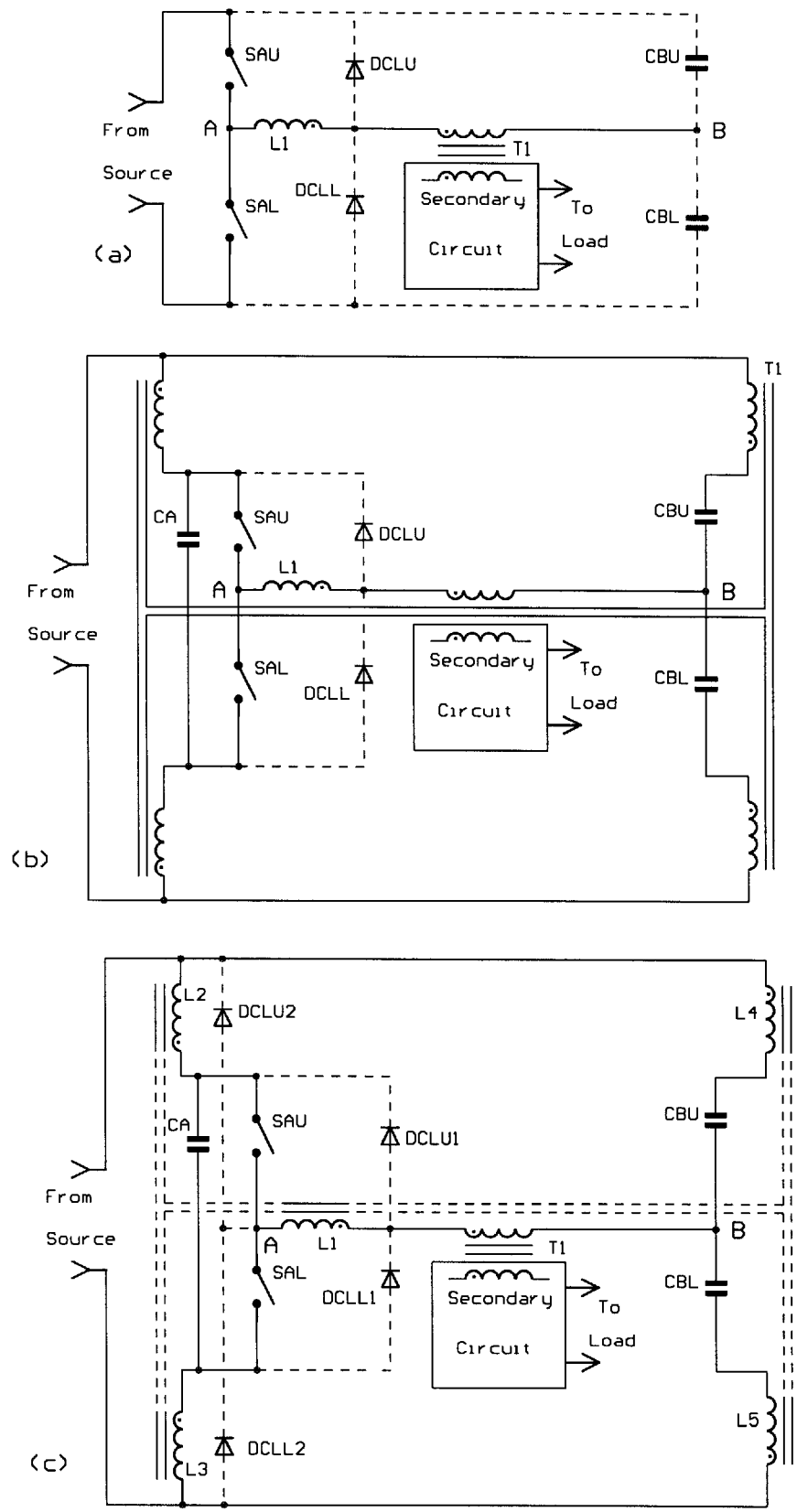
Figure 29:
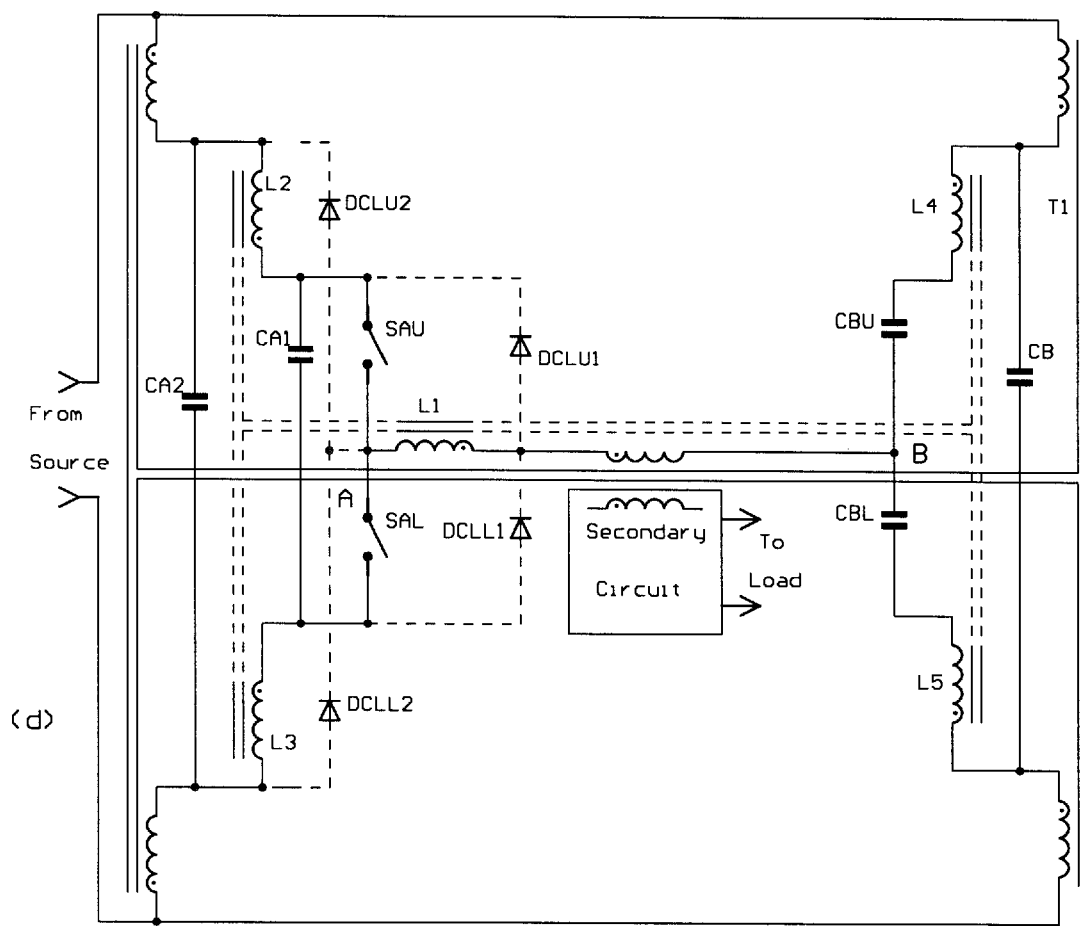
Figure 29:
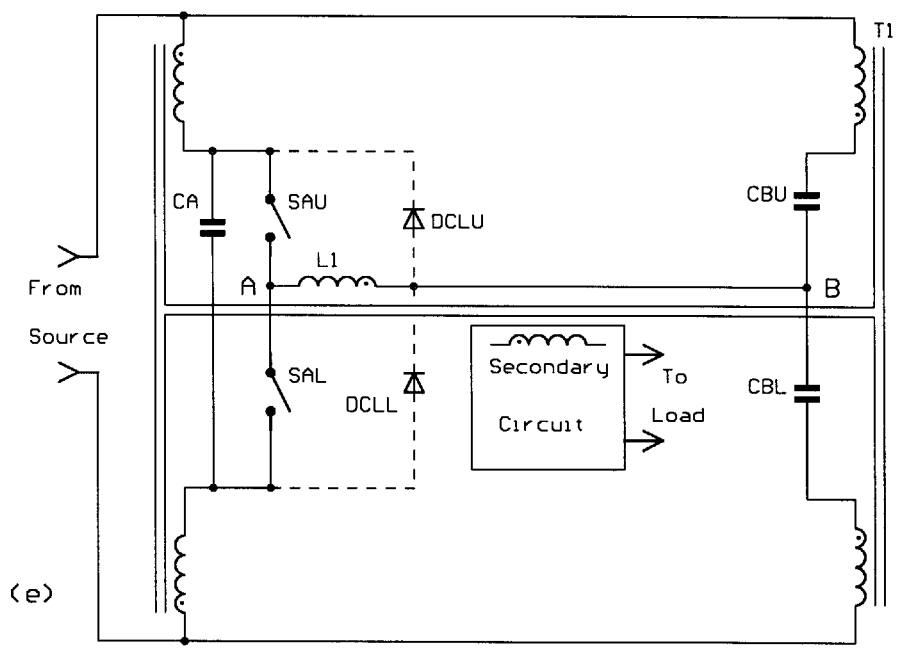
Figure 29:
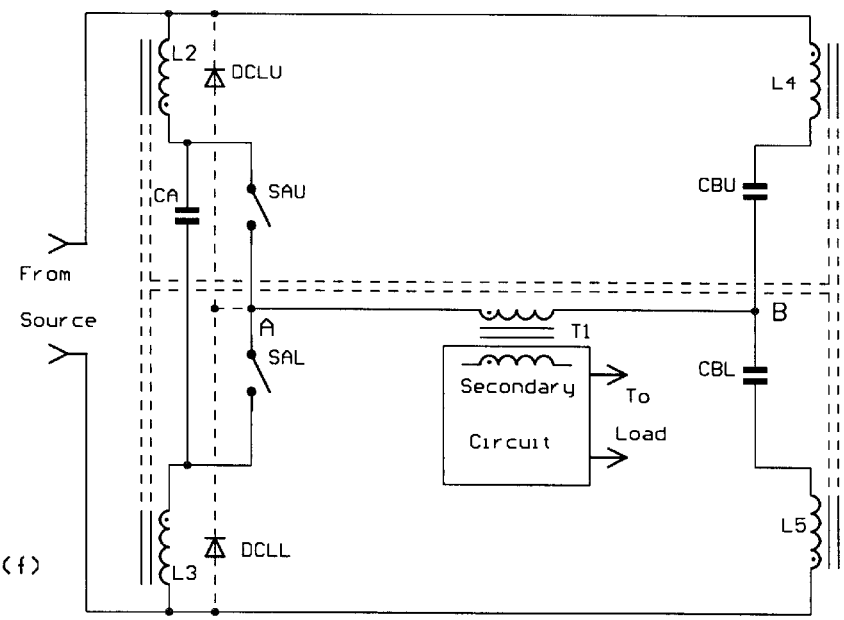
Figure 29:
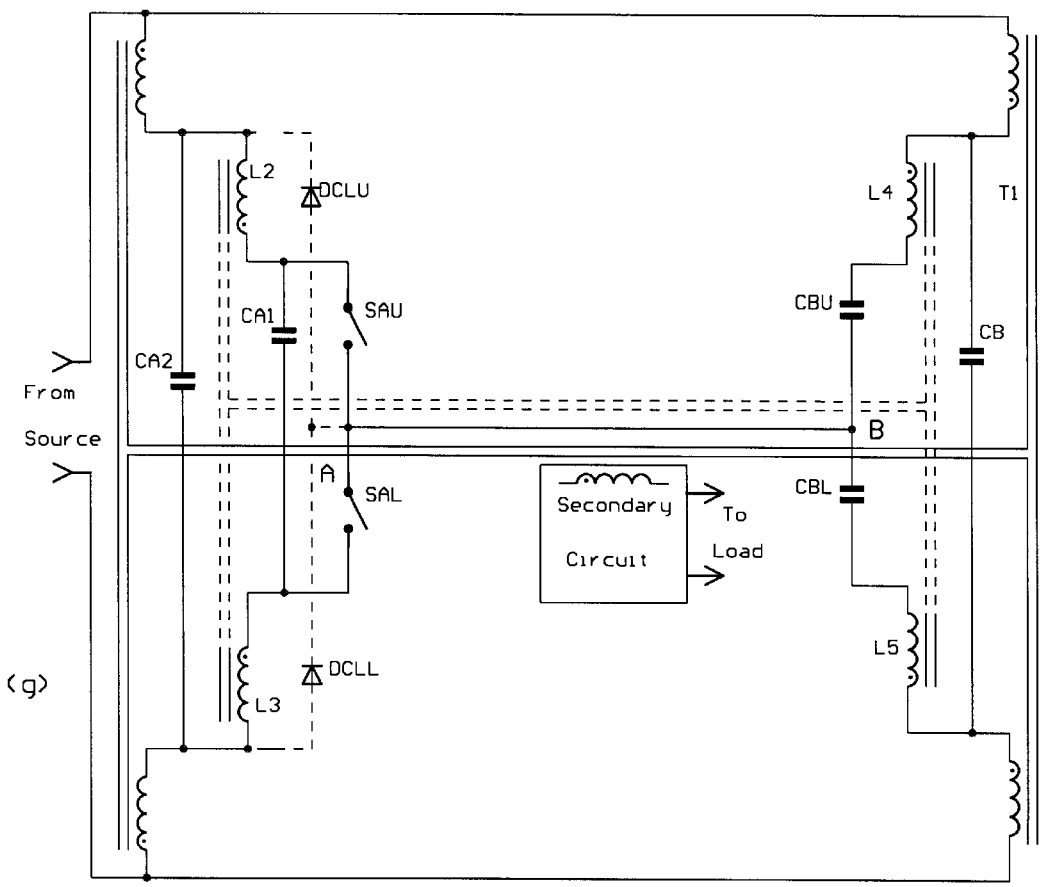

FIG. 29(a) illustrates a ZVS half bridge transformer coupled type primary circuit.

FIG. 29(b) illustrates a ZVS half bridge transformer coupled type primary circuit with ripple current cancellation achieved by applying the synthesis method illustrated in FIG. 8(d) to the FIG. 29(a) circuit.

FIG. 29(c) illustrates a ZVS half bridge transformer coupled type primary circuit with ripple current cancellation achieved by applying the synthesis method illustrated in FIG. 8(d) to the FIG. 29(a) circuit.

FIG. 29(d) illustrates a ZVS half bridge transformer coupled type primary circuit with ripple current cancellation achieved by applying the synthesis method illustrated in FIG. 8(d) to the FIG. 29(c) circuit.

FIG. 29(e) illustrates a ZVS half bridge transformer coupled type primary circuit with common mode current cancellation achieved by applying the synthesis method illustrated in FIG. 8(e) to the FIG. 28(b) circuit.

FIG. 29(f) illustrates a ZVS half bridge transformer coupled type primary circuit with common mode current cancellation achieved by applying the synthesis method illustrated in FIG. 8(e) to the FIG. 28(c) circuit.

FIG. 29(g) illustrates a ZVS half bridge transformer coupled type primary circuit with common mode current cancellation achieved by applying the synthesis method illustrated in FIG. 8(e) to the FIG. 28(d) circuit.

Figure 30:
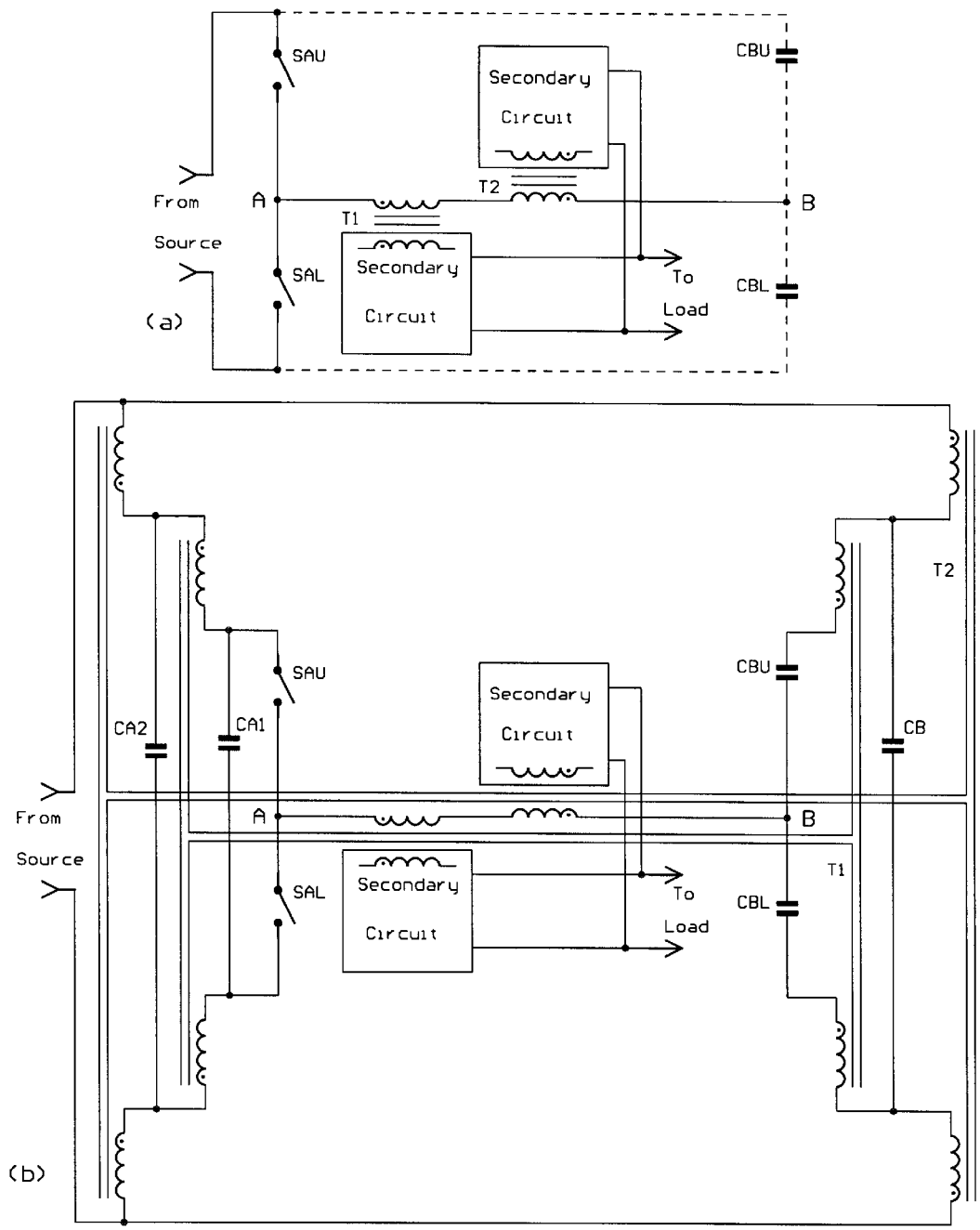
Figure 30:
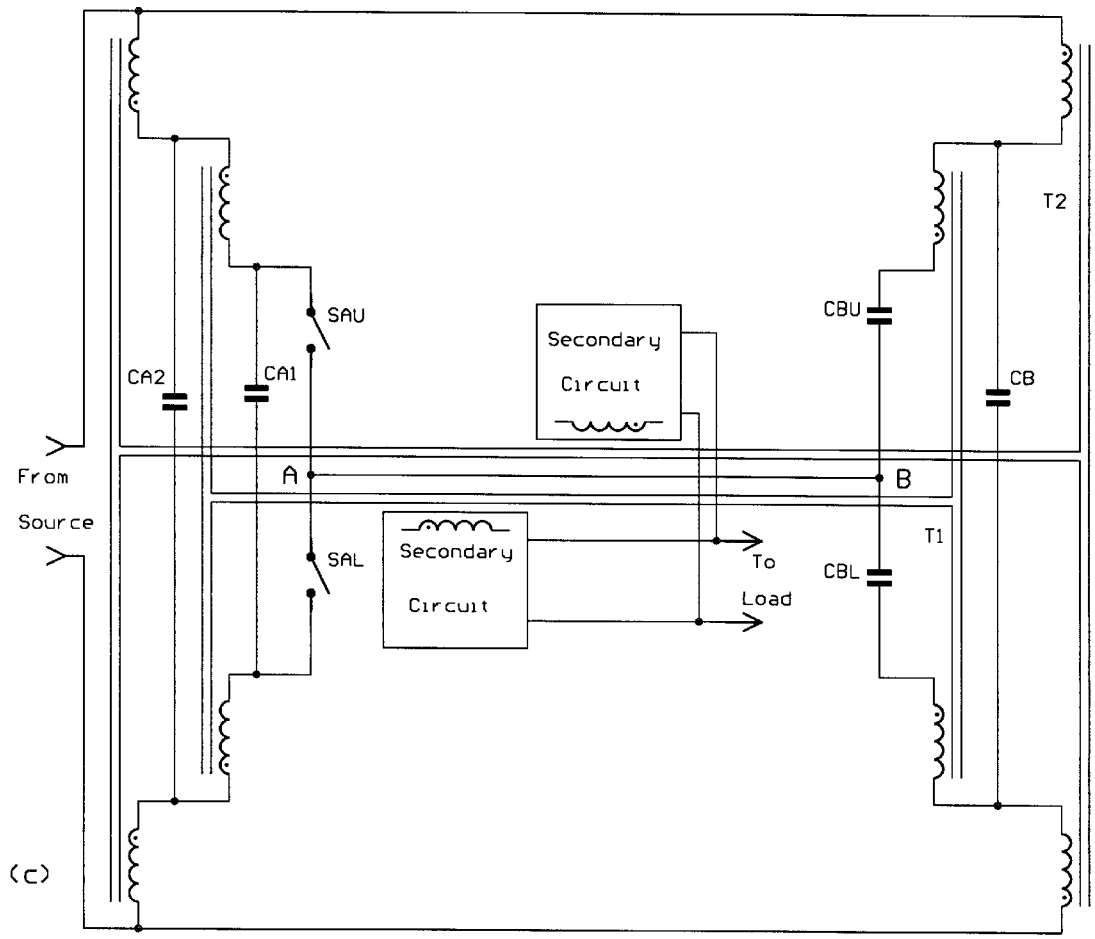

FIG. 30(a) illustrates a half bridge interleaved coupled inductor buck type primary circuit.

FIG. 30(b) illustrates a half bridge interleaved coupled inductor buck type primary circuit with ripple current cancellation achieved by applying the synthesis method illustrated in FIG. 8(d) to the FIG. 30(a) circuit.

FIG. 30(c) illustrates a half bridge interleaved coupled inductor buck type primary circuit with common mode current cancellation achieved by applying the synthesis method illustrated in FIG. 8(e) to the FIG. 30(b) circuit.

Figure 31:
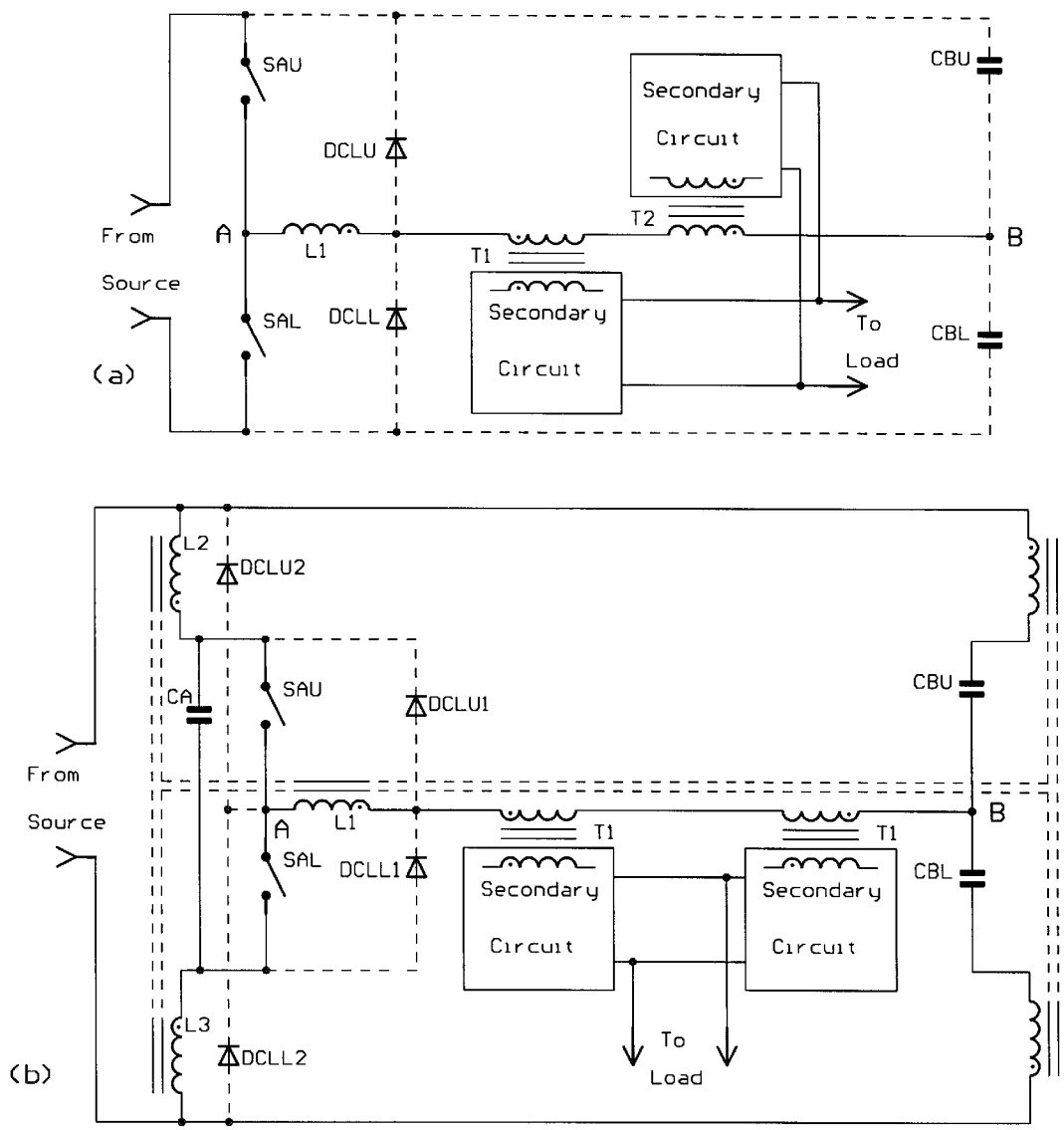
Figure 31:
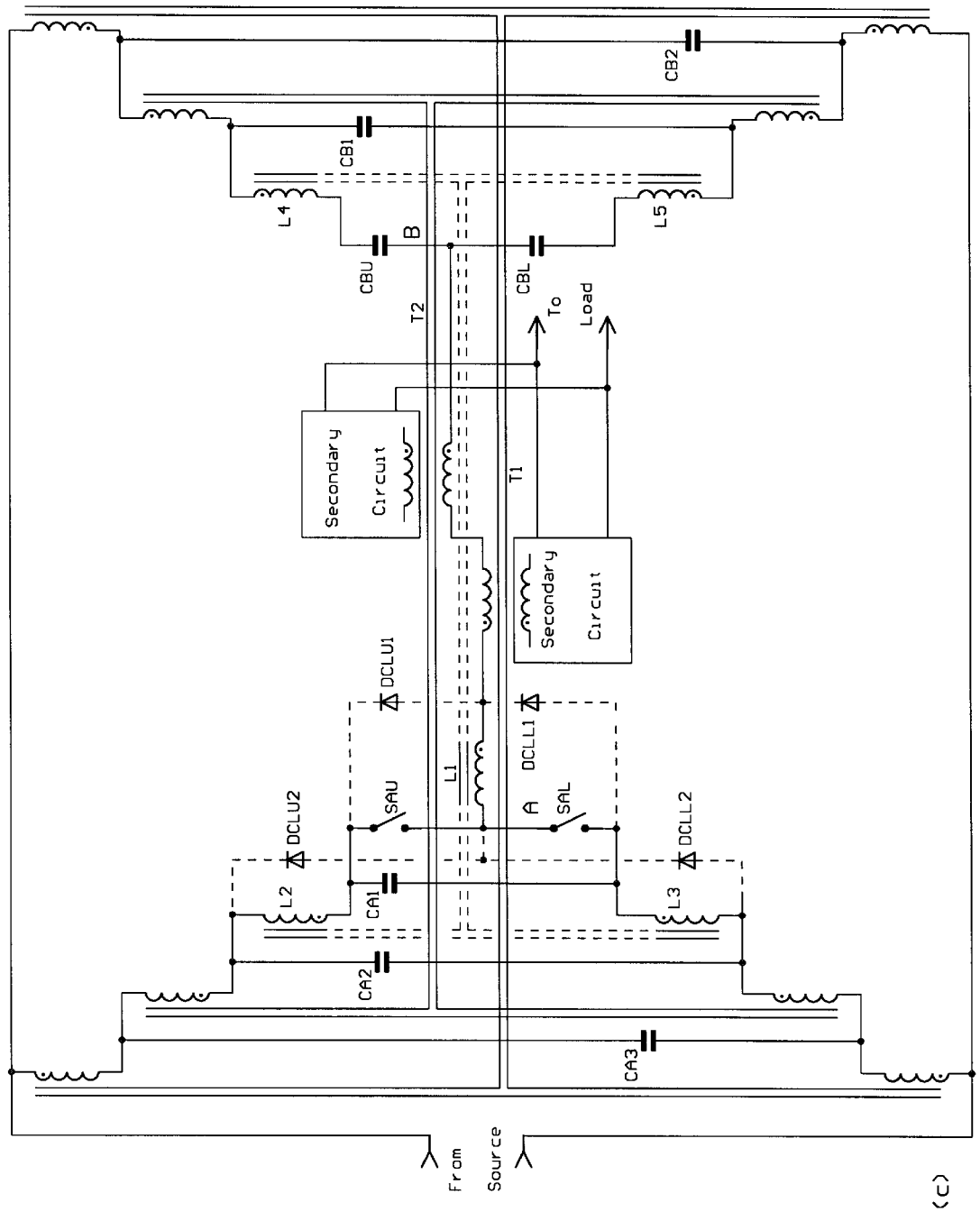
Figure 31:
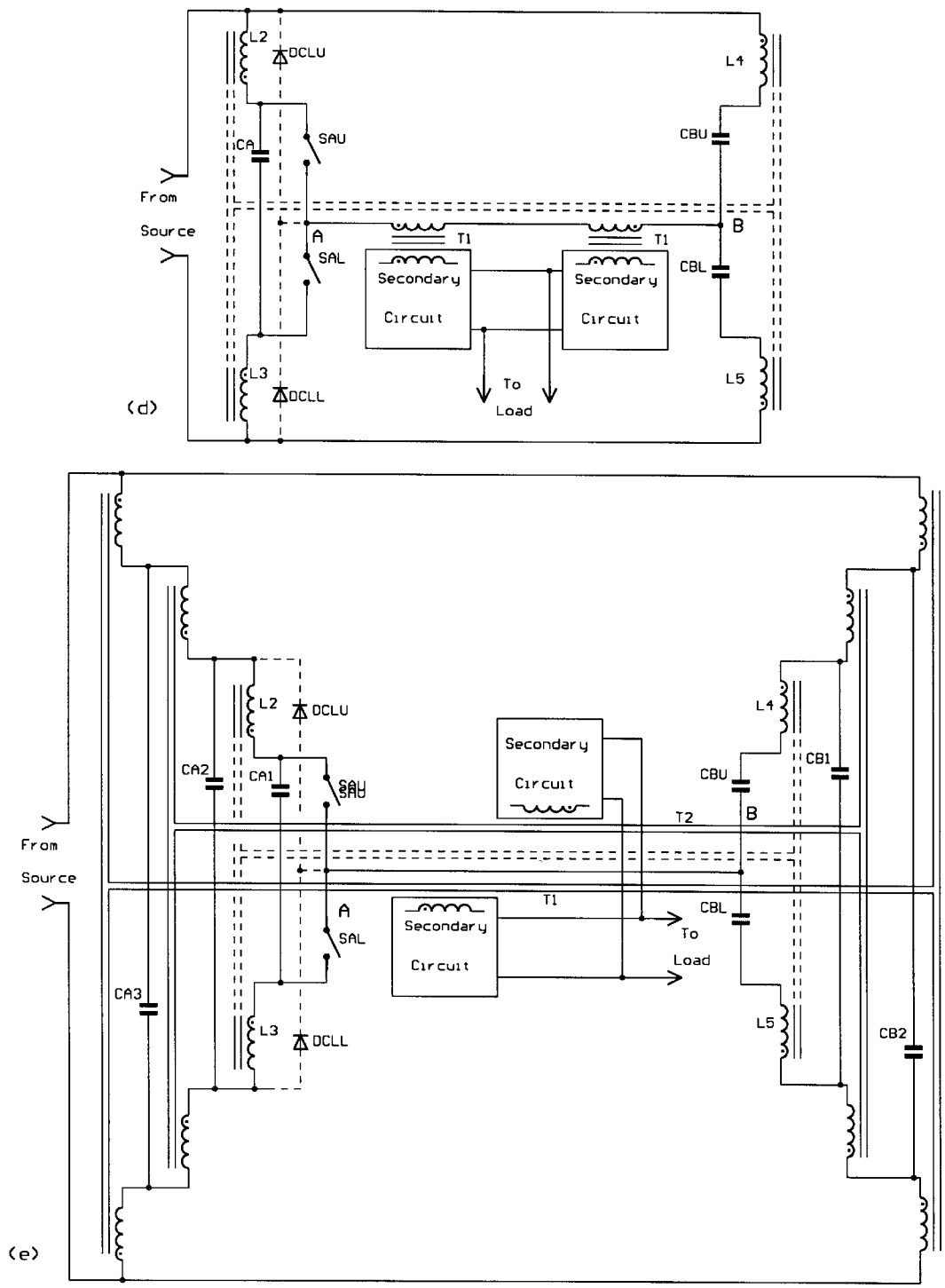

FIG. 31(a) illustrates a ZVS half bridge interleaved coupled inductor buck type primary circuit.

FIG. 31(b) illustrates a ZVS half bridge interleaved coupled inductor buck type primary circuit with ripple current cancellation achieved by applying the synthesis method illustrated in FIG. 8(d) to the FIG. 31(a) circuit.

FIG. 31(c) illustrates a ZVS half bridge interleaved coupled inductor buck type primary circuit with improved ripple current cancellation achieved by applying the synthesis method illustrated in FIG. 8(d) to the FIG. 31(a) circuit.

FIG. 31(d) illustrates a ZVS half bridge interleaved coupled inductor buck type primary circuit with common mode current cancellation achieved by applying the synthesis method illustrated in FIG. 8(e) to the FIG. 31(b) circuit.

FIG. 31(e) illustrates a ZVS half bridge interleaved coupled inductor buck type primary circuit with common mode current cancellation achieved by applying the synthesis method illustrated in FIG. 8(e) to the FIG. 31(c) circuit.

Figure 32:
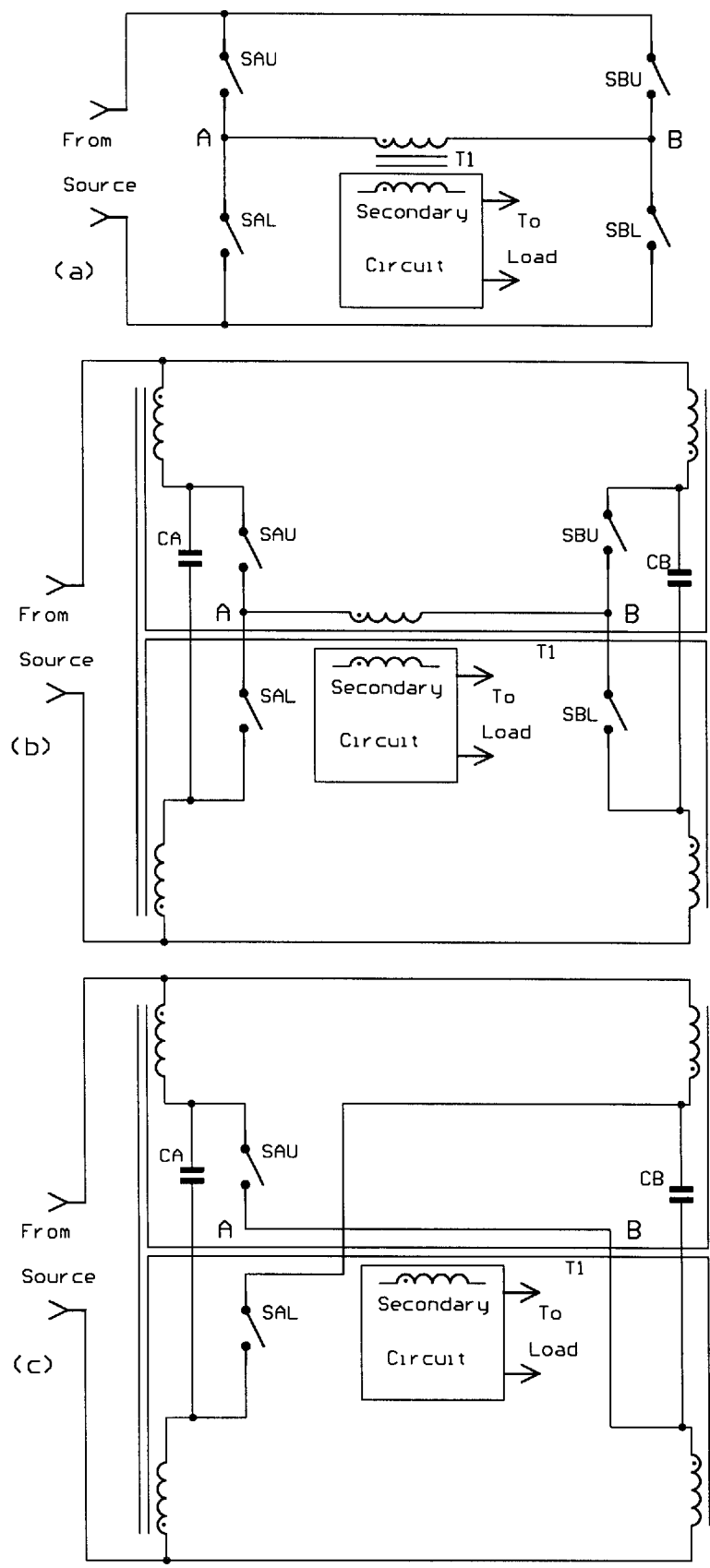

FIG. 32(a) illustrates a full bridge transformer coupled type primary circuit FIG. 32(b) illustrates a full bridge transformer coupled type primary circuit with ripple current cancellation achieved by applying the synthesis method illustrated in FIG. 9(d) to the FIG. 32(a) circuit.

FIG. 32(c) illustrates a full bridge transformer coupled type primary circuit with the number of switches reduced to two achieved by applying the synthesis method illustrated in FIG. 9(g) to the FIG. 32(b) circuit.

Figure 33:
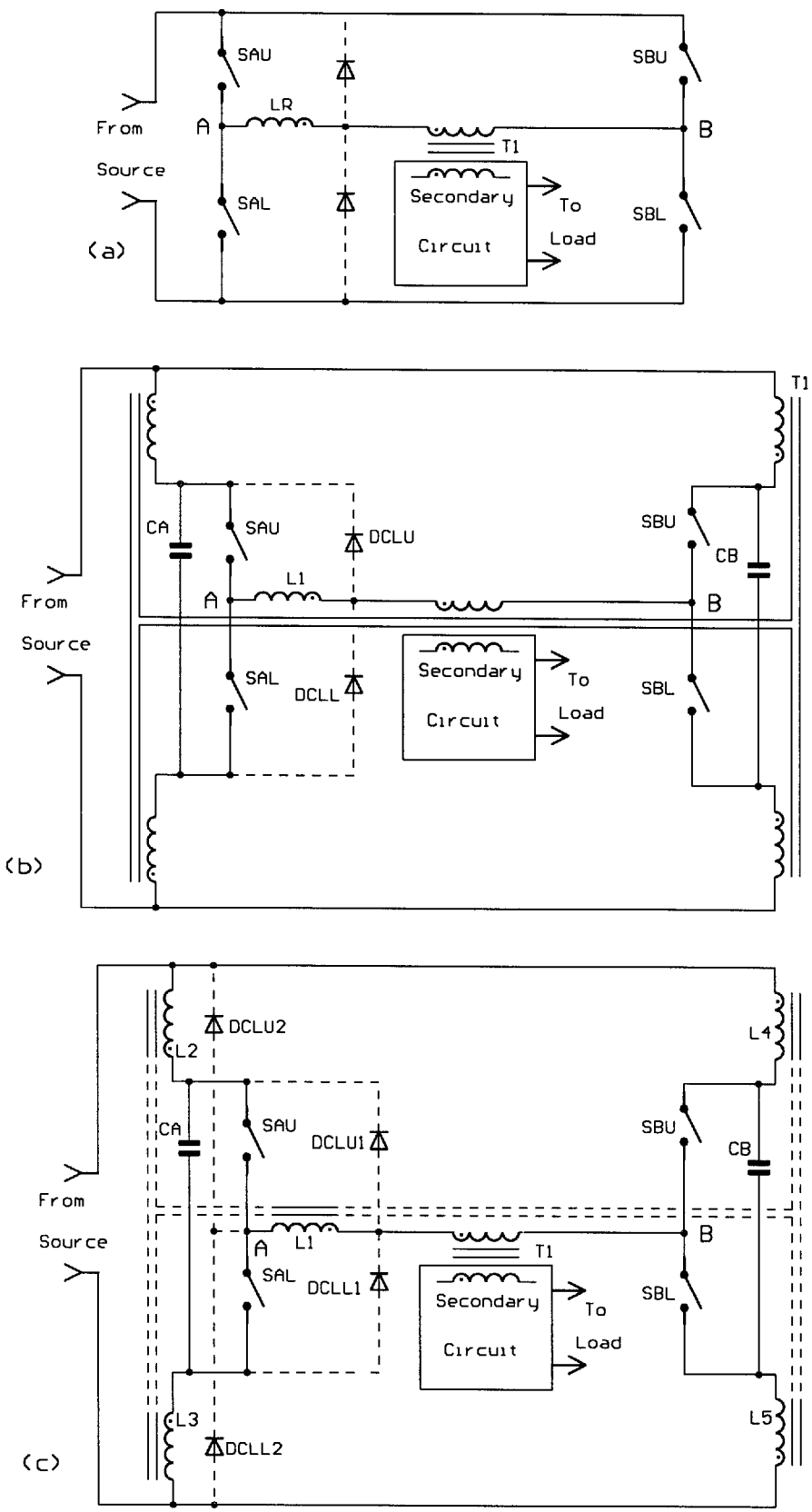
Figure 33:
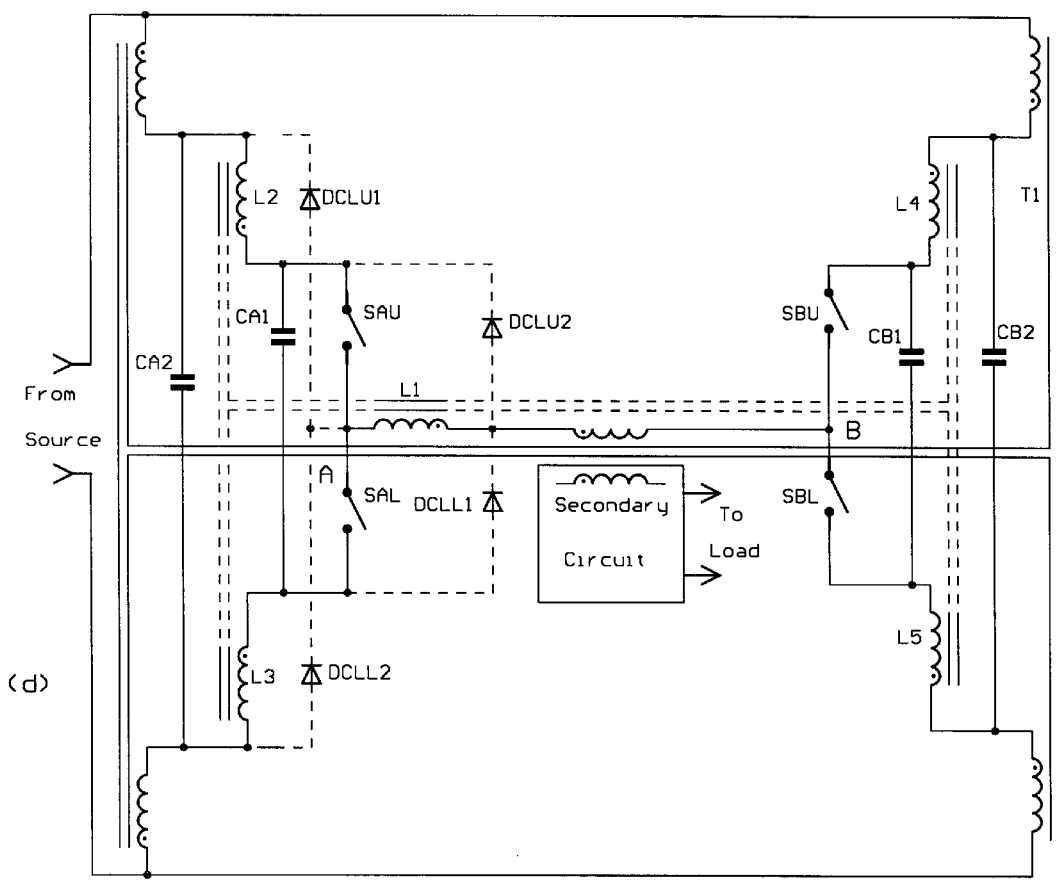
Figure 33:
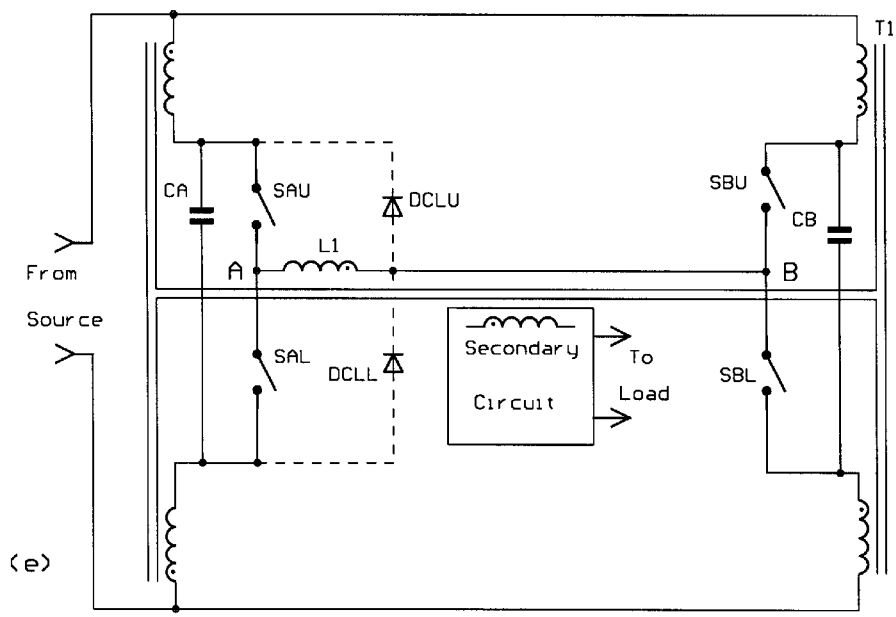
Figure 33:
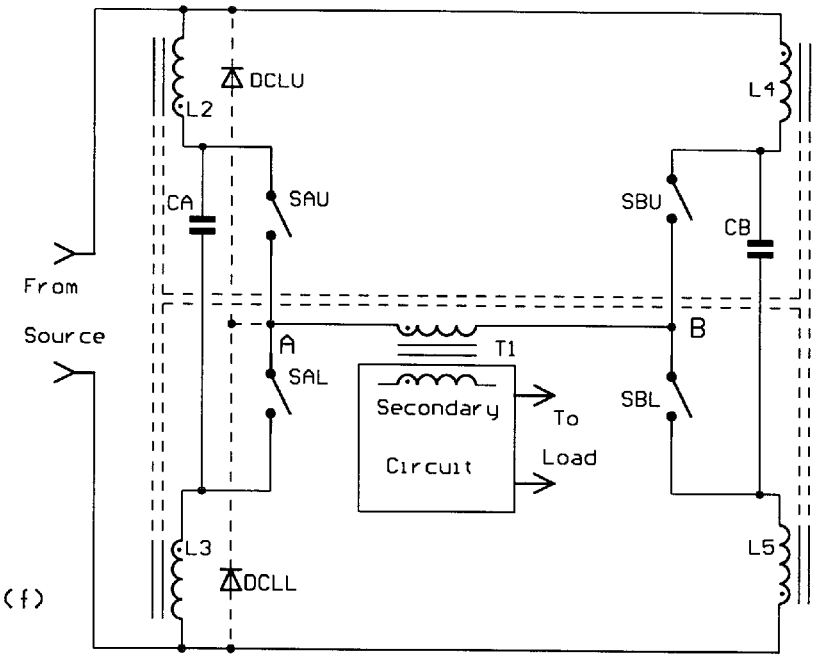
Figure 33:
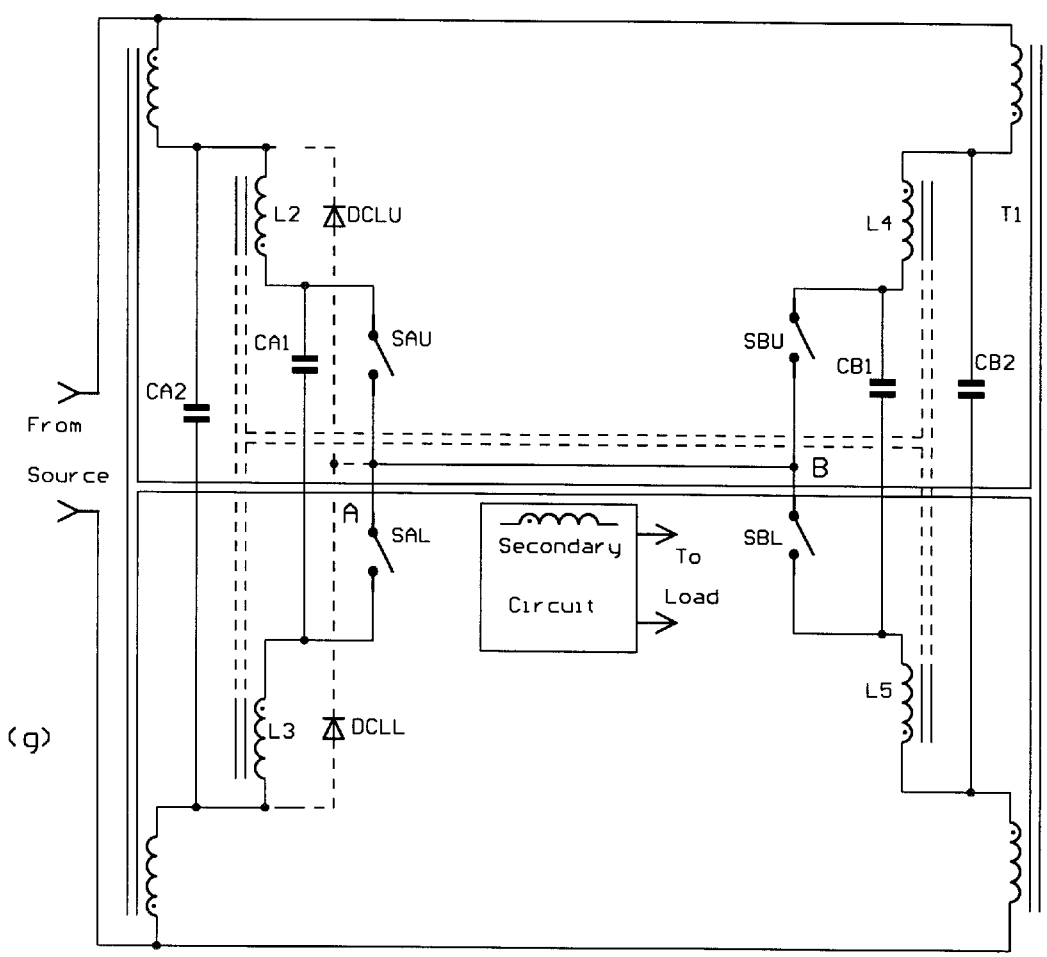

FIG. 33(a) illustrates a ZVS full bridge transformer coupled type primary circuit.

FIG. 33(b) illustrates a ZVS full bridge transformer coupled type primary circuit with ripple current cancellation achieved by applying the synthesis method illustrated in FIG. 9(d) to the FIG. 33(a) circuit.

FIG. 33(c) illustrates a ZVS full bridge transformer coupled type primary circuit with ripple current cancellation achieved by applying the synthesis method illustrated in FIG. 9(d) to the FIG. 33(a) circuit.

FIG. 33(d) illustrates a ZVS full bridge transformer coupled type primary circuit with improved ripple current cancellation achieved by applying the synthesis method illustrated in FIG. 9(d) to the FIG. 33(a) circuit.

FIG. 33(e) illustrates a ZVS full bridge transformer coupled type primary circuit with common mode current cancellation achieved by applying the synthesis method illustrated in FIG. 9(f) to the FIG. 33(b) circuit.

FIG. 33(f) illustrates a ZVS full bridge transformer coupled type primary circuit with common mode current cancellation achieved by applying the synthesis method illustrated in FIG. 9(f) to the FIG. 33(c) circuit.

FIG. 33(g) illustrates a ZVS full bridge transformer coupled type primary circuit with common mode current cancellation achieved by applying the synthesis method illustrated in FIG. 9(f) to the FIG. 33(d) circuit.

Figure 34:
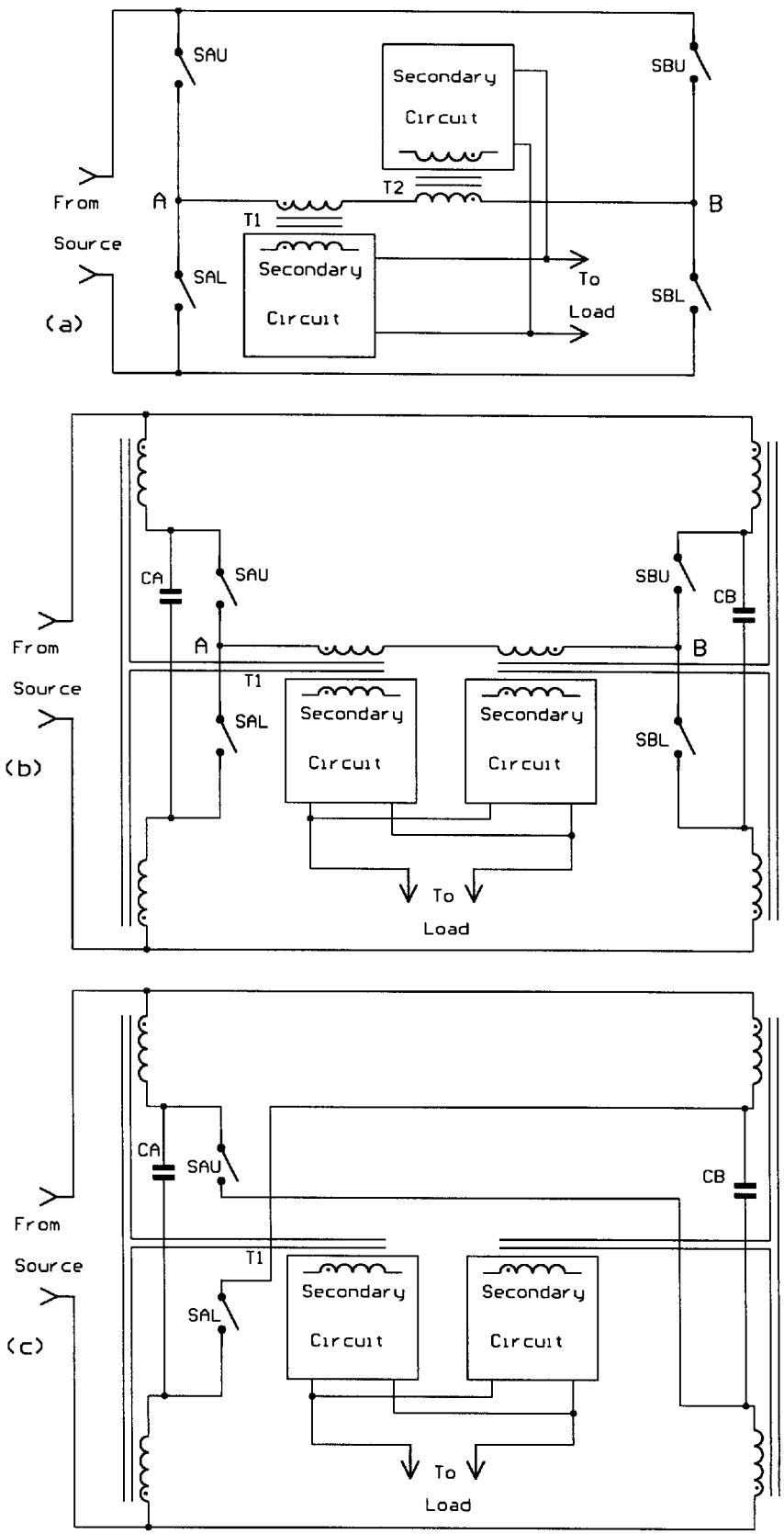
Figure 34:
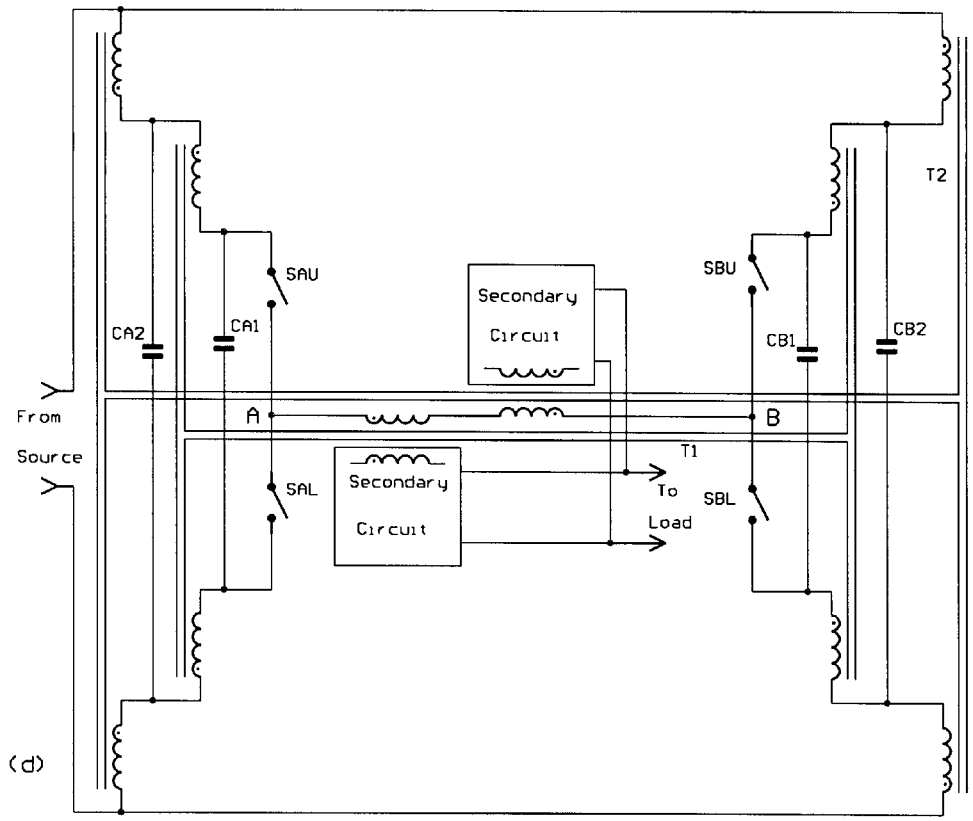
Figure 34:
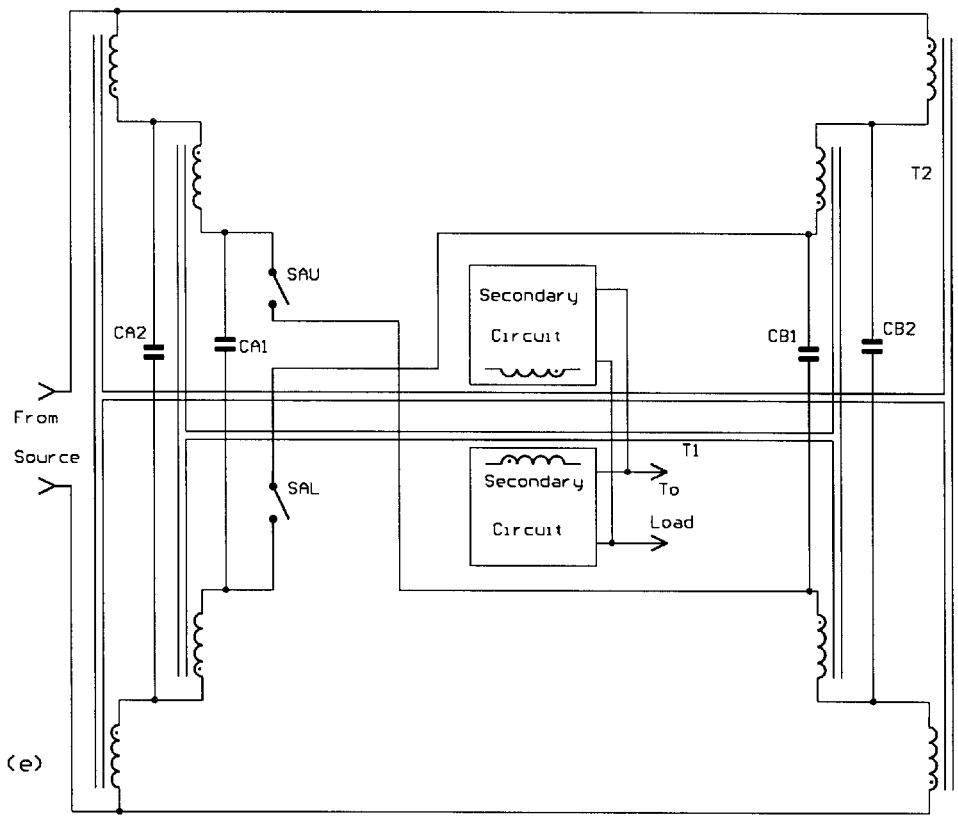

FIG. 34(a) illustrates a full bridge interleaved coupled inductor buck type primary circuit.

FIG. 34(b) illustrates a full bridge interleaved coupled inductor buck type primary circuit with ripple current cancellation achieved by applying the synthesis method illustrated in FIG. 3(d) to each primary winding in the FIG. 34(a) circuit.

FIG. 34(c) illustrates a push pull interleaved coupled inductor buck type primary circuit with common mode current cancellation and a reduction of switch number from the FIG. 34(a) circuit achieved by applying the synthesis methods illustrated in FIG. 4(c) and 9(g) to the FIG. 34(a) circuit.

FIG. 34(d) illustrates a full bridge interleaved coupled inductor buck type primary circuit with ripple current cancellation achieved by applying the synthesis method illustrated in FIG. 9(d) to the FIG. 34(a) circuit.

FIG. 34(e) illustrates a full bridge interleaved coupled inductor buck type primary circuit with common mode current cancellation and a reduction of switch number in the FIG. 34(a) circuit achieved by applying the synthesis method illustrated in FIG. 9(g) to the FIG. 34(a) circuit.

Figure 35:
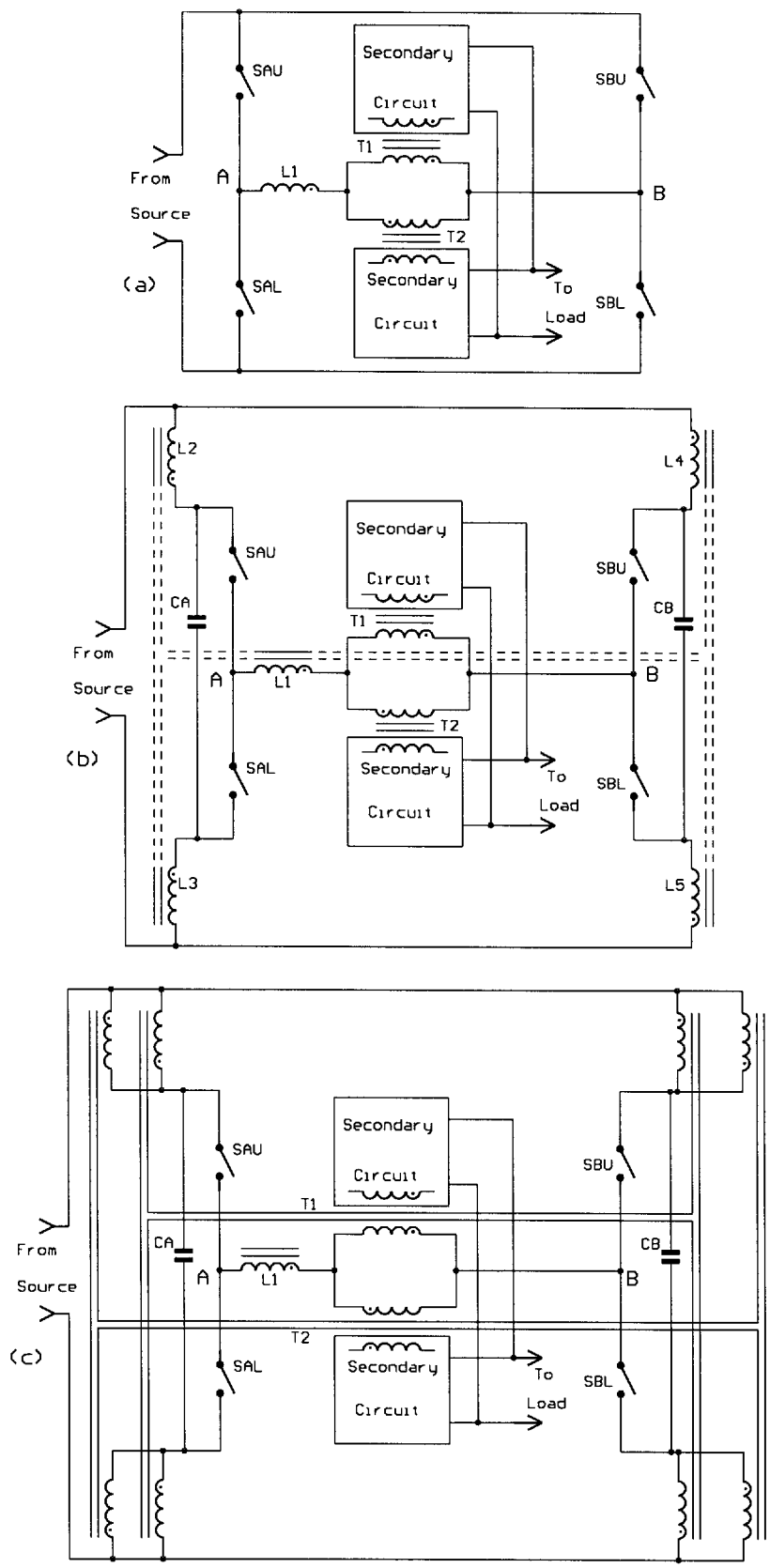
Figure 35:
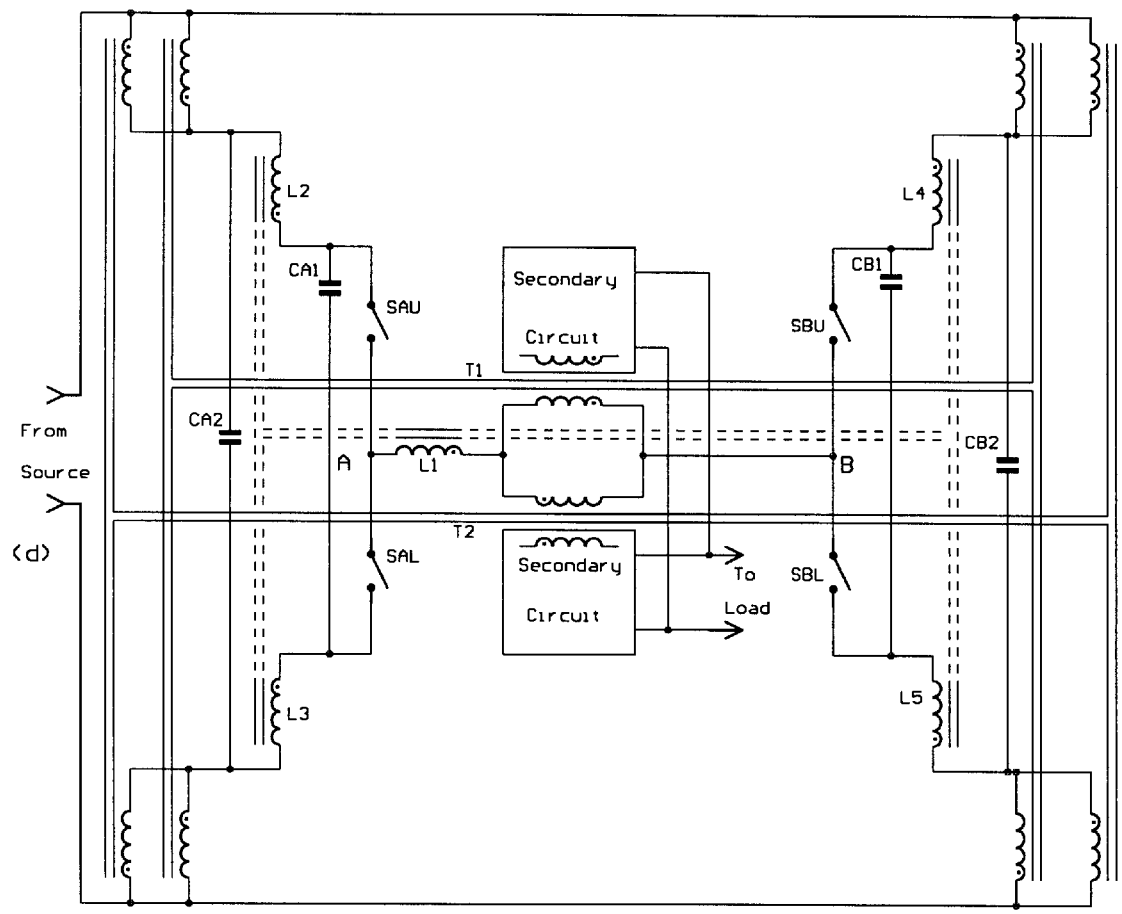
Figure 35:
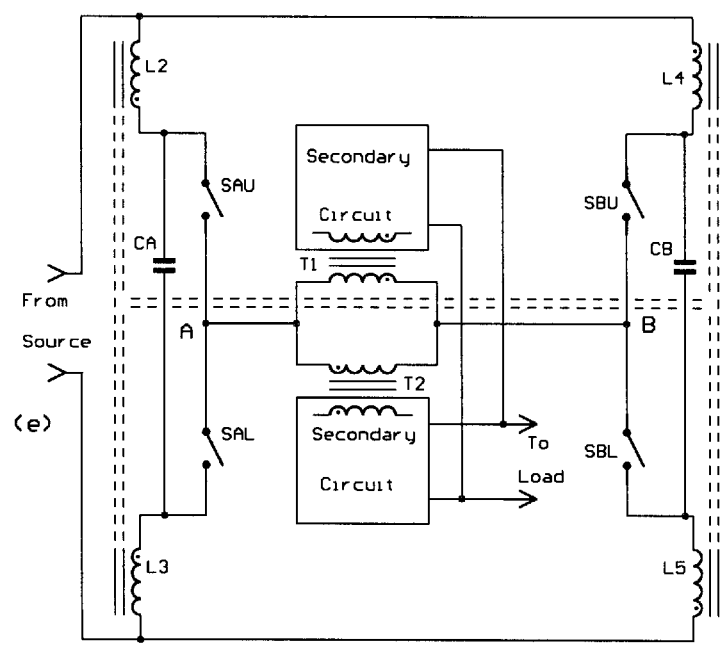
Figure 35:
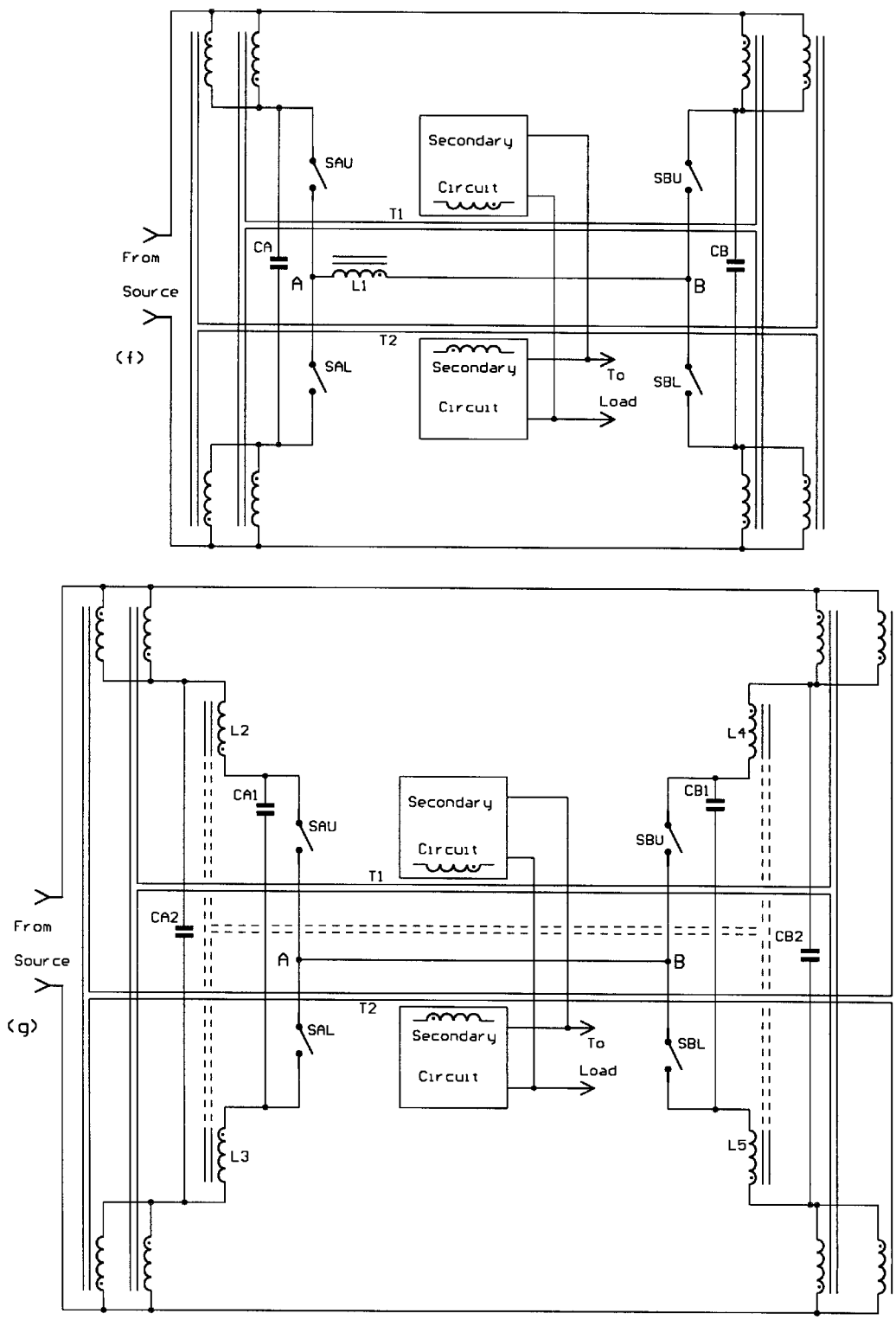

FIG. 35(a) illustrates a full bridge primary inductor parallel transformer type primary circuit.

FIG. 35(b) illustrates a full bridge primary inductor parallel transformer type primary circuit with ripple current cancellation achieved by applying the synthesis method illustrated in FIG. 9(d) to the FIG. 35(a) circuit.

FIG. 35(c) illustrates a full bridge primary inductor parallel transformer type primary circuit with ripple current cancellation achieved by applying the synthesis method illustrated in FIG. 9(d) to the FIG. 35(a) circuit.

FIG. 35(d) illustrates a full bridge primary inductor parallel transformer type primary circuit with improved ripple current cancellation achieved by applying the synthesis method illustrated in FIG. 9(d) to the FIG. 35(a) circuit.

FIG. 35(e) illustrates a full bridge primary inductor parallel transformer type primary circuit with common mode current cancellation achieved by applying the synthesis method illustrated in FIG. 9(f) to the FIG. 35(b) circuit.

FIG. 35(f) illustrates a full bridge primary inductor parallel transformer type primary circuit with common mode current cancellation achieved by applying the synthesis method illustrated in FIG. 9(f) to the FIG. 35(c) circuit.

FIG. 35(g) illustrates a full bridge primary inductor parallel transformer type primary circuit with common mode current cancellation achieved by applying the synthesis method illustrated in FIG. 9(f) to the FIG. 35(d) circuit.

Figure 36:
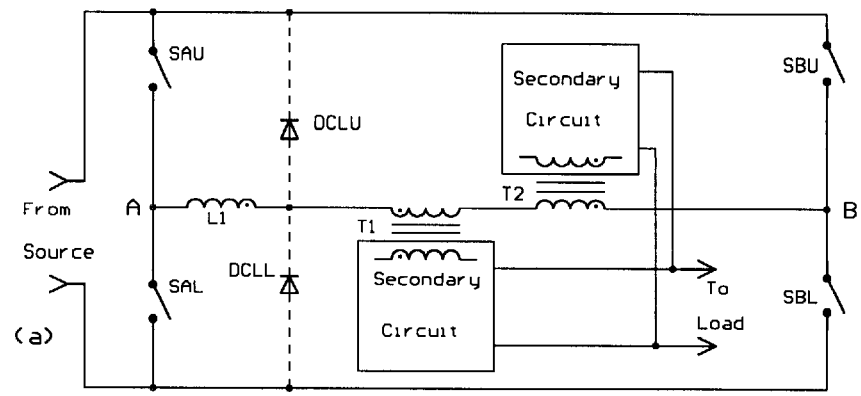
Figure 36:
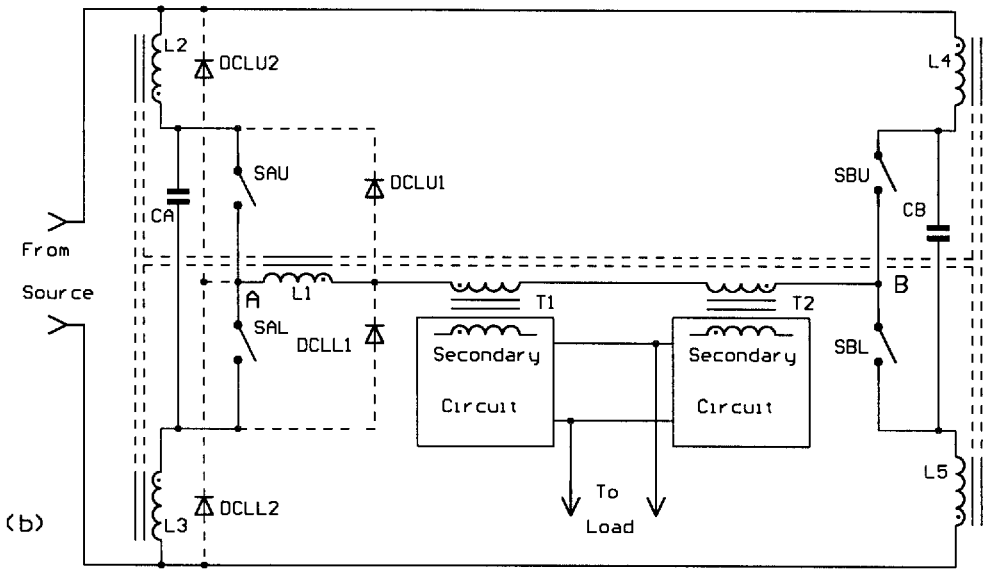
Figure 36:
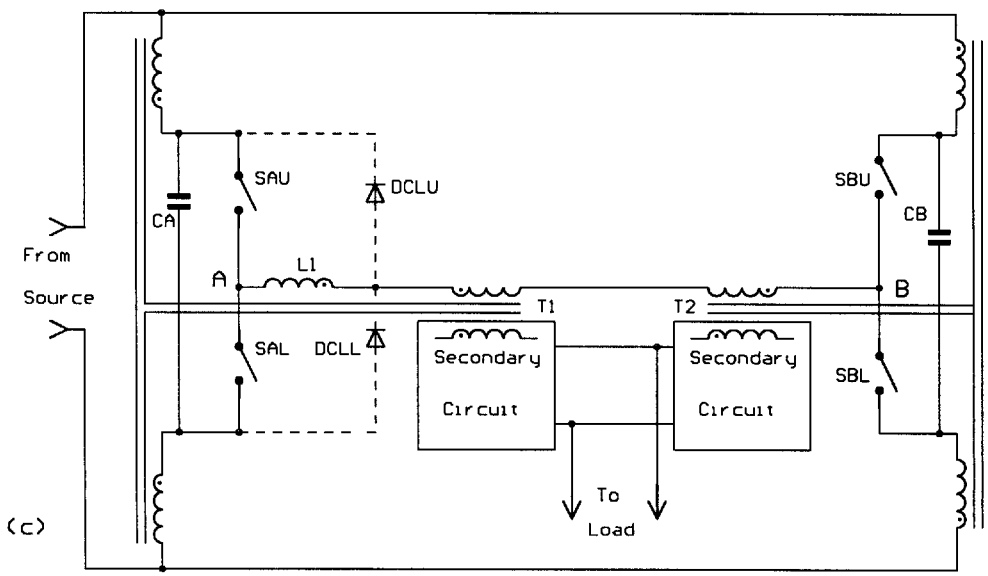
Figure 36:
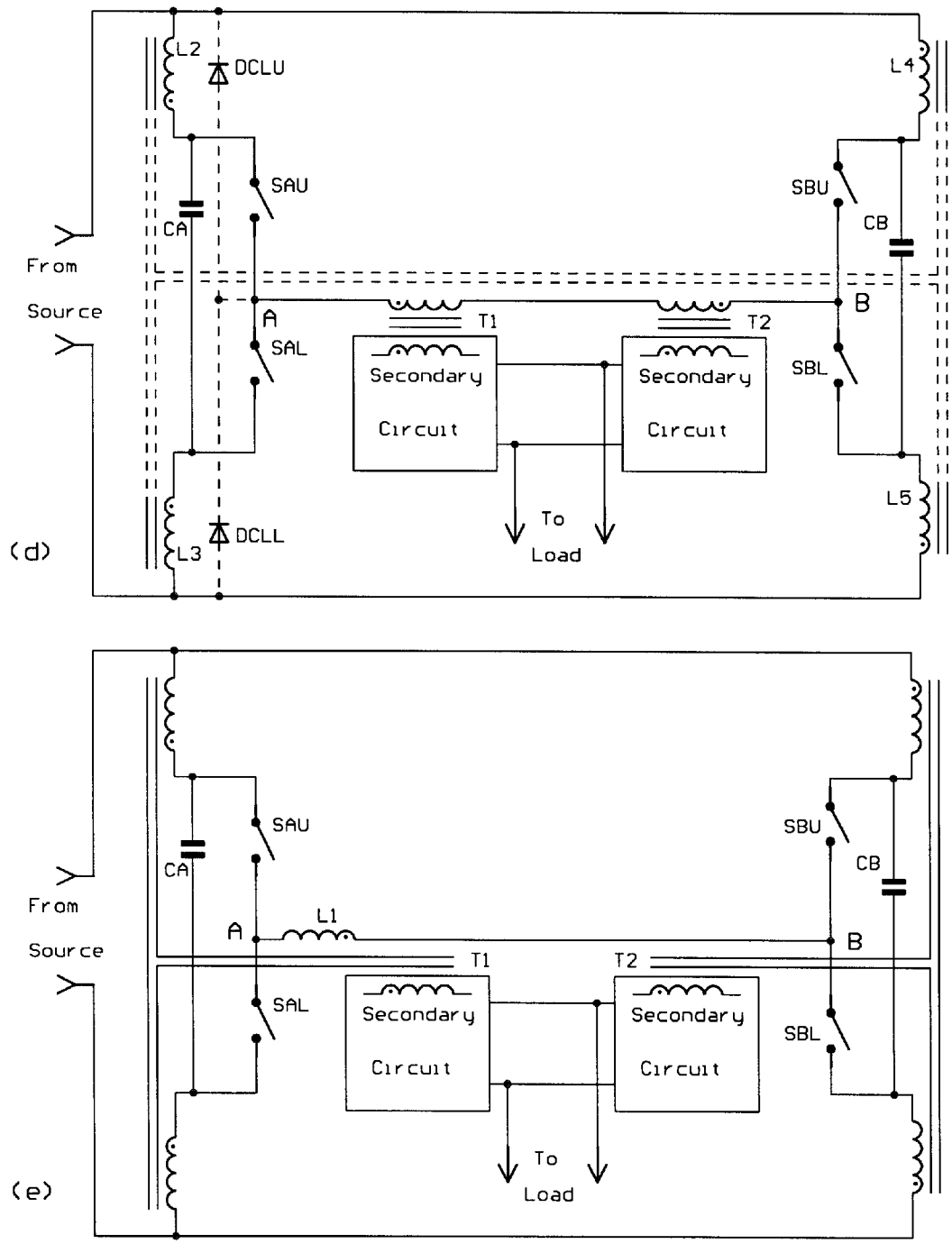
Figure 36:
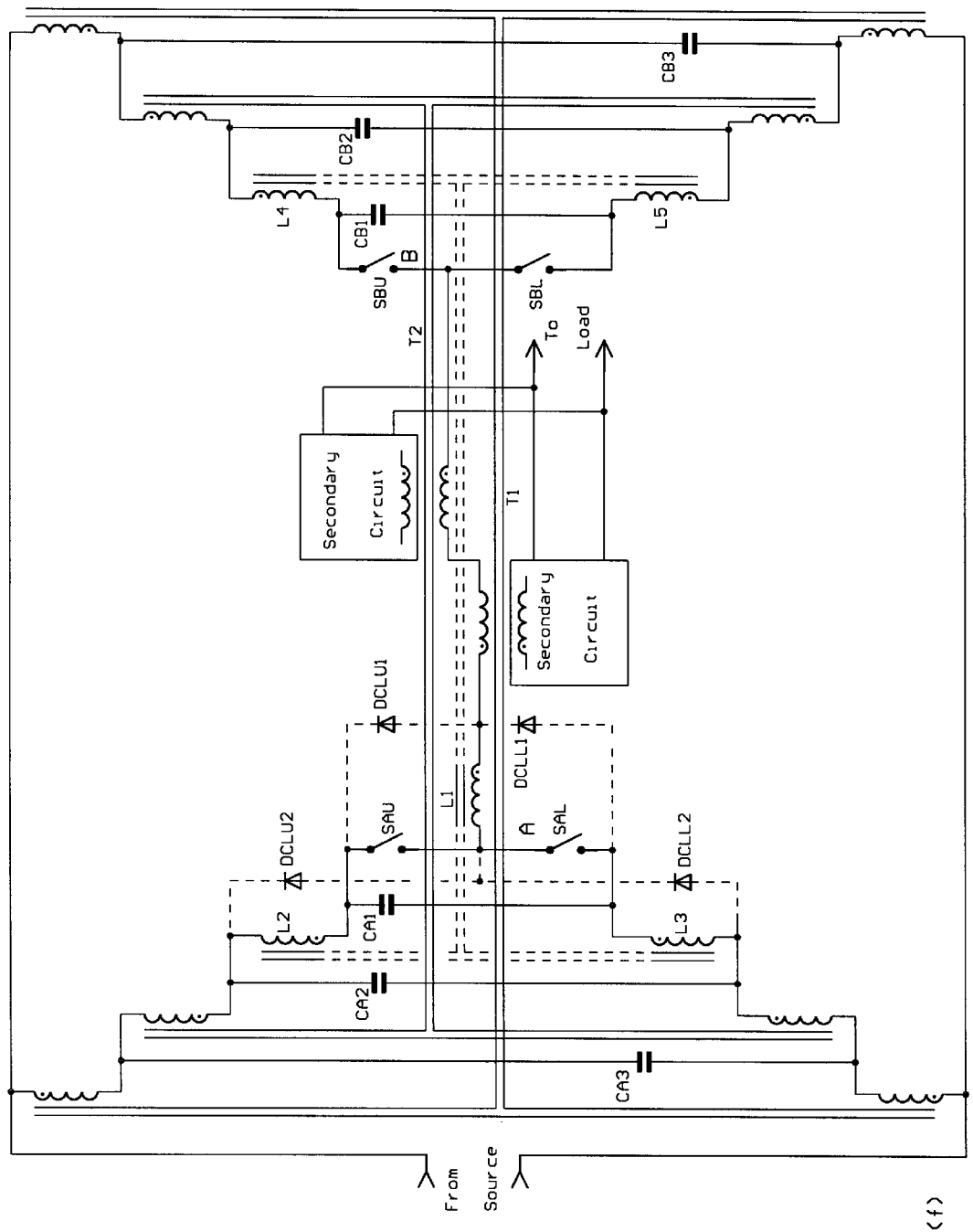
Figure 36:
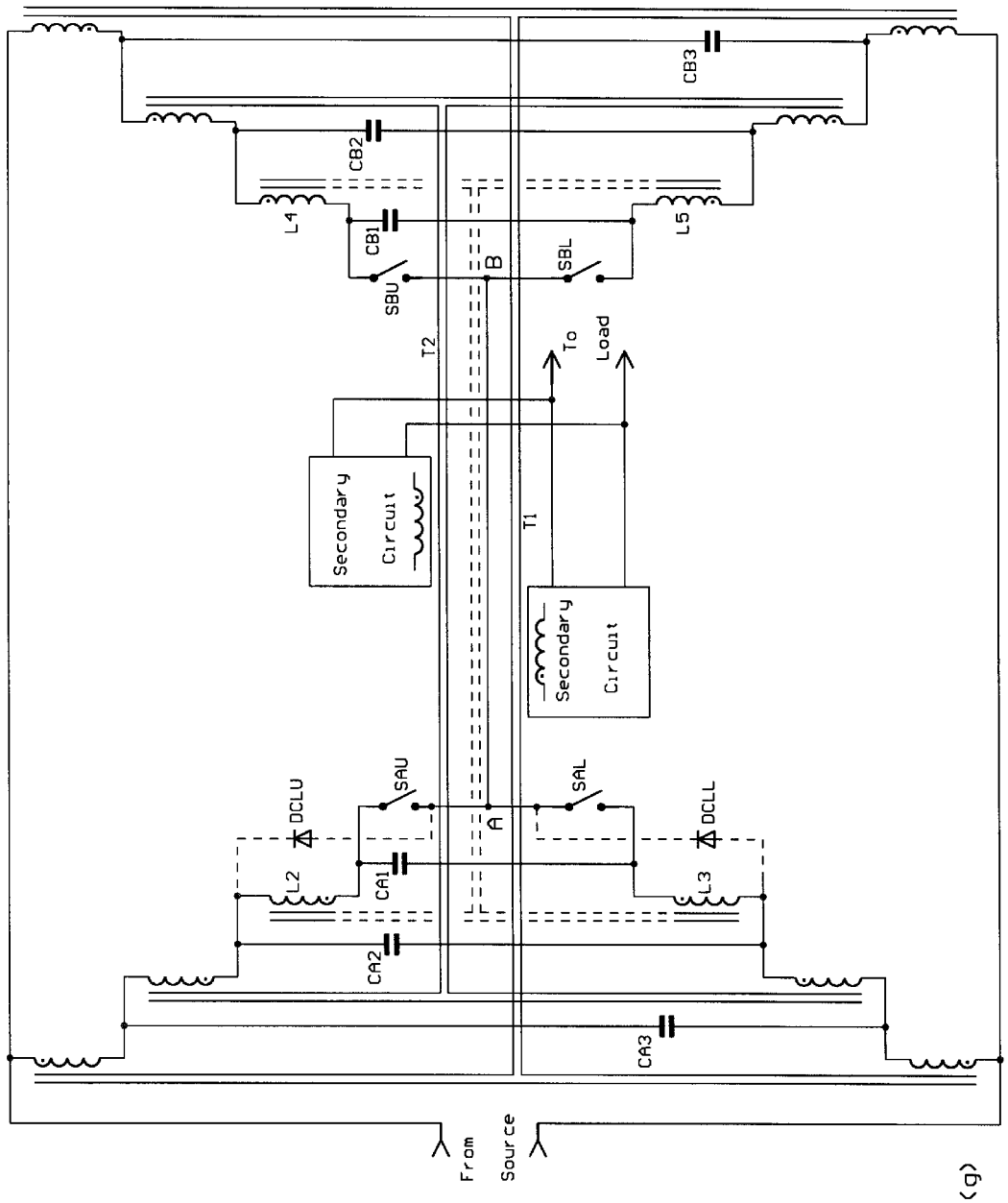

FIG. 36(a) illustrates a ZVS full bridge interleaved coupled inductor buck type primary circuit.

FIG. 36(b) illustrates a ZVS full bridge interleaved coupled inductor buck type primary circuit with ripple current cancellation achieved by applying the synthesis method illustrated in FIG. 9(d) to the FIG. 36(a) circuit.

FIG. 36(c) illustrates a ZVS full bridge interleaved coupled inductor buck type primary circuit with ripple current cancellation achieved by applying the synthesis method illustrated in FIG. 3(d) to each of the coupled inductors primary windings in the FIG. 36(a) circuit.

FIG. 36(d) illustrates a ZVS full bridge interleaved coupled inductor buck type primary circuit simplified by applying the synthesis method illustrated in FIG. 9(f) to the FIG. 36(b) circuit.

FIG. 36(e) illustrates a ZVS full bridge interleaved coupled inductor buck type primary circuit simplified by applying the synthesis method illustrated in FIG. 4(c) to the FIG. 36(c) circuit.

FIG. 36(f) illustrates a ZVS full bridge interleaved coupled inductor buck type primary circuit with improved ripple current cancellation achieved by applying the synthesis method illustrated in FIG. 9(d) to the FIG. 36(a) circuit.

FIG. 36(g) illustrates a ZVS full bridge interleaved coupled inductor buck type primary circuit with common mod e current cancellation achieved by applying the synthesis method illustrated in FIG. 9(f) to the FIG. 36(f) circuit.

Figure 37:
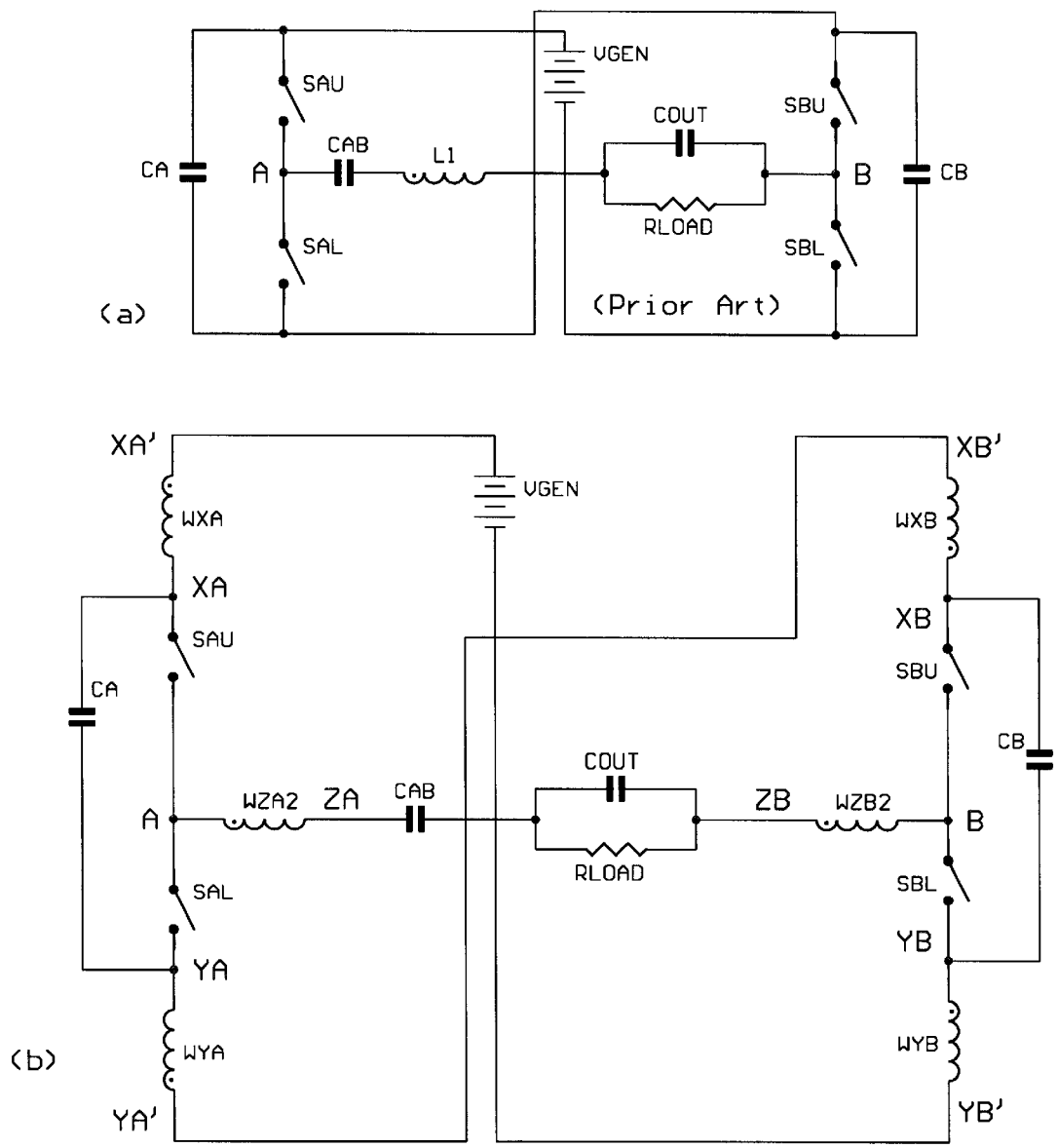
Figure 37:
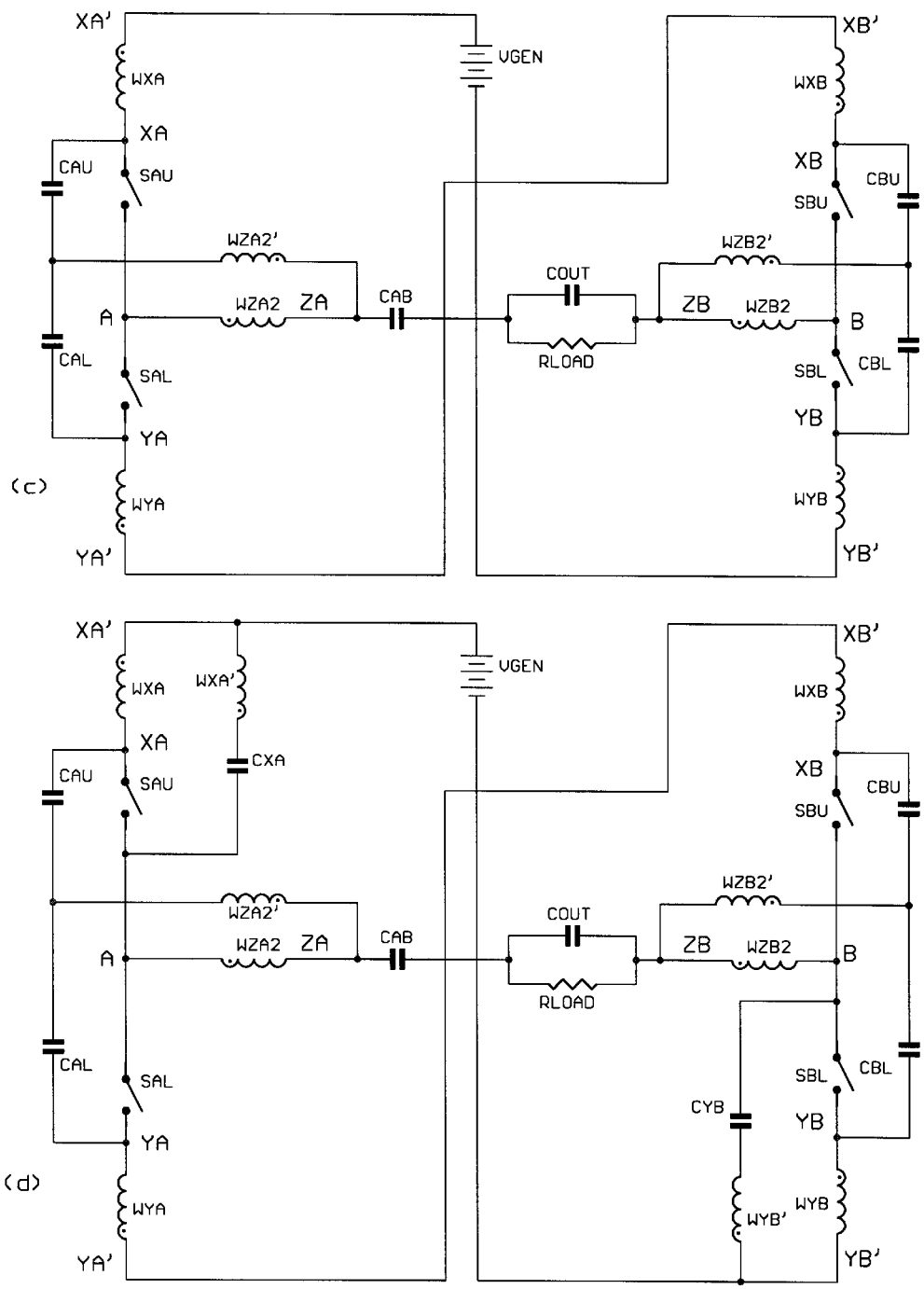

FIG. 37(a) illustrates a stacked full bridge buck amplifier.

Figure 10:
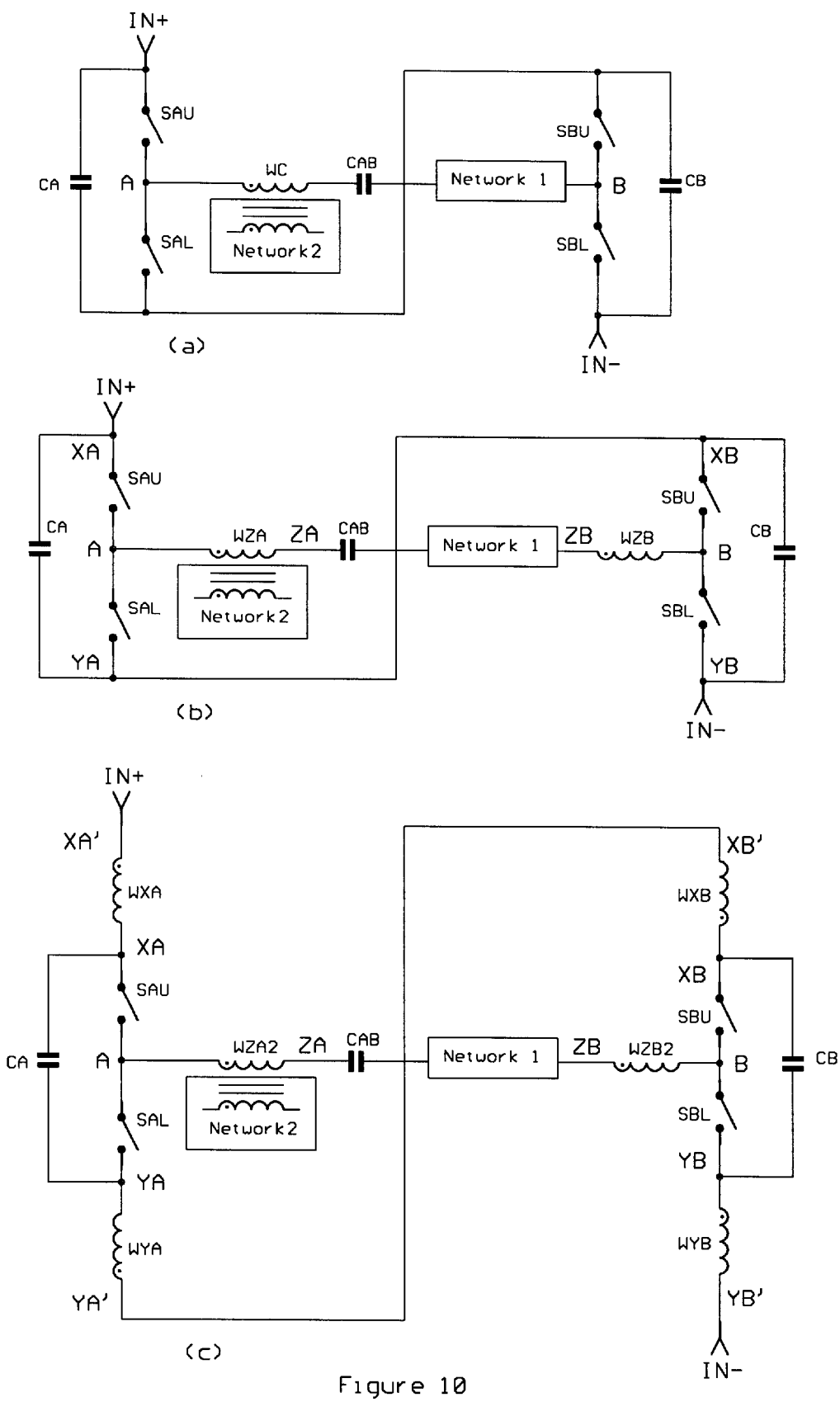
FIG. 10(a) illustrates a generalized stacked full bridge power conversion network.
FIG. 10(b) illustrates the FIG. 10(a) network with the center leg winding split into two windings and arranged to create two three terminal networks of the type illustrated in FIG. 3(a).
FIG. 10(c) illustrates the FIG. 10(b) network with the synthesis method illustrated in FIGS. 3(a) through 3(d) applied to form a new stacked full bridge power conversion network with non-pulsating terminal currents.
FIG. 10(d) illustrates the FIG. 10(c) network with the two center leg windings combined into a single center leg winding.
FIG. 10(e) illustrates the FIG. 10(c) network with two windings and two capacitors added to provide mutual ripple current cancellation at the two network terminals.
FIG. 10(f) illustrates the FIG. 10(d) network with the center leg winding reduced to the point of elimination and series windings combined into a single winding.
Figure 10:
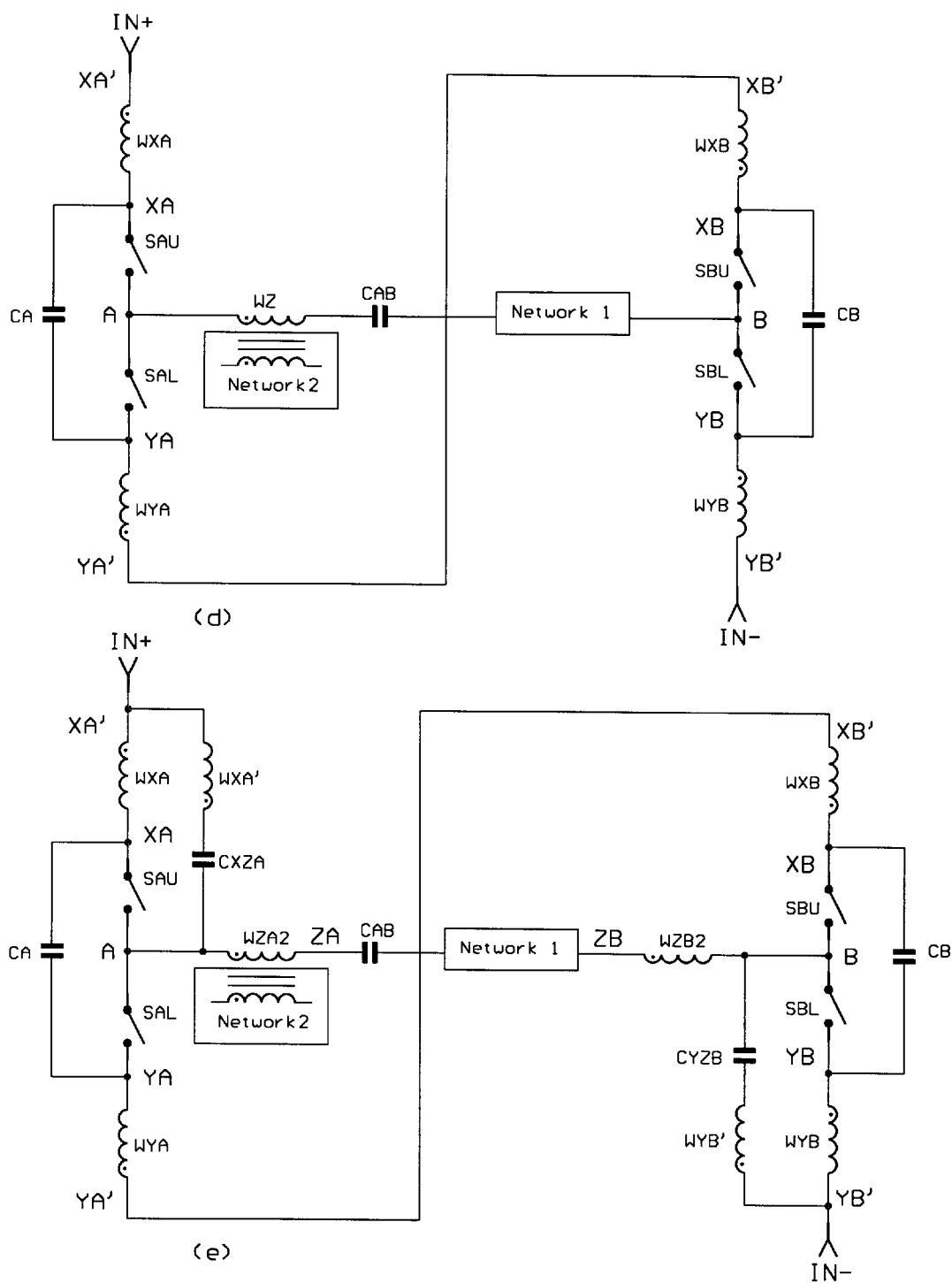
Figure 10:
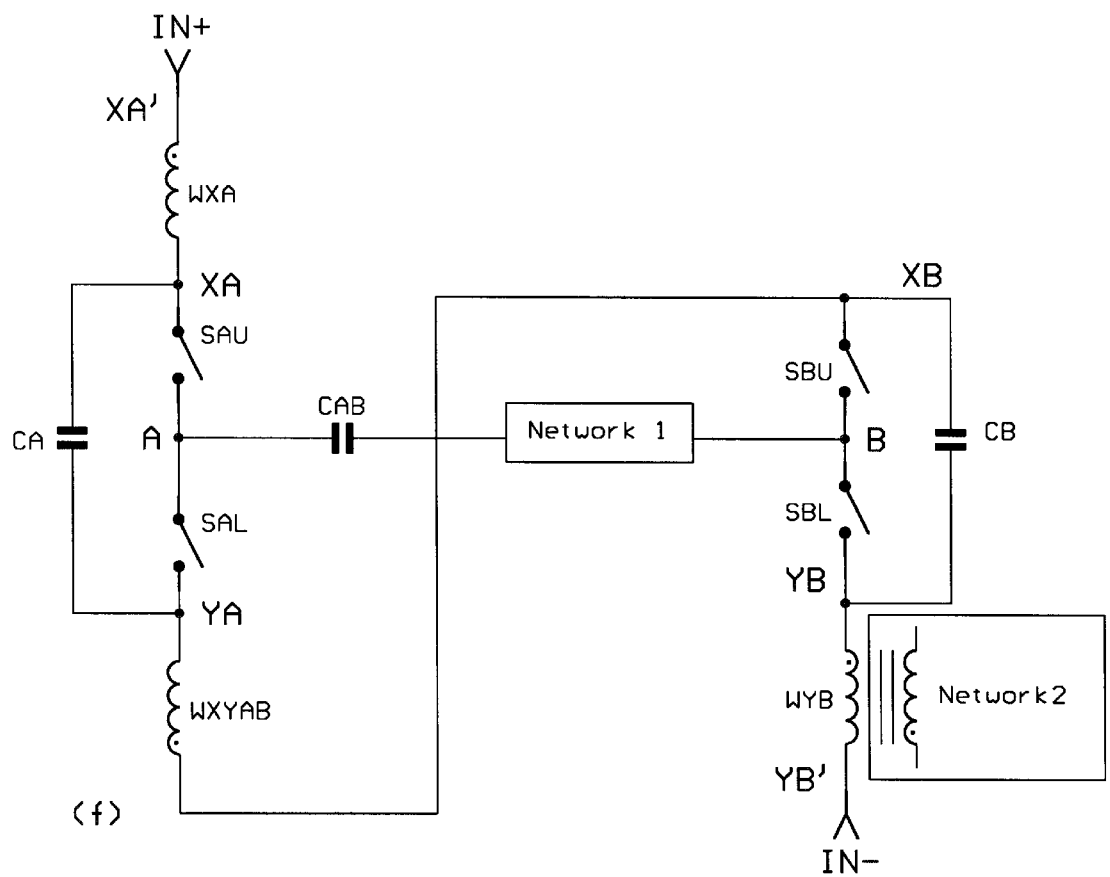

FIG. 37(b) illustrates a stacked full bridge buck amplifier with non-pulsating terminal currents achieved by applying the synthesis method illustrated in FIG. 10(c) to the FIG. 37(a) circuit.

FIG. 37(c) illustrates a stacked full bridge buck amplifier with load ripple current cancellation.

FIG. 37(d) illustrates a stacked full bridge buck amplifier with input terminal ripple current cancellation achieved by applying the synthesis method illustrated in FIG. 10(e) to the FIG. 37(c) circuit.

Figure 38:
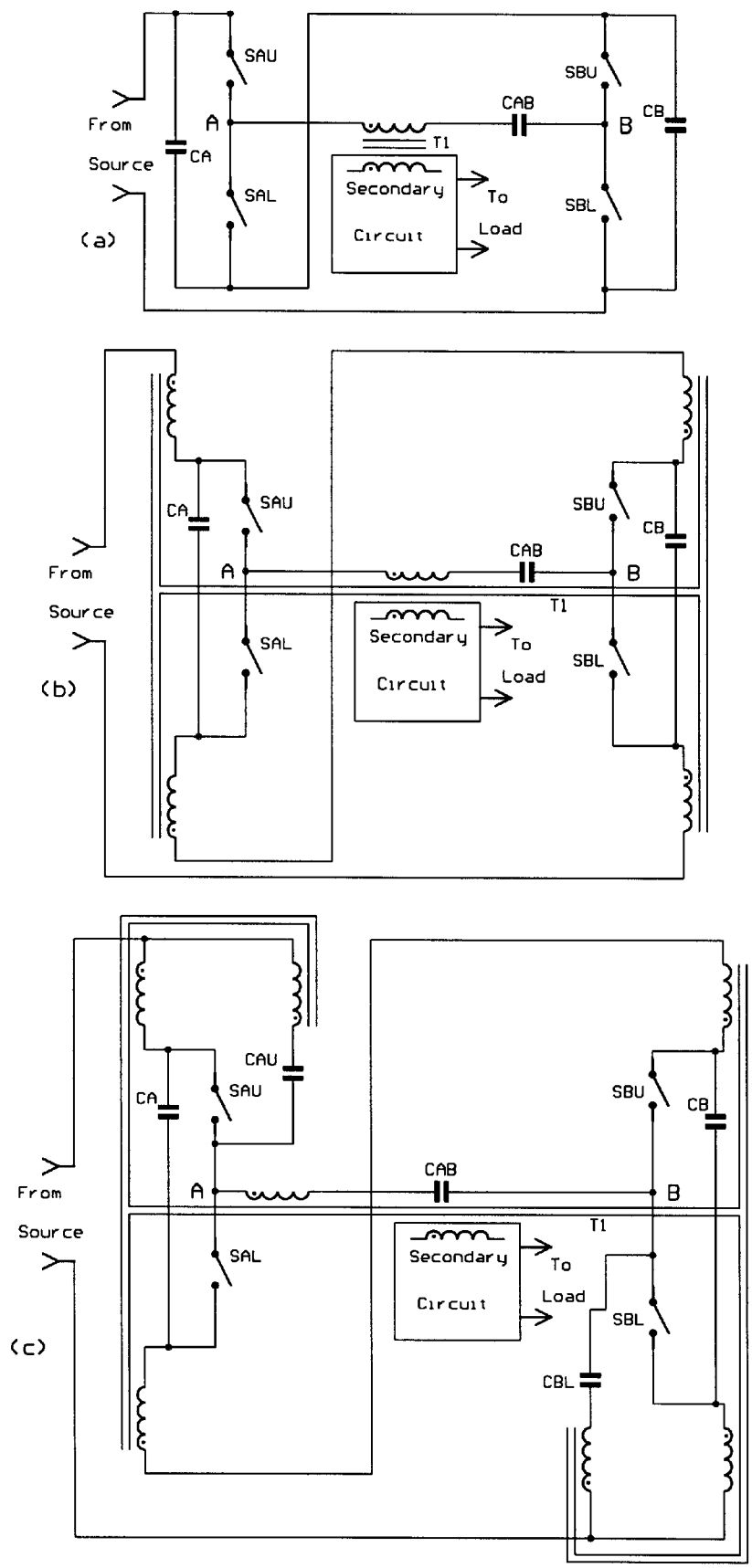
Figure 38:
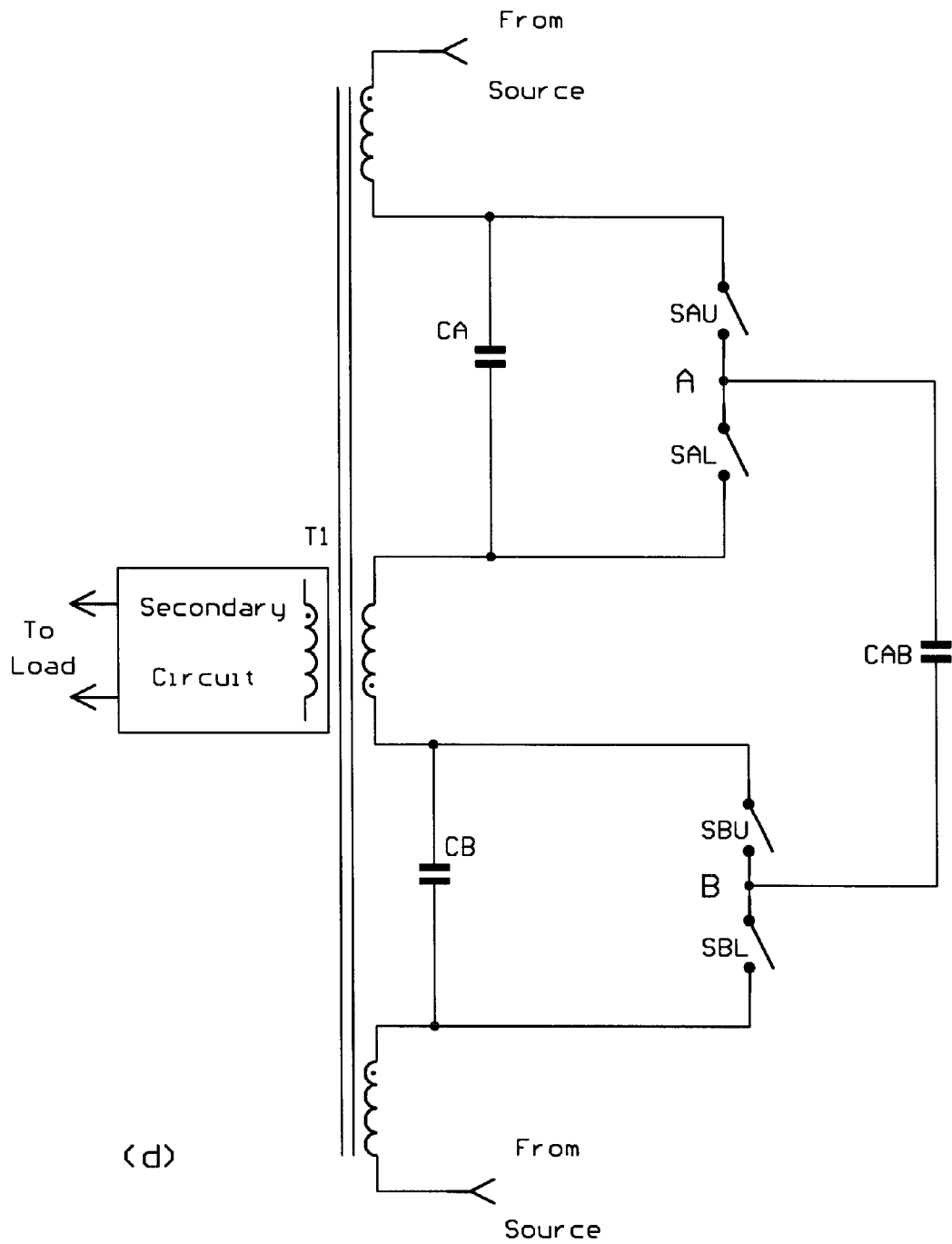

FIG. 38(a) illustrates a stacked full bridge transformer coupled type primary circuit.

FIG. 38(b) illustrates a stacked full bridge transformer coupled type primary circuit with non-pulsating terminal current achieved by applying the synthesis method illustrated in FIG. 10(d) to the FIG. 38(a) circuit.

FIG. 38(c) illustrates a stacked full bridge transformer coupled type primary circuit with terminal ripple current cancellation achieved by applying the synthesis method illustrated in FIG. 10(e) to the FIG. 38(b) circuit.

FIG. 38(d) illustrates a stacked full bridge transformer coupled type primary circuit with common mode current cancellation achieved by applying the synthesis method illustrated in FIG. 10(f) to the FIG. 38(b) circuit.

Figure 39:
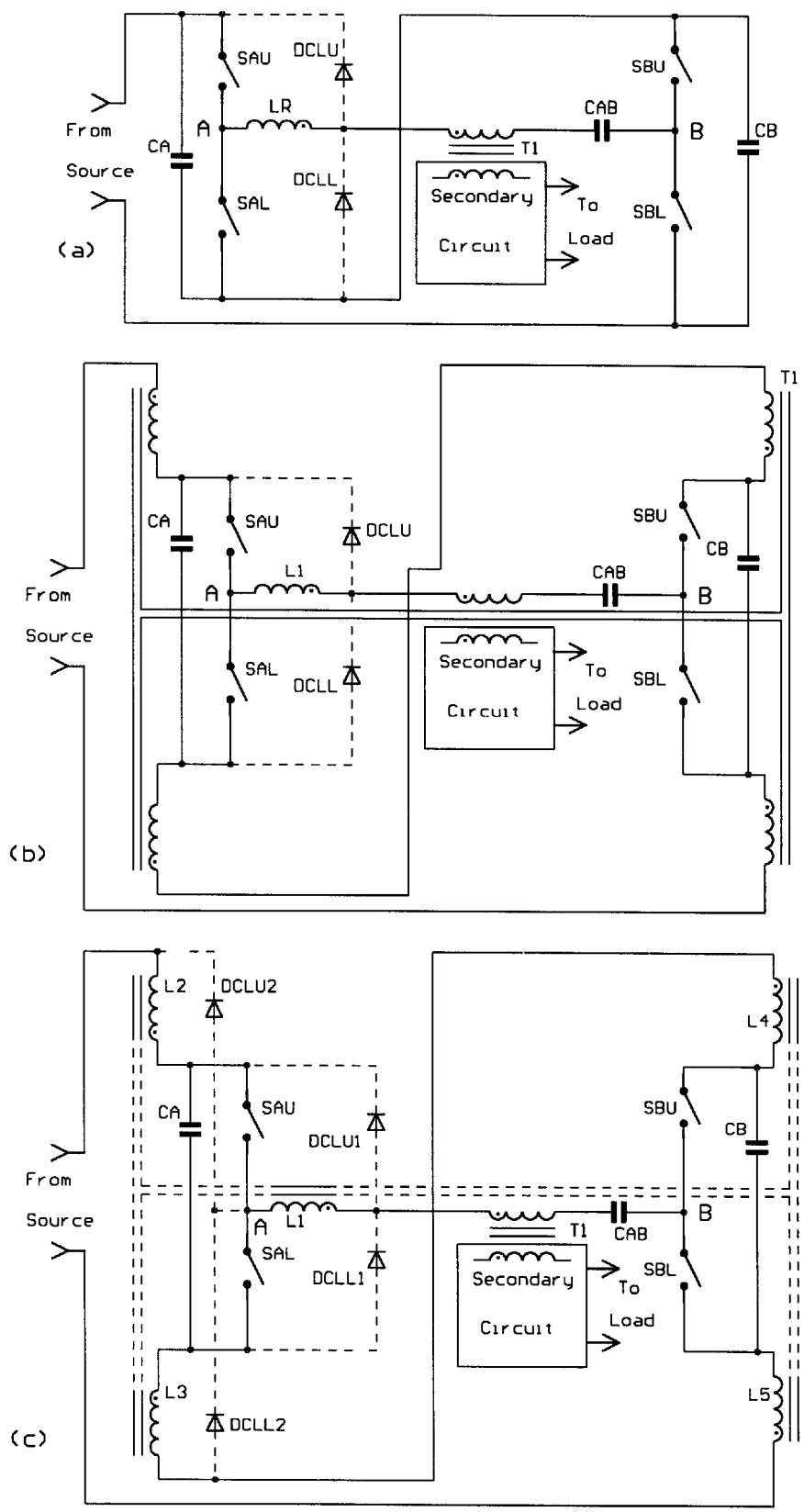
Figure 39:
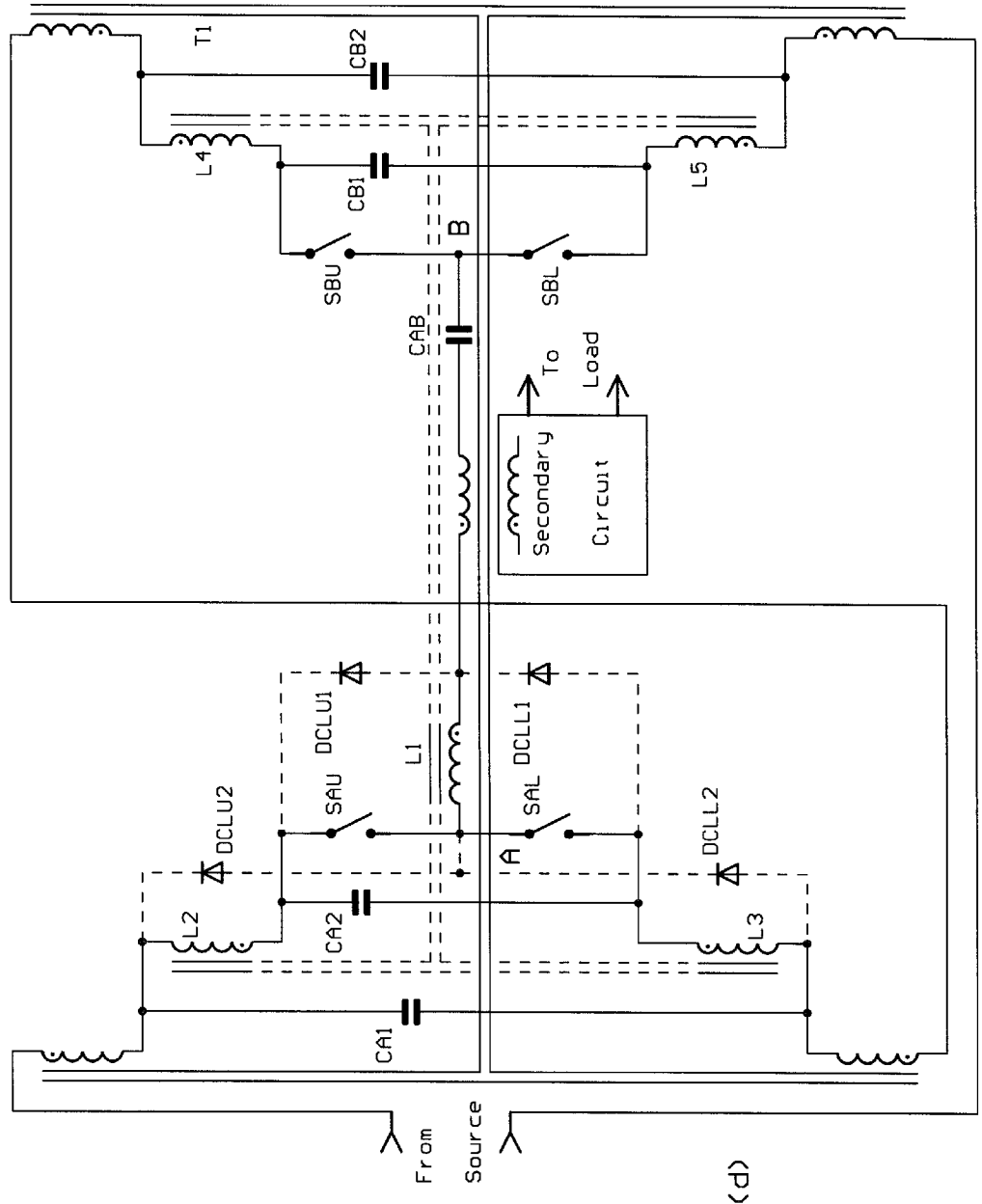
Figure 39:
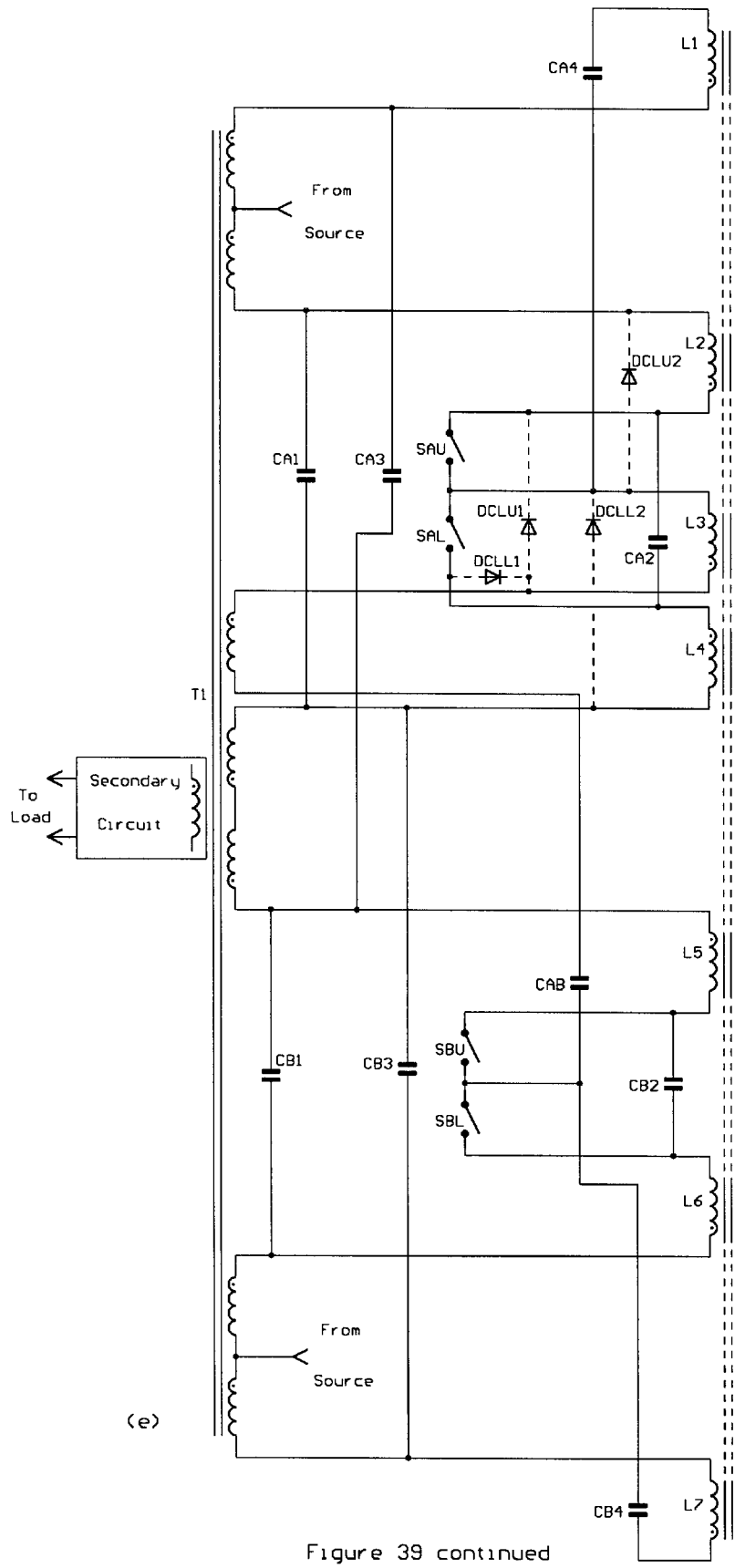
Figure 39:
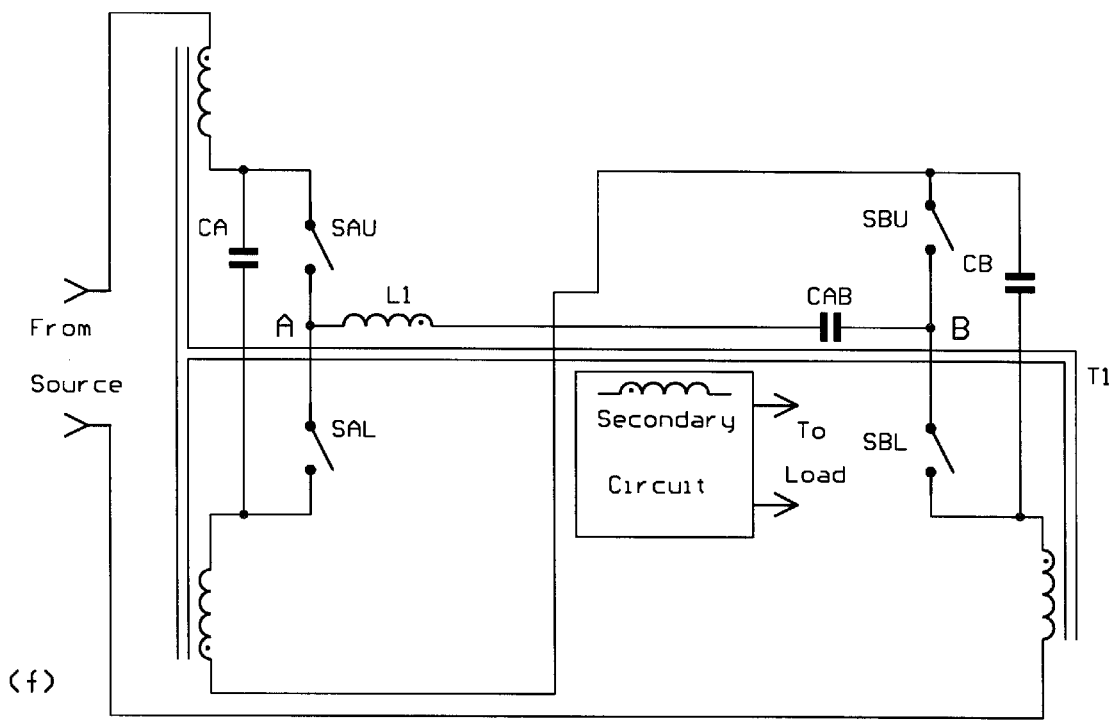
Figure 39:
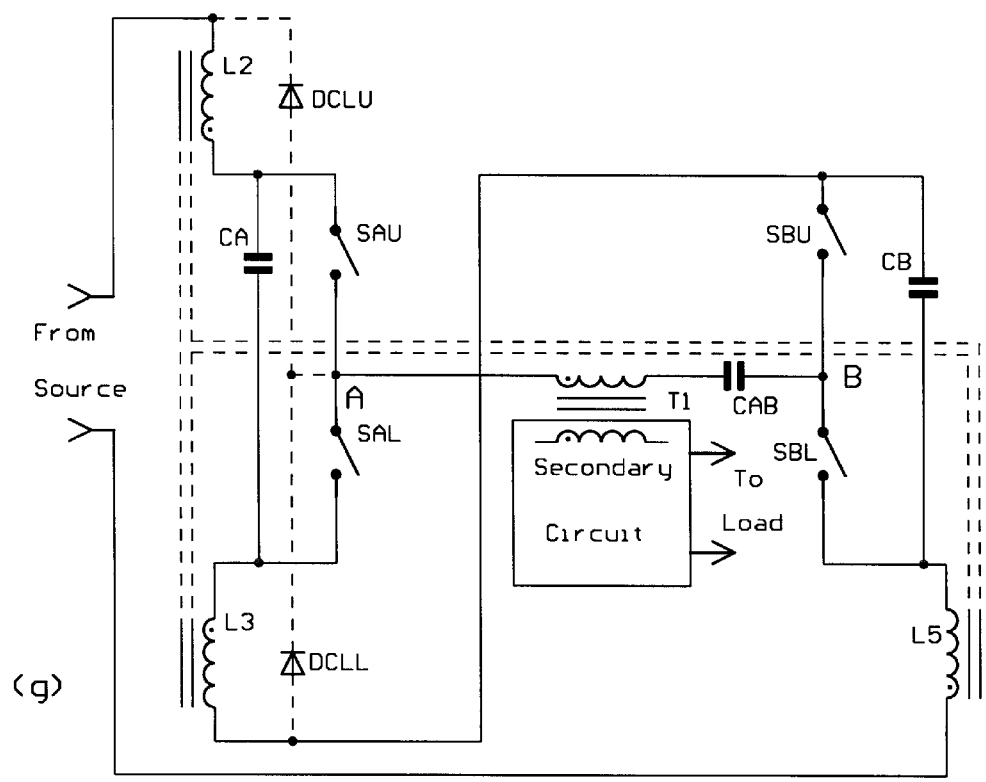
Figure 39:
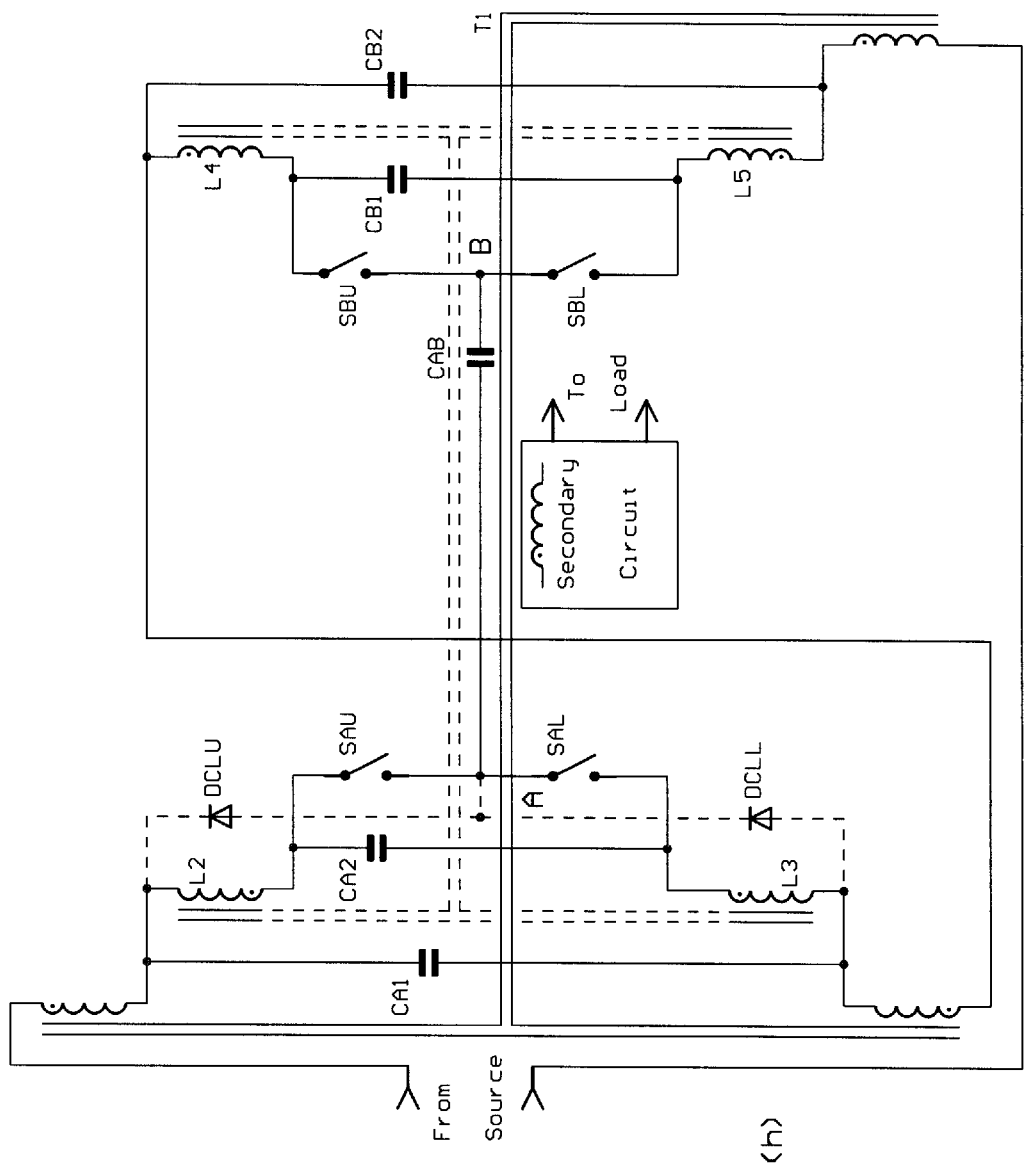

FIG. 39(a) illustrates a ZVS stacked full bridge transformer coupled type primary circuit.

FIG. 39(b) illustrates a ZVS stacked full bridge transformer coupled type primary circuit with non-pulsating terminal current achieved by applying the synthesis method illustrated by FIG. 10(d) to the FIG. 39(a) circuit.

FIG. 39(c) illustrates a ZVS stacked full bridge transformer coupled type primary circuit with non-pulsating terminal current achieved by applying the synthesis method illustrated by FIG. 10(d) to the FIG. 39(a) circuit.

FIG. 39(d) illustrates a ZVS stacked full bridge transformer coupled type primary circuit with non-pulsating terminal current achieved by applying the synthesis method illustrated by FIG. 10(d) to the FIG. 39(c) circuit.

FIG. 39(e) illustrates a ZVS stacked full bridge transformer coupled type primary circuit with ripple current cancellation achieved by applying the synthesis method illustrated in FIG. 10(e) to the FIG. 39(a) circuit.

FIG. 39(f) illustrates a ZVS stacked full bridge transformer coupled type primary circuit simplified by applying the synthesis method illustrated in FIG. 10(f) to the FIG. 39(b) circuit.

FIG. 39(g) illustrates a ZVS stacked full bridge transformer coupled type primary circuit simplified by applying the synthesis method illustrated in FIG. 10(f) to the FIG. 39(c) circuit.

FIG. 39(h) illustrates a ZVS stacked full bridge transformer coupled type primary circuit simplified by applying the synthesis method illustrated in FIG. 10(f) to the FIG. 39(d) circuit.

Figure 40:
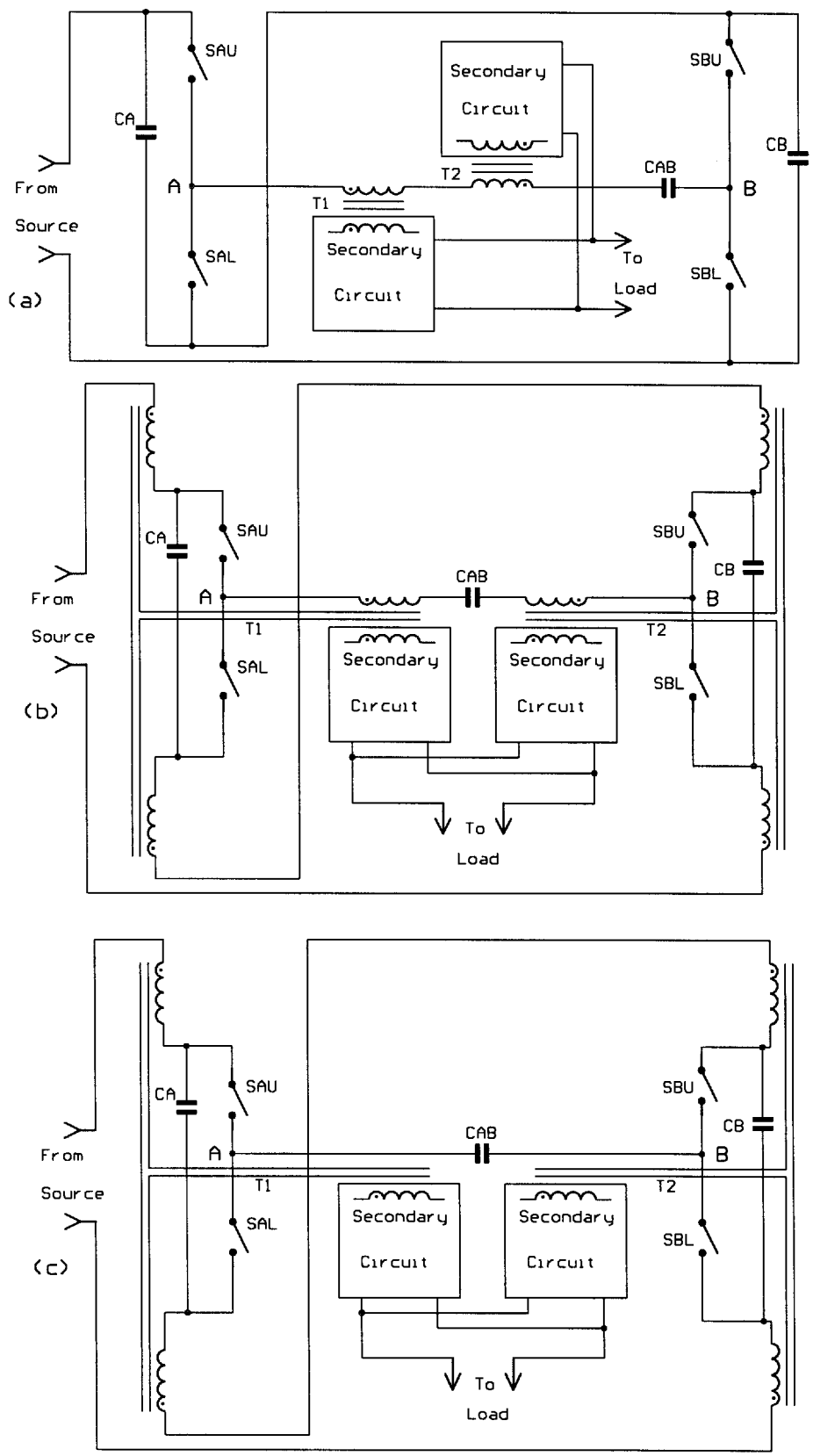
Figure 40:
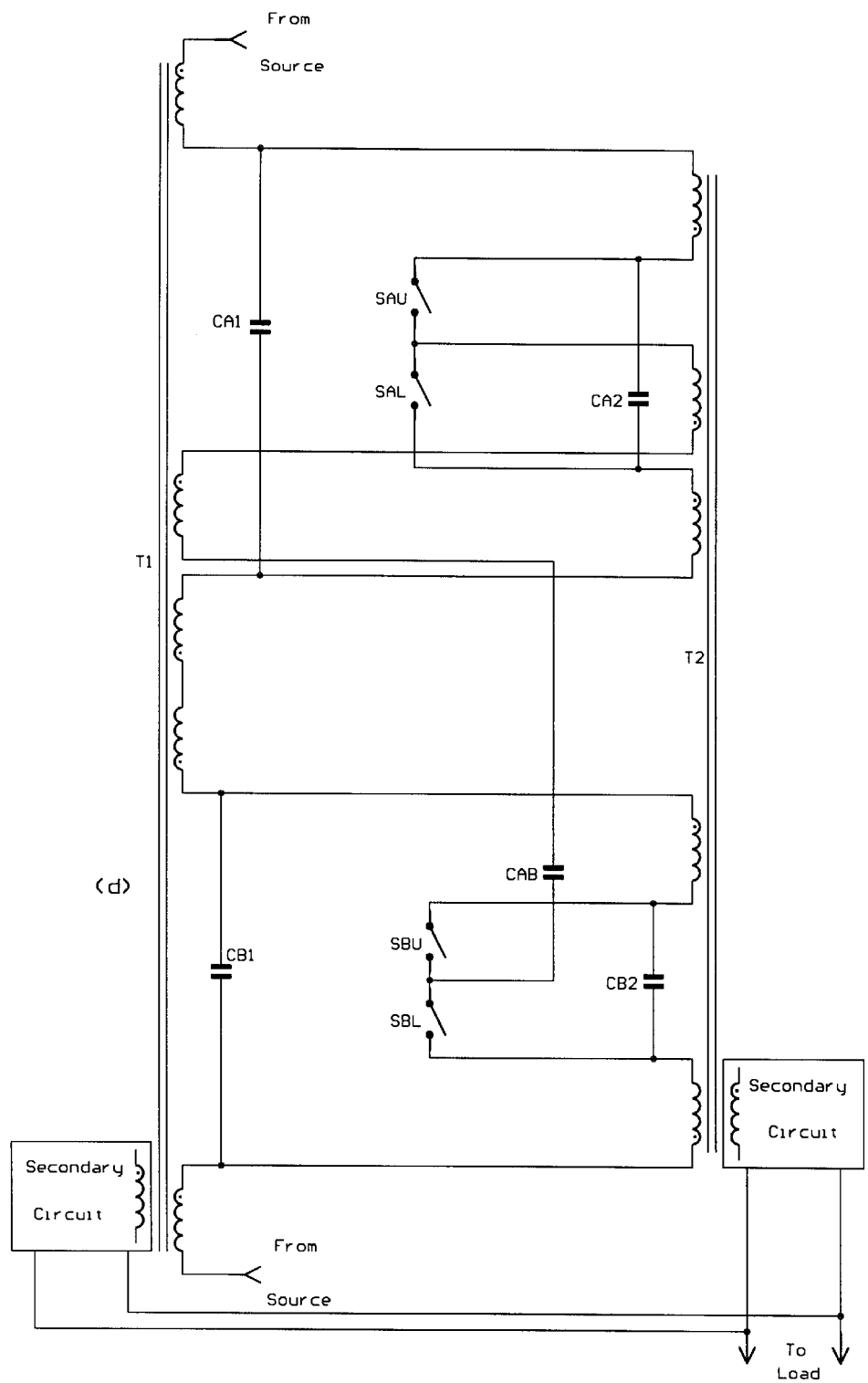
Figure 40:
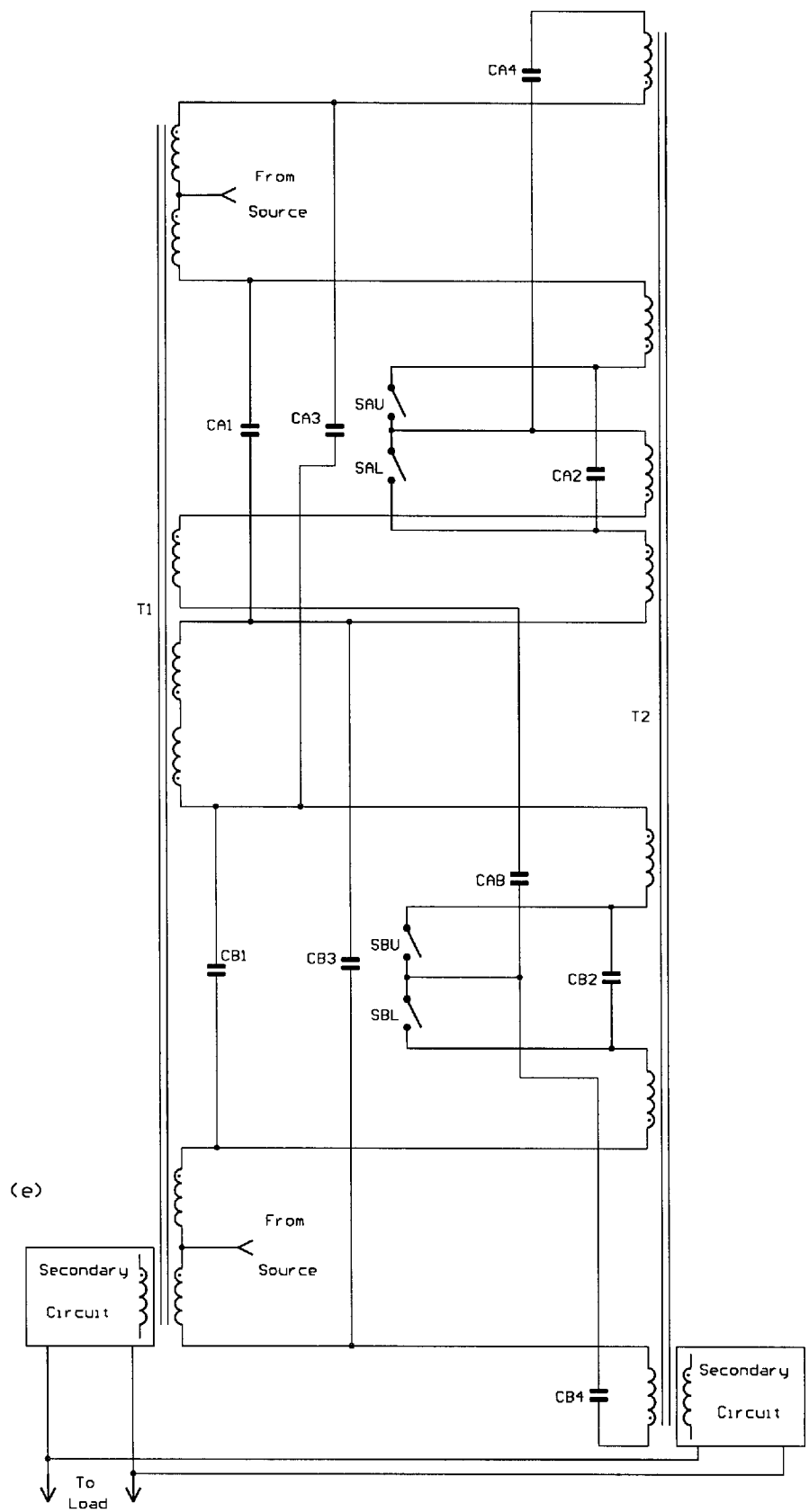
Figure 40:
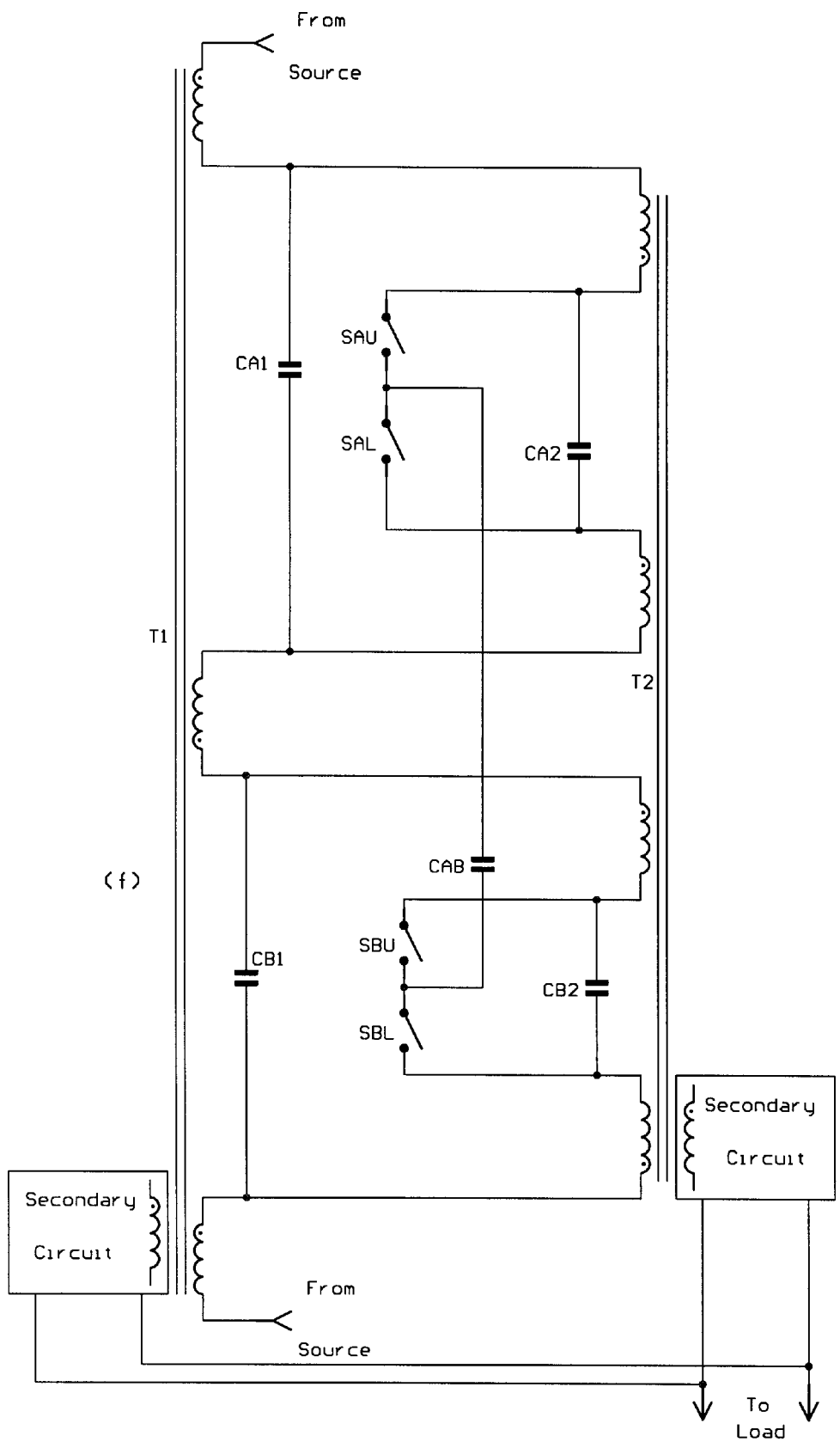

FIG. 40(a) illustrates a stacked full bridge interleaved coupled inductor buck type primary circuit.

FIG. 40(b) illustrates a stacked full bridge interleaved coupled inductor buck type primary circuit with non-pulsating terminal current achieved by applying the synthesis method illustrated in FIG. 3(d) to the FIG. 40(a) circuit.

FIG. 40(c) illustrates a stacked full bridge interleaved coupled inductor buck type primary circuit simplified by applying the synthesis method illustrated in FIG. 4(c) to the FIG. 40(b) circuit.

FIG. 40(d) illustrates a stacked full bridge interleaved coupled inductor buck type primary circuit with non-pulsating terminal current achieved by applying the synthesis method illustrated in FIG. 10(d) to the FIG. 40(a) circuit.

FIG. 40(e) illustrates a stacked full bridge interleaved coupled inductor buck type primary circuit with ripple current cancellation achieved by applying the synthesis method illustrated in FIG. 10(e) to the FIG. 40(a) circuit.

FIG. 40(f) illustrates a stacked full bridge interleaved coupled inductor buck type primary circuit with common mode current cancellation achieved by applying the synthesis method illustrated in FIG. 10(f) to the FIG. 10(d) circuit.

Figure 41:
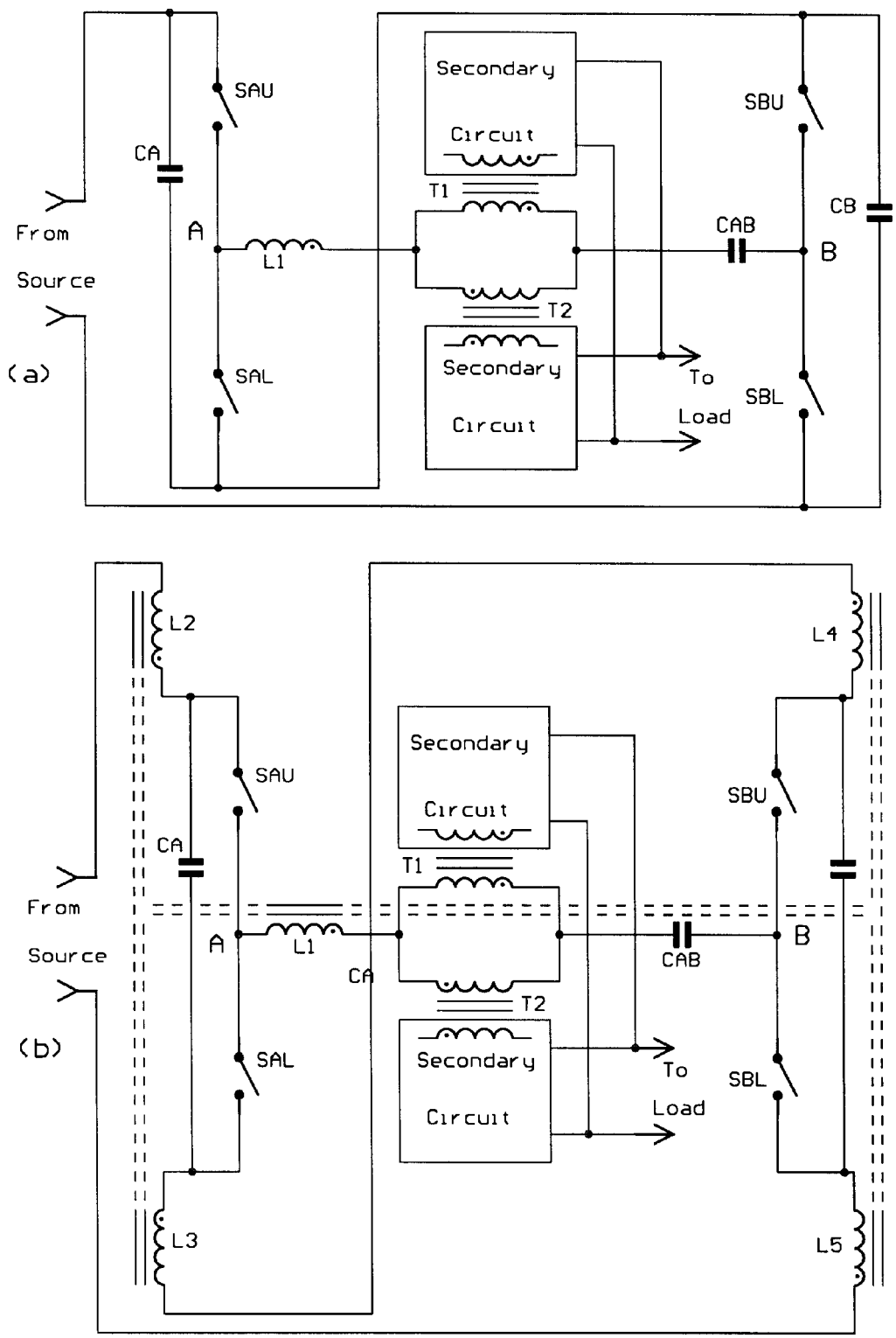
Figure 41:
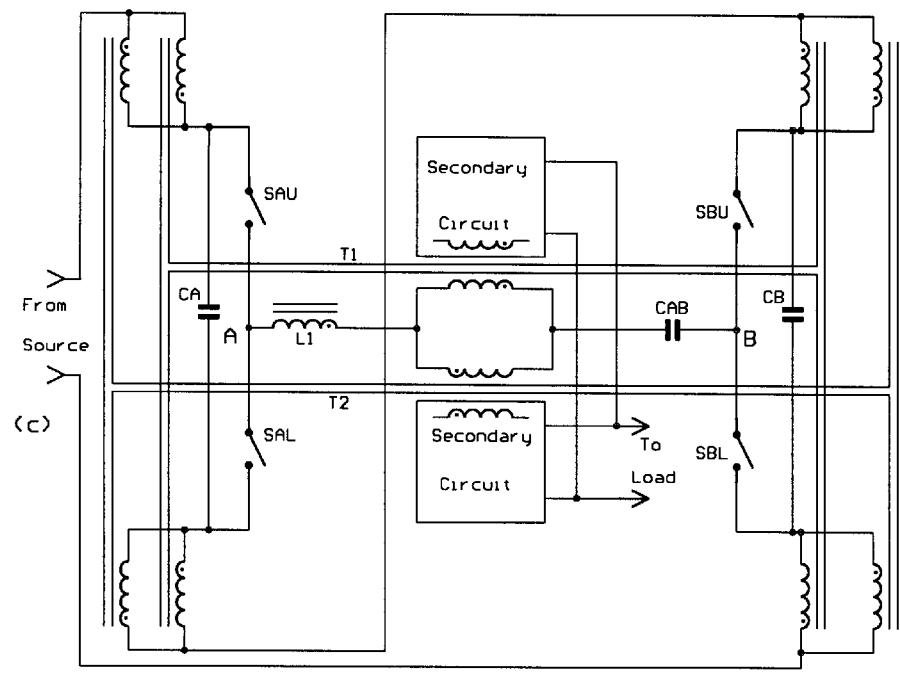
Figure 41:
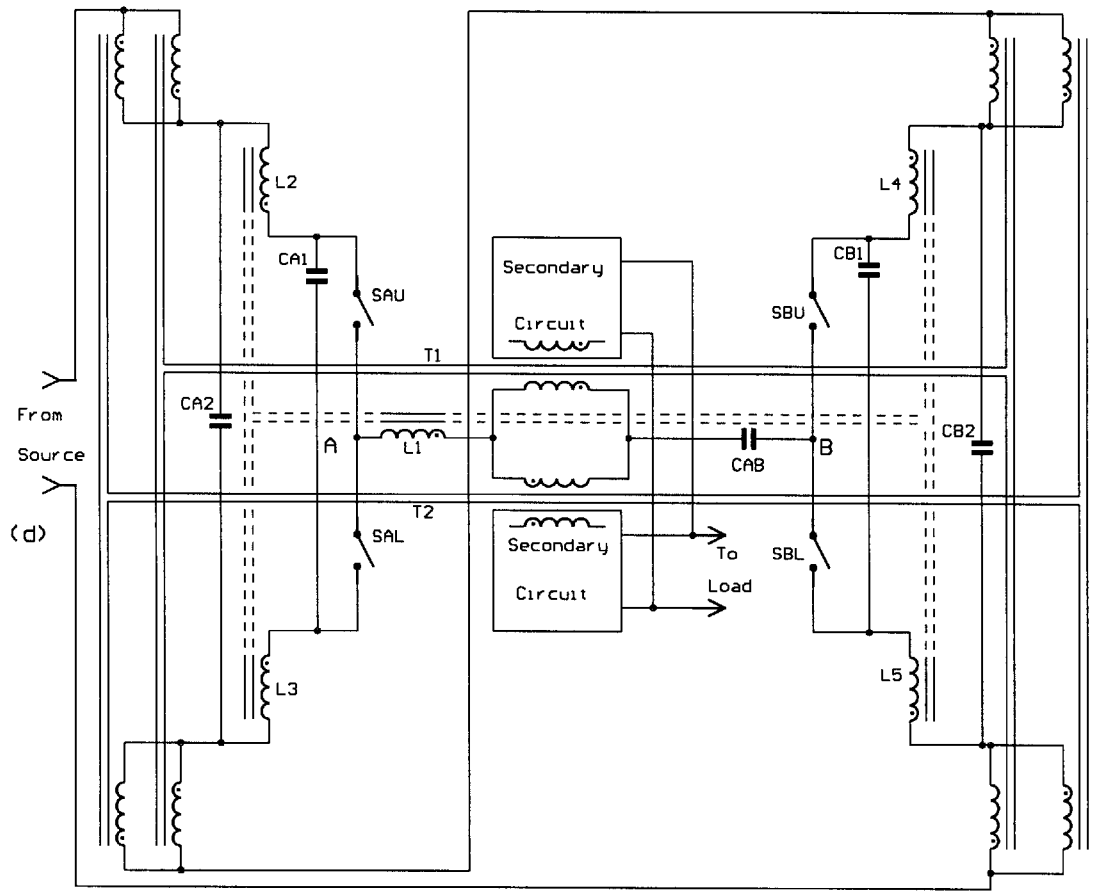
Figure 41:
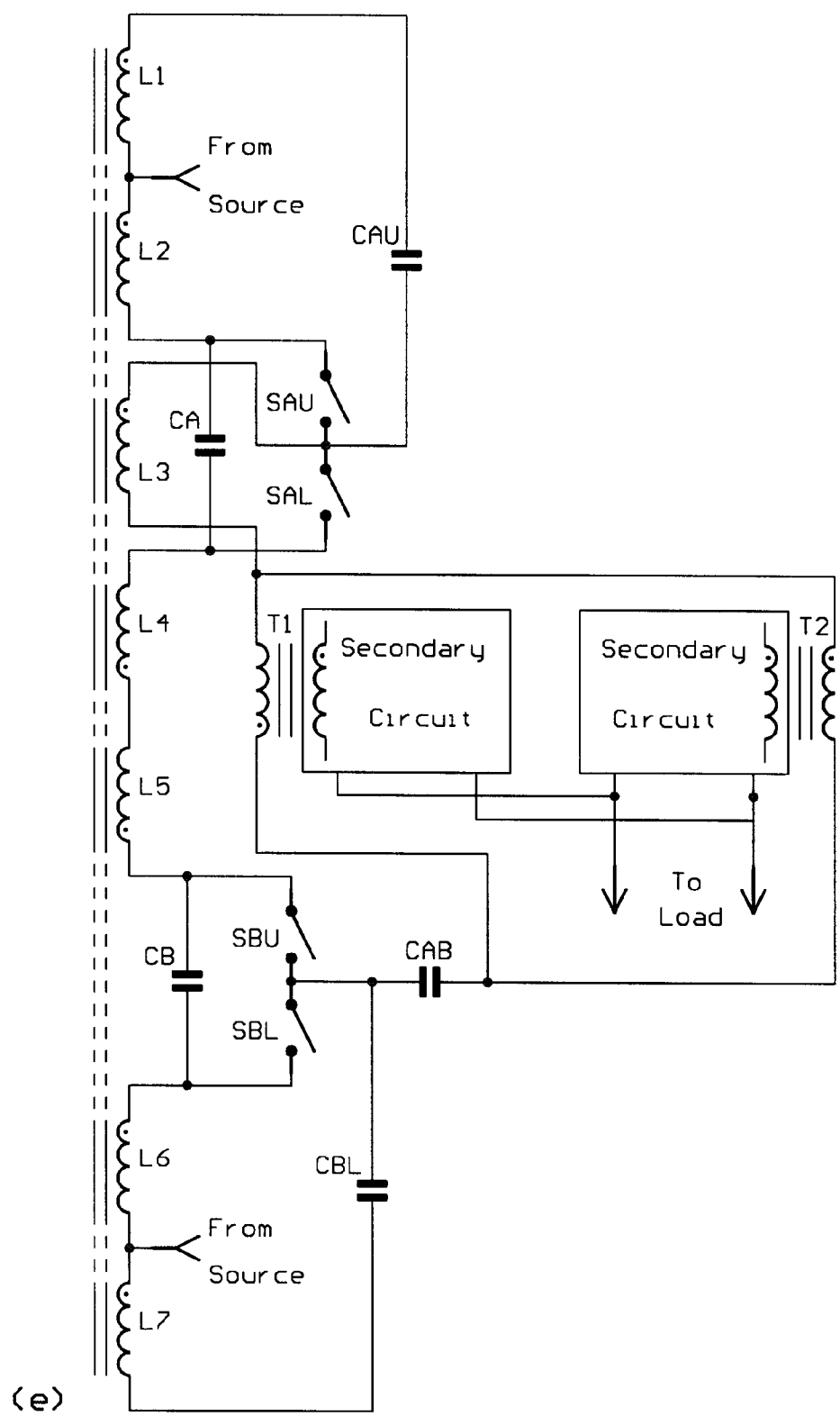
Figure 41:
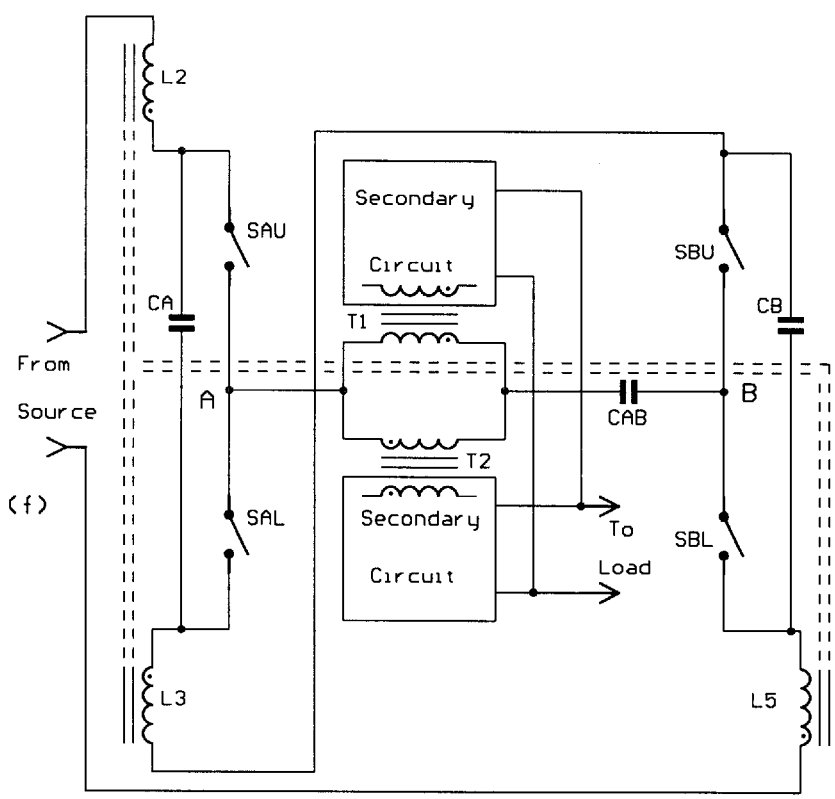
Figure 41:
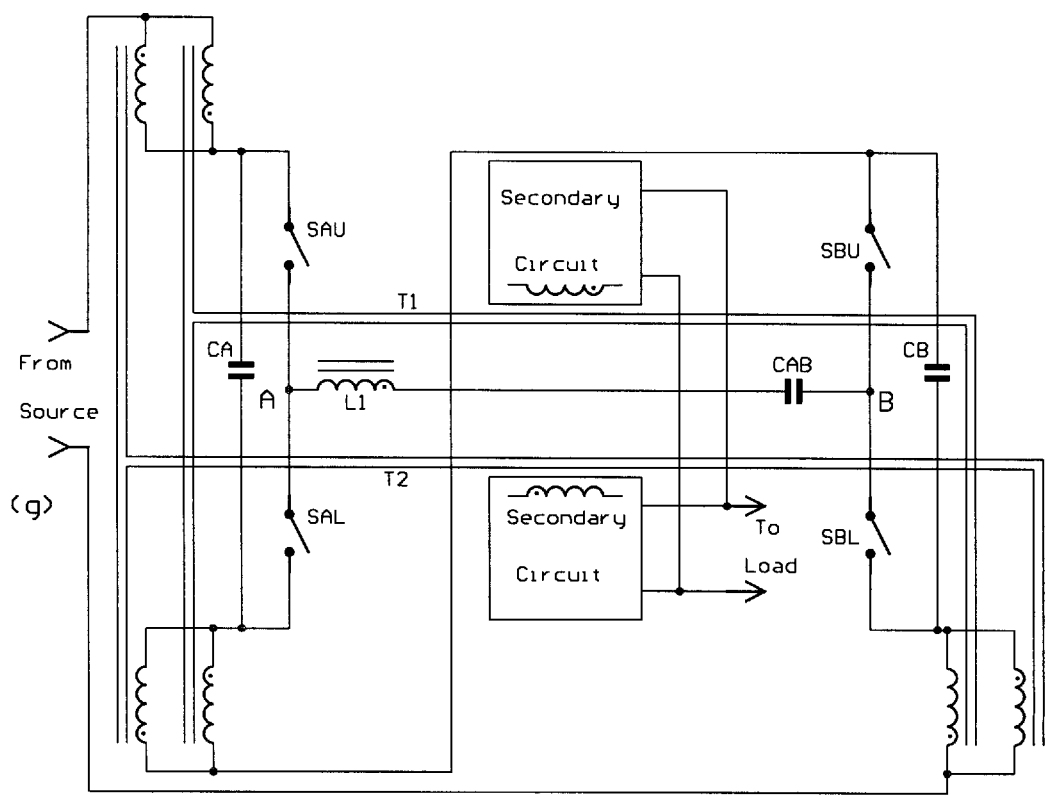
Figure 41:
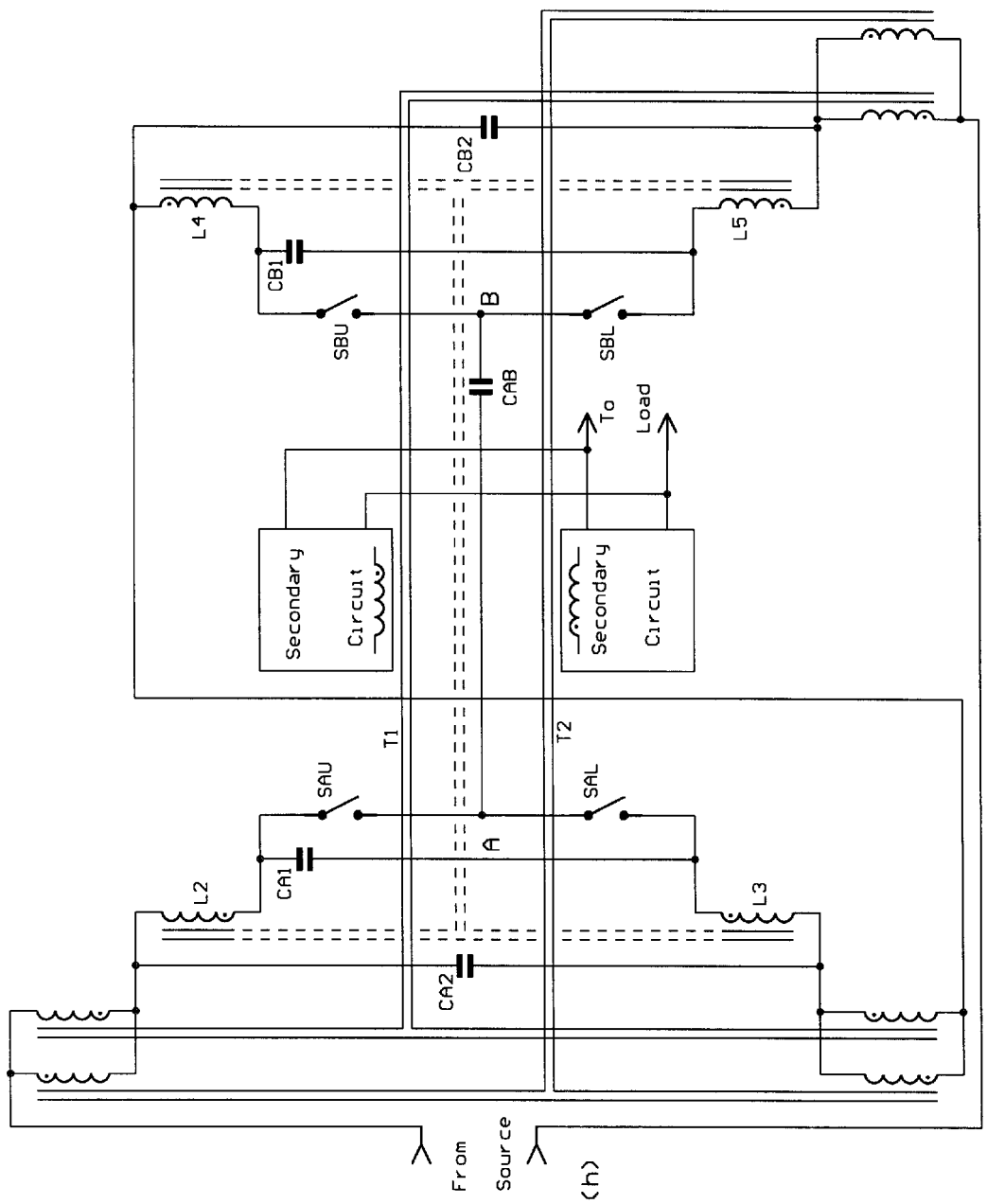

FIG. 41(a) illustrates a stacked full bridge primary inductor parallel transformer type primary circuit.

FIG. 41(b) illustrates a stacked full bridge primary inductor parallel transformer type primary circuit with non-pulsating terminal current achieved by applying the synthesis method illustrated in FIG. 10(d) to the FIG. 41(a) circuit.

FIG. 41(c) illustrates a stacked full bridge primary inductor parallel transformer type primary circuit with non-pulsating terminal current achieved by applying the synthesis method illustrated in FIG. 10(d) to the FIG. 41(a) circuit.

FIG. 41(d) illustrates a stacked full bridge primary inductor parallel transformer type primary circuit with improved non-pulsating terminal current achieved by applying the synthesis method illustrated in FIG. 10(d) to the FIG. 41(a) circuit.

FIG. 41(e) illustrates a stacked full bridge primary inductor parallel transformer type primary circuit with ripple current cancellation achieved by applying the synthesis method illustrated in FIG. 10(e) to the FIG. 41(a) circuit.

FIG. 41(f) illustrates a stacked full bridge primary inductor parallel transformer type primary circuit with common mode current cancellation achieved by applying the synthesis method illustrated in FIG. 10(f) to the FIG. 41(b) circuit.

FIG. 41(g) illustrates a stacked full bridge primary inductor parallel transformer type primary circuit with common mode current cancellation achieved by applying the synthesis method illustrated in FIG. 10(f) to the FIG. 41(c) circuit.

FIG. 41(h) illustrates a stacked full bridge primary inductor parallel transformer type primary circuit with common mode current cancellation achieved by applying the synthesis method illustrated in FIG. 10(f) to the FIG. 41(d) circuit.

Figure 42:
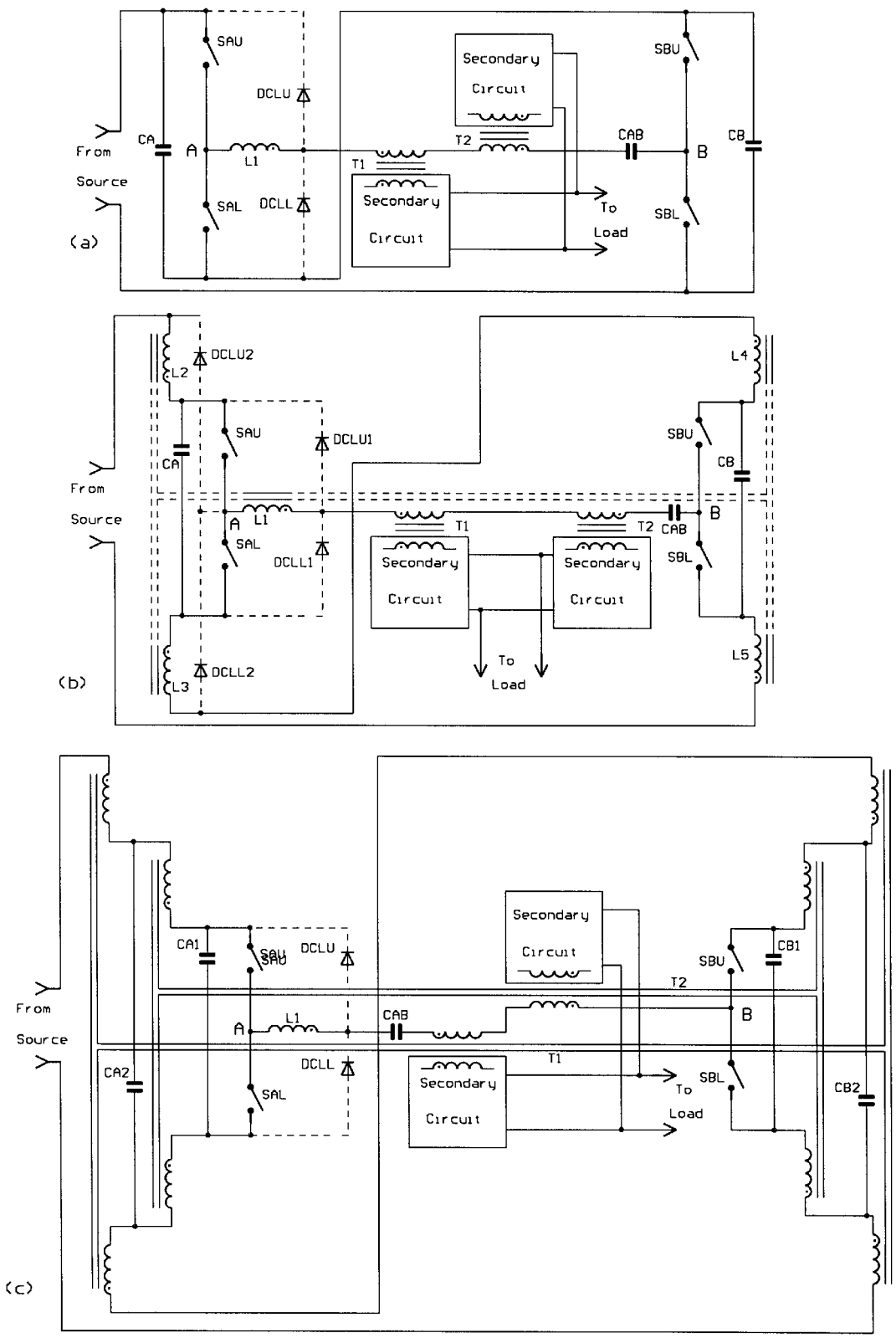
Figure 42:
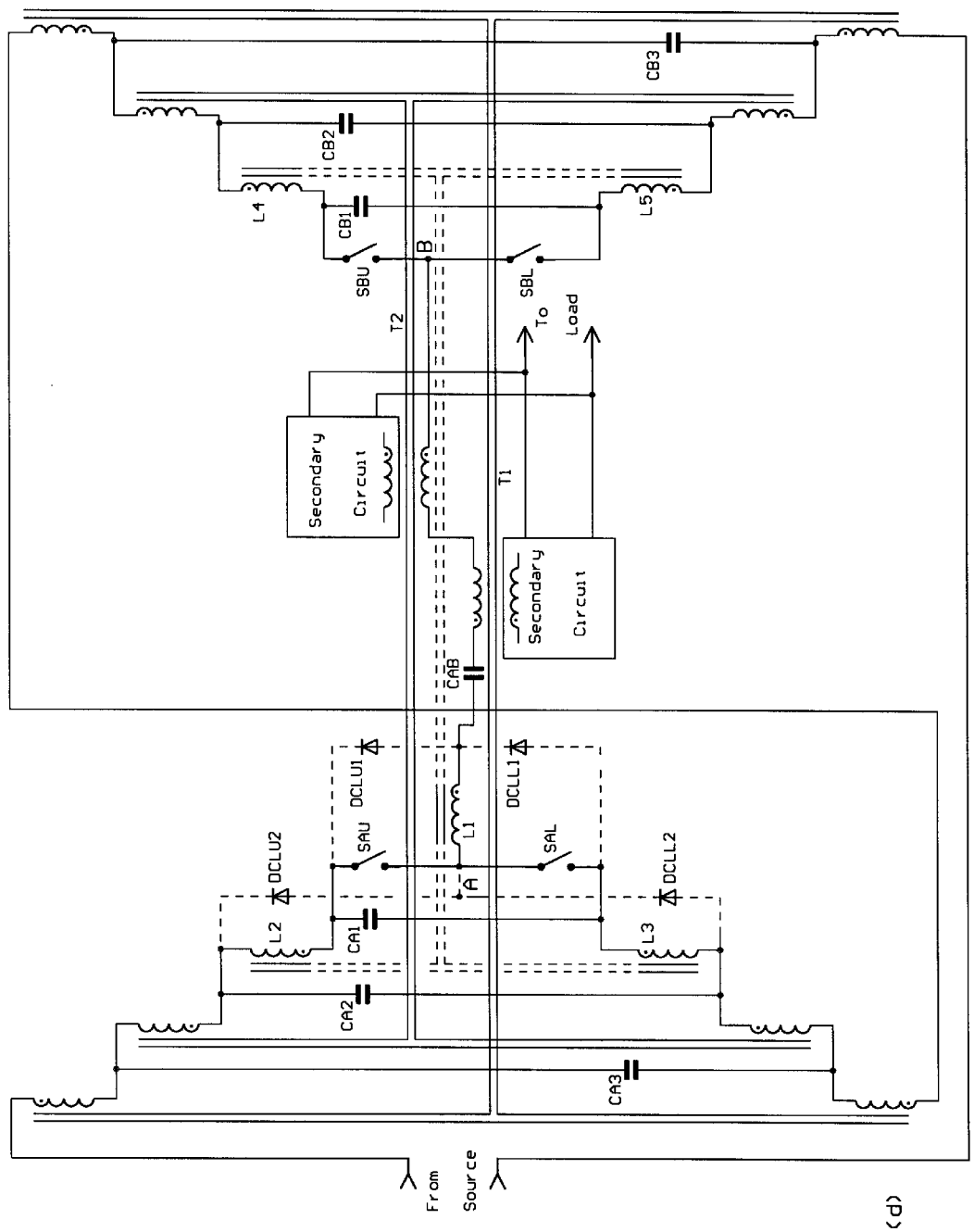
Figure 42:
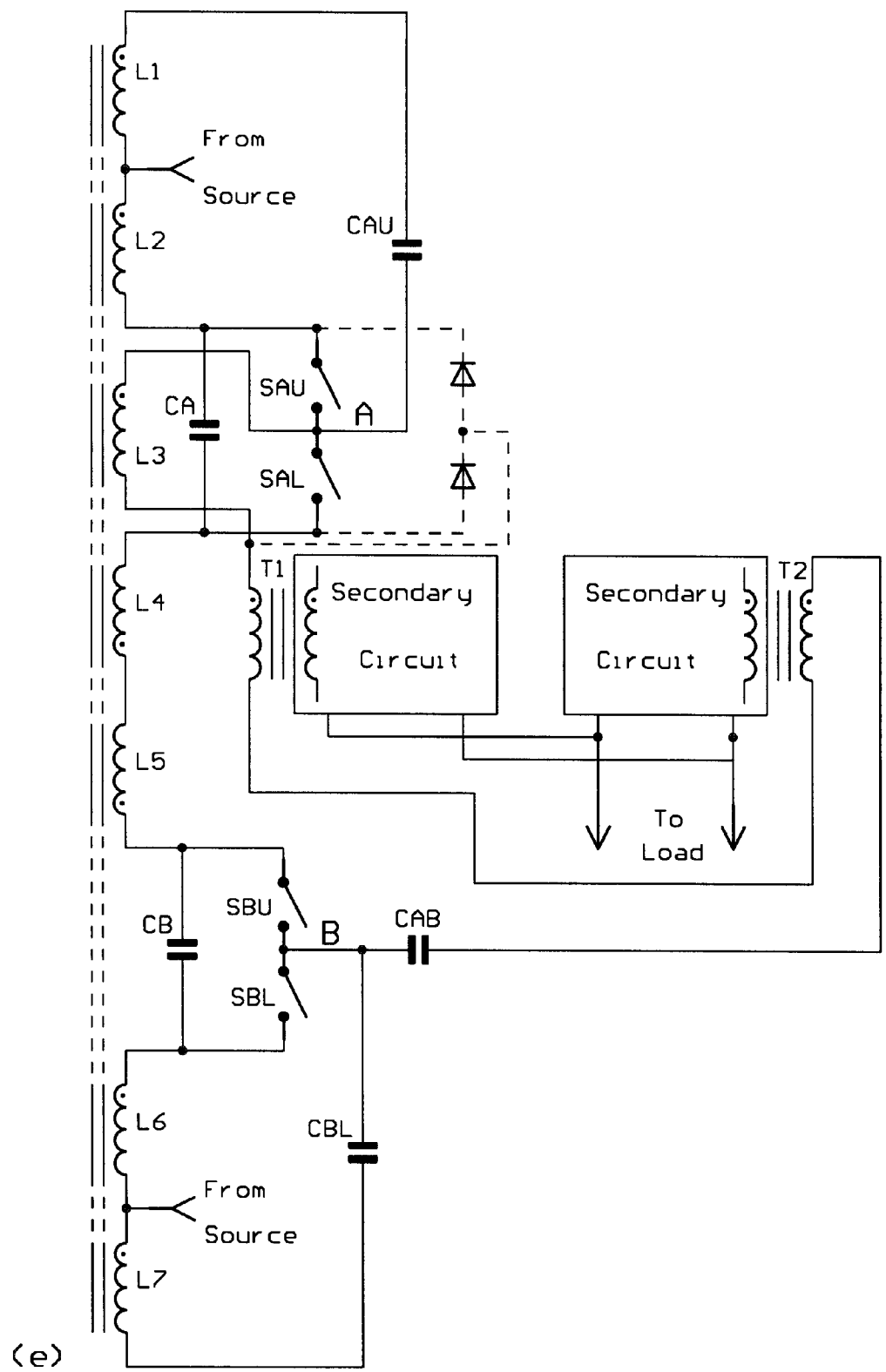
Figure 42:
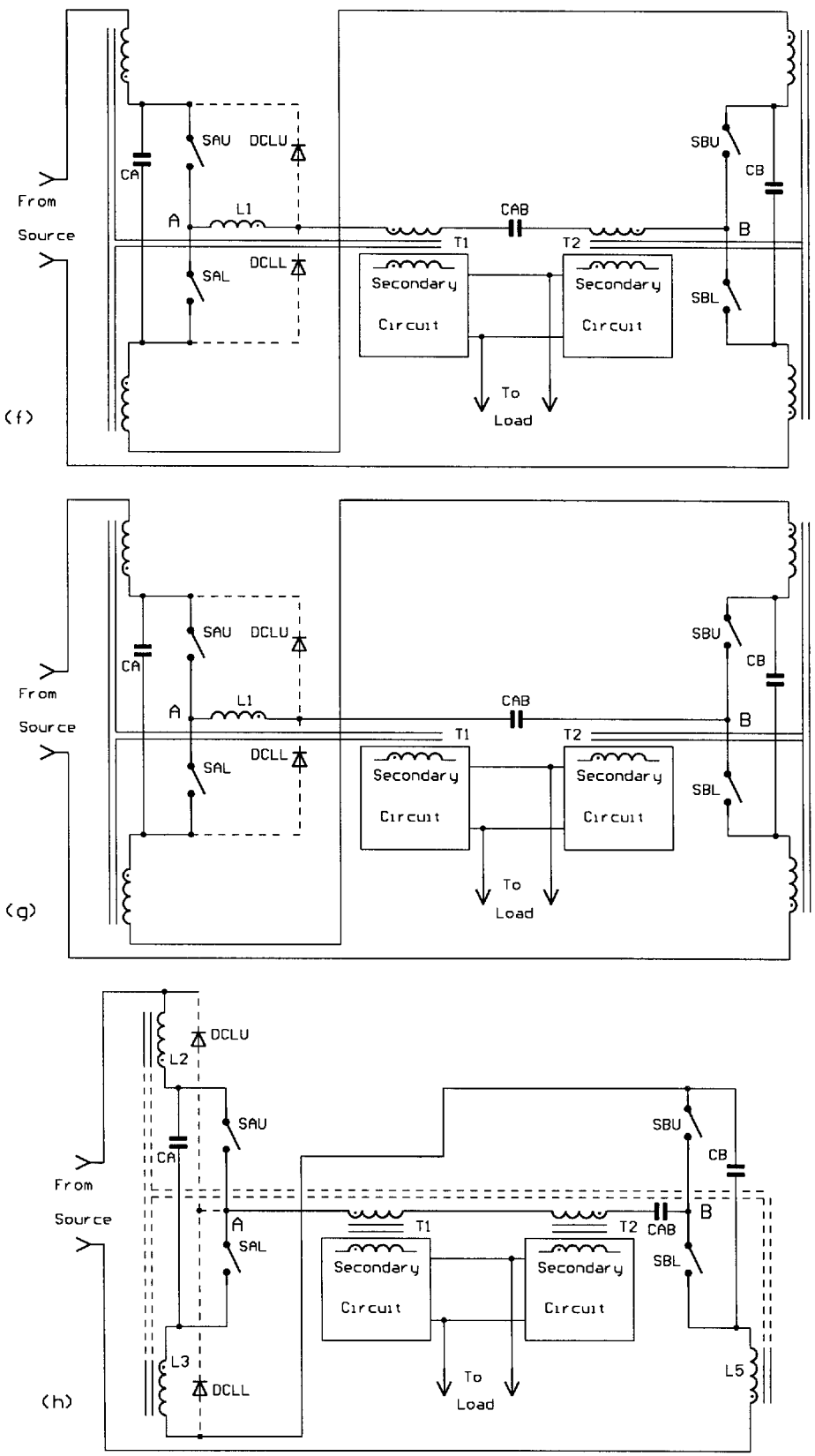

FIG. 42(a) illustrates a ZVS stacked full bridge interleaved coupled inductor buck type primary circuit.

FIG. 42(b) illustrates a ZVS stacked full bridge interleaved coupled inductor buck type primary circuit with non-pulsating terminal current achieved by applying the synthesis method illustrated in FIG. 10(d) to the FIG. 42(a) circuit.

FIG. 42(c) illustrates a ZVS stacked full bridge interleaved coupled inductor buck type primary circuit with non-pulsating terminal current achieved by applying the synthesis method illustrated in FIG. 10(d) to the FIG. 42(a) circuit.

FIG. 42(d) illustrates a ZVS stacked full bridge interleaved coupled inductor buck type primary circuit with improved non-pulsating terminal current achieved by applying the synthesis method illustrated in FIG. 10(d) to the FIG. 42(a) circuit.

FIG. 42(e) illustrates a ZVS stacked full bridge interleaved coupled inductor buck type primary circuit with ripple current cancellation achieved by applying the synthesis method illustrated in FIG. 10(e) to the FIG. 42(b) circuit.

FIG. 42(f) illustrates a ZVS stacked full bridge interleaved coupled inductor buck type primary circuit with non-pulsating terminal current achieved by applying the synthesis method illustrated in FIG. 3(d) to the FIG. 42(a) circuit.

FIG. 42(g) illustrates a ZVS stacked full bridge interleaved coupled inductor buck type primary circuit simplified by applying the synthesis method illustrated in FIG. 4(c) to the FIG. 42(f) circuit.

FIG. 42(h) illustrates a ZVS stacked full bridge interleaved coupled inductor buck type primary circuit simplified by applying the synthesis method illustrated in FIG. 10(f) to the FIG. 42(b) circuit.

FIG. 42(i) illustrates a ZVS stacked full bridge interleaved coupled inductor buck type primary circuit with common mode current cancellation achieved by applying the synthesis method illustrated in FIG. 10(f) to the FIG. 42(c) circuit.

FIG. 42(j) illustrates a ZVS stacked full bridge interleaved coupled inductor buck type primary circuit with common mode current cancellation achieved by applying the synthesis method illustrated in FIG. 10(f) to the FIG. 42(d) circuit.

Figure 43:
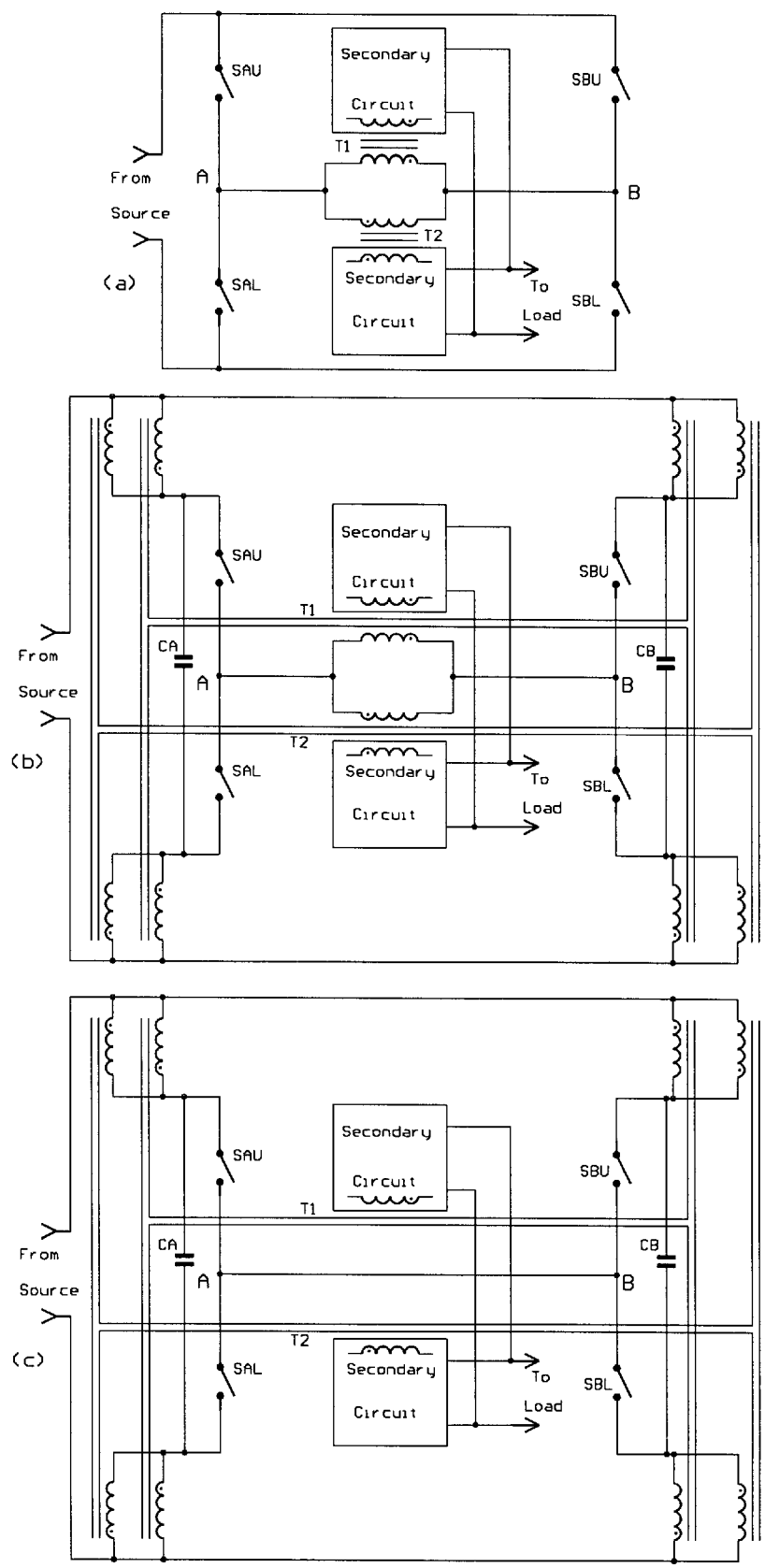
Figure 43:
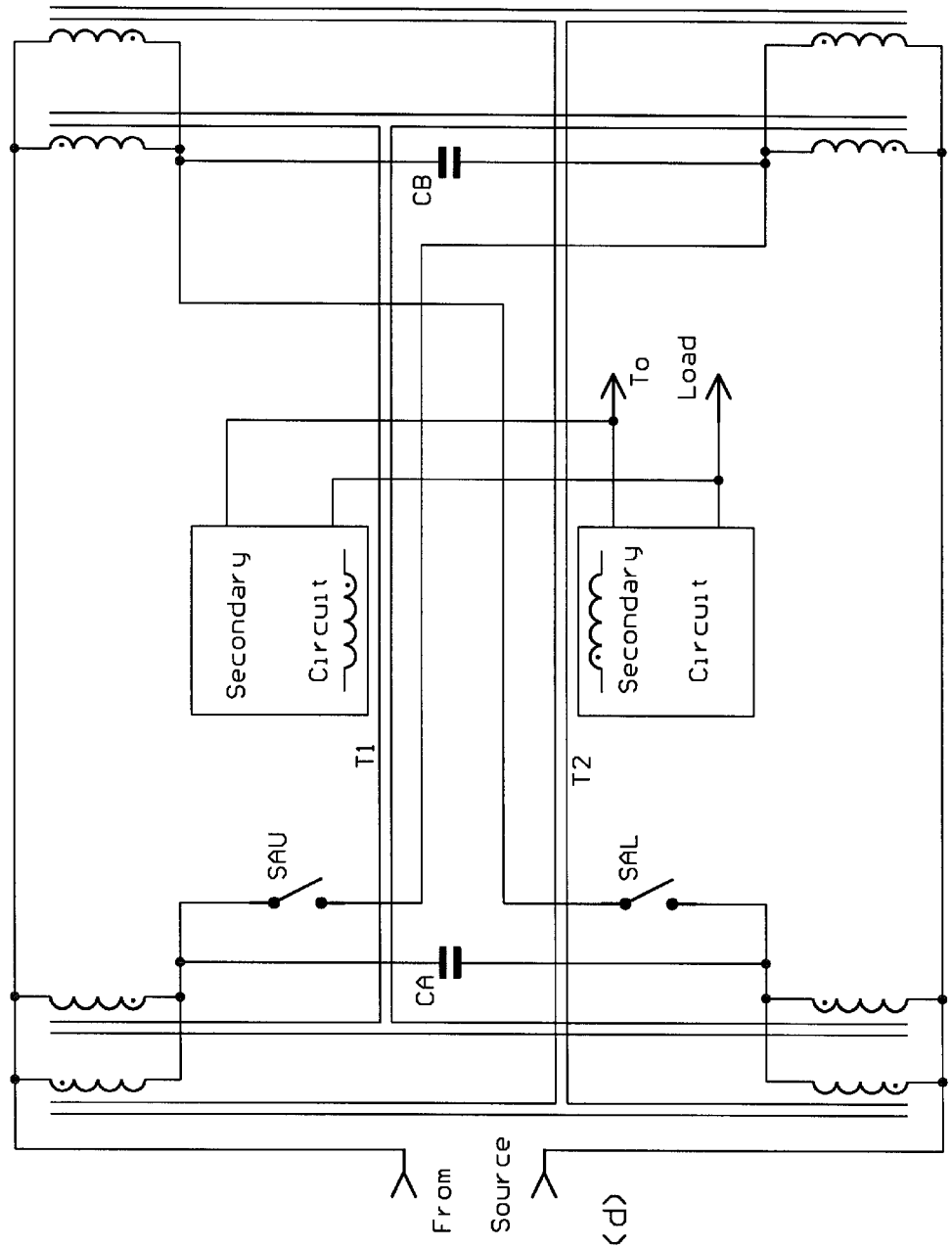

FIG. 43(a) illustrates a full bridge push pull dual transformer type primary circuit.

FIG. 43(b) illustrates a full bridge push pull dual transformer type primary circuit with ripple current cancellation achieved by applying the synthesis method illustrated in FIG. 9(d) to the FIG. 43(a) circuit.

FIG. 43(c) illustrates a full bridge push pull dual transformer type primary circuit with common mode current cancellation achieved by applying the synthesis method illustrated in FIG. 9(f) to the FIG. 43(b) circuit.

FIG. 43(d) illustrates a full bridge push pull dual transformer type primary circuit simplified by applying the synthesis method illustrated in FIG. 9(g) to the FIG. 43(c) circuit.

Figure 44:
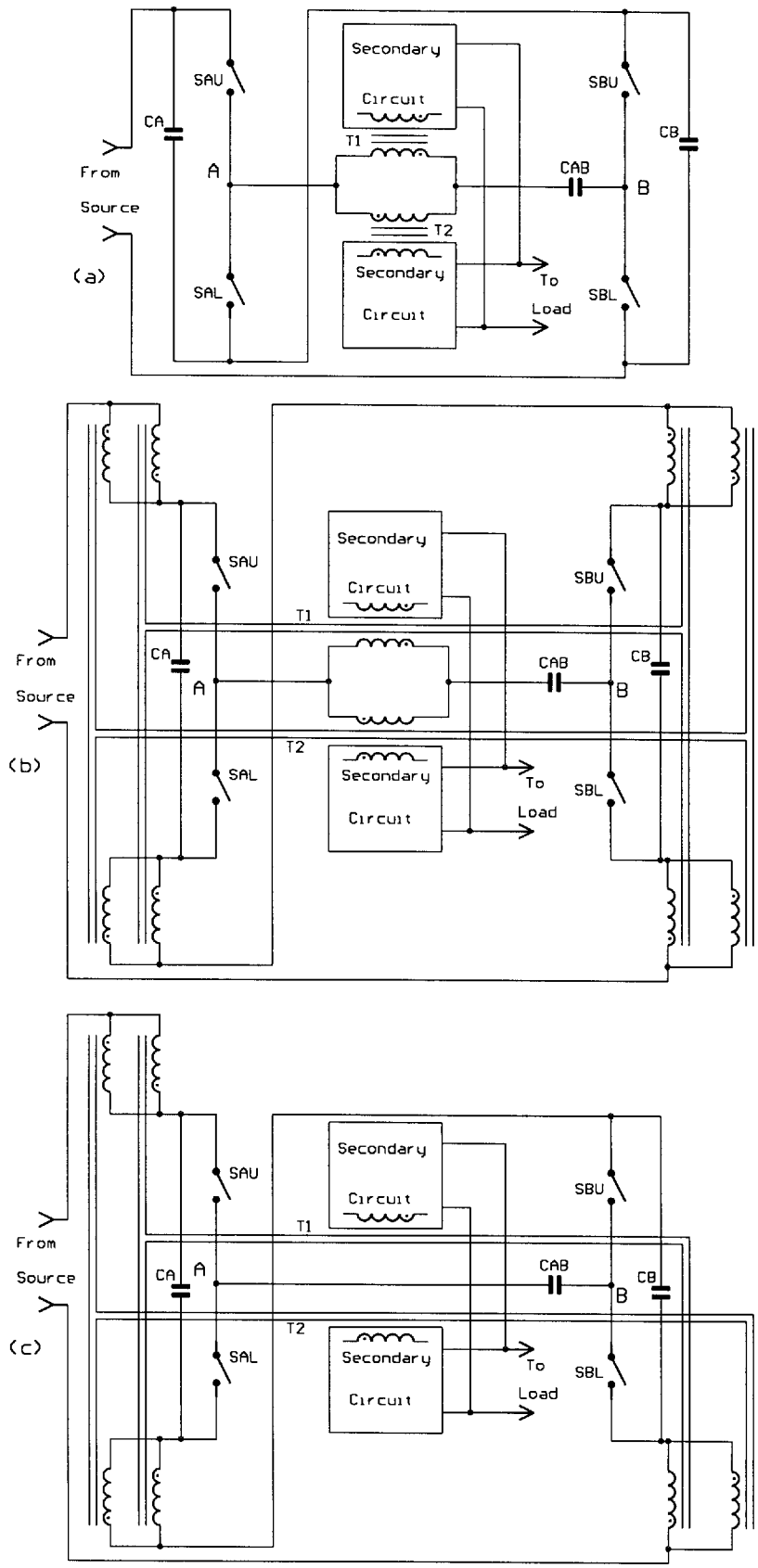
Figure 44:
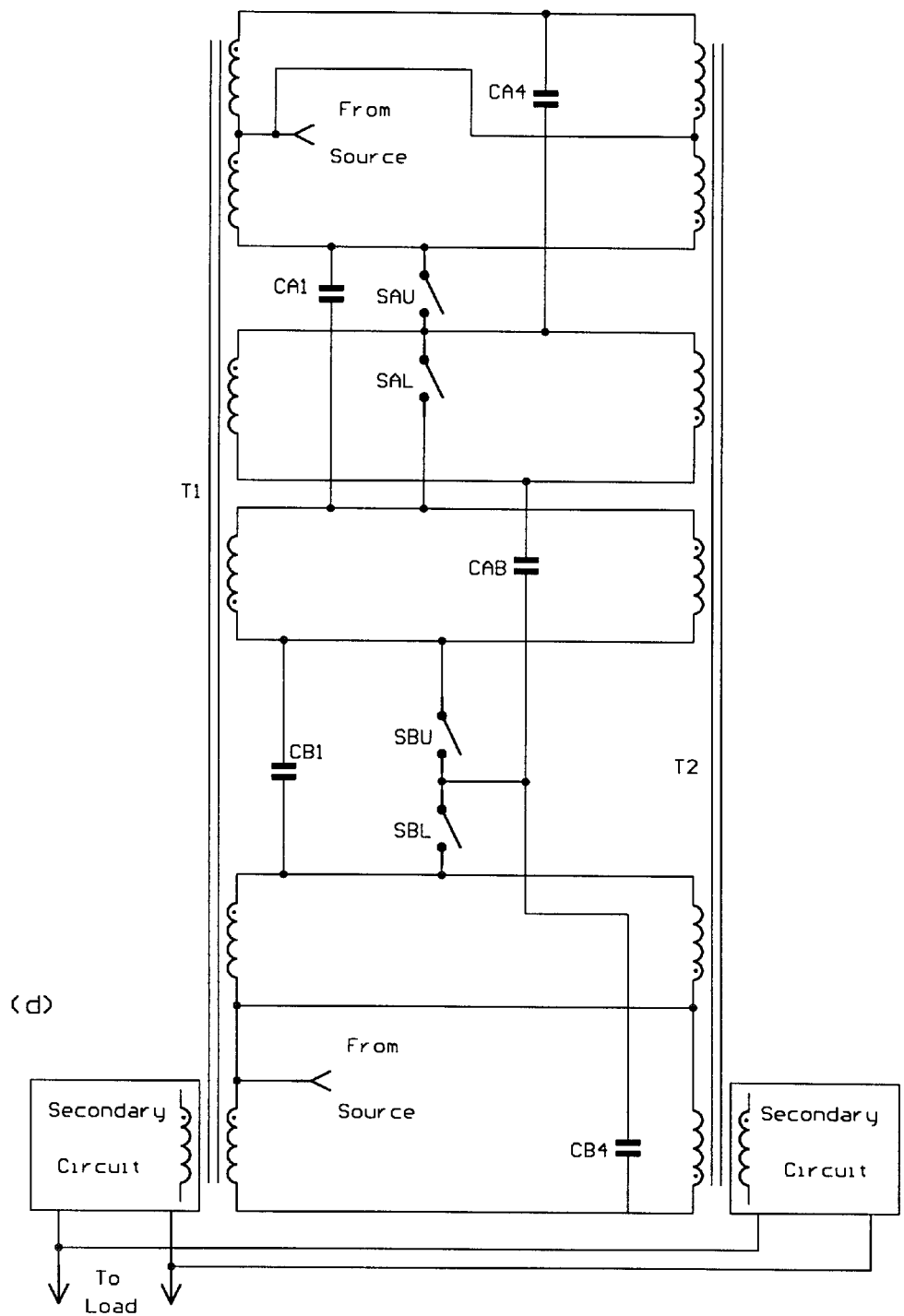

FIG. 44(a) illustrates a stacked full bridge push pull dual transformer type primary circuit.

FIG. 44(b) illustrates a stacked full bridge push pull dual transformer type primary circuit with non-pulsating terminal current achieved by applying the synthesis method illustrated in FIG. 10(d) to the FIG. 44(a) circuit.

FIG. 44(c) illustrates a stacked full bridge push pull dual transformer type primary circuit simplified by applying the synthesis method illustrated in FIG. 10(f) to the FIG. 44(b) circuit.

FIG. 44(d) illustrates a stacked full bridge push pull dual transformer type primary circuit with terminal ripple current cancellation achieved by applying the synthesis method illustrated in FIG. 10(e) to the FIG. 44(b) circuit.

Figure 45:
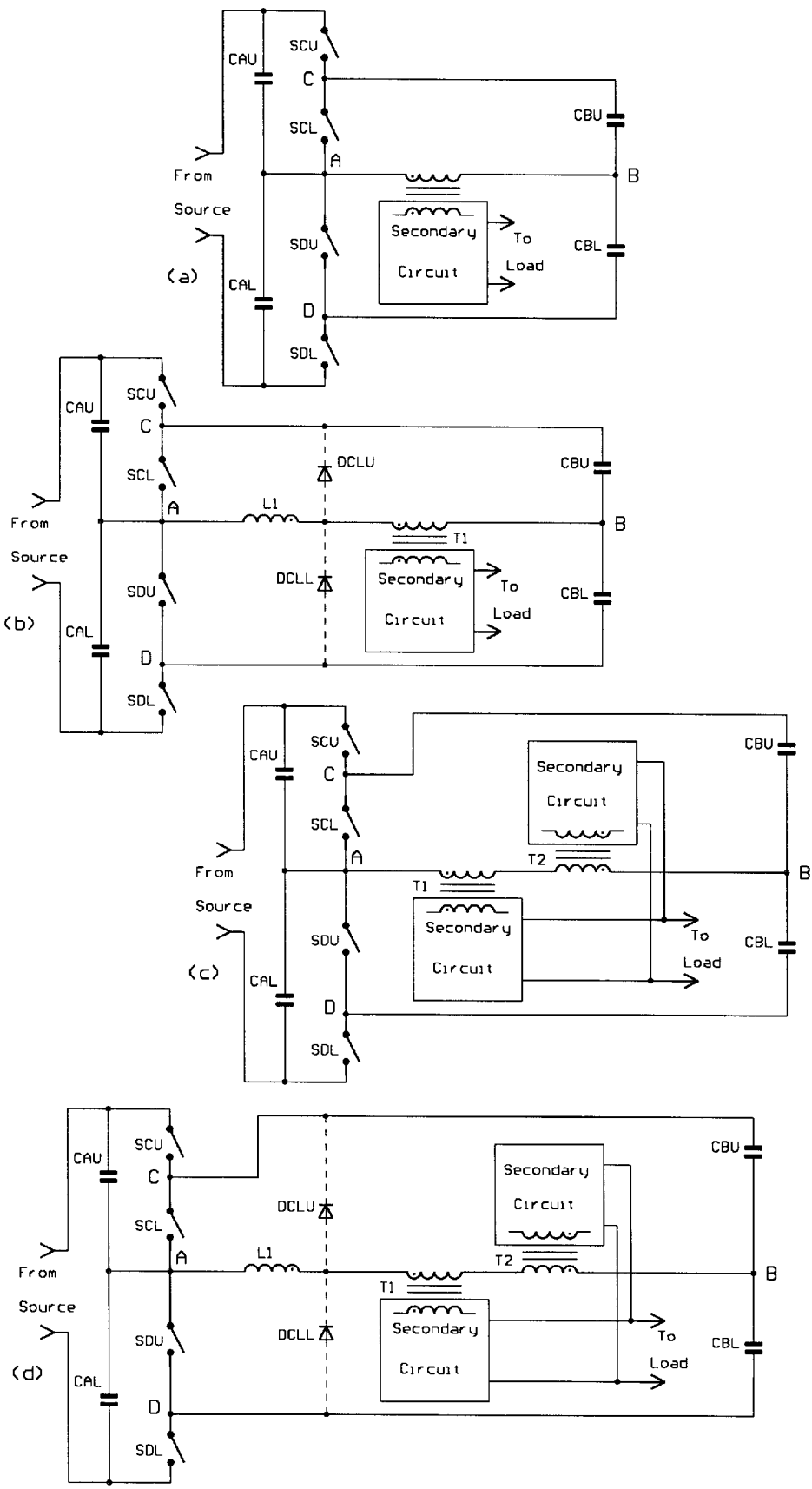

FIG. 45(a) illustrates a stacked half bridge full bridge transformer coupled type primary circuit.

FIG. 45(b) illustrates a ZVS stacked half bridge full bridge transformer coupled type primary circuit.

FIG. 45(c) illustrates a stacked half bridge full bridge interleaved couple inductor buck type primary circuit.

FIG. 45(d) illustrates a ZVS stacked half bridge full bridge interleaved couple inductor buck type primary circuit.

Figure 46:
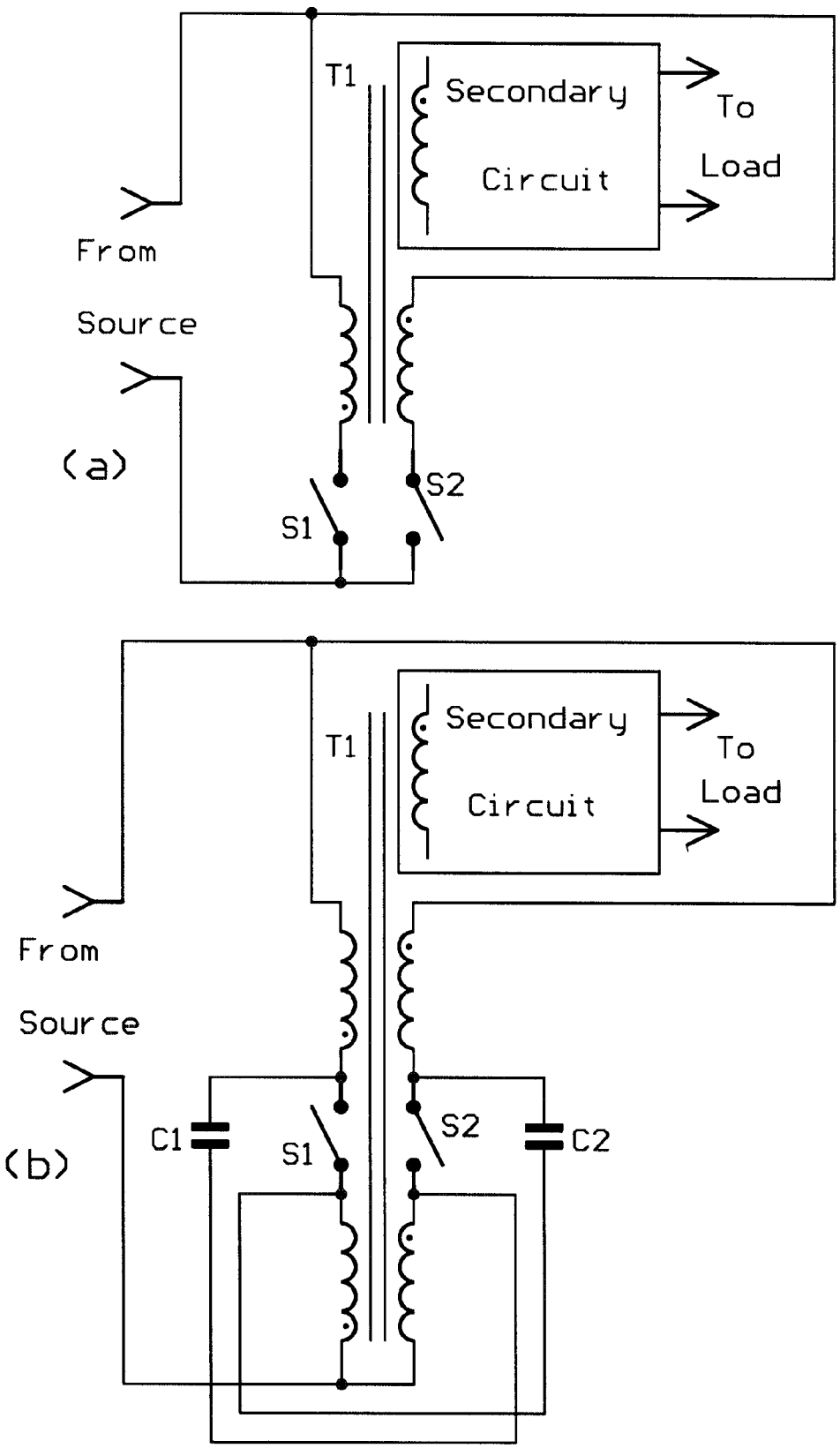

FIG. 46(a) illustrates a push pull transformer coupled type primary circuit.

FIG. 46(b) illustrates a push pull transformer coupled type primary circuit with ripple current cancellation achieved by applying the synthesis method illustrated in FIG. 5(i) to the FIG. 46(a) circuit.

Figure 47:
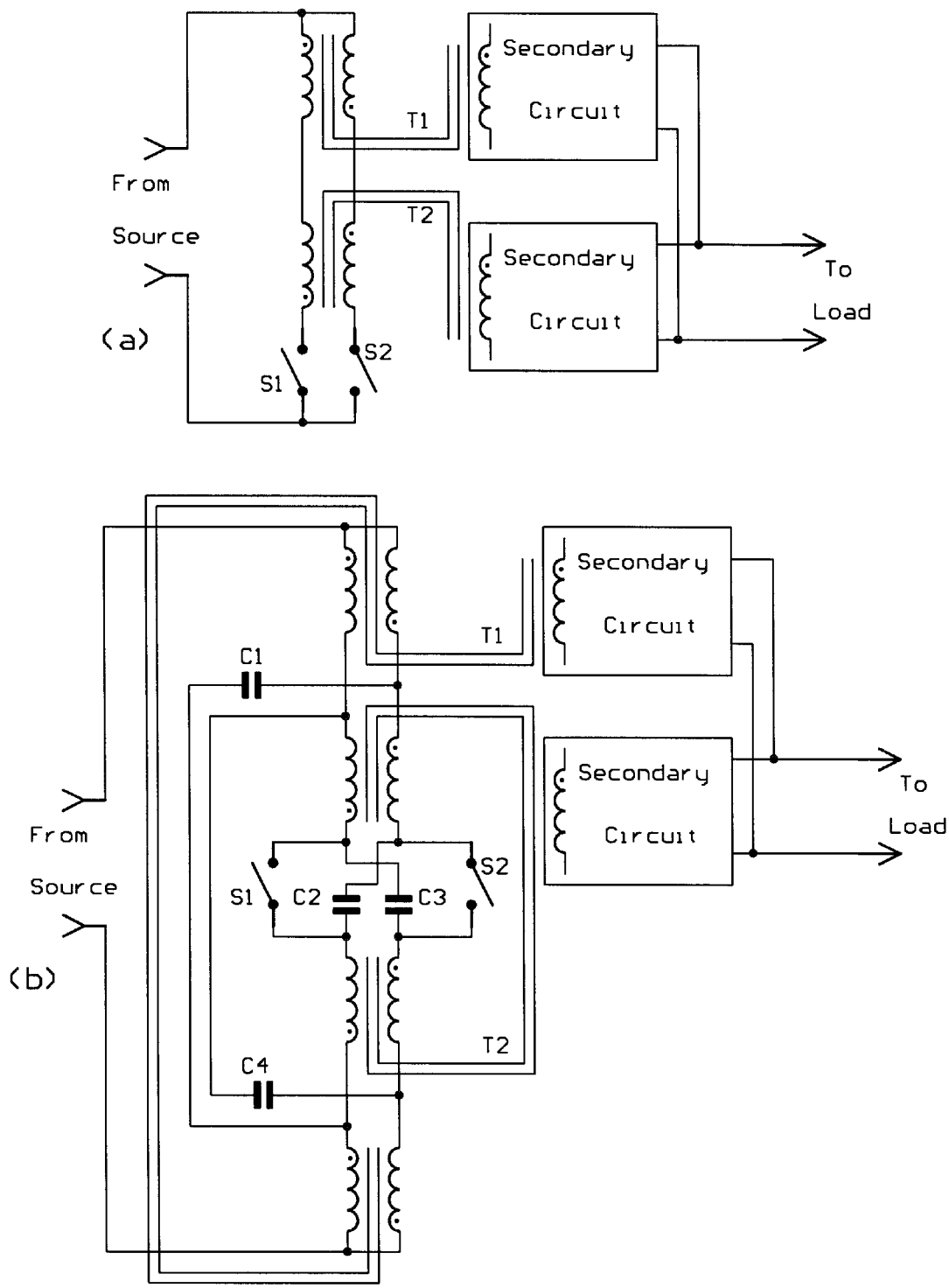

FIG. 47(a) illustrates a push pull interleaved coupled inductor buck type primary circuit.

FIG. 47(b) illustrates a push pull interleaved coupled inductor buck type primary circuit with ripple current cancellation achieved by applying the synthesis method illustrated in FIG. 5(i) to the FIG. 47(a) circuit.

SUMMARY

The subject invention describes universally applicable synthesis methods that enhance the EMC and AC performance of the circuits to which the synthesis methods are applied. The subject methods require the splitting and addition of windings and, in some cases, the addition of circuit capacitors. In all cases the placement of split windings does not require an additional magnetic core and, in many cases, an increase in magnetic circuit element size is not required. The circuit synthesis methods described provide an attractive alternative to input and output filters designed to reduce or eliminate electromagnetic interference (EMI) by reducing or eliminating EMI at its source.

DESCRIPTION OF THE INVENTION

First Synthesis Method Description

The subject invention describes a first circuit synthesis method applicable to a three terminal power conversion network, in which a winding network of magnetic circuit elements is in series with one of the terminals, is converted into an equivalent three terminal network with superior terminal current properties. For purposes of ease of understanding and clarity the first synthesis method will be described and illustrated for the case in which the winding network contains a single winding. It should be understood that a network of parallel and/or series windings can be substituted for the single winding of the illustrations, as will be illustrated in the examples that follow. The first synthesis method is described in the following steps.

A first synthesis method is described by reference to the figures. Consider an original three terminal network, as illustrated in FIG. 3(a), having an X terminal, a Y terminal, and a Z terminal, in which one of the three terminals, here the Z terminal, has connected in series with it, a winding, WZ, such that a current in the winding WZ is equal to the Z terminal current at all times.

A first step in the first synthesis method moves the winding, WZ, out of the original three terminal network, so that a reduced three terminal network is formed that does not contain the winding, WZ. The reduced network has the X terminal, the Y terminal and a Z' terminal and is illustrated in FIG. 3(b). In this step, the three terminal network defined by the terminals X, Y, and Z is equivalent and identical in operation to the original three terminal network.

A second step in the first synthesis method divides the winding, WZ, into a winding, WZ1, and a winding, WZ2, such that the two windings together, placed in series, as shown in FIG. 3(c), are electrically equivalent to the original winding, WZ. If the original winding WZ was coupled magnetically to other windings, then the new windings, WZ1 and WZ2, must also be magnetically coupled to these other windings and to each other, and the number of turns in the two new windings, WZ1 and WZ2, added together, must be equal to the number of turns in the original winding, WZ, in order to maintain the same turns ratios of the original network. If the original winding WZ is uncoupled, then the windings, WZ1 and WZ2, may or may not be mutually magnetically coupled, but, if they are magnetically coupled, then their relative polarity is specified by the polarity dots, as indicated in FIG. 3(c). The portion of the original winding WZ that is assigned to the winding WZ1 is greater than 0% and less than or equal to 100% of the original winding, WZ. The remaining portion of the original winding, WZ, if any, is assigned to the winding WZ2. The reader should keep in mind the possibility that the portion of the WZ winding assigned to the WZ2 winding may be zero per cent, which is equivalent to replacing the WZ2 winding with a conducting path or lead.

A third step of the first synthesis method, illustrated in FIG. 3(d), requires deleting the WZ1 winding and adding a similar winding, WX, at the X terminal and a similar winding, WY, at the Y terminal, and, if the terminals X and Y are not already capacitively coupled in the reduced three terminal network, adding a capacitor CXY. The addition of the windings, WX and WY, creates an improved network defined by a terminal X', a terminal Y', and the terminal Z, as illustrated in FIG. 3(d). The addition or deletion of windings at a network terminal does not change the DC operating characteristics of the three terminal networks because the average DC voltage across a magnetic winding in the steady state must be zero, assuming that the winding is ideal and has zero winding resistance. In fact, the windings will have, at least, a small amount of winding resistance so that the DC voltage across the winding in the steady state will be small or approximately zero for practical purposes, but not exactly equal to zero. The capacitor, CXY, may be necessary, if the terminals X and Y are not already capacitively coupled, because the improved network formed by the third step will, in most cases, have non-pulsating terminal currents at all three terminals, X', Y', and Z, but the original three terminal network may have had pulsating terminal currents at terminals X and Y. The capacitor, CXY, provides a mechanism to accommodate both non-pulsating terminal currents at terminals X' and Y' of the new network and pulsating terminal currents at terminals X and Y of the original network, so that the CXY capacitor current will, in general, be pulsating. The third step completes the synthesis of an improved three terminal network, defined by the terminals X', Y', and Z, equivalent in DC operating characteristics to the original three terminal network, defined by the terminals X, Y, and Z, but with equal or better terminal current properties. In many cases the new three terminal network will have all terminal currents non-pulsating. Generally, if the original three terminal network has non-pulsating Z terminal current, then the new network will have non-pulsating terminal current at all three terminals. It is possible that the winding WZ2 may contain zero per cent of the original winding, but the results are unchanged if this is the case, because, if the first synthesis method yields a three terminal network in which two terminal currents are non-pulsating, then the third terminal current must also be non-pulsating, regardless of whether or not the terminal current must pass through a winding connected in series with the terminal. This result is a consequence of charge conservation and guarantees that one terminal current will be the negative of the algebraic sum of the other two terminal currents. The results of the first synthesis process when the WZ2 winding contains 0% of the original winding is illustrated in FIG. 4(c).

One can think of the first synthesis method as pushing a winding into one terminal of a three terminal network. By pushing the winding into one terminal of the three terminal network two AC coupled windings are pushed out of the remaining two network terminals to form a network with equivalent DC operating characteristics and improved terminal current properties. The only restriction on networks to which the first synthesis method applies is that the voltage difference between the X and Y terminals must be substantially DC.

If the WZ winding is magnetically coupled to other windings in the original three terminal network, then all of the windings appearing in the FIGS. 3(a) through 3(d) and 4(c) must be magnetically coupled with relative polarities as indicated by the polarity dots included with each winding, the sum of the turns in the WZ1 and WZ2 windings must equal the number of turns in the WZ winding, and the number of turns in the WX and WY windings must be equal to each other and equal to the number of turns in the WZ1 winding, in order to maintain the same turns ratios as the original three terminal network and to ensure that the applied voltage to the CXY capacitor will be substantially DC. If the WZ winding is not magnetically coupled to any other windings in the original three terminal network, then the windings in the new circuits generated in the first synthesis method may or may not be mutually magnetically coupled, and, if the user wants the windings to be magnetically coupled, then they must be magnetically coupled according to the polarity dots, as indicated. The advantage of magnetically coupling the windings is that a reduced number of magnetic cores is required. In general, the improved three terminal network requires no more magnetic cores than the original three terminal network.

In addition to the achievement of improved terminal current properties with no change in the DC operating characteristics there will, in general, be an improvement in the AC operating characteristics. The first synthesis method will have, in general, a positive effect on the control-to-output transfer function. Circuits that have a boost or flyback transfer function typically have a right half plane zero in the control-to-output transfer function, which has a negative impact on the control bandwidth and the load transient response. Circuits that are synthesized from circuits with boost or flyback transfer functions, according to the first synthesis method, will have improved control bandwidth and load transient response. In general, the AC operating characteristics will be better with lesser rather than greater magnetic coupling and with a larger rather than a smaller coupling capacitor, CXY.

An optional fourth step is illustrated in FIG. 3(e). The fourth step adds three more windings and three more capacitors to form a network in which the winding ripple currents cancel at each network terminal to provide a net decrease in terminal ripple current. One winding is added at each of the terminals X', Y', and Z, such that the polarities of each of the three new windings are opposed to the polarities of the original windings connected at each terminal. Capacitors are added, as shown in FIG. 3(e), to provide each new winding with an AC voltage that yields a ripple current that opposes the ripple current of the original winding. The result is that at each network terminal a pair of windings with opposite polarities is connected. Since the windings have opposite polarities one of the windings will provide a positive ramping current slope at the network terminal at the same time that the other winding, connected at the same terminal, provides a negative ramping current slope. The combination of positive ramping and negative ramping current slopes provides a net current slope magnitude smaller than the current slope magnitude of either winding, or a zero current slope if the two current slope magnitudes are precisely matched. The windings may or may not be coupled together on a single common core. If they are coupled on a single common core then the polarity dots illustrated on each winding indicates the relative polarities of the windings. The ripple cancellation effect improves, in general, with lesser rather than greater magnetic coupling of the windings, with larger rather than smaller winding inductance, with larger rather than smaller capacitors, and with higher rather than lower switching frequency. The ripple cancellation effect achieved in FIG. 3(e) generally applies to any three terminal network which meets the criteria of having a winding in series with the Z terminal regardless of whether the original network had non-pulsating terminal currents at any of the three terminals.

Assume, for example, that the windings in FIG. 3(e) are all equal value inductors, that all three terminals are connected to DC operating points, and that the network is in a steady state operating condition. Consider an instant when the undotted terminals of the windings are positive in voltage with respect to the dotted terminals of the windings. The undotted terminal of the WZ2 winding, connected through the capacitor CXZ to the WX' winding, will force the undotted terminal of the WX' winding high (positive with respect to the X' terminal voltage). The current in the WX' winding will increase in the direction from undotted terminal to dotted terminal, since the voltage at the undotted terminal of the winding X' is positive with respect to the voltage at the dotted terminal of the X' winding. At the same time, the voltage at the dotted terminal of the WX winding will be low with respect to the voltage at the undotted terminal of the WX winding, so that the current in the WX winding will increase from undotted terminal to dotted terminal. At the X' terminal there will be increased current flowing towards the X' terminal from winding WX' and increased current flowing away from the X' terminal from winding WX so that the net increase of current flowing from the terminal X' is zero.

FIGS. 4(a) and 4(b) illustrate alternative arrangements to the FIG. 3(e) structure with similar results. The only difference in the networks of FIGS. 3(e), 4(a), and 4(b) is the applied voltage to the capacitor(s) connected in series with winding WZ2. The best of these three arrangements will be the arrangement that yields the smallest applied voltage(s) to the capacitor(s) connected in series with the WZ2 winding.

The results of application of the first synthesis method depends, in part, on the winding or winding network to which the synthesis method is applied. For example, if the original three terminal network comprises an inductor in series with a transformer winding, then the synthesis method might be applied to the inductor, to the transformer winding, or to the winding network comprising the series combination of the inductor and the transformer winding. The results achieved also depend on how the winding or winding network is partitioned into the parts, WZ1 and WZ2, that either remain in series with the Z terminal or are moved to the X and Y terminals, respectively. The circuit examples below will further illustrate these points.

Second Synthesis Method Description

The subject invention describes a second circuit synthesis method in which an original two terminal power conversion network, in which a winding network of magnetic circuit elements is connected in series with an electronic circuit network that contains at least one switching element, is converted into an equivalent two terminal power conversion network with superior terminal current and/or common mode current properties. For purposes of ease of understanding and clarity the second synthesis method will be described and illustrated for the case in which the winding network contains a single winding. It should be understood that a network of parallel and/or series windings can be substituted for the single winding of the illustrations.

A second synthesis method is described by reference to the figures. Consider an original two terminal network comprising at least a winding and a switch. as illustrated in FIG. 5(a). The original two terminal network has a terminal V and a terminal W. A winding WV is connected in series with the V terminal such that the V terminal current is identical to the WV winding current. An electronic circuit Network 1, connected between the winding WV and the terminal W, contains a switching element and may or may not contain additional circuit elements. A Network 2 may contain any positive integer number, plus zero, of circuit elements without restriction. If the number of circuit elements in the Network 2 is not zero then the Network 2 is magnetically coupled, but not electrically coupled by a conducting path included in FIG. 5(a), to the WV winding or to the electronic circuit Network 1.

A first step in the second synthesis method splits the WV winding into two windings, a winding WV2 connected at the V terminal and a winding WV1 connected at the position of the original WV winding, as illustrated in FIG. 5(b), wherein the sum of the two windings WV1 and WV2 is equivalent to the original single winding, WV. The partition of the winding WV into windings WV1 and WV2 must provide a portion greater than zero per cent of the original winding in the WV2 winding and a portion less than 100 percent of the original winding in the WV1 winding, so it is possible that all of the original winding may be contained in the WV2 winding and none of the original winding contained in the WV1 winding. If the original winding, WV, is magnetically coupled to any other circuit elements in FIG. 5(a) then the new windings, WV1 and WV2, must be magnetically coupled to each other and to any other windings to which the winding WV was coupled with relative polarity as indicated by the winding dots illustrated in the figures. The number of turns in the WV1 winding plus the number of turns in the WV2 winding must add to the number of turns in the WV winding, in order to maintain the same turns ratios of the original two terminal network. If the winding, WV, is not magnetically coupled to any other circuit elements in FIG. 5(a) then the windings, WV1 and WV2, may or may not be mutually magnetically coupled, but if the user decides to magnetically couple the windings, WV1 and WV2, then the windings must be magnetically coupled as shown by the winding polarity dots as illustrated in the figures. In the event that the original winding WV is already connected to the V terminal, which is often the case, then the WV winding becomes the WV2 winding, there is no WV1 winding, and no action is necessary in the first step of the second synthesis method other than renaming the WV winding as the WV2 winding.

A second step of the second synthesis method, as illustrated in FIG. 5(c), splits the winding WV2 into two equivalent windings, a WV3 winding and a WW winding, which together are electrically equivalent to the WV2 winding, with the winding WV3 placed at the V terminal and the winding WW placed outside of the W terminal, forming an improved two terminal network defined by the terminals V and W', as illustrated in FIG. 5(c). If the WV winding was magnetically coupled then the WV3 and WW windings must be magnetically coupled and the sum of the turns of the WV3 and WW windings must be equal to the number of turns of the WV2 winding from which they originated. In general, the best performance will be achieved when the WV3 and WW windings are identical. The improved two terminal power conversion network created by the second step will, in general, have equal or superior electromagnetic performance to the original two terminal network. In particular, parasitic currents that originate at the undotted terminal of winding WV3 and the dotted terminal of winding WW will be 180 degrees out of phase and will cancel. If the terminals V and W' are AC grounds and the Network 2 is not empty then in addition to the magnetic coupling between the windings WV1, WV3, WW, and the winding(s) of Network 2 there will also be parasitic capacitive coupling, generally known as interwinding capacitance which results in common mode currents. In the case of the network of FIG. 5(c) the common mode currents associated with interwinding capacitance of the WV3 and WW windings will be opposite in polarity and will cancel. This is due to the fact that the AC voltage at the undotted terminal of winding WV3 is out of phase from the AC voltage at the dotted terminal of the winding WW. With the winding arrangement of FIG. 5(c) there will be AC currents in the parasitic capacitances between windings. The AC voltage and parasitic capacitive currents will be greatest at the ends of each winding opposite the AC ground connections at terminals V and W', which are the dotted terminal of winding WW and the undotted terminal of winding WV3. There will be cancellation of these parasitic capacitance currents in the FIG. 5(c) arrangement since the AC voltages and associated parasitic capacitive currents at the dotted terminal of winding WW and the undotted terminal of winding WV3 will be 180 degrees out of phase. The cancellation of the parasitic capacitive currents will result in lower EMI, particularly lower common mode noise. If all of the original winding WV was partitioned into the WV2 winding such that the WV1 winding received 0% of the partition then that result is illustrated in FIG. 5(j). The FIG. 5(j) circuit, in addition to being simpler than the FIG. 5(c) circuit, has better parasitic capacitive current cancellation than the FIG. 5(c) circuit since there will be no parasitic capacitive current from the eliminated WV1 winding.

Optional additional steps of the second synthesis method are illustrated in FIGS. 5(d) through 5(k), which yield improvements in terminal current properties and reduced EMI. FIGS. 5(d) and 5(e) show the addition to the FIG. 5(c) network of a winding and a capacitor in series with the added winding at one of the terminals. The added winding and capacitor provide ripple current cancellation at the network terminal to which the added winding is connected during the part of the operational cycle in which both windings can conduct, since the ripple current in the added winding is 180 degrees out of phase with the winding previously connected at the same network terminal. FIG. 5(f) illustrates a network in which windings and capacitors are added at both network terminals with the result of terminal ripple current cancellation at both network terminals during the full operational cycle. FIG. 5(k) is similar to the FIG. 5(f) network but the WV1 winding is eliminated by receiving a portion of 0% of the original winding partition. If the WV3 and WW windings are magnetically coupled then the windings added in the FIGS. 5(d) through 5(f) and 5(k) must also be magnetically coupled to each other and to all of the windings shown in the figures with polarities as shown in the FIGS. 5(d) through 5(f) and 5(k). The number of turns of the WV3' winding must be equal to the number of turns of the WW winding and the number of turns of the WW' winding must be equal to the number of turns of the WV3 winding, in order to maintain the same turns ratios as in the original two terminal network and to apply a voltage with minimal AC component to the capacitors added in the FIGS. 5(d) through 5(f) and 5(k).

FIG. 5(g) illustrates a two terminal network consisting of two parallel two terminal networks, of the type described above and illustrated in FIG. 5(a), operated 180 degrees out of phase, and known as a push pull arrangement by those skilled in the art of power conversion. By application of the first two steps, as illustrated above in FIGS. 5(b) and 5(c), to each leg of the FIG. 5(g) network, a new network, as illustrated in FIG. 5(h), is realized. The FIG. 5(h) network achieves improved EMI performance by comparison to the FIG. 5(g) network for the reasons stated above for FIG. 5(c). Adding a pair of capacitors, as illustrated in FIG. 5(i) achieves terminal ripple current cancellation by providing a path for current flow in each winding over the full operational cycle. In the FIG. 5(h) circuit a winding in series with an open switch in the Network 1A will result in zero current slope in the windings in series with the Network 1A, while at the same time, if the switch in the Network 1B is closed, the ripple current slope in the windings in series with the Network 1B will be non-zero, so that no ripple cancellation can take place. In particular, in the FIG. 5(i) circuit, the ripple current contribution from the WWA winding will be 180 degrees out of phase from the ripple current contribution from the WWB winding at the W' network terminal. Likewise the ripple current contribution from the WV3A winding will be 180 degrees out of phase from the ripple current contribution of the WV3B winding at the V network terminal.

Figure 6:
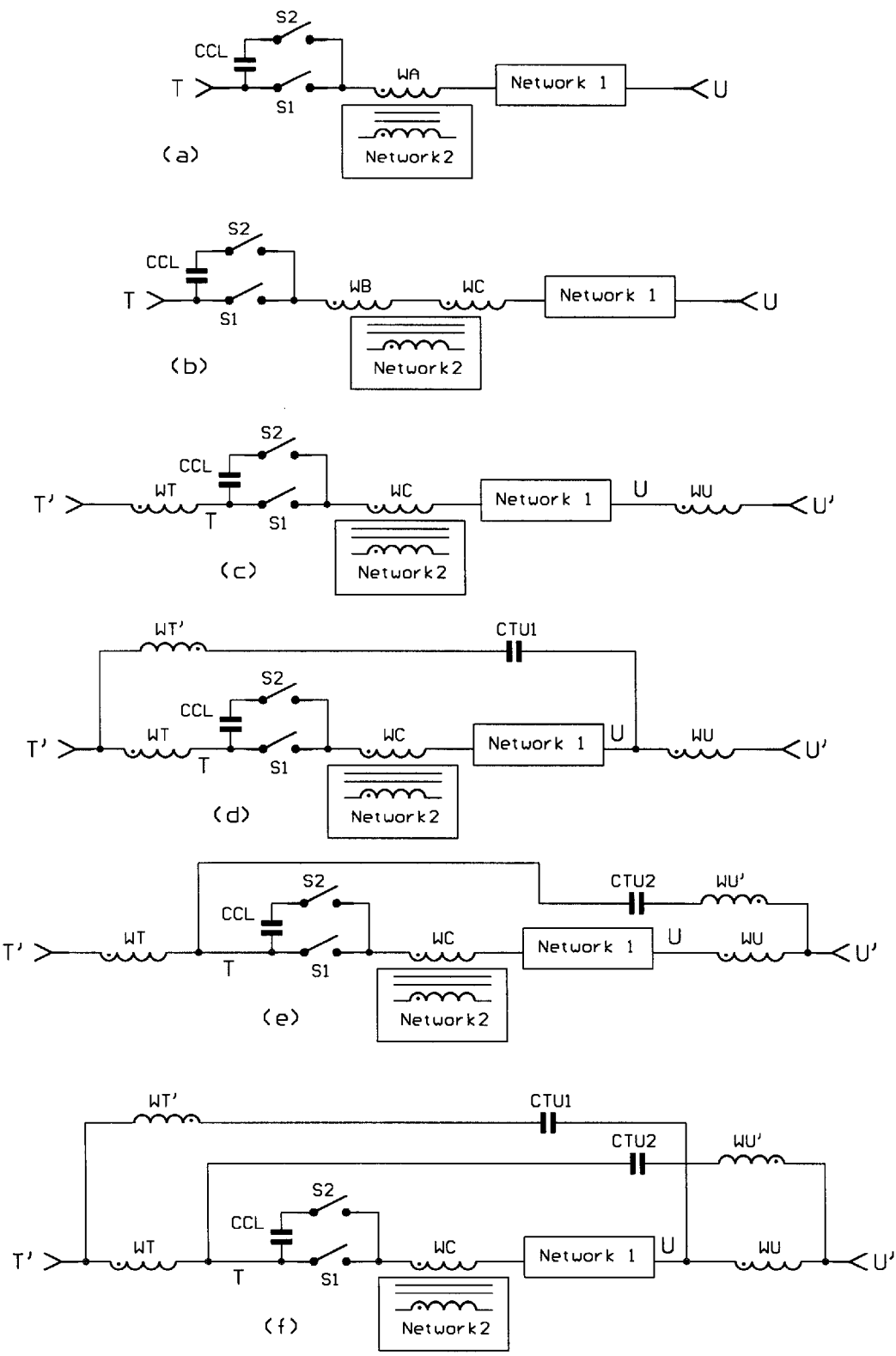
FIG. 6(a) illustrates a two terminal power conversion network, of the type illustrated by the FIG. 5(a) network, with a main switch and an active reset switch combination.
FIG. 6(b) illustrates a two terminal active reset network equivalent to the FIG. 6(a) network with the WA winding split into two windings.
FIG. 6(c) illustrates a balanced two terminal active reset network similar to the FIG. 6(b) network, but with the WB winding split into two windings which are moved to the network terminals.
FIG. 6(d) illustrates the two terminal network of FIG. 6(c) with the addition of a winding and capacitor which provides mutual ripple current cancellation at the T' terminal.
FIG. 6(e) illustrates the two terminal network of FIG. 6(c) with the addition of a winding and capacitor which provides mutual ripple current cancellation at the U' terminal.
FIG. 6(f) illustrates the two terminal network of FIG. 6(c) with the addition of two windings and two capacitors which provides mutual ripple current cancellation at both the U' terminal and the T' terminal.

FIG. 6(a) illustrates an active clamp arrangement of a two terminal network which is a more specific example of a network to which the second synthesis method applies. In the case of the FIG. 6(a) network the electronic circuit Network 1 may contain circuit elements or may comprise only a conducting path or lead. The FIGS. 6(b) through 6(f) illustrate the application of the second synthesis method to the active clamp network.

Figure 7:
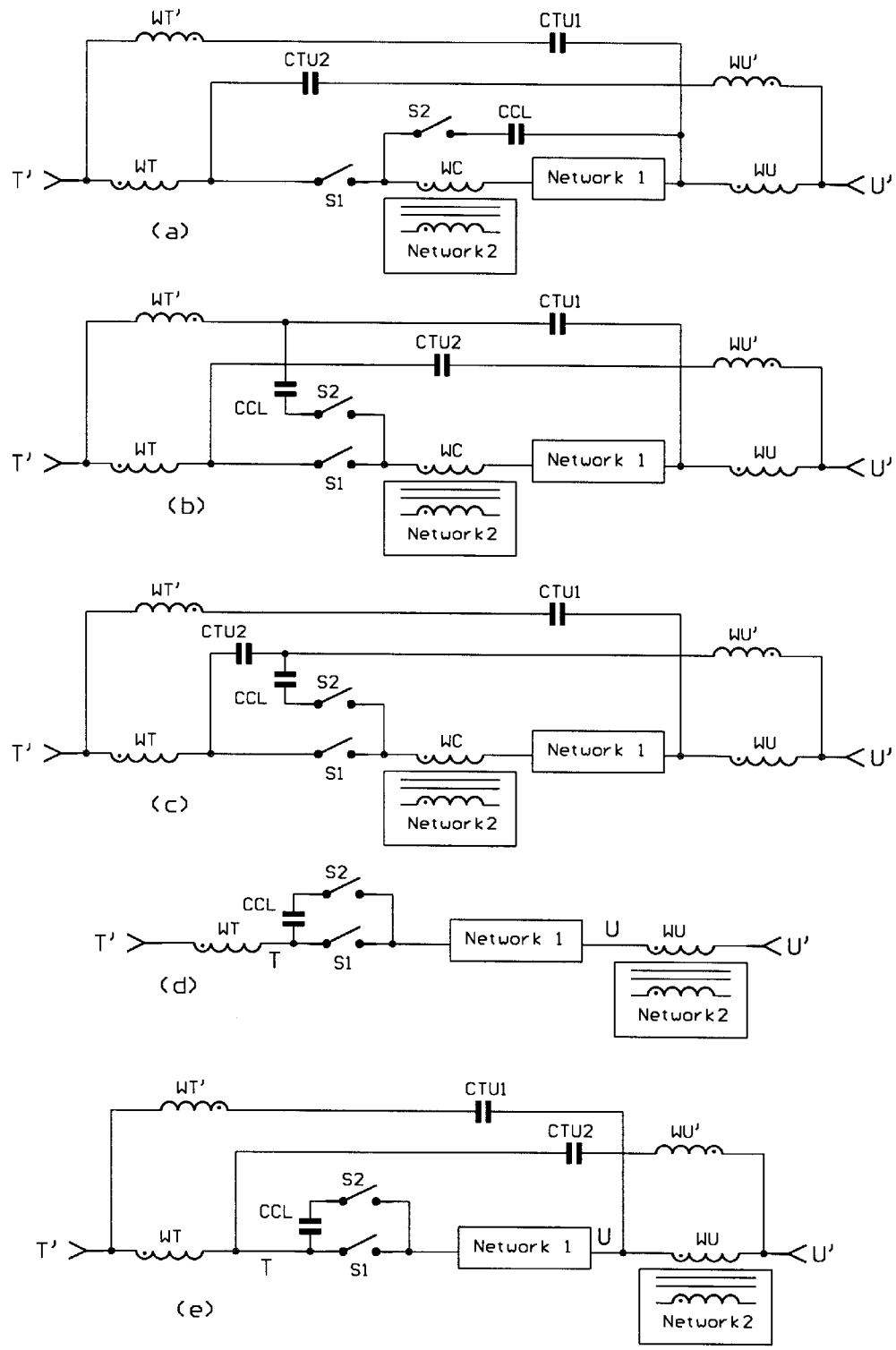
FIG. 7(a) illustrates a two terminal power conversion network similar to the FIG. 6(f) network but with an alternate connection of the reset capacitor.
FIG. 7(b) illustrates a two terminal power conversion network similar to the FIG. 6(f) and FIG. 7(a) networks but with an alternate connection of the reset capacitor.
FIG. 7(c) illustrates a two terminal power conversion network similar to the FIG. 6(f), FIG. 7(a), and FIG. 7(b) networks but with an alternate connection of the reset capacitor.
FIG. 7(d) illustrates the FIG. 6(c) network with the WC winding reduced to the point of elimination.
FIG. 7(e) illustrates the FIG. 6(f) network with the WC winding reduced to the point of elimination.

FIGS. 7(a) through 7(c) illustrate the active clamp network with alternate clamp capacitor connections, compared to the FIG. 6(f) network. The different clamp capacitor connections yield different clamp capacitor voltages and different terminal ripple currents. FIG. 7(d) illustrates an active clamp network with the WC winding partition reduced to 0%, as first illustrated in FIG. 5(j). FIG. 7(e) illustrates an active clamp network with the WC winding partition reduced to 0% with ripple current cancellation, as first illustrated by the FIG. 5(k) network.

The results of application of the second synthesis method depends, in part, on the winding or winding network to which the synthesis method is applied. For example, if the original two terminal network comprises an inductor in series with a transformer winding then the synthesis method might be applied to the inductor, to the transformer winding, or to the winding network comprising the series combination of the inductor and the transformer winding. The results achieved also depend on how the winding or winding network WV is partitioned into the parts, WV1 and WV2, that either remain at the original winding position or are moved to the V terminal, respectively. The circuit examples below will further illustrate these points.

Third Synthesis Method Description

The subject invention describes a circuit synthesis method in which an original two terminal half bridge power conversion network, in which a winding network is connected in the center leg of the half bridge, is converted into an improved two terminal half bridge power conversion network. In general, the improved two terminal half bridge power conversion network will have superior electromagnetic performance characteristics. For purposes of ease of understanding and clarity the third synthesis method will be described and illustrated for the case in which the winding network contains a single winding. It should be understood that a network of parallel and/or series windings can be substituted for the single winding of the illustrations.

A third synthesis method is described by reference to the figures. In an original network, illustrated in FIG. 8(a), there is an IN+ terminal and an IN− terminal. There are three legs to a half bridge circuit, a switch leg, located on the left in FIG. 8(a), a capacitor leg, comprising at least a capacitor connected to one or the other of the network terminals, illustrated on the right side of FIG. 8(a), and a center leg containing at least a winding network WC. The switch leg comprises two switches, a switch SAU connected to the IN+ terminal, a switch SAL connected to the IN− terminal, and a node A connecting the two switches to each other. The center leg is connected between the switch leg and the capacitor leg but does not connect to the network terminals in the original half bridge network. The center leg is terminated at the node A on the left and at a node B on the right. The node A connects the two switches. The node B connects to the capacitor terminal opposite to the capacitor terminal that connects to a half bridge network terminal. In addition to the winding WC, the center leg may also contain other electronic circuit elements, which would be contained in a Network 1 of FIG. 8(a). A second electronic circuit network, Network 2, may be coupled magnetically to the winding WC or may be magnetically coupled to windings contained in the Network 1. If there are no components in the Network 1, then the Network 1 shall be replaced by a conducting path or lead in the figures. It should be understood that the third synthesis method applies to networks that can be arranged as described if the subject network does not precisely match the description of the original network provided above. For example, consider the case in which the subject network comprises the switch leg but the remainder of the subject network does not precisely match the above description. If the center leg of the subject network contains a series capacitor and the center leg of the subject network is connected to a network terminal then the network can be rearranged so that the capacitor in the center leg connects to a network terminal and the remaining components of the center leg form a new center leg in an equivalent reconfigured network that precisely matches the description of the original half bridge network provided above.

A first step in the third synthesis method, illustrated in FIG. 8(b), splits the center leg winding, WC, into two center leg windings, a WZA winding and WZB winding, which, together, are equivalent to the original single winding. One of the two windings, WZA, is connected to the switch leg at node A and the other winding, WZB, is connected to the capacitor leg at node B, as illustrated in FIG. 8(b). The circuit created contains two three terminal networks of the type to which the first synthesis method is applicable. One three terminal network comprises the two switches and the left winding, WZA. The other three terminal network comprises the right winding, WZB, and two capacitors in the capacitor leg of the half bridge. If the capacitor leg of the original half bridge did not contain two capacitors connected in series between the two network terminals, then the first step also requires the addition of a second capacitor, such that the capacitor leg comprises the node B and two capacitors in series connecting the two network terminals and the center leg, as illustrated in the FIG. 8(b). If the original winding WC was magnetically coupled to another winding in the original half bridge network, then the windings, WZA and WZB, must also be magnetically coupled to those other windings in the original half bridge network and they must also be magnetically coupled to each other. Also, if there is WC winding magnetic coupling, then the number of turns of the winding WZA plus the number of turns of the winding WZB must add to the number of turns in the WC winding in order to maintain the turns ratios of the original network, and the relative polarities of the WZA and WZB windings must be as indicated in FIG. 8(b) by the polarity dots.

A second step of the third synthesis method requires the application of the first three steps, illustrated in FIGS. 3(a) through 3(d), of the first synthesis method to each three terminal network embedded in the half bridge network, as described above for FIG. 8(b). The result is an improved two terminal half bridge network, as illustrated in FIG. 8(c). The improved half bridge network achieves the result of terminal ripple current cancellation. The ripple current in the WXA winding is 180 degrees out of phase from the ripple current in the WXB winding. Also, the ripple current in the WYA winding is 180 degrees out of phase from the ripple current in the WYB winding so that the ripple currents at each of the two half bridge network terminals of the improved half bridge network is less in magnitude than the ripple current of any winding connected to the terminals. If all of the windings in the improved half bridge network are magnetically coupled and if the number of turns in the windings WXA, WYA, WXB, and WYB are all equal then the ripple current magnitude in each of these four windings will also be equal and there will be a symmetry that will yield zero net ripple terminal current to a first order approximation at both half bridge network terminals of the improved half bridge network.

An optional step of the third synthesis method combines the two center leg windings of the improved half bridge network, if any, into a single winding, as illustrated in FIG. 8(d). The first synthesis method, as illustrated in FIG. 4(c), allows for moving the entire Z terminal winding to the X and Y terminals so that there may be no windings to combine in the center leg, as illustrated in FIG. 8(e). In addition to a simpler half bridge network the FIG. 8(e) network provides a performance advantage, particularly for the case in which the original WC winding is magnetically coupled to another winding. The advantage is that the common mode currents flowing through the parasitic capacitances cancel achieving lower net common mode current in the FIG. 8(e) network than in the other arrangements illustrated, although all of the networks illustrated, except the original half bridge network and the network illustrated in FIG. 8(b), provide some common mode current cancellation.

The results of application of the third synthesis method depends, in part, on the winding or winding network to which the synthesis method is applied. For example, if the original half bridge network comprises an inductor in series with a transformer winding in the center leg of the half bridge, then the synthesis method might be applied to the inductor, to the transformer winding, or to the winding network comprising the series combination of the inductor and the transformer winding. The results achieved also depend on how the windings or winding networks WZA and WZB are partitioned into the parts that either remain at the original winding positions or are moved to the network terminals. The circuit examples below will further illustrate these points.

Fourth Synthesis Method Description

The subject invention describes a fourth circuit synthesis method in which an original two terminal full bridge power conversion network, in which a winding network is connected in the center leg of the full bridge, is converted into an improved two terminal full bridge power conversion network. In general, the improved two terminal full bridge power conversion network will have superior electromagnetic performance characteristics. For purposes of ease of understanding and clarity the fourth synthesis method will be described and illustrated for the case in which the winding network contains a single winding. It should be understood that a network of parallel and/or series windings can be substituted for the single winding of the illustrations.

The fourth synthesis method is described by reference to the figures. In an original network, illustrated in FIG. 9(a), there are two network terminals, an IN+ terminal and an IN− terminal. There are three legs to a full bridge circuit, a first switch leg, located on the left side of FIG. 9(a), a second switch leg, located on the right side of FIG. 9(a), and a center leg containing at least a winding WC. The left switch leg comprises a node A and two switches, a switch SAU connected to the IN+ terminal, a switch SAL connected to the IN− terminal, with switches SAU and SAL connected to each other at the node A. The right switch leg comprises two switches, a switch SBU connected to the IN+ terminal, a switch SBL connected to the IN− terminal, with switches SBL and SBU connected to each other at the node B. The center leg is connected between the first switch leg at the node A and the second switch leg at the node B, but does not connect to the network terminals in the original full bridge network. In addition to a winding WC the center leg may also contain other electronic circuit elements, which would be contained in a Network 1 of FIG. 9(a). A second electronic circuit network, Network 2, may be coupled magnetically to the center leg winding or may be magnetically coupled to a winding or windings contained in Network 1. If there are no components in the Network 1, then the Network 1 shall be replaced by a conducting path or lead in the figures.

A first step in the fourth synthesis method, illustrated in FIG. 9(b), splits the center leg winding WC into two center leg windings, a winding WZA and a winding WZB, which together are equivalent to the original winding WC. One of the two windings, WZA, is connected to the first switch leg at node A and the other winding, WZB, is connected to the second switch leg at node B, as illustrated in FIG. 9(b). The new network created by the first step contains two three terminal networks of the type to which the first synthesis method is applicable. One three terminal network comprises the two switches in the left leg and the winding, WZA, connected to the node A. The other three terminal network comprises the winding, WZB, connected to the node B and the two switches in the right leg of the full bridge. If the original winding WC was magnetically coupled to another winding in the original full bridge network, then the windings WZA and WZB must also be magnetically coupled to those other windings in the original full bridge network and they must also be magnetically coupled to each other. Also, if there is WC winding magnetic coupling, then the number of turns of the winding WZA plus the number of turns of the winding WZB must add to the number of turns in the WC winding, in order to maintain the turns ratios of the original network, and the relative polarities of the WZA and WZB windings must be as indicated by the polarity dots in the FIG. 9(b).

A second step of the fourth synthesis method requires the application of the first three steps, illustrated in FIGS. 3(a) through 3(d), of the first synthesis method to each three terminal network embedded in the new full bridge network, as described above for FIG. 9(b). The result is an improved full bridge network, as illustrated in FIG. 9(c). The improved full bridge network achieves the result of terminal ripple current cancellation. The ripple current in the WXA winding is 180 degrees out of phase from the ripple current in the WXB winding. Also, the ripple current in the WYA winding is 180 degrees out of phase from the ripple current in the WYB winding, so that the ripple currents at each of the two full bridge network terminals is less in magnitude than the ripple current of any winding connected to the terminals. If all of the windings in the improved network are magnetically coupled, and if the number of turns in the windings WXA, WYA, WXB, and WYB are all equal, then the ripple current magnitude in each of these four windings will also be equal, and there will be ripple current slope cancellation that will yield zero net ripple terminal current, to a first order approximation, at both full bridge network terminals of the improved network.

An optional step of the fourth synthesis method combines the two center leg windings, if any, into a single winding, as illustrated in FIG. 9(d). The first synthesis method allows for moving the entire Z terminal winding to the X and Y terminals so that there may be no windings to combine in the center leg, as illustrated in FIG. 9(f).

Another optional step, illustrated in FIG. 9(e) adds two windings and two capacitors to the FIG. 9(c) network and provides a mechanism for ripple current cancellation in the Network 1. The dotted terminal of the winding WZA2' is connected to the left terminal of Network 1 (labeled ZA in FIG. 9(e)) with the undotted terminal of winding WZA2. When the switch SAU is turned on the dotted terminal of winding WZA2 will be pulled high (positive). At the same time the undotted terminals of winding WXA, winding WYA, and WZA2' are pulled low, so that in all of these windings the dotted terminals will be positive with respect to the undotted terminals, so that current will increase in the direction of dotted terminal to undotted terminal in each winding. At the left terminal of Network 1 current will be increasing from left to right in the winding WZA2 and increasing from right to left in the winding WZA2', so that the net increase in current at the left terminal of Network 1 will be zero to a first order approximation. The winding current slopes will be reversed when the switch SAL is on and the current ramps will cancel at the left terminal of Network 1.

Another optional step illustrated in FIG. 9(g) applies only to the case in which the Network 1 is empty, or comprises only a lead or conducting path. The FIG. 9(g) network eliminates two of the four switches, simplifying the network and switch drive requirements. The switches can be eliminated only for applications in which the switch SAU is synchronized with the switch SBL and the switch SAL is synchronized with the switch SBU. The FIG. 9(g) network is identical to the FIG. 5(i) network. This suggests that by applying the fourth synthesis method to a full bridge network to obtain the results in FIG. 9(g) and then applying the second synthesis method in reverse, starting from FIG. 5(i) and progressing to FIG. 5(g), one can synthesize a standard push pull network from a standard full bridge network. The synthesis methods, as just described, can be applied in reverse to form a standard full bridge network from a standard push pull network. These results are mostly of academic interest, since the networks in the intermediate steps, achieved by application of the synthesis methods revealed in this application, yield performance results not achievable by either the standard full bridge networks or the standard push pull networks.

The results of application of the fourth synthesis method depends, in part, on the winding or winding network to which the synthesis method is applied. For example, if the original full bridge network comprises an inductor in series with a transformer winding in the center leg of the full bridge, then the synthesis method might be applied to the inductor, to the transformer winding, or to the winding network comprising the series combination of the inductor and the transformer winding. The results achieved also depend on how the windings or winding networks WZA and WZB are partitioned into the parts that either remain at the original winding positions or are moved to the network terminals. The circuit examples below will further illustrate these points.

Fifth Synthesis Method Description

The subject invention describes a fifth circuit synthesis method in which an original two terminal stacked full bridge power conversion network, in which a winding network is connected in the center leg of the full bridge, is converted into an improved two terminal stacked full bridge power conversion network. In general, the improved two terminal stacked full bridge power conversion network will have superior electromagnetic performance characteristics. For purposes of ease of understanding and clarity the fifth synthesis method will be described and illustrated for the case in which the winding network contains a single winding. It should be understood that a network of parallel and/or series windings can be substituted for the single winding of the illustrations.

The fifth synthesis method is described by reference to the figures. In an original network, illustrated in FIG. 10(a), there are two network terminals, an IN+ terminal and an IN− terminal. There are three legs to a stacked full bridge circuit, a first switch leg, located on the left in FIG. 10(a), a second switch leg, located on the right side of FIG. 10(a), and a center leg containing at least a winding network WC and a capacitor CAB. The left switch leg comprises a node A, a capacitor CA, a switch SAU connected to the IN+ terminal, and a switch SAL connected to the right switch leg, with switches SAU and SAL connected to each other at the node A. The capacitor CA of the left switch leg connects to the switch SAU and to the switch SAL, but does not connect to the node A. The right switch leg comprises a node B, a capacitor CB, a switch SBL connected to the IN− terminal, and a switch SBU connected to the left switch leg, with both switches connected to each other at the node B. The capacitor CB of the right switch leg connects to the switch SBU and to the switch SBL, but it does not connect to the node B. The center leg is connected between the first switch leg at the node A and the second switch leg at the node B but does not connect to the network terminals in the original stacked full bridge network. In addition to the winding WC and the capacitor CAB the center leg may also contain other electronic circuit elements, which would be contained in a Network 1 of FIG. 9(a). A second electronic circuit network, Network 2, may be coupled magnetically to the center leg winding or may be magnetically coupled to a winding or windings contained in the Network 1. If there are no components in the Network 1, then the Network 1 shall be replaced by a conducting path or lead in the figures.

A first step in the fifth synthesis method, illustrated in FIG. 10(b), splits the center leg winding into two center leg windings, a winding WZA and a winding WZB, which, together, are equivalent to the original winding, WC. One of the two windings, WZA, is connected to the first switch leg at node A and the other winding, WZB, is connected to the second switch leg at node B, as illustrated in FIG. 10(b). The new network created by the first step contains two three terminal networks of the type to which the first synthesis method is applicable. One three terminal network comprises the left switch leg and the winding, WZA, connected to the node A. The other three terminal network comprises the winding, WZB, connected to the node B and the right switch leg of the stacked full bridge network. If the original winding, WC, was magnetically coupled to another winding in the original stacked full bridge network, then the windings WZA and WZB must also be magnetically coupled to those other windings in the original stacked full bridge network and they must also be magnetically coupled to each other. Also, if there is WC winding magnetic coupling, then the number of turns of the winding, WZA, plus the number of turns of the winding, WZB, must add to the number of turns in the WC winding, in order to maintain the turns ratios of the original network, and the relative polarities of the WZA and WZB windings must be as indicated by the polarity dots in the FIG. 10(b).

A second step of the fifth synthesis method requires the application of the first three steps, illustrated in FIGS. 3(a) through 3(d), of the first synthesis method to each three terminal network embedded in the stacked full bridge network, as described above for FIG. 10(b). The result is an improved stacked full bridge network, as illustrated in FIG. 10(c). Each terminal of the improved network contains a series winding which will have some uncoupled inductance which will improve the terminal current ripple properties.

An optional step of the fifth synthesis method combines the two center leg windings, if any, into a single winding, as illustrated in FIG. 10(d). The first synthesis method allows for moving the entire Z terminal winding to the X and Y terminals, so that there may be no windings to combine in the center leg, as illustrated in FIG. 10(f). FIG. 10(f) also illustrates the combination of the series connected windings, WYA and WXB, into a single equivalent winding, WXYAB.

Another optional step, illustrated in FIG. 10(e) adds two windings and two capacitors to the FIG. 10(c) network and provides a mechanism for ripple current cancellation at the IN+ and IN− terminals. The dotted terminal of the winding WXA is connected to the IN+ terminal with the undotted terminal of winding WXA'. When the switch SAU is turned on the undotted terminal of winding WXA will be pulled low (negative). At the same time the dotted terminal of winding WXA' is pulled high (positive), so that in these windings the dotted terminals will be positive with respect to the undotted terminals, so that current will increase in the direction of dotted terminal to undotted terminal in each winding. At the IN+ terminal current will be increasing from top to bottom in the winding WXA and increasing from bottom to top in the winding WXA', so that the net increase in current at the IN+ terminal will be zero to a first order approximation. The winding current slopes will be reversed when the switch SAL is on and the current ramps will cancel at the IN+ terminal.

The results of application of the fifth synthesis method depends, in part, on the winding or winding network to which the synthesis method is applied. For example, if the original stacked full bridge network comprises an inductor in series with a transformer winding in the center leg of the stacked full bridge, then the synthesis method might be applied to the inductor, to the transformer winding, or to the winding network comprising the series combination of the inductor and the transformer winding. The results achieved also depend on how the windings or winding networks WZA and WZB are partitioned into the parts that either remain at the original winding positions or are moved to the network terminals. The circuit examples below will further illustrate these points.

New Converter Circuit Topologies Based on the New Synthesis Methods

Figure 1:
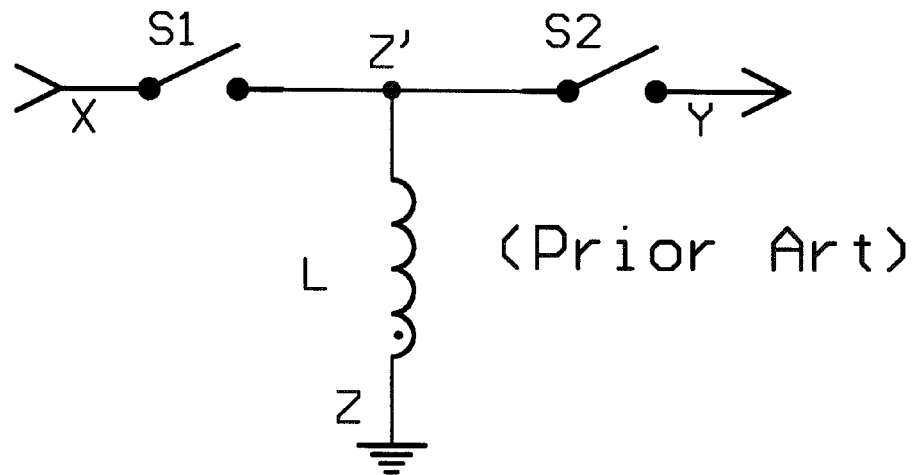
FIG. 1 illustrates a non-isolated flyback converter with the properties of pulsating input and output terminal currents.
Figure 2:
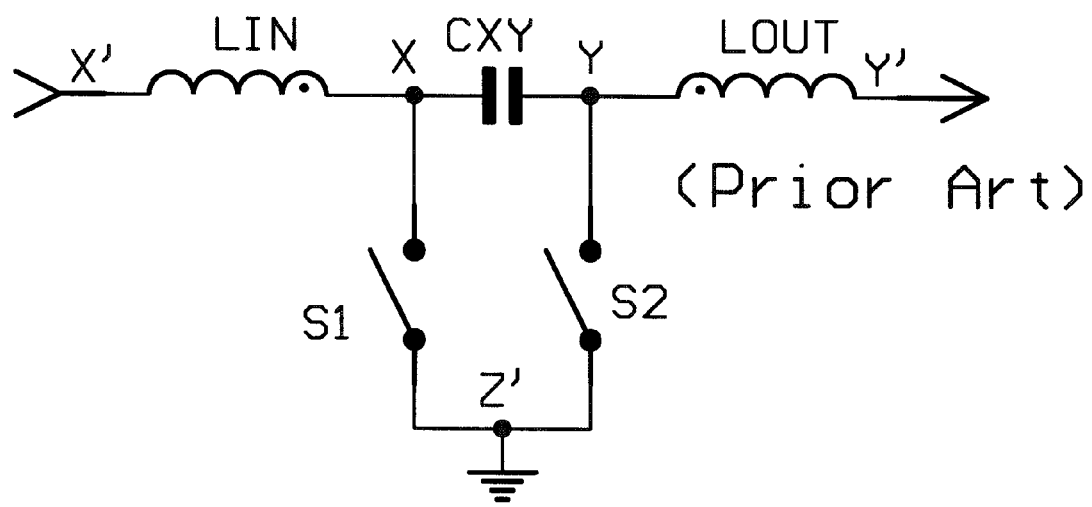
FIG. 2 illustrates a Cuk converter, or two inductor flyback converter, which has the property of non-pulsating input and output terminal currents and improved AC performance characteristics.

It can be seen by observing FIGS. 1 and 2 that the FIG. 2 circuit is an application of the first synthesis method to the FIG. 1 circuit. The network defined by the X, Y, and Z terminals of a three terminal network embedded in FIG. 1 meets the criteria for the application of the first synthesis method. The FIG. 2 circuit represents the application of the steps illustrated in FIGS. 3(a), 3(b) and 4(c) to the FIG. 1 circuit. In addition to achieving non-pulsating terminal ripple currents at all three terminals, the FIG. 2 circuit achieves improved AC performance, by comparison to the FIG. 1 circuit. Suppose that the left terminals of FIGS. 1 and 2 are connected to a source and the right terminals are connected to a load. In the FIG. 1 circuit the response to a large positive load current transient is to increase the duty cycle to 100% which keeps the S1 switch on and the S2 switch off, with the result that the output (load) voltage drops because no energy can be delivered to the load with the S2 switch off. The response of the FIG. 1 circuit to a load transient is typical of circuits with a right half plane zero in the control-to-output transfer function. In the FIG. 2 circuit the response of the switches to the load transient is the same as the FIG. 1 circuit, but the output current and voltage will rise as the capacitor C discharges into LOUT and into the load, which causes the LOUT current to increase and helps the output voltage to recover quickly from the load transient while the switch states remain unchanged. In the FIG. 2 circuit energy is delivered to the load when the S2 switch is off and achieves much better load transient performance than can be achieved by the FIG. 1 circuit.

Figure 11:
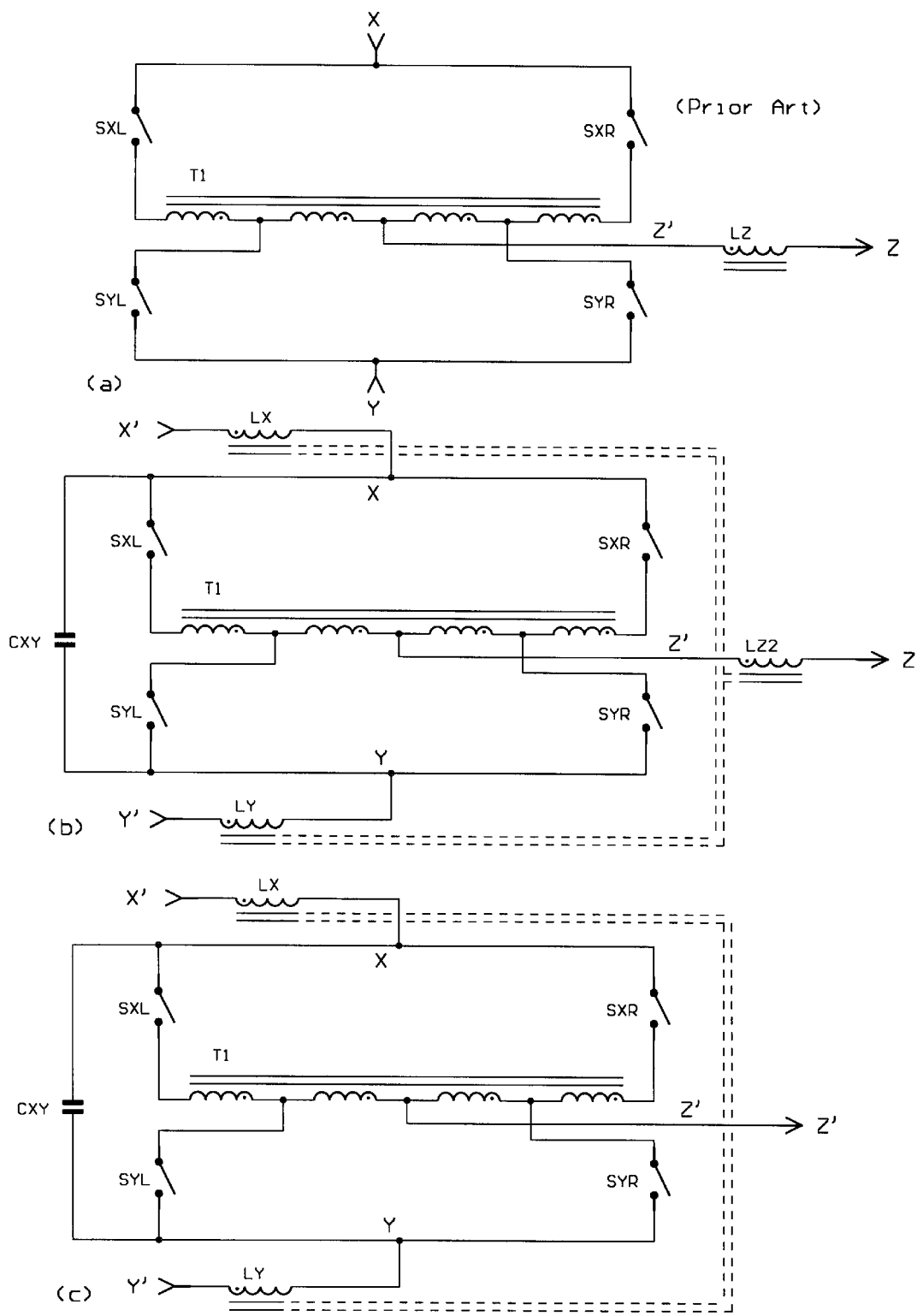
FIG. 11(a) illustrates a three terminal power conversion network with a choke in series with the Z terminal winding and pulsating terminal currents at the X and Y terminals.
FIG. 11(b) illustrates a new equivalent three terminal power conversion network formed by application of the synthesis method illustrated by FIGS. 3(a) through 3(d) with the property of non-pulsating terminal currents at all three network terminals.
FIG. 11(c) illustrates a new equivalent three terminal power conversion network formed by applying the synthesis method illustrated by FIGS. 3(a), 3(b), and 4(c) to the FIG. 11(a) network.
FIG. 11(d) illustrates the FIG. 11(b) network with windings and capacitors added in the synthesis method of FIG. 3(e) to provide a new equivalent three terminal power conversion network with mutual ripple current cancellation at all three terminals.
FIG. 11(e) illustrates a buck form of the FIG. 11(c) and FIG. 11(d) networks.
FIG. 11(f) illustrates a boost form of the FIG. 11(c) and FIG. 11(d) networks.
FIG. 11(g) illustrates a flyback form of the FIG. 11(c) and FIG. 11(d) networks.
Figure 11:
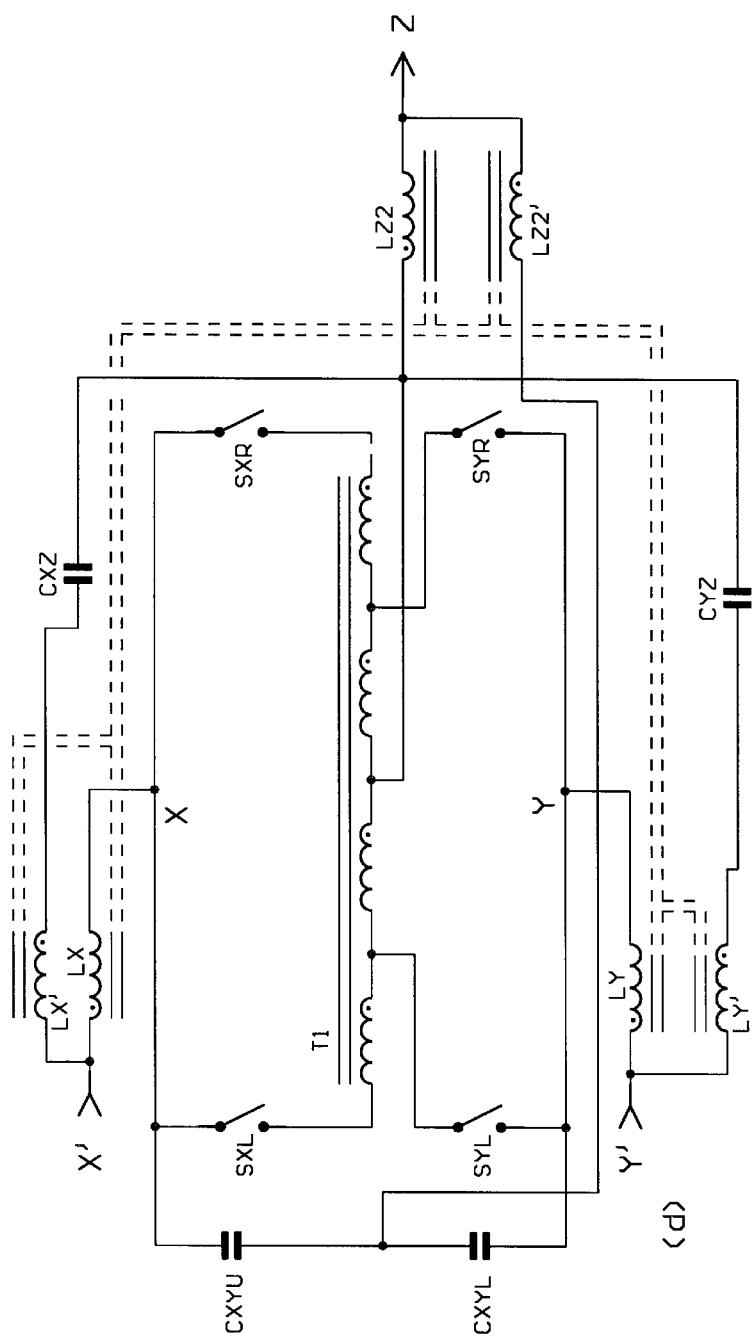
Figure 11:
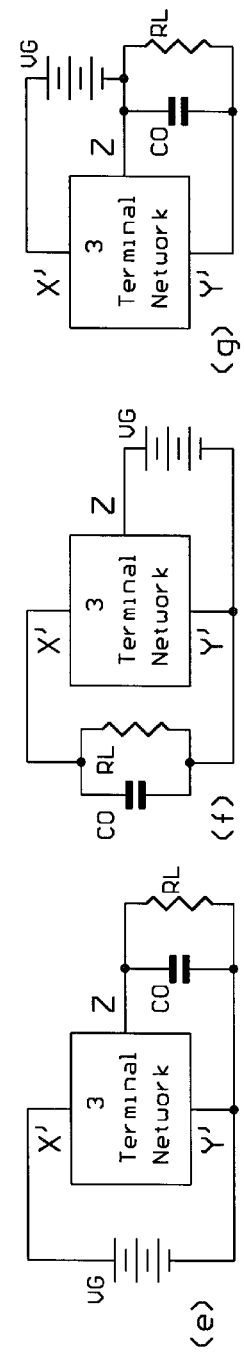

FIG. 11($a$) illustrates an autotransformer coupled buck converter which is useful for high step down ratios. The upper switches, SXL and SXR, are duty cycle modulated and operated 180 degrees out of phase from each other. The lower switch on the left, SYL, is operated in anti-synchronization to the upper switch on the left SXL and the lower switch on the right, SYR, is operated in anti-synchronization to the upper switch on the right, SXR. There is no limit on switch duty cycle. The output terminal current is non-pulsating, but the input terminal current is pulsating. FIG. 11($b$) shows the resulting circuit with the first three steps of the first synthesis method applied to create an equivalent converter in which all terminal currents are non-pulsating. FIG. 11($c$) illustrates the application of the first synthesis method for the case in which none of the original Z terminal winding remains in the Z terminal, as first illustrated in the FIG. 4($c$). The FIG. 11($d$) circuit is the circuit with the optional fourth step of the first synthesis method applied to the FIG. 11($b$) circuit to create an equivalent converter with ripple current cancellation at all three terminals. All of the inductor windings may be coupled on a single common magnetic core, although this coupling is not a requirement. The autotransformer remains unchanged by the synthesis method. The synthesis method requires adding inductor windings and capacitors, but does not require additional magnetic cores. The lowest terminal ripple current results when the inductor windings are uncoupled, but this requires multiple magnetic cores to accomplish. FIG. 11($e$) illustrates how the networks of FIGS. 11($b$) through 11($d$) can be used to form a buck (non-inverting step down) type converter. FIG. 11($f$) illustrates how the networks of FIGS. 11($b$) through 11($d$) can be used to form a boost (non-inverting step up) type converter. FIG. 11($g$) illustrates how the networks of FIGS. 11($b$) through 11($d$) can be used to form a flyback (inverting step up/down) type converter.

Figure 12:
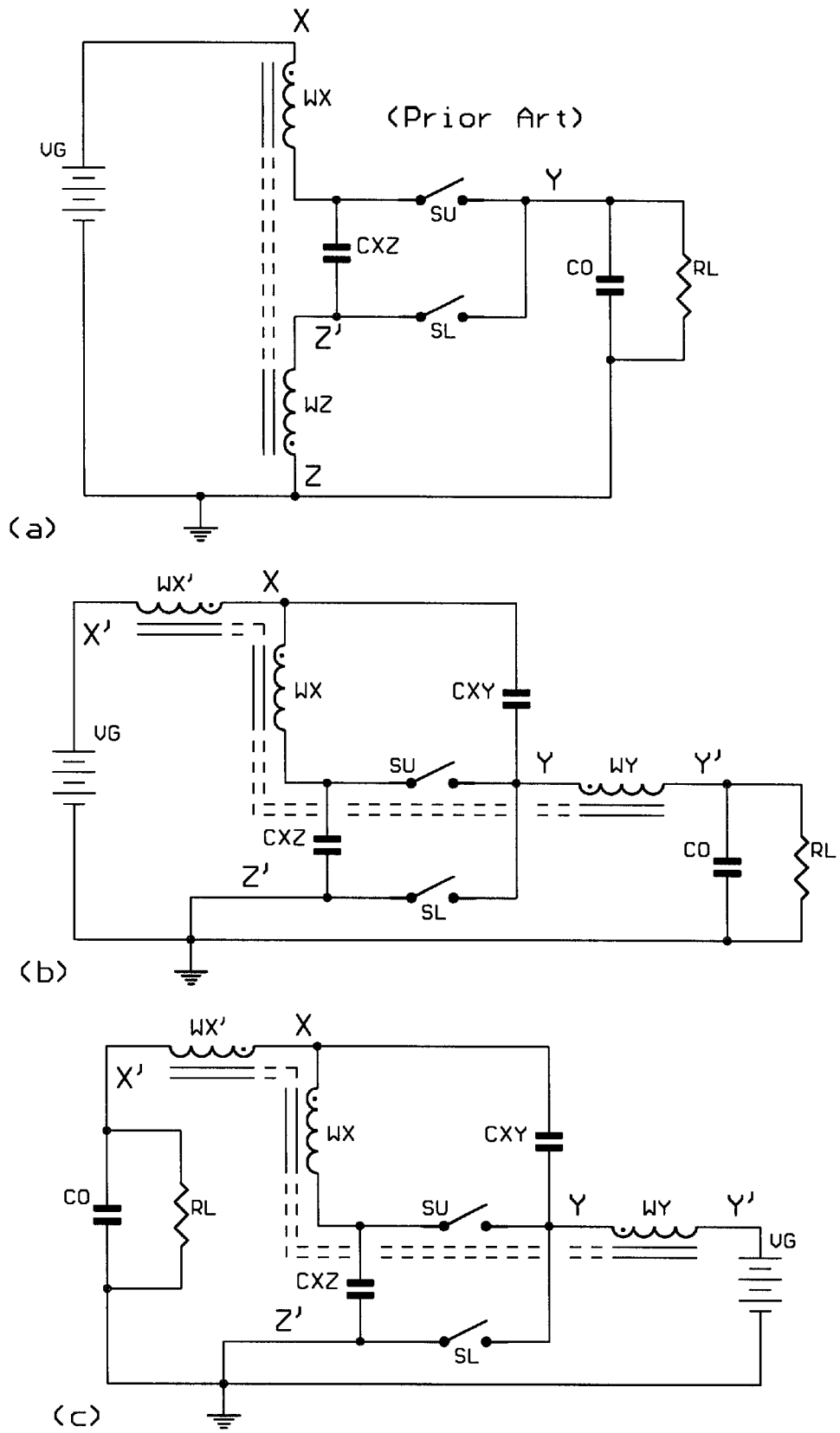
FIG. 12(a) illustrates a two inductor buck converter according to the prior art with a pair of floating switches.
FIG. 12(b) illustrates a buck converter equivalent to the FIG. 12(a) circuit with the synthesis method of FIGS. 3(a), 3(b), and 4(c) applied to yield a buck converter with non-pulsating terminal currents at all terminals and with ground referenced switches.
FIG. 12(c) illustrates a boost form of the FIG. 12(b) circuit with ground referenced switches and non-pulsating terminal currents.
Figure 13:
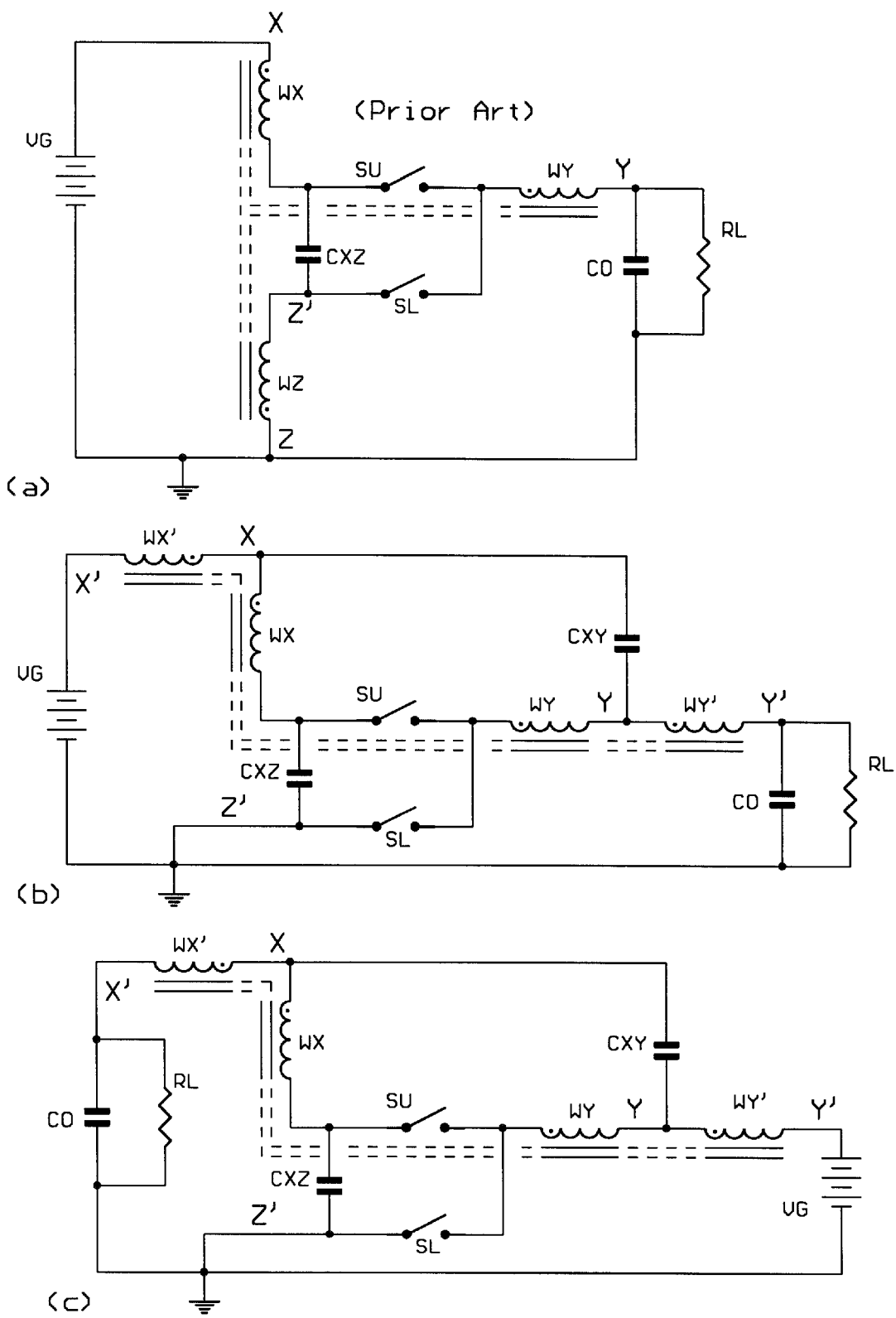
FIG. 13(a) illustrates a three inductor buck converter according to the prior art with a pair of floating switches.
FIG. 13(b) illustrates a buck converter equivalent to the FIG. 13(a) circuit with the synthesis method of FIGS. 3(a), 3(b), and 4(c) applied to yield a buck converter with non-pulsating terminal currents at all terminals and with ground referenced switches.
FIG. 13(c) illustrates a boost form of the FIG. 13(b) circuit with ground referenced switches and non-pulsating terminal currents.

FIG. 12($a$) illustrates a two inductor buck converter according to the prior art. FIG. 13($a$) illustrates a three inductor buck converter according to the prior art. Both of these buck converters already have the desirable property of non-pulsating terminal currents at all three terminals. One undesirable feature of the FIG. 12($a$) and FIG. 13($a$) circuits is that none of the switches are referred to ground or any other DC operating point. It would be preferable, for some applications, if one or both of the switches in each circuit could be connected to ground or some other DC operating point. By applying the first synthesis method, as illustrated in FIGS. 12($b$) and 13($b$), respectively, new circuits are formed in which both switches are referred to either ground or a DC operating point and the circuit maintains the properties of non-pulsating terminal currents at all three terminals. By reversing the relative positions of input source and load in the FIG. 12($b$) and FIG. 13($b$) circuits boost versions of the circuits are created, as illustrated in FIG. 12($c$) and FIG. 13($c$), respectively. The boost circuits of FIG. 12($c$) and FIG. 13($c$) have the properties of non-pulsating terminal currents at all three terminals and both of the switches are referred to DC operating points. A flyback circuit with non-pulsating input and output terminal currents and ground referenced switches is illustrated in FIG. 2.

Figure 14:
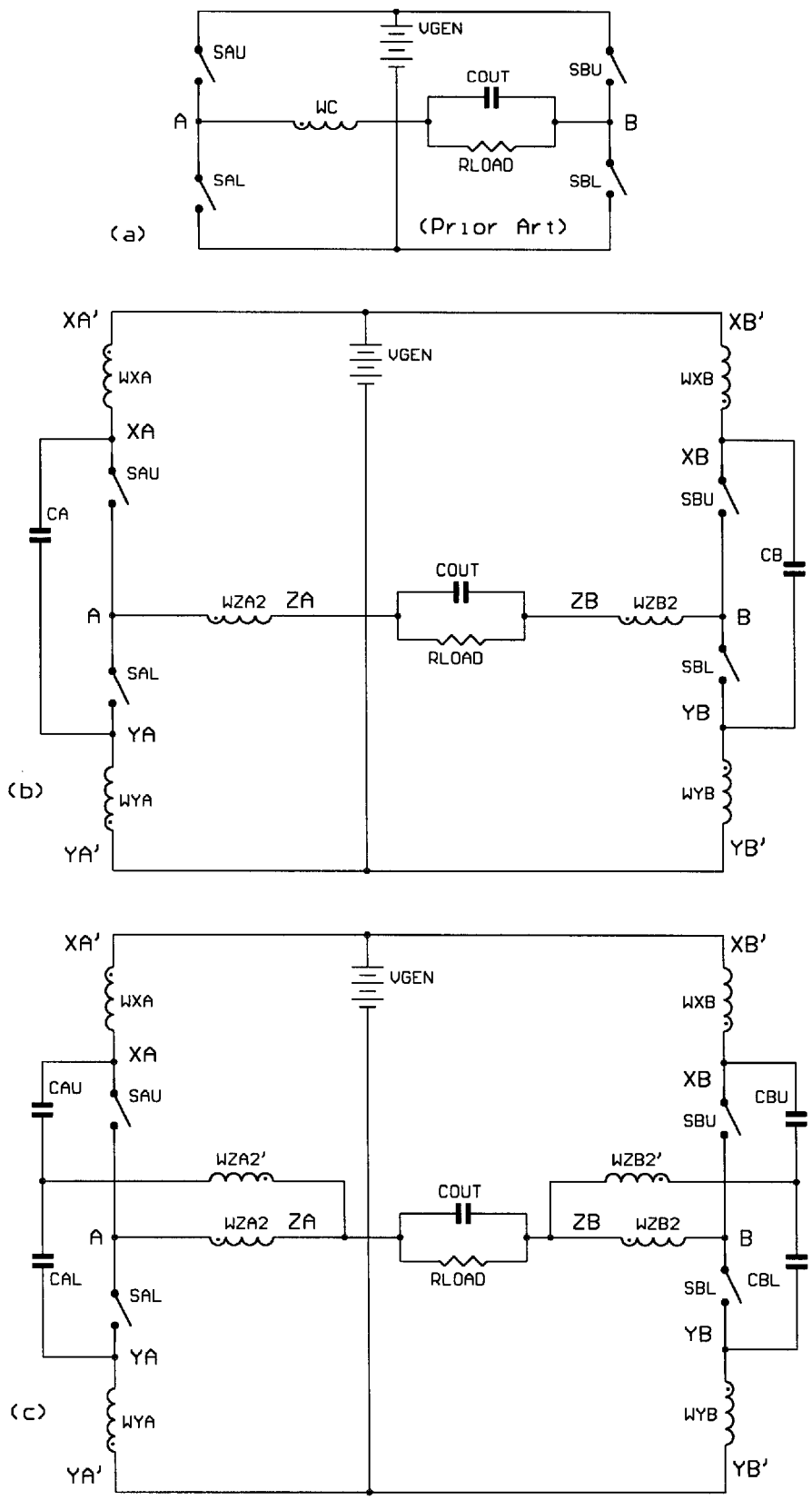
FIG. 14(a) illustrates a full bridge buck amplifier circuit which has non-pulsating load current but pulsating source terminal currents.
FIG. 14(b) illustrates the FIG. 14(a) circuit with the synthesis method revealed by FIGS. 9(a) through 9(c) applied to provide a full bridge buck amplifier with all terminal currents non-pulsating and mutual ripple current cancellation at the two source terminals.
FIG. 14(c) illustrates the FIG. 14(b) circuit with the synthesis method revealed by FIGS. 9(a) through 9(e) applied to provide a full bridge buck amplifier with mutual ripple current cancellation at all terminals, including the load terminals.

FIG. 14($a$) illustrates a conventional full bridge four quadrant buck converter as might be used for an audio or servo amplifier, sine wave inverter, or a bi-polar bidirectional power converter. The center leg inductor provides non-pulsating terminal current to the load, which is also in the center leg. Application of the first two steps of the fourth synthesis method to the FIG. 14($a$) circuit yields the circuit of FIG. 14($b$). Applying the optional step, illustrated in FIG. 9($e$), to the FIG. 14($b$) circuit yields the FIG. 14($c$) circuit, which achieves ripple cancellation at both source terminals and both load terminals. Moreover, the circuit of FIG. 14($c$) can be accomplished with no increase in the number of required magnetic cores, if all of the windings are placed on a single common core. One tradeoff a designer can make is to decrease filter component size in exchange for higher ripple. This suggests the possibility of decreasing the size, weight, and cost of the capacitors and inductors in the FIG. 14($c$) circuit in exchange for higher ripple. The FIG. 14($c$) circuit achieves much lower ripple than the FIG. 14($a$) circuit by adding windings and capacitors to the FIG. 14($a$) circuit, but for a given load terminal ripple current the FIG. 14($c$) circuit will require a smaller coupled inductor and smaller total capacitance than the FIG. 14($a$) circuit. It would also be possible to achieve simultaneously both lower ripple and a cheaper and smaller single magnetic circuit element.

Figure 15:
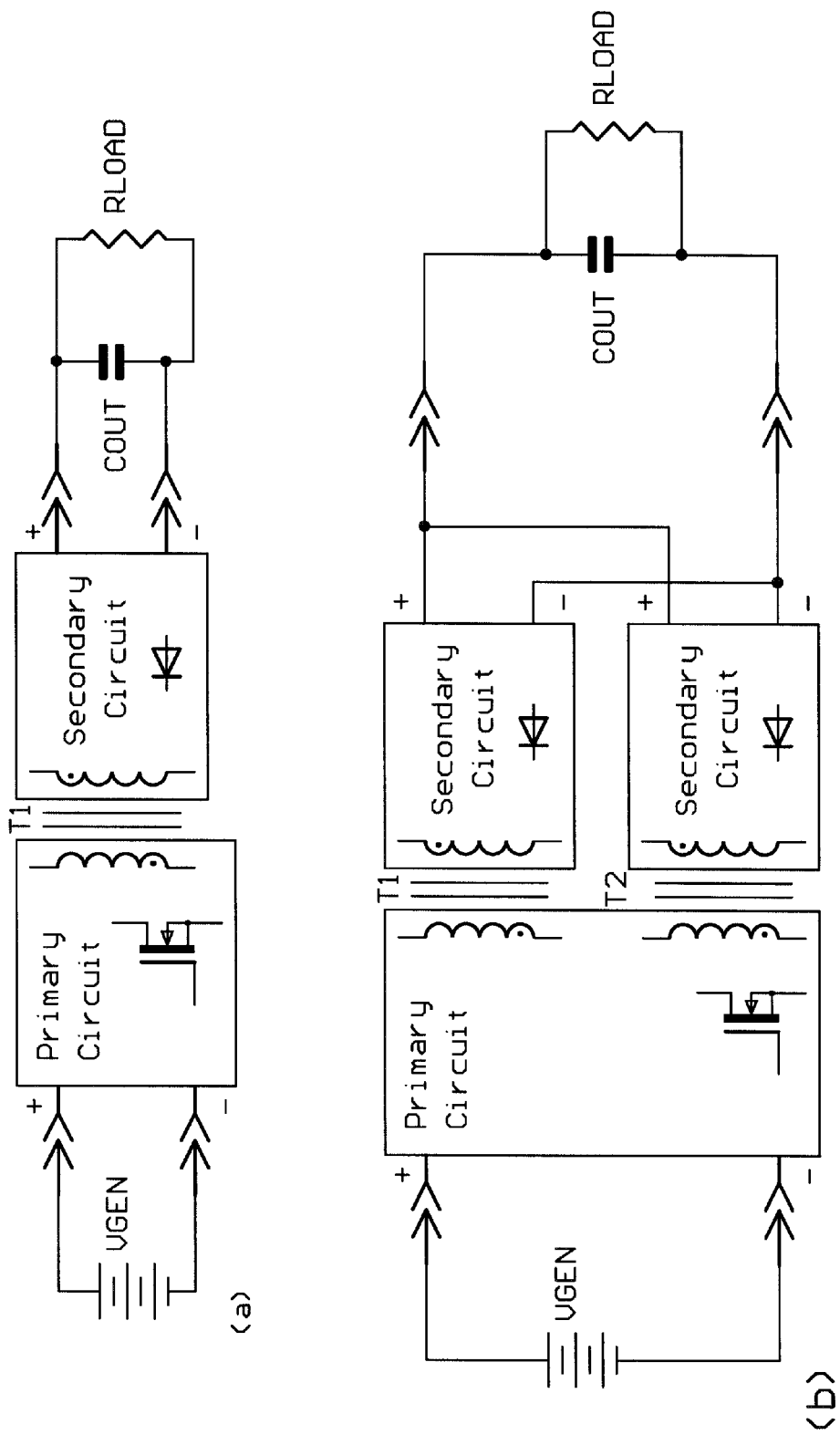
FIG. 15(a) illustrates the general form of an isolated power conversion network with two primary source terminals and two secondary load terminals using a single coupled magnetic circuit element.
FIG. 15(b) illustrates the general form of an isolated power conversion network with two primary source terminals and two secondary load terminals using two coupled magnetic circuit elements.

FIG. 15($a$) illustrates a general form for an isolated power converter circuit that employs a single isolation transformer or coupled inductor. In the general case, a source voltage is connected to a primary circuit comprising at least a switch and a winding which is magnetically coupled to a secondary circuit comprising at least a winding and a switch. The secondary circuit is connected to a load. An alternative arrangement for a general isolated converter is illustrated in FIG. 15($b$). The FIG. 15($b$) circuit employs two isolating magnetic circuit elements for transferring power across the isolation boundary. In most cases the secondary circuits in converters of the FIG. 15($b$) type are identical and are operated in anti-synchronization. The primary circuit of converters of the FIG. 15($b$) type comprise at least a switch and a winding although one primary winding for each secondary circuit is common. Each secondary circuit comprises at least a switch and a winding.

Figure 16:
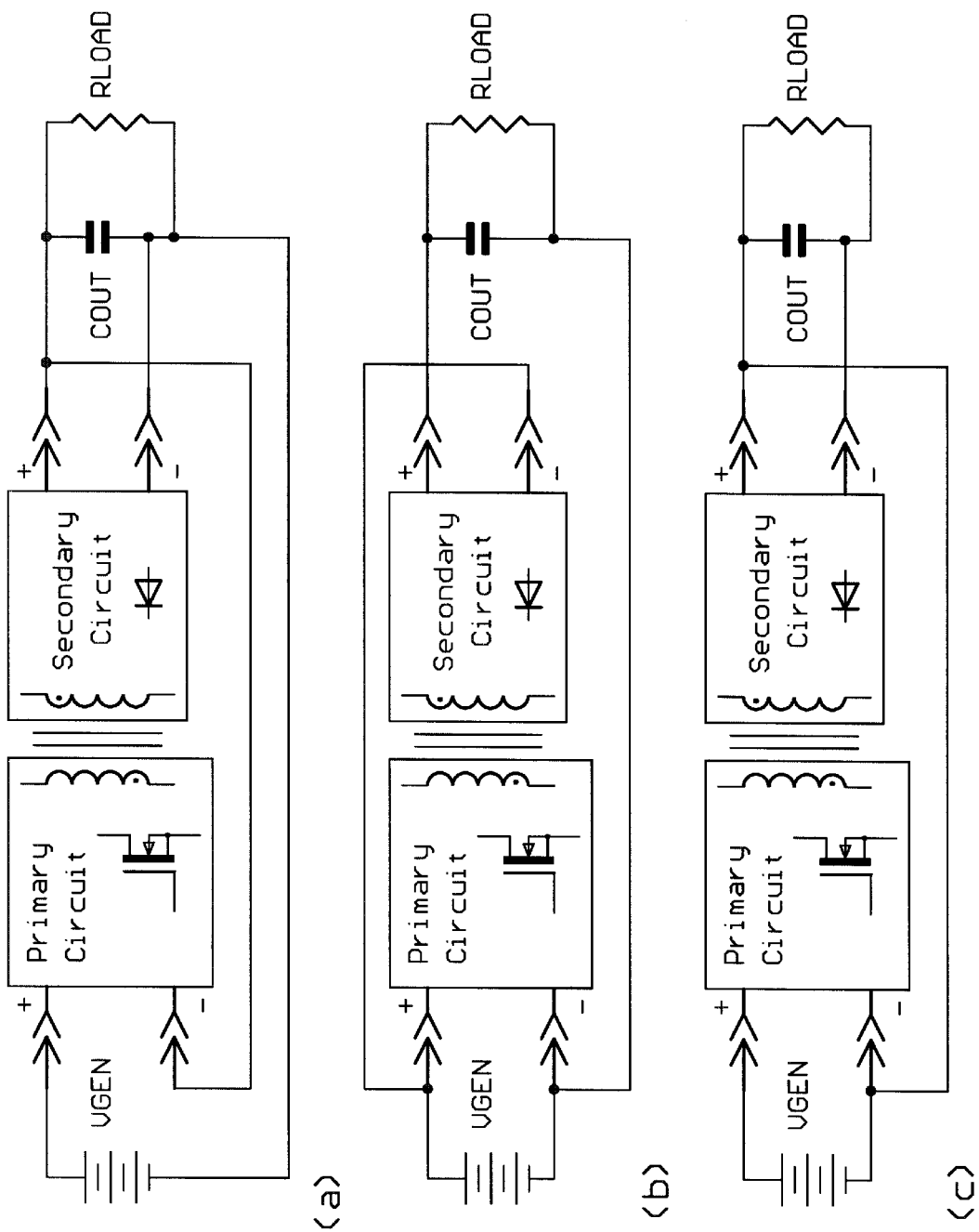
FIG. 16(a) illustrates a non-isolated non-inverting step down converter based on the general isolated converter form of FIG. 15(a).
FIG. 16(b) illustrates a non-isolated non-inverting step up converter based on the general isolated converter form of FIG. 15(a).
FIG. 16(c) illustrates a non-isolated inverting step up/down converter based on the general isolated converter form of FIG. 15(a).
FIG. 16(d) illustrates a non-isolated non-inverting step down converter based on the general isolated converter form of FIG. 15(b).
FIG. 16(e) illustrates a non-isolated non-inverting step up converter based on the general isolated converter form of FIG. 15(b).
FIG. 16(f) illustrates a non-isolated inverting step up/down converter based on the general isolated converter form of FIG. 15(b).
Figure 16:
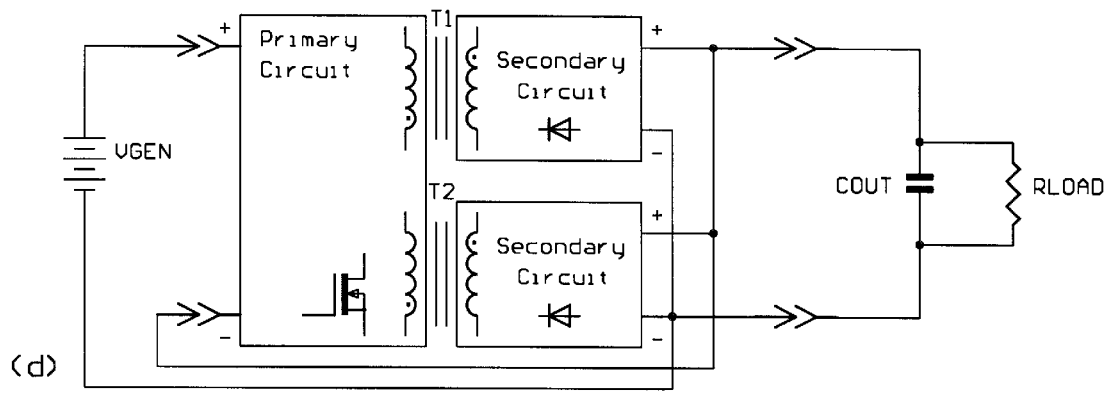
Figure 16:
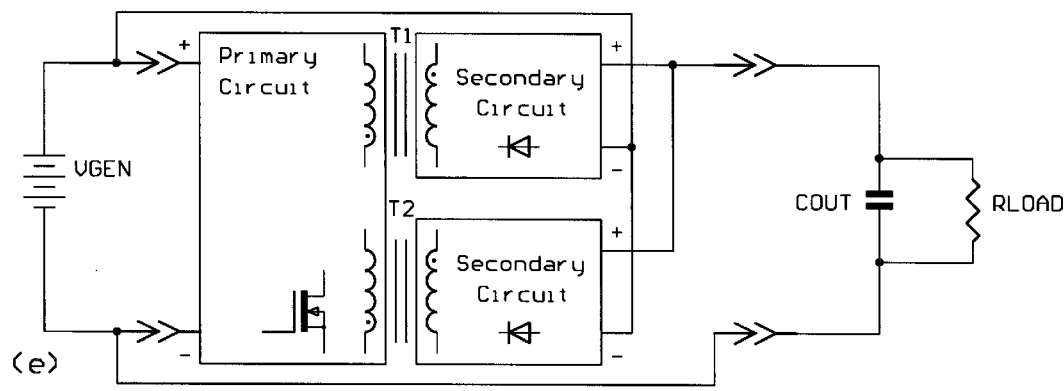
Figure 16:
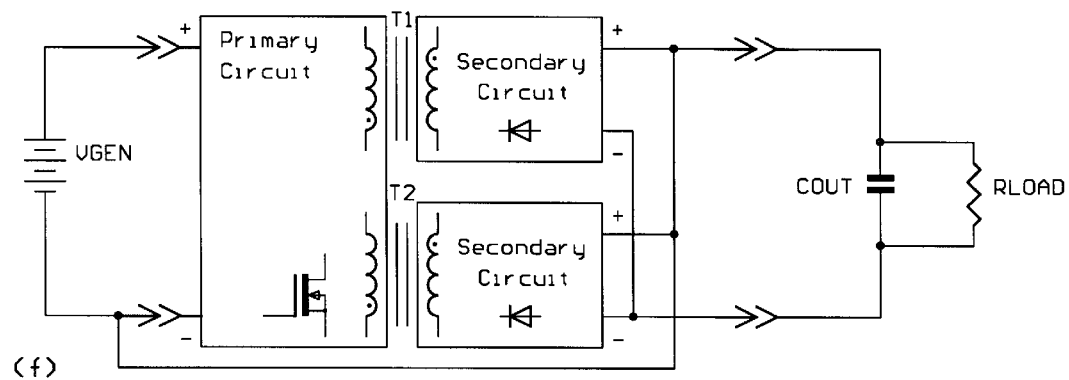

Power converters of the same general form as those shown in FIGS. 15($a$) and 15($b$) can be used to form non-isolated converters, although this practice is not very common because, in most cases, non-isolated power converters with similar properties can be formed with fewer magnetic circuit elements. There are, however, some cases in which the isolated forms provide a good solution to non-isolated converter problems. One example is the solution to the problem of non-isolated converters with high step down conversion ratios, such as powering a microprocessor with 60 amperes at 1 volt from a 12 volt, 24 volt, or 48 volt source. A buck converter is commonly used for non-isolated step down conversion, but, in the case of a buck converter operating from a 48 volt bus and delivering 60 amperes to a load, switching 48 volts and 60 amperes simultaneously presents enormous demands on the switch. Examples of non-isolated converters that specifically address the high step down ratio conversion issue are illustrated in FIGS. 11($a$) through 11($e$). An example of a general circuit form similar to that of FIG. 15($a$) that is useful for high step down conversion ratios is illustrated in FIG. 16($a$). In the FIG. 16($a$) circuit the primary circuit current is delivered to the load along with all of the secondary current so it has an efficiency advantage over the FIG. 15(a) form. By using a coupled magnetic with relatively high primary to secondary turns ratio the demands placed on the primary switch are significantly reduced. FIG. 16(b) illustrates a non-inverting step up form of the FIG. 15(a) circuit and FIG. 16(c) illustrates an inverting step up/down form of the FIG. 15(a) circuit. Similarly, non-isolated forms of the FIG. 15(b) circuit can be realized. These are illustrated as non-inverting step down converter in FIG. 16(d), non-inverting step up converter in FIG. 16(e), and inverting step up/down converter in FIG. 16(f). In all of the circuit forms in FIGS. 15(a) through 16(f) new forms that achieve improved EMI properties, such as non-pulsating terminal currents and cancellation of ripple and parasitic currents, can be synthesized by application of the methods taught here to known primary circuits, known secondary circuits, or both known primary circuits and known secondary circuits.

Embodiments Achieved By Application of the Synthesis Methods

FIGS. 17(a) through 17(e) illustrate examples of prior art secondary circuits. FIG. 17(f) illustrates an application of the second synthesis method to the FIG. 17(c) circuit wherein the positive load terminal of FIG. 17(c) corresponds to the V terminal of the FIG. 5(a) network and the negative load terminal of FIG. 17(c) corresponds to the W terminal of FIG. 5(a). Also, the negative load terminal of FIG. 17(f) corresponds to the W' terminal of FIG. 5(k) and the positive load terminal of FIG. 17(f) corresponds to the V terminal of FIG. 5(k). The FIG. 17(f) circuit achieves load terminal ripple current cancellation.

FIG. 17(g) illustrates an application of the second synthesis method to the circuit of FIG. 17(d). Here the FIG. 17(d) circuit corresponds to the FIG. 5(g) circuit and the FIG. 17(g) circuit corresponds to the FIG. 5(i) circuit. The FIG. 17(g) circuit achieves load terminal ripple current cancellation and common mode current cancellation.

FIG. 17(h) illustrates an application of the second synthesis method to the FIG. 17(e) circuit. The FIG. 17(e) circuit corresponds to the FIG. 5(a) circuit and the FIG. 17(h) circuit corresponds to the FIG. 5(k) circuit. The FIG. 17(h) circuit achieves load terminal ripple current cancellation.

FIG. 17(i) illustrates a prior art secondary circuit as might be used in an isolated flyback converter. FIG. 17(j) illustrates an application of the second synthesis method to the FIG. 17(i) circuit. Here the FIG. 17(i) circuit corresponds to the FIG. 5(a) circuit and the FIG. 17(j) circuit corresponds to the FIG. 5(j) circuit and achieves common mode current cancellation. FIG. 17(k) applies the second synthesis method to the FIG. 17(j) circuit to achieve a circuit corresponding to the FIG. 5(k) circuit with output terminal current ripple current cancellation.

FIG. 17(l) illustrates a prior art secondary circuit as is often used in a single ended forward converter. FIG. 17(m) illustrates the application of the second synthesis method to the FIG. 17(l) network defined by V1 and W1 wherein the transformer secondary winding and the switch S1 of FIG. 17(l) correspond to the WV winding and Network 1, respectively, in the FIG. 5(a) circuit and the secondary windings and the switch S1 of FIG. 17(m) correspond to the FIG. 5(j) circuit. The FIG. 17(m) circuit achieves common mode current cancellation in the T1 transformer for improved EMI. FIG. 17(n) illustrates the application of the second synthesis method to the two terminal network defined by V2 and W2 in FIG. 17(l) to achieve output terminal ripple cancellation. FIG. 17(o) illustrates the application of the second synthesis method to both the network defined by V1 and W1 in FIG. 17(l) and to the network defined by V2 and W2 in FIG. 17(l) to achieve a single ended forward converter secondary circuit with both common mode current cancellation and output terminal ripple current cancellation.

FIG. 17(p) illustrates a prior art secondary circuit with a saturable inductor in series with the secondary winding and switch to achieve a delay in the switch turn on timing. FIG. 17(q) illustrates the application of the second synthesis method to the FIG. 17(p) circuit to achieve common mode current cancellation in the transformer T1. FIG. 17(r) illustrates the application of the second synthesis method to the FIG. 17(q) circuit to achieve output terminal ripple current cancellation.

FIG. 17(s) illustrates a current doubler rectifier secondary circuit with saturable reactors to provide switch turn on delays for zero voltage switching.

FIG. 17(t) illustrates a prior art single ended forward converter secondary with a saturable reactor used to provide switch turn on delay. FIG. 17(u) illustrates the application of the second synthesis method to the network defined by V1 and W1 of the FIG. 17(t) secondary circuit to achieve output terminal ripple current cancellation. FIG. 17(v) illustrates the application of the second synthesis method to the network defined by V2 and W2 of the FIG. 17(t) secondary circuit to achieve common mode current cancellation. FIG. 17(w) illustrates the application of the second synthesis method to the network defined by V1 and W1 of the FIG. 17(v) secondary circuit. The FIG. 17(w) circuit achieves both common mode current cancellation and output terminal ripple current cancellation.

Figure 17:
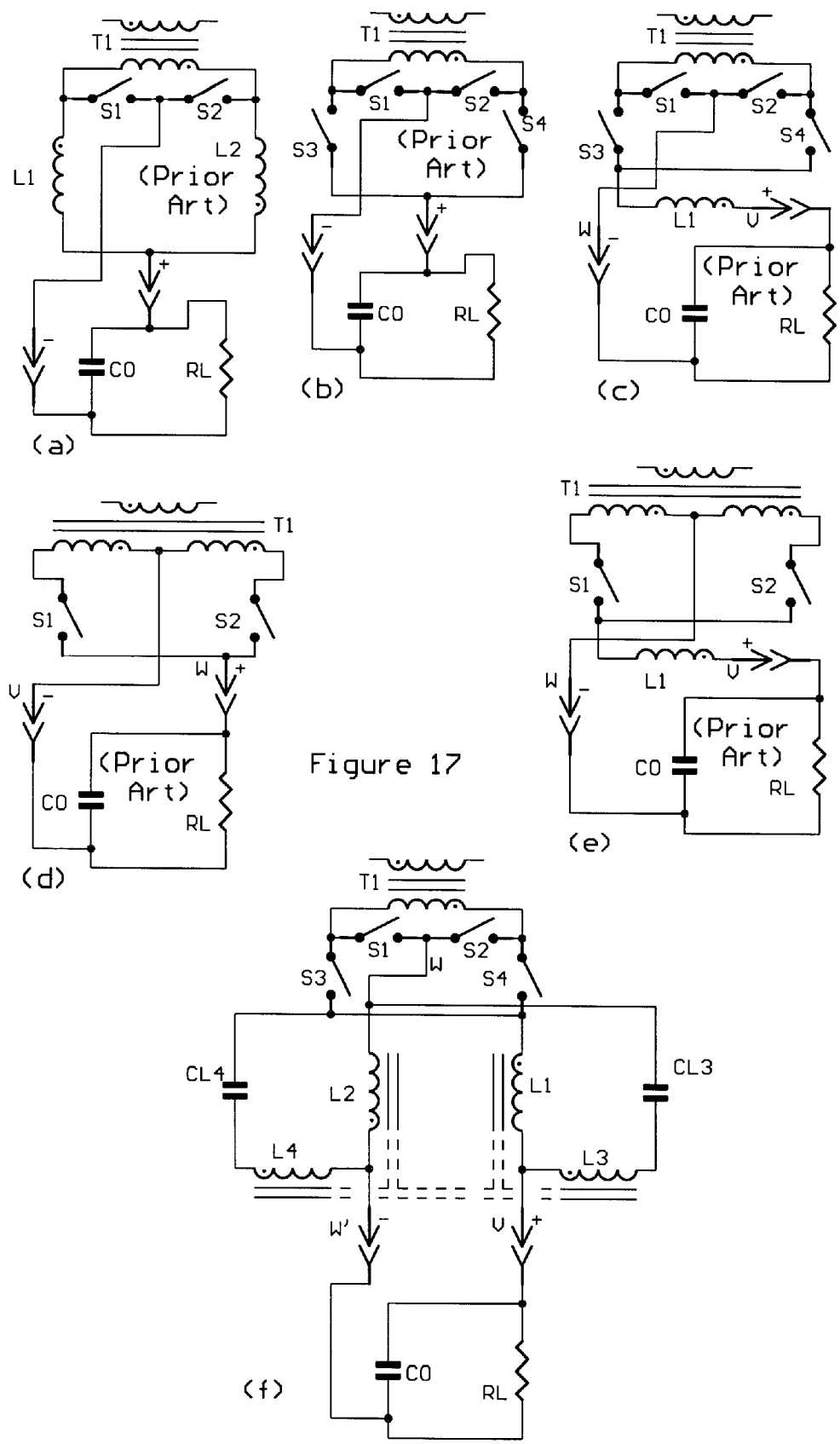
FIG. 17(aa) illustrates a push-pull rectifier with output choke type secondary circuit which achieves common mode current cancellation by applying the synthesis method illustrated by FIG. 5(j) to the FIG. 17(y) circuit.
Figure 17:
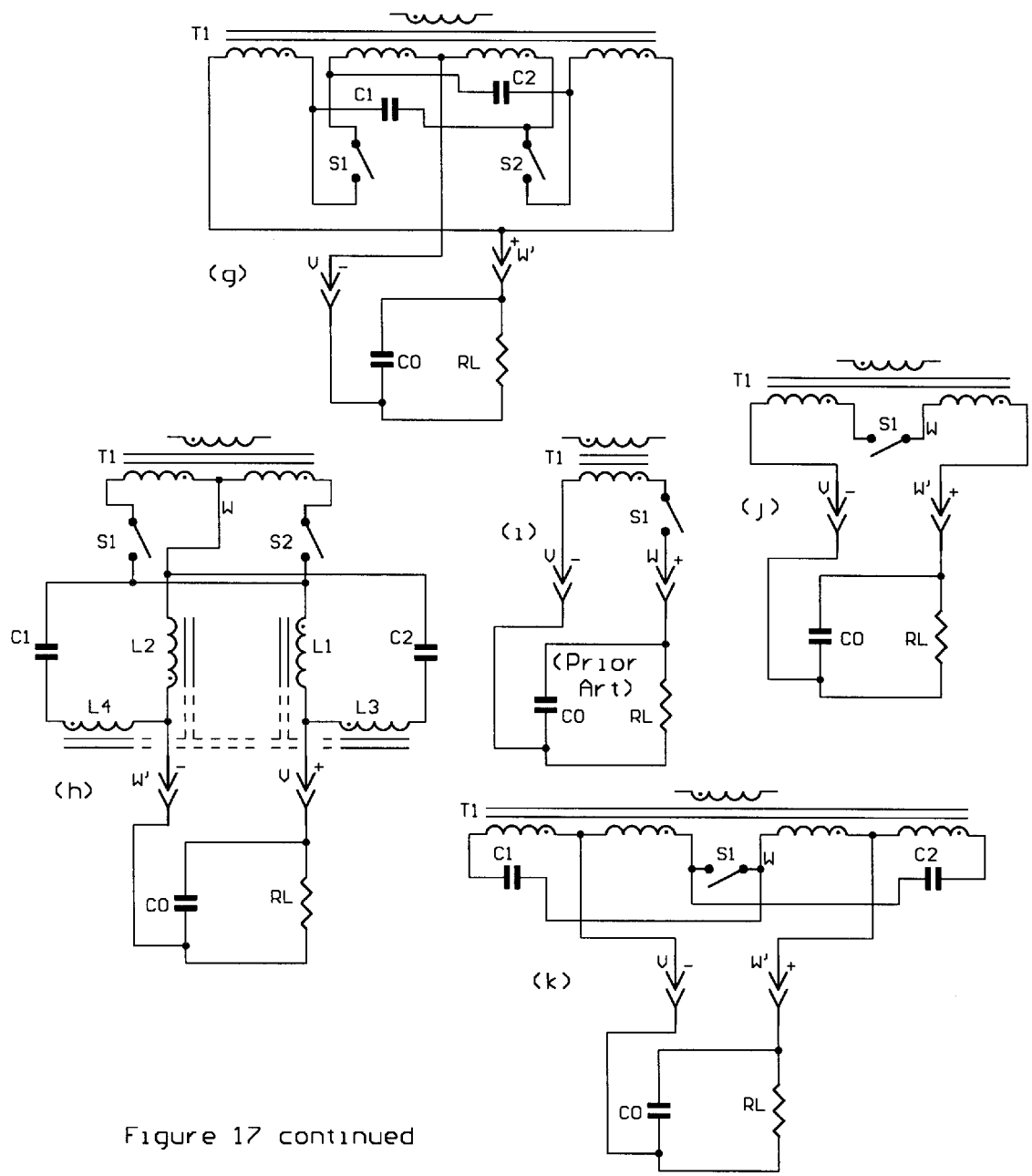
Figure 17:
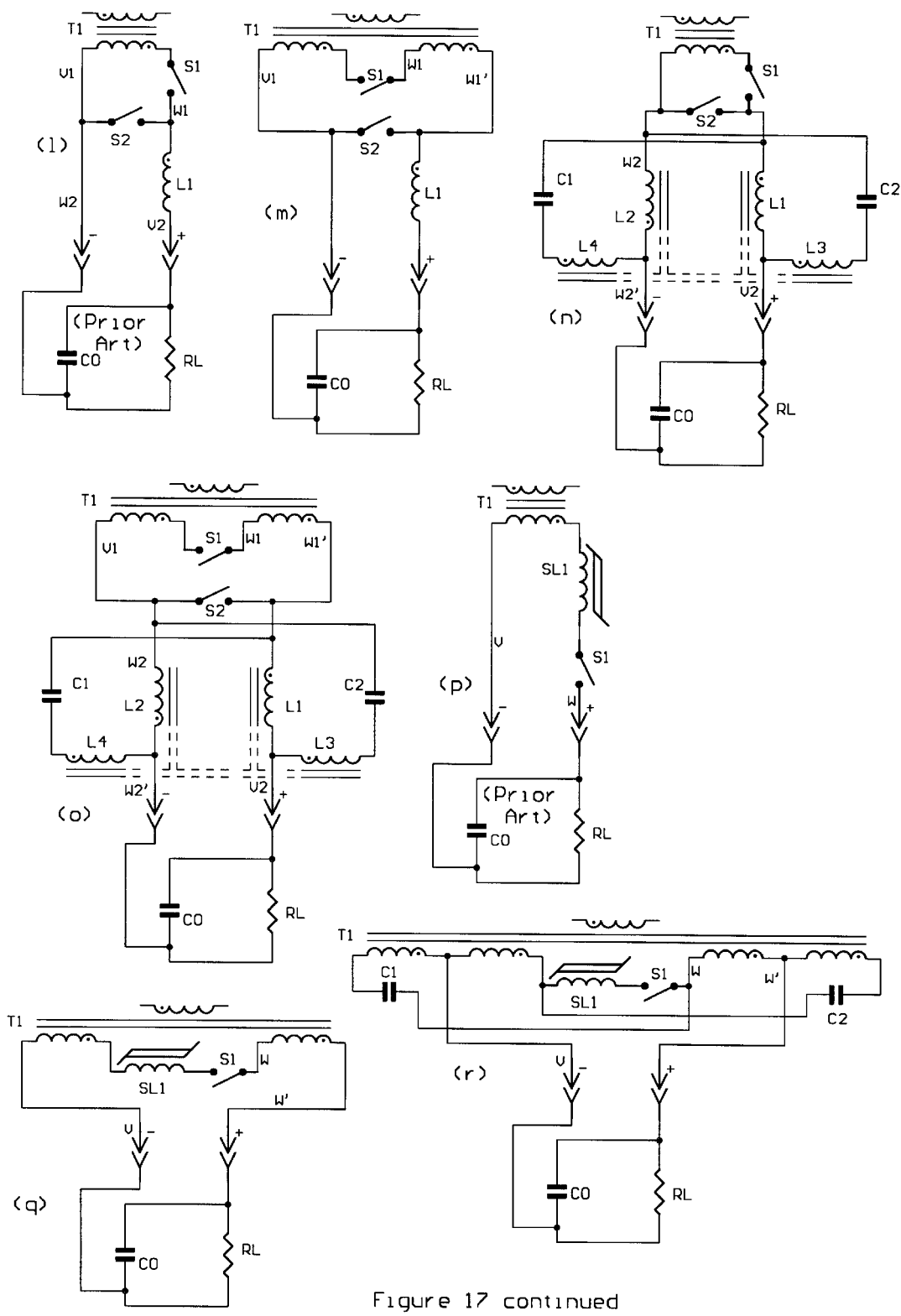
Figure 17:
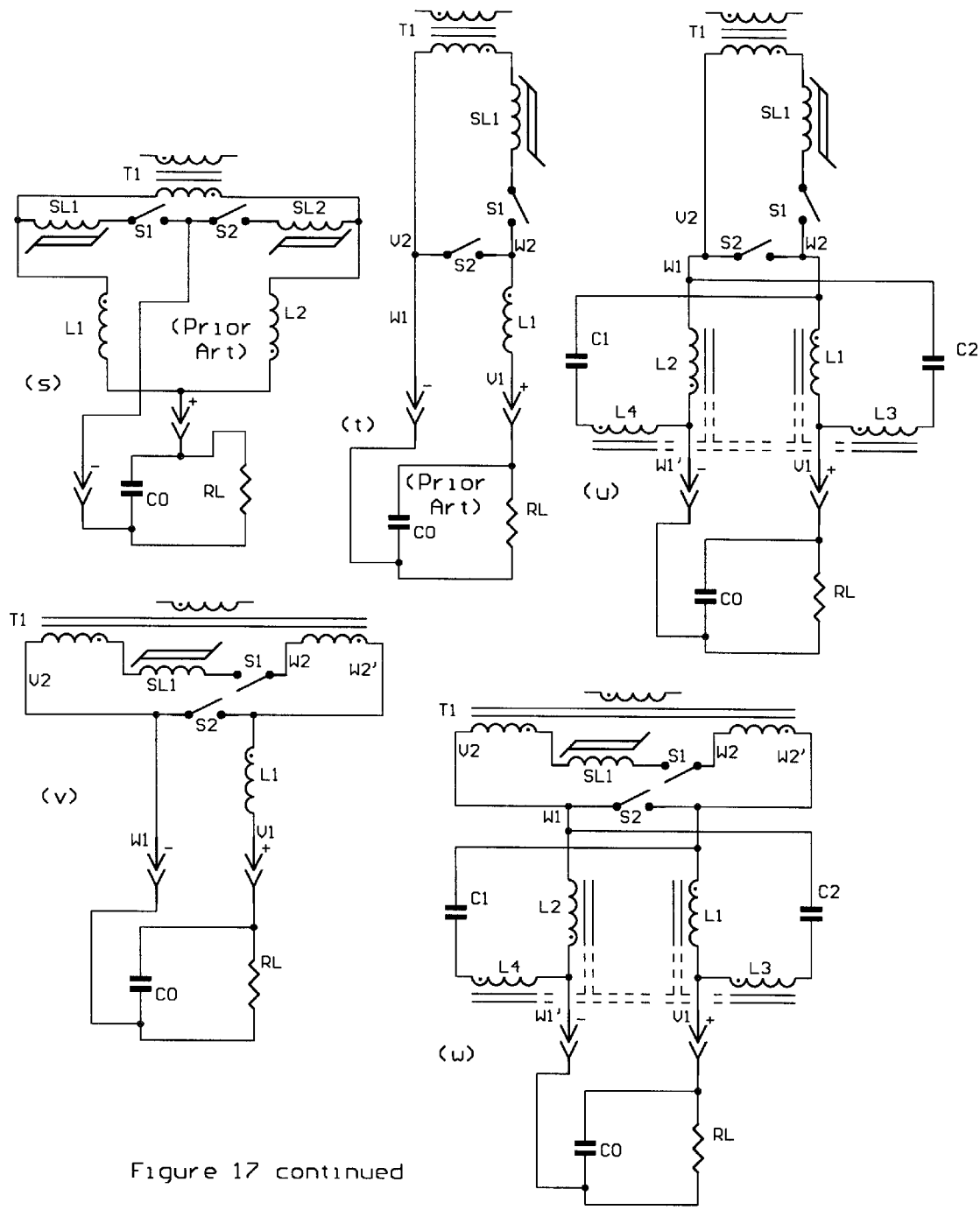
Figure 17:
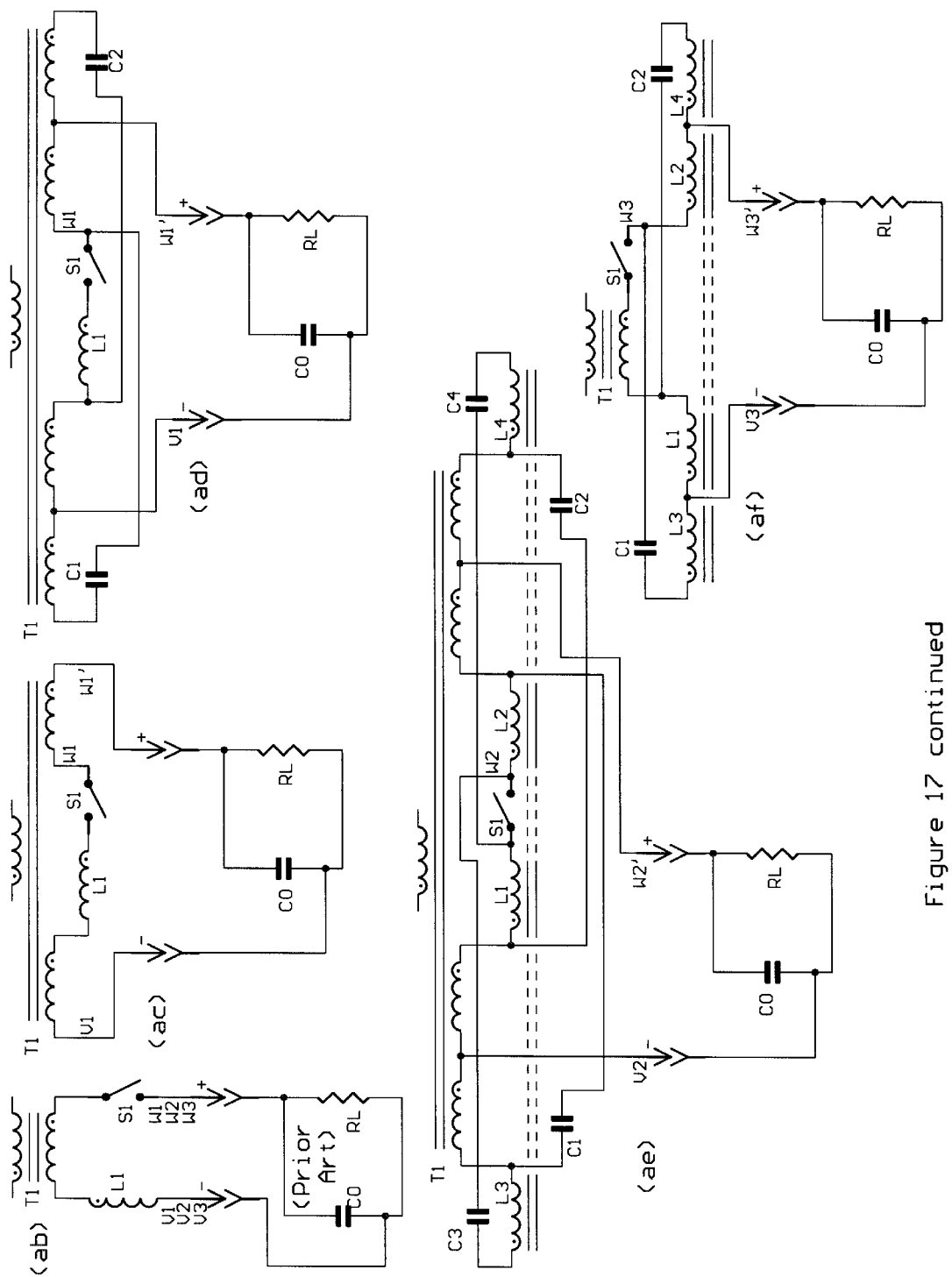
Figure 17:
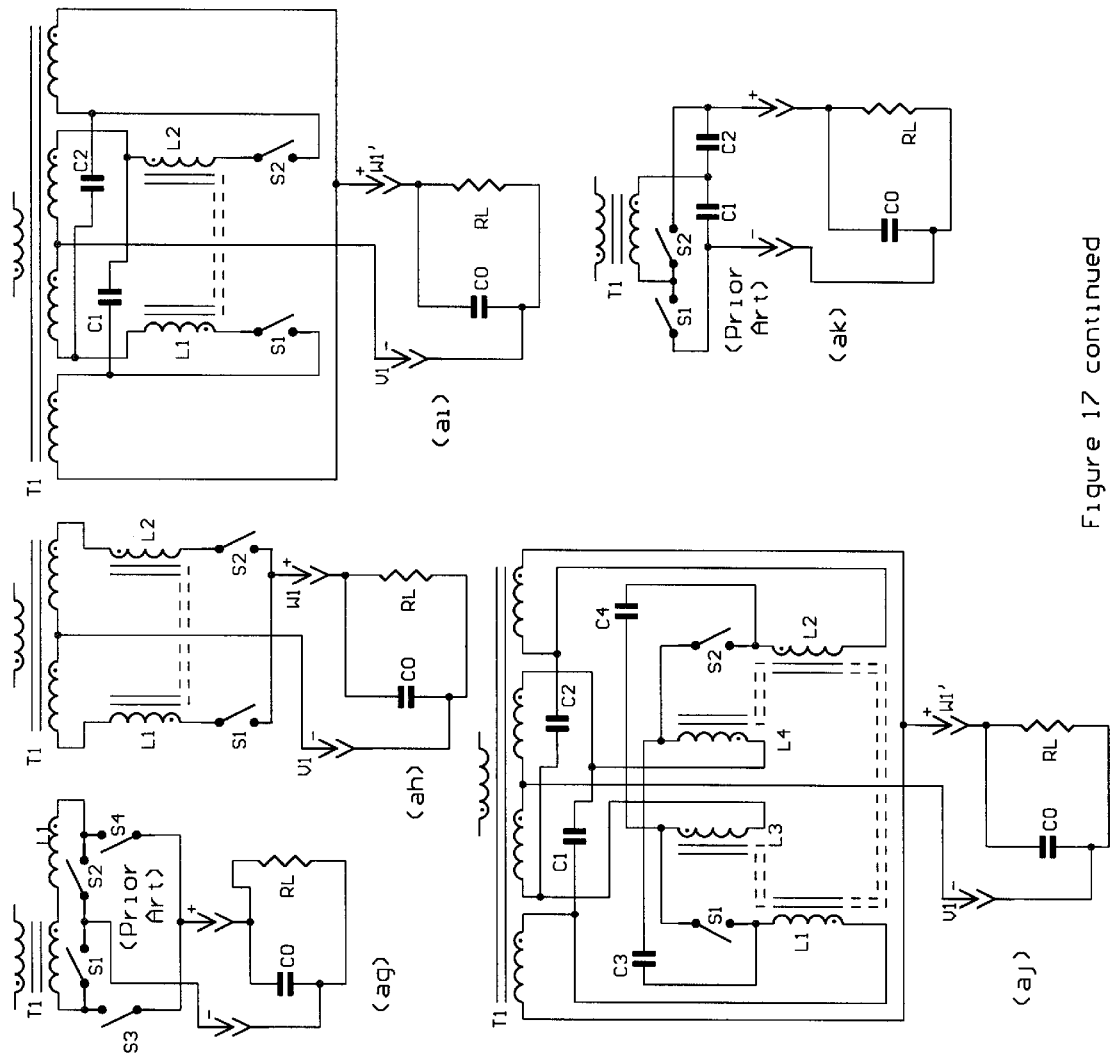
Figure 17:
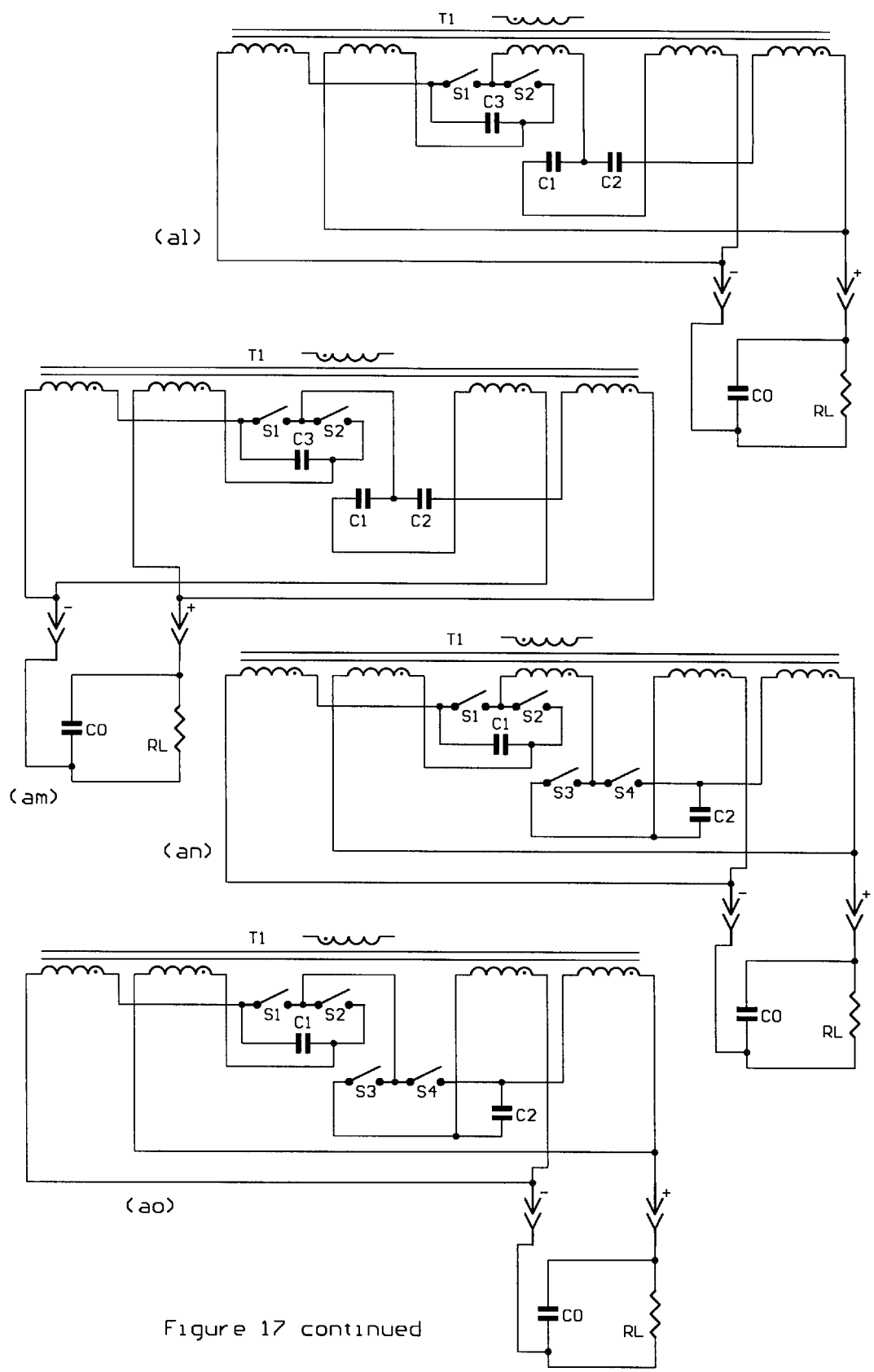
Figure 17:
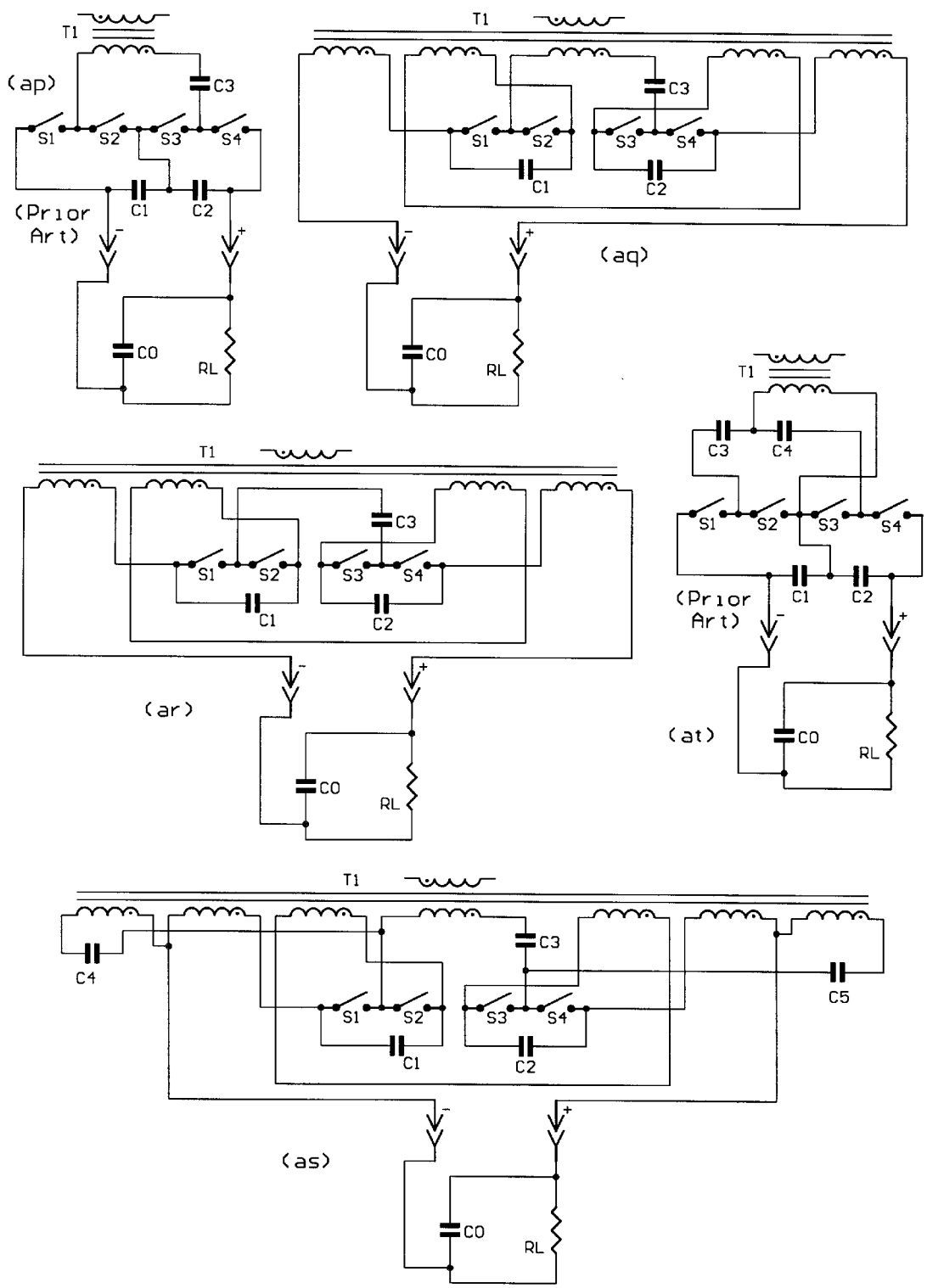
Figure 17:
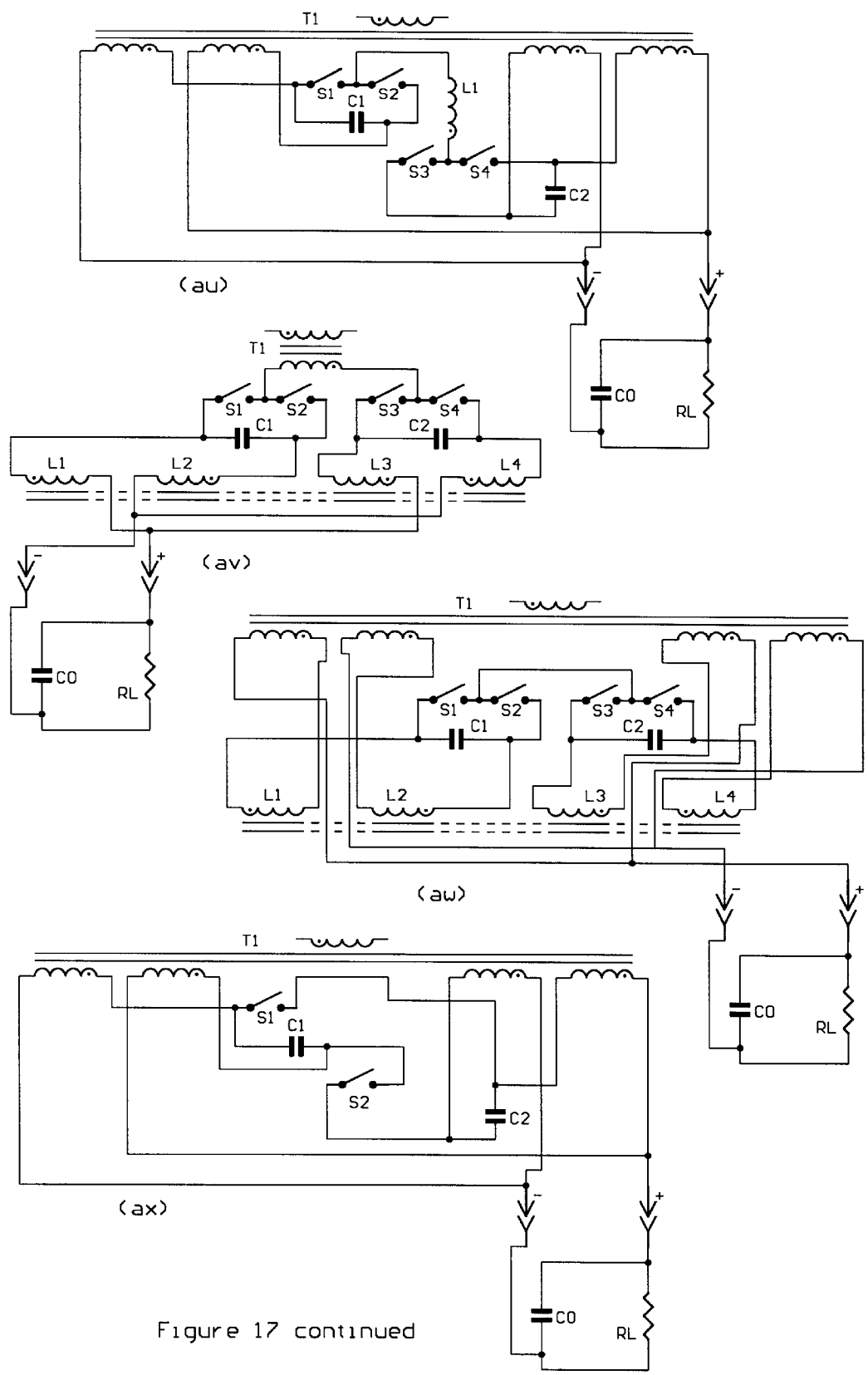

FIG. 17(x) illustrates a prior art push pull secondary circuit with saturable inductors to provide switch turn on delays. FIG. 17(y) illustrates the application of the second synthesis method to the network defined by V1 and W1 of the FIG. 17(x) circuit. The FIG. 17(y) circuit achieves output terminal ripple current cancellation. FIG. 17(z) illustrates the application of the second synthesis method to the push pull network defined by V2 and W2 of the FIG. 17(x) secondary circuit to achieve common mode current cancellation. FIG. 17(aa) illustrates the application of the second synthesis method to the network defined by V1 and W1 of the FIG. 17(z) circuit to achieve output terminal ripple current cancellation.

FIG. 17(ab) illustrates a prior art secondary circuit used in zero voltage switching converters. FIG. 17(ac) illustrates the application of the first two steps of the second synthesis method to the network defined by V1 and W1 of the FIG. 17(ab) circuit. In the FIG. 17(ac) circuit the inductor L1 is placed next to the switch S1 rather than at the negative load terminal. The second synthesis method is applied to the T1 secondary winding. The FIG. 17(ac) circuit achieves common mode current cancellation. FIG. 17(ad) illustrates the continuation of the application of the second synthesis method to the network defined by V1 and W1' of the FIG. 17(ac) circuit. The FIG. 17(ad) circuit achieves output terminal ripple current cancellation. FIG. 17(ae) illustrates the application of the second synthesis method to the network defined by V2 and W2 of the FIG. 17(ab) circuit with the L1 inductor and secondary winding positions reversed. In FIG. 17(ae) the second synthesis method is applied to the winding network comprising the series combination of L1 and the T1 secondary winding, reversed from their relative positions in the FIG. 17(ab) circuit. The FIG. 17(ae) circuit achieves both common mode current cancellation and a high degree of output terminal ripple current cancellation. FIG.

17(*af*) illustrates the application of the second synthesis method to the network defined by V3 and W3 of the FIG. 17(*ab*) circuit. In FIG. 17(*af*) the synthesis method is applied to the L1 inductor, but not to the T1 secondary winding. The FIG. 17(*af*) circuit achieves output terminal ripple current cancellation.

FIG. 17(*ag*) illustrates a prior art full bridge secondary rectifier with a series inductor used in zero voltage switching converters. FIG. 17(*ah*) illustrates a push pull secondary rectifier with series inductors. FIG. 17(*ai*) illustrates the application of the second synthesis method to the FIG. 17(*ah*) wherein the method is applied to the secondary windings of the T1 transformer to achieve both common mode current cancellation and output terminal ripple current cancellation. FIG. 17(*aj*) illustrates the application of the second synthesis method to the FIG. 17(*ah*) circuit wherein the method is applied to the winding networks comprising the series connection of the inductors and T1 secondary windings to achieve both common mode current cancellation and a higher degree of output terminal ripple current cancellation.

FIG. 17(*ak*) illustrates a prior art voltage doubler rectifier secondary circuit which is a form of half bridge circuit with a switch leg, a capacitor leg and the T1 secondary winding forming the center leg. FIG. 17(*al*) illustrates the application of the third synthesis method to the FIG. 17(*ak*) circuit to achieve a voltage doubler rectifier with output terminal ripple current cancellation. FIG. 17(*am*) illustrates the FIG. 17(*al*) circuit with the center leg winding eliminated. Both the FIG. 17(*al*) circuit and the FIG. 17(*am*) circuit achieve common mode current cancellation but there is a higher degree of common mode current cancellation in the FIG. 17(*am*) circuit.

FIG. 17(*an*) illustrates the application of the fourth synthesis method to the FIG. 17(*b*) circuit, which is a full bridge rectifier secondary circuit. The FIG. 17(*an*) circuit achieves common mode current cancellation and output terminal ripple current cancellation. FIG. 17(*ao*) illustrates the FIG. 17(*an*) circuit with the center leg winding eliminated whereby the common mode current cancellation is further improved from the FIG. 17(*an*) circuit.

FIG. 17(*ap*) illustrates a full bridge doubler rectifier secondary circuit which is equivalent to a stacked full bridge type circuit with a left switch leg, a right switch leg, and a center leg comprising the T1 transformer secondary winding and a capacitor. FIG. 17(*aq*) illustrates the application of the first two steps of the fifth synthesis method to the FIG. 17(*ap*) circuit. The FIG. 17(*aq*) circuit achieves common mode current cancellation plus non-pulsating terminal currents. FIG. 17(*ar*) illustrates the FIG. 17(*aq*) circuit with the center leg winding eliminated whereby a higher degree of common mode current cancellation is achieved. FIG. 17(*as*) illustrates the application of an optional step of the fifth synthesis method which achieves terminal ripple current cancellation. Two of the windings of the FIG. 17(*ar*) and 17(*as*) circuits are placed in series and may be combined into a single equivalent winding further simplifying the circuits in the manner illustrated in FIG. 10(*f*).

FIG. 17(*at*) illustrates a full bridge voltage quadrupler rectifier secondary circuit.

FIG. 17(*au*) illustrates the application of the fourth synthesis method to the secondary winding of the FIG. 17(*ag*) circuit which achieves both common mode current cancellation and load terminal ripple current cancellation. FIG. 17(*av*) illustrates the application of the fourth synthesis method to the inductor of the FIG. 17(*ag*) circuit which achieves load terminal ripple current cancellation. FIG. 17(*aw*) illustrates the application of the fourth synthesis method to the winding network comprising the series combination of the inductor and secondary winding of the FIG. 17(*ag*) circuit which achieves both common mode current cancellation and load terminal ripple current cancellation.

Figure 9:
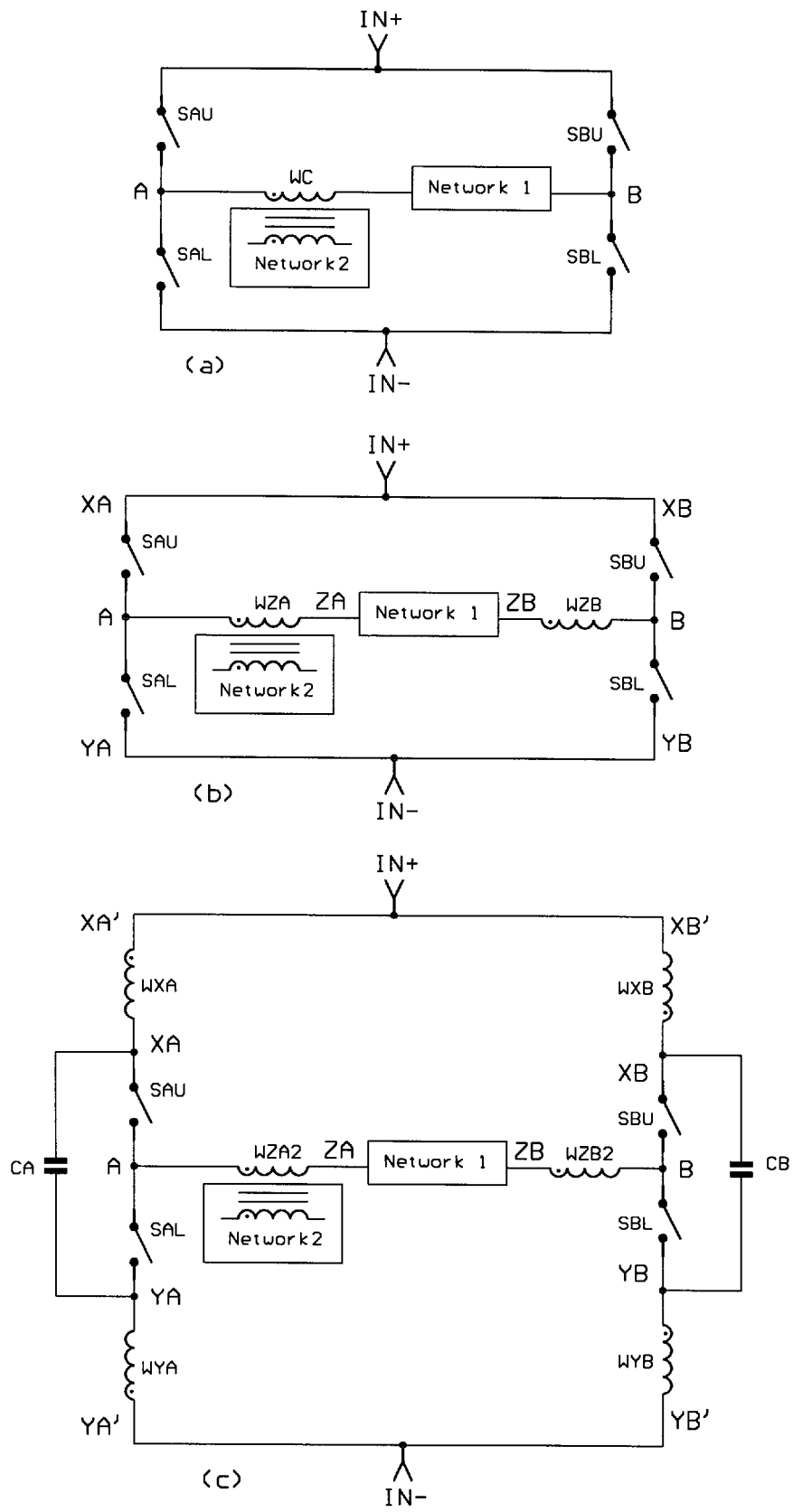
FIG. 9(a) illustrates a generalized full bridge power conversion network.
FIG. 9(b) illustrates the FIG. 9(a) network with the center leg winding split into two windings and arranged to create two three terminal networks of the type illustrated in FIG. 3(a).
FIG. 9(c) illustrates the FIG. 9(b) network with the synthesis method illustrated in FIGS. 3(a) through 3(d) applied to form a new full bridge power conversion network with mutual ripple current cancellation at the two network terminals.
FIG. 9(d) illustrates the FIG. 9(c) network with the two center leg windings combined into a single center leg winding.
FIG. 9(e) illustrates the FIG. 9(c) network with two windings and two capacitors added to accomplish ripple current cancellation in the center leg network 1.
FIG. 9(f) illustrates the FIG. 9(d) network with the center leg winding reduced to the point of elimination.
FIG. 9(g) illustrates a simplification of the FIG. 9(f) circuit applicable only to circuits in which the Network 1 is empty and cross connected switches are operated in synchronization in which the full bridge network of FIG. 9(f) is reduced to an equivalent push pull network.
Figure 9:
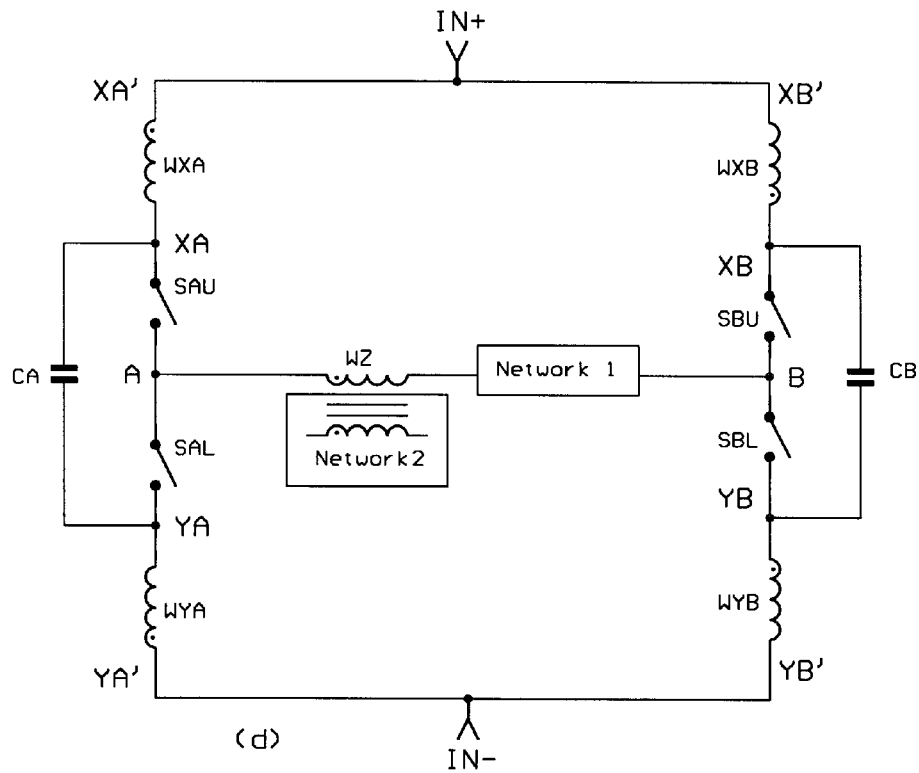
Figure 9:
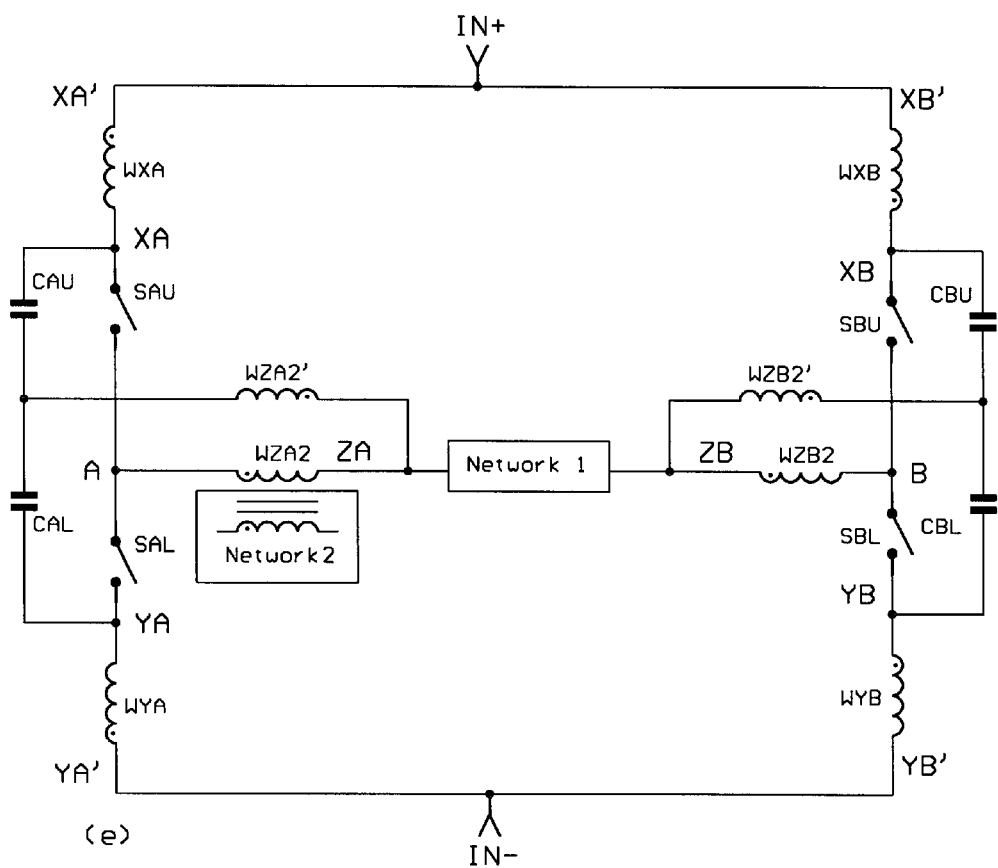
Figure 9:
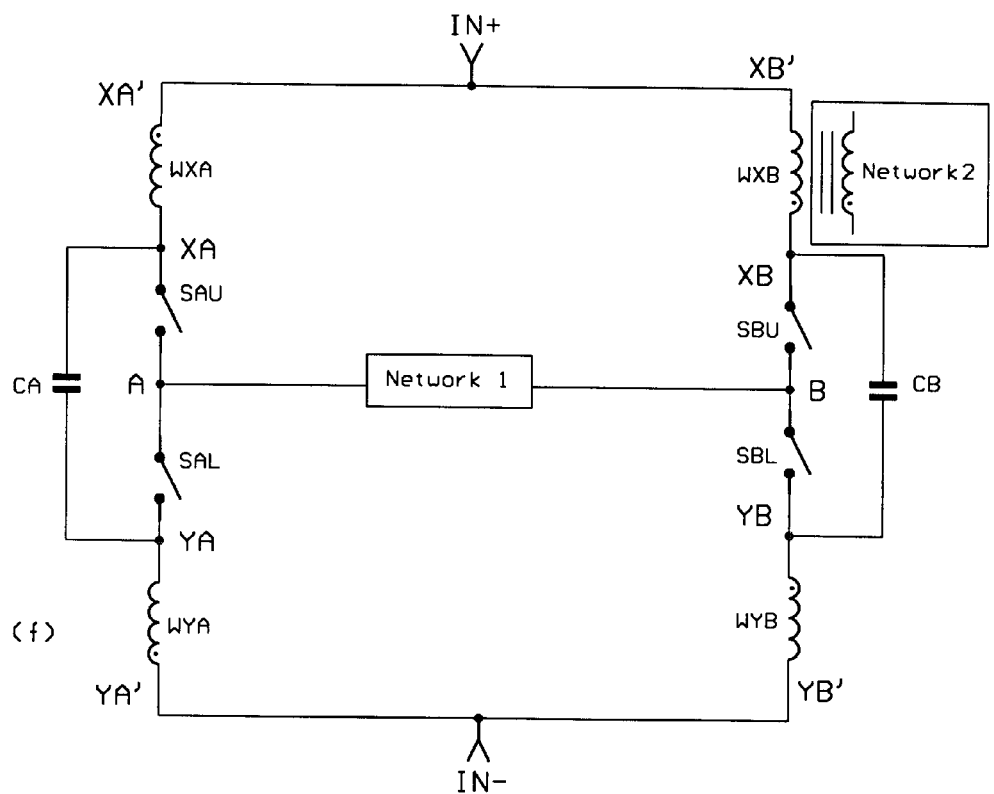
Figure 9:
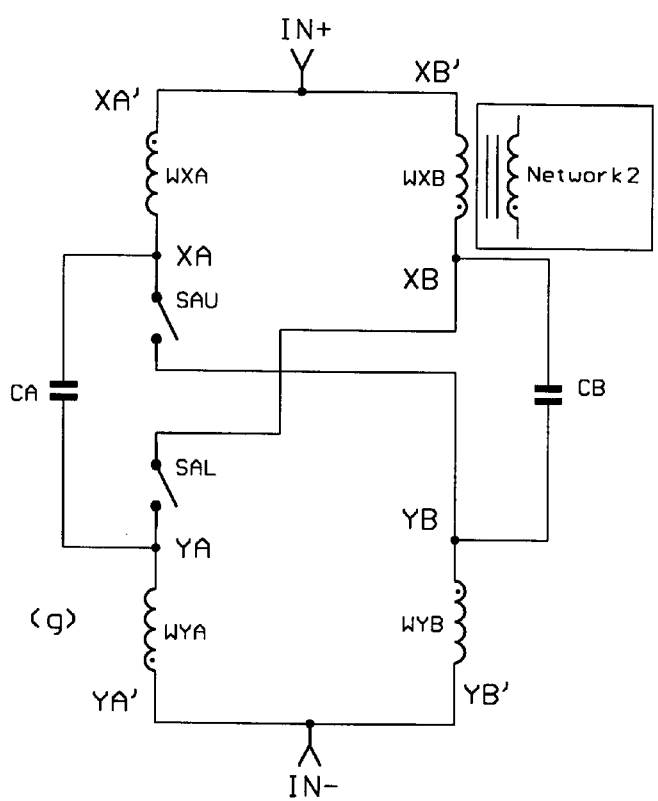

FIG. 17(*ax*) illustrates a simplification of the FIG. 17(*ao*) circuit which eliminates two of the four switches as illustrated in FIG. 9(*g*) and explained above.

Figure 18:
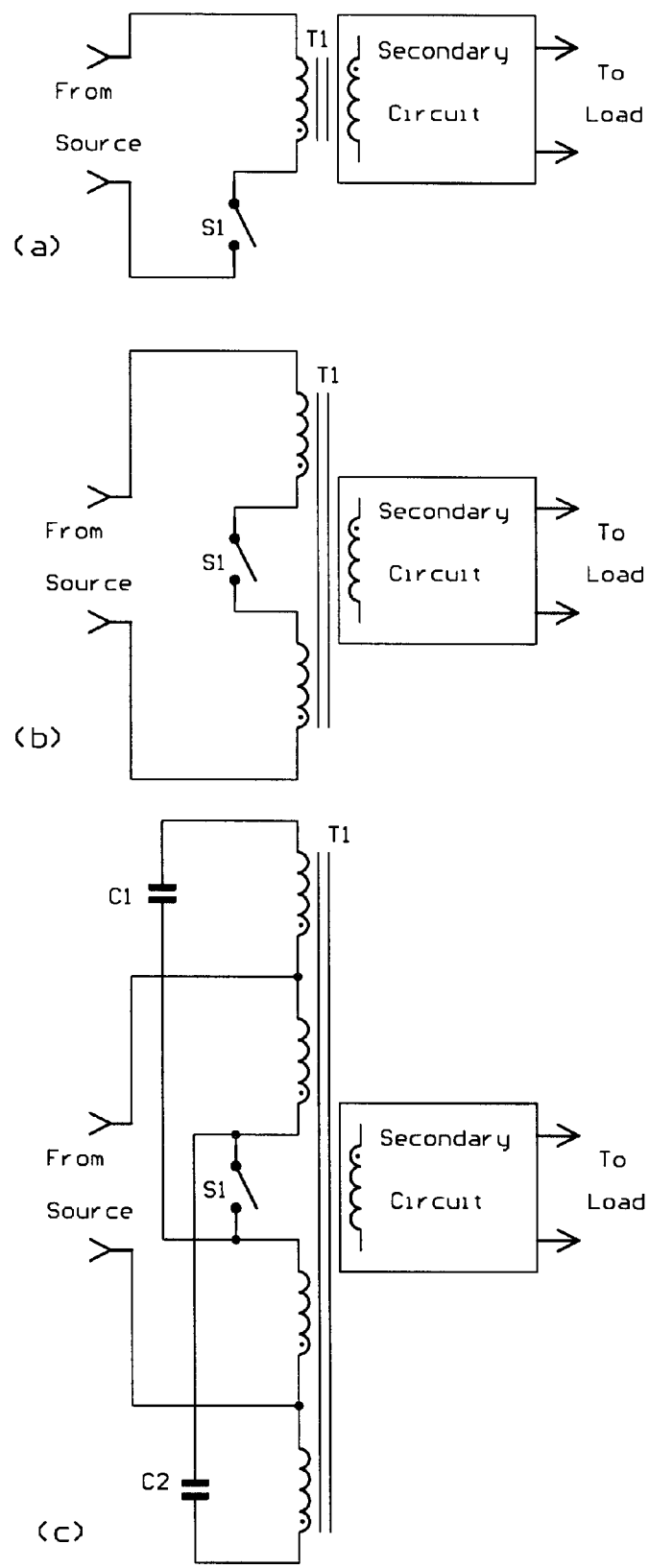

FIG. 18(*a*) illustrates a flyback type primary circuit. The suitable secondary circuits needed to form a working power converter are illustrated in FIGS. 17(*i*), 17(*j*), and 17(*k*). The FIG. 18(*a*) primary circuit combined with the secondary circuit illustrated in FIG. 17(*k*) provides a simple isolated flyback converter with output terminal ripple current cancellation and improved common mode noise with a single magnetic circuit element. One characteristic of the flyback converter of FIG. 18(*a*) is that there is a relatively high level of common mode current originating from the transformer primary winding. The common mode current originates from the interwinding capacitance between the transformer primary winding and the transformer secondary winding. Interwinding capacitor currents that originate at the dotted terminal of the transformer are a particular problem because the amount of current depends on the AC voltage applied to the interwinding capacitor and the amount of interwinding capacitance. The AC voltage at the dotted terminal of the T1 primary winding is relatively large. The common mode current from the undotted terminal of the T1 primary winding will be small since there is no AC applied voltage at that terminal. Reduction of common mode currents in the FIG. 18(*a*) circuit usually involves (1) placing a faraday shield or faraday shields between the primary and secondary windings inside the transformer which significantly reduces the parasitic capacitance between the primary and secondary winding and (2) providing a large common mode choke and Y capacitors, as part of the line input filter.

FIG. 18(*b*) illustrates the application of the first two steps of the second synthesis method to the FIG. 18(*a*) primary circuit. The result is an improvement in common mode noise due to common mode current cancellation. The suitable secondary circuits are the same as those suitable for the FIG. 18(*a*) circuit. FIG. 18(*b*) has two primary windings. Let us assume that the two primary windings have the same number of turns. Common mode currents from the undotted terminal of the upper primary winding and the dotted terminal of the lower primary winding will be small because there is no AC voltage at these terminals. There will, however, be relatively large common mode currents generated at the dotted terminal of the upper primary winding and at the undotted terminal of the lower primary winding. The magnitude of the AC voltage at the dotted terminal of the upper primary winding and at the undotted terminal of the lower primary winding will be half of the AC voltage applied at the dotted terminal of the primary winding of the FIG. 18(*a*) circuit. Correspondingly, the magnitude of the common mode currents generated at the dotted terminal of the upper primary winding and the undotted terminal of the lower primary winding of the FIG. 18(*b*) circuit will be lower than the common mode current generated at the dotted terminal of the primary winding of the FIG. 18(*a*) circuit. Moreover, the directions of the common mode currents and AC voltages at the dotted terminal of the upper primary winding and the undotted terminal of the lower primary winding in the FIG. 18(*b*) circuit are mutually opposed and cancel each other, so that the net common mode current is much less than the common mode current at either terminal. The degree of cancellation depends on the winding construction and the degree of balance or matching of the interwinding capacitances associated with the dotted terminal of the upper primary winding and the undotted terminal of the lower primary winding.

FIG. 18(c) illustrates the continued application of the second synthesis method to the FIG. 18(b) circuit wherein input terminal ripple current cancellation is also achieved. The suitable secondary circuits are the same as for the FIG. 18(a) circuit.

Figure 19:
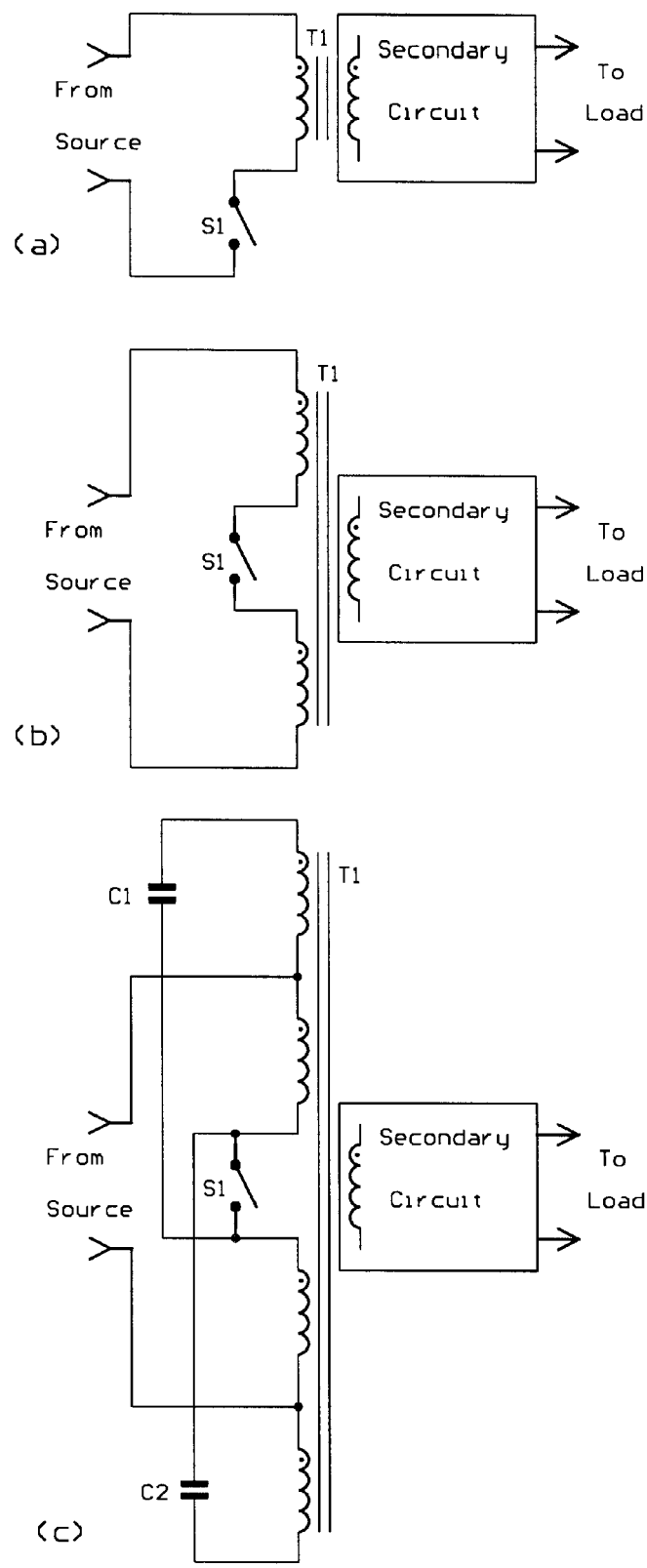

FIG. 19(a) illustrates a forward type primary circuit. The suitable secondary circuits include those illustrated in FIGS. 17(l), 17(m), 17(n), 17(o), 17(t), 17(u), 17(v), 17(w), 17(ab), 17(ac), 17(ad), 17(ae), and 17(af).

FIG. 19(b) illustrates the application of the first two steps of the second synthesis method to the FIG. 19(a) circuit wherein improved common mode noise performance due to common mode current cancellation is achieved. The suitable secondary circuits are the same as those suitable for the FIG. 19(a) circuit.

FIG. 19(c) illustrates the continued application of the second synthesis method to the FIG. 19(b) circuit wherein source terminal ripple current cancellation is achieved. The suitable secondary circuits are the same as those suitable for the FIG. 19(a) circuit.

FIG. 20(a) illustrates a coupled inductor buck converter primary circuit. Both or either of the capacitors, CU and CL, can be used to form a working primary circuit. The suitable secondary circuits needed to form a working power converter are illustrated in FIGS. 17(i), 17(j), 17(k), 17(ab), 17(ac), 17(ad), 17(ae), and 17(af).

FIG. 20(b) illustrates the application of the first synthesis method to a three terminal network comprising the two switches and the primary winding of the FIG. 20(a) circuit. With a single primary circuit capacitor, either CU or CL, but not both, a circuit with non-pulsating source terminal current is formed. The suitable secondary circuits are the same as those suitable for FIG. 20(a).

FIG. 20(c) illustrates the application of the third synthesis method to the FIG. 20(a) circuit wherein a circuit with source terminal ripple current cancellation and common mode current cancellation is achieved. A higher degree of common mode current cancellation can be achieved by reduction or elimination of the center leg winding, as illustrated in FIG. 20(d). The suitable secondary circuits are the same as those suitable for FIG. 20(a).

FIG. 21(a) illustrates an active clamp flyback converter primary circuit. One or both of the primary capacitors may be used to form a working primary circuit. The use of capacitor C1 provides an EMI advantage but requires a larger capacitor with a higher voltage rating than required for C2. The suitable secondary circuits are the same as those suitable for FIG. 20(a).

FIG. 21(b) illustrates the application of the first two steps of the second synthesis method to the FIG. 21(a) primary circuit wherein common mode current cancellation is achieved. Any one, two, or three of the primary capacitors may be used. C1 provides the best choice for low EMI, but it has the highest voltage stress, C2 has the lowest voltage stress and the worst EMI. The suitable secondary circuits are the same as those suitable for FIG. 20(a).

FIG. 21(c) illustrates the continued application of the second synthesis method to the FIG. 21(b) circuit wherein terminal ripple current cancellation is achieved. The suitable secondary circuits are the same as those suitable for FIG. 20(a).

FIG. 22(a) illustrates an active clamp single ended forward converter primary circuit. Either or both of the primary capacitors shown may be used to form a working primary circuit. The suitable secondary circuits are the same as those suitable for the FIG. 19(a) primary circuit.

FIG. 22(b) illustrates the application of the first two steps of the second synthesis method to the FIG. 22(a) primary circuit wherein common mode current cancellation is achieved. The suitable secondary circuits are the same as those suitable for the FIG. 19(a) primary circuit.

FIG. 22(c) illustrates the continued application of the second synthesis method to the FIG. 22(b) primary circuit wherein source terminal ripple current cancellation is achieved. The suitable secondary circuits are the same as those suitable for the FIG. 19(a) primary circuit.

FIG. 23(a) illustrates a zero voltage switching active clamp flyback converter primary circuit. One or both of the primary capacitors may be used to form a working power converter. An optional clamp diode is also illustrated in the FIG. 23(a) circuit. The clamp diode clamps ringing associated with the primary inductor and the circuit's parasitic capacitance, including parasitic capacitance associated with the transformer and both the primary and secondary switches. The suitable secondary circuits are the same as those suitable for FIG. 20(a).

FIG. 23(b) illustrates the application of the first two steps of the second synthesis method to the primary winding of the FIG. 23(a) primary circuit wherein common mode current cancellation is achieved. The suitable secondary circuits are the same as those suitable for FIG. 20(a).

FIG. 23(c) illustrates the continued application of the second synthesis method to the FIG. 23(b) circuit wherein source terminal ripple current cancellation is achieved. The suitable secondary circuits are the same as those suitable for FIG. 20(a).

FIG. 23(d) illustrates the application of the first synthesis method to a three terminal network comprising the primary capacitor, primary switches, and primary inductor of the FIG. 23(a) primary circuit. The FIG. 23(d) circuit achieves non-pulsating source terminal currents. The suitable secondary circuits are the same as those suitable for FIG. 20(a).

FIG. 23(e) illustrates the application of the second synthesis method to the primary inductor of the FIG. 23(a) circuit wherein source terminal ripple current cancellation is achieved. The suitable secondary circuits are the same as those suitable for FIG. 20(a).

FIG. 23(f) illustrates the application of the second synthesis method to a winding network comprising the series combination of the primary inductor and the primary winding of the T1 transformer wherein both common mode current cancellation and source terminal ripple current cancellation are achieved. The suitable secondary circuits are the same as those suitable for FIG. 20(a).

FIG. 24(a) illustrates a zero voltage switching active clamp forward converter primary circuit. One or both of the primary capacitors may be used to form a working power converter. An optional clamp diode is also illustrated in the FIG. 24(a) circuit. The clamp diode clamps ringing associated with the primary inductor and the circuit's parasitic capacitance, including parasitic capacitance associated with the transformer and both the primary and secondary switches. The suitable secondary circuits are the same as those suitable for the FIG. 19(a) primary circuit.

FIG. 24(b) illustrates the application of the first two steps of the second synthesis method to the primary winding of the FIG. 24(a) primary circuit wherein common mode current cancellation is achieved. The suitable secondary circuits are the same as those suitable for the FIG. 19(a) primary circuit.

FIG. 24(c) illustrates the continued application of the second synthesis method to the FIG. 24(b) circuit wherein source terminal ripple current cancellation is achieved. The suitable secondary circuits are the same as those suitable for the FIG. 19(a) primary circuit.

FIG. 24(d) illustrates the application of the first synthesis method to a three terminal network comprising the primary capacitor, primary switches, and primary inductor of the FIG. 24(a) primary circuit. The FIG. 24(d) circuit achieves non-pulsating source terminal currents. The suitable secondary circuits are the same as those suitable for the FIG. 19(a) primary circuit.

FIG. 24(e) illustrates the application of the second synthesis method to the primary inductor of the FIG. 24(a) circuit wherein source terminal ripple current cancellation is achieved. The suitable secondary circuits are the same as those suitable for the FIG. 19(a) primary circuit.

FIG. 24(f) illustrates the application of the second synthesis method to a winding network comprising the series combination of the primary inductor and the primary winding of the T1 transformer wherein both common mode current cancellation and source terminal ripple current cancellation are achieved. The suitable secondary circuits are the same as those suitable for the FIG. 19(a) primary circuit.

FIG. 25(a) illustrates a zero voltage switching coupled inductor buck converter primary circuit. One or both of the primary capacitors shown may be used to form a working power converter. The optional diode clamps parasitic ringing. The suitable secondary circuits are the same as those suitable for the FIG. 20(a) primary circuit.

FIG. 25(b) illustrates the application of the first synthesis method to a three terminal network comprising the two primary switches an d the primary inductor of the FIG. 25(a) circuit. The FIG. 25(b) circuit achieves non-pulsating source terminal current if one, but not both, of the primary capacitors are used. There are two optional clamp diodes for eliminating parasitic ringing. The combination of the diode DCL2 and the CU capacitor should not be used because the achievement of non-pulsating source terminal current will be lost with that combination. The suitable secondary circuits are the same as those suitable for the FIG. 20(a) primary circuit.

FIG. 25(c) illustrates the application of the third synthesis method to the primary inductor of the FIG. 25(a) primary circuit wherein source terminal ripple current cancellation is achieved. The suitable secondary circuits are the same as those suitable for the FIG. 20(a) primary circuit.

FIG. 25(d) illustrates the application of the first synthesis method to a three terminal network comprising the two primary switches and the primary winding of the T1 transformer of the FIG. 25(a) circuit. The suitable secondary circuits are the same as those suitable for the FIG. 20(a) primary circuit.

FIG. 25(e) illustrates the application of the third synthesis method to the primary winding of the T1 transformer of the FIG. 25(a) primary circuit wherein common mode current cancellation and source terminal ripple current cancellation are achieved. The suitable secondary circuits are the same as those suitable for the FIG. 20(a) primary circuit.

FIG. 25(f) illustrates the application of the third synthesis method to a winding network comprising the series combination of the primary inductor and the primary winding of the T1 transformer of the FIG. 25(a) primary circuit wherein common mode current cancellation and source terminal ripple current cancellation are achieved. Either or both of the optional clamp diodes shown may be used to provide clamping of parasitic ringing. The suitable secondary circuits are the same as those suitable for the FIG. 20(a) primary circuit.

FIG. 25(g) illustrates the application of the first synthesis method to the FIG. 25(a) circuit in which all of the original primary winding is eliminated to achieve an improved level of common mode current cancellation. The suitable secondary circuits are the same as those suitable for the FIG. 20(a) primary circuit.

FIG. 25(h) illustrates the application of the third synthesis method to the transformer primary winding of the FIG. 25(a) circuit eliminating the center leg primary transformer winding to achieve an improved level of common mode current cancellation by comparison to the FIG. 25(e) circuit. The suitable secondary circuits are the same as those suitable for the FIG. 20(a) primary circuit.

FIG. 25(i) illustrates the application of the third synthesis method to a winding network comprising the series combination of primary inductor and primary transformer winding of the FIG. 25(a) circuit, eliminating the center leg windings to achieve an improved level of common mode current cancellation by comparison to the FIG. 25(f) circuit. The suitable secondary circuits are the same as those suitable for FIG. 20(a).

FIG. 26(a) illustrates an active clamp interleaved coupled inductor buck primary circuit. One or both of the primary capacitors shown can be used to form a working power converter. In most cases the two secondary circuits will have the same form, but in this case the T2 transformer stores DC energy and the T1 transformer's DC energy storage is zero. The suitable secondary circuits for use with T1 transformer are the same as those suitable for the FIG. 18(a) circuit. The suitable secondary circuits for the T2 transformer include all of the secondaries suitable for FIG. 20(a) plus FIGS. 17(p), 17(q), and 17(r).

FIG. 26(b) illustrates the application of the first two steps of the second synthesis method to a winding network comprising the series combination of the T1 primary winding and the T2 primary winding of the FIG. 26(a) primary circuit wherein common mode current cancellation is achieved. The suitable secondary circuits are the same as those suitable for FIG. 26(a).

FIG. 26(c) illustrates the continued application of the second synthesis method to the FIG. 26(b) primary circuit wherein source terminal ripple current cancellation is achieved. The suitable secondary circuits are the same as those suitable for use with the FIG. 26(a) primary circuit.

FIG. 27(a) illustrates a zero voltage switching active clamp coupled inductor buck primary circuit. One or both of the primary capacitors may be used to form a working power conversion circuit. The optional clamp diode in the primary circuit is used to clamp parasitic ringing. The suitable secondary circuits are the same as those suitable for use with the FIG. 20(a) primary circuit.

FIG. 27(b) illustrates a zero voltage switching active clamp coupled inductor buck primary circuit with common mode current cancellation achieved by applying the second synthesis method to the winding network comprising the series connection of the two primary windings of the FIG. 27(a) circuit. The suitable secondary circuits are the same as those suitable for use with the FIG. 20(a) primary circuit.

FIG. 27(c) illustrates a zero voltage switching active clamp coupled inductor buck primary circuit with terminal ripple current cancellation achieved by applying the second synthesis method to the winding network comprising the series connection of the two primary windings of the FIG. 27(a) circuit. The suitable secondary circuits are the same as those suitable for use with the FIG. 20(a) primary circuit.

FIG. 27(d) illustrates a zero voltage switching active clamp coupled inductor buck primary circuit with non-pulsating terminal currents by applying the first synthesis method to the primary inductor of the FIG. 27(a) circuit. The suitable secondary circuits are the same as those suitable for use with the FIG. 20(a) primary circuit.

FIG. 27(e) illustrates a zero voltage switching active clamp coupled inductor buck primary circuit with terminal ripple current cancellation achieved by applying the second synthesis method to the primary inductor of the FIG. 27(a) circuit. The suitable secondary circuits are the same as those suitable for use with the FIG. 20(a) primary circuit.

FIG. 27(f) illustrates a zero voltage switching active clamp coupled inductor buck primary circuit with terminal ripple current cancellation achieved by applying the second synthesis method to the primary inductor of the FIG. 27(b) circuit. The suitable secondary circuits are the same as those suitable for use with the FIG. 20(a) primary circuit.

FIG. 27(g) illustrates a zero voltage switching active clamp coupled inductor buck primary circuit with non-pulsating terminal currents achieved by applying the first synthesis method to the primary inductor of the FIG. 27(b) circuit. The suitable secondary circuits are the same as those suitable for use with the FIG. 20(a) primary circuit.

FIG. 27(h) illustrates a zero voltage switching active clamp coupled inductor buck primary circuit with non-pulsating terminal currents achieved by applying the first synthesis method to the primary inductor of the FIG. 27(a) circuit. The FIG. 27(h) circuit differs from the FIG. 27(d) circuit in that the original winding is entirely eliminated which provides for a simpler circuit. The suitable secondary circuits are the same as those suitable for use with the FIG. 20(a) primary circuit.

FIG. 27(i) illustrates a zero voltage switching active clamp coupled inductor buck primary circuit with terminal ripple current cancellation achieved by applying the second synthesis method to the primary inductor of the FIG. 27(a) circuit. The FIG. 27(i) circuit differs from the FIG. 27(e) circuit in that the original winding is entirely eliminated which provides for a simpler circuit. The suitable secondary circuits are the same as those suitable for use with the FIG. 20(a) primary circuit.

FIG. 27(j) illustrates a zero voltage switching active clamp coupled inductor buck primary circuit with terminal ripple current cancellation achieved by applying the second synthesis method to the primary inductor of the FIG. 27(b) circuit. The FIG. 27(j) circuit differs from the FIG. 27(f) circuit in that the original winding is entirely eliminated which provides for a simpler circuit. The suitable secondary circuits are the same as those suitable for use with the FIG. 20(a) primary circuit.

FIG. 27(k) illustrates a zero voltage switching active clamp coupled inductor buck primary circuit with non-pulsating terminal currents achieved by applying the first synthesis method to the primary inductor of the FIG. 27(b) circuit. The FIG. 27(k) circuit differs from the FIG. 27(g) circuit in that the original winding is entirely eliminated which provides for a simpler circuit. The suitable secondary circuits are the same as those suitable for use with the FIG. 20(a) primary circuit.

FIG. 27(l) illustrates a zero voltage switching active clamp coupled inductor buck primary circuit with common mode and terminal ripple current cancellation achieved by applying the second synthesis method to the winding network comprising the series connection of the two transformer primary windings and the primary inductor of the FIG. 27(a) circuit. The suitable secondary circuits are the same as those suitable for use with the FIG. 20(a) primary circuit.

FIG. 28(a) illustrates a half bridge primary circuit with a single winding in the center leg. Suitable secondary circuits include those illustrated in FIGS. 17(a) through 17(k), 17(s), and 17(x) through 17(ax).

FIG. 28(b) illustrates a half bridge primary circuit with a single winding in the center leg with terminal ripple current cancellation achieved by applying the third synthesis method to the FIG. 28(a) circuit. The suitable secondary circuits are the same as those suitable for use with the FIG. 28(a) primary circuit.

FIG. 28(c) illustrates a half bridge primary circuit with terminal ripple current cancellation achieved by applying the third synthesis method to the FIG. 28(a) circuit. The suitable secondary circuits are the same as those suitable for use with the FIG. 28(a) primary circuit.

FIG. 29(a) illustrates a zero voltage switching asymmetrical half bridge primary circuit. The suitable secondary circuits are illustrated in FIGS. 17(a), 17(c), 17(e), 17(f), and 17(h) through 17(k).

FIG. 29(b) illustrates a zero voltage switching asymmetrical half bridge primary circuit with terminal ripple current cancellation achieved by applying the third synthesis method to the transformer primary winding of the FIG. 29(a) circuit. The suitable secondary circuits are illustrated in FIGS. 17(a), 17(c), 17(e), 17(f), and 17(h) through 17(k).

FIG. 29(c) illustrates a zero voltage switching asymmetrical half bridge primary circuit with terminal ripple current cancellation achieved by applying the third synthesis method to the primary inductor of the FIG. 29(a) circuit. The suitable secondary circuits are the same as those suitable for use with the FIG. 29(a) primary circuit.

FIG. 29(d) illustrates a zero voltage switching asymmetrical half bridge primary circuit with terminal ripple current cancellation achieved by applying the third synthesis method to a winding network comprising the series combination of the primary inductor and the transformer primary winding of the FIG. 29(a) circuit. The suitable secondary circuits are the same as those suitable for use with the FIG. 29(a) primary circuit.

FIG. 29(e) illustrates a zero voltage switching asymmetrical half bridge primary circuit with terminal ripple current cancellation achieved by applying the third synthesis method to the transformer primary winding of the FIG. 29(a) circuit. The FIG. 29(e) circuit differs from the FIG. 29(b) circuit in that the center leg transformer primary winding has been eliminated which simplifies the circuit and provides improved common mode current cancellation. The suitable secondary circuits are the same as those suitable for use with the FIG. 29(a) primary circuit.

FIG. 29(f) illustrates a zero voltage switching asymmetrical half bridge primary circuit with terminal ripple current cancellation achieved by applying the third synthesis method to the primary inductor of the FIG. 29(a) circuit. The FIG. 29(f) circuit differs from the FIG. 29(c) circuit in that the center leg primary inductor winding has been eliminated which simplifies the circuit. The suitable secondary circuits are the same as those suitable for use with the FIG. 29(a) primary circuit.

FIG. 29(g) illustrates a zero voltage switching asymmetrical half bridge primary circuit with terminal ripple current cancellation achieved by applying the third synthesis method to a winding network comprising the series combination of the primary inductor and the transformer primary winding of the FIG. 29(a) circuit. The FIG. 29(g) circuit differs from the FIG. 29(d) circuit in that the center leg primary inductor winding and the transformer primary center leg winding have been eliminated which simplifies the circuit and provides for improved common mode current cancellation. The suitable secondary circuits are the same as those suitable for use with the FIG. 29(a) primary circuit.

FIG. 30(a) illustrates an asymmetrical half bridge interleaved coupled inductor buck primary circuit. The suitable secondary circuits are the same as those suitable for the T2 transformer of the FIG. 26(a) circuit.

FIG. 30(b) illustrates an asymmetrical half bridge interleaved coupled inductor buck primary circuit with common mode current and terminal ripple current cancellation achieved by applying the third synthesis method to the winding network comprising the series combination of the two transformer primary windings of the FIG. 30(a) circuit. The suitable secondary circuits are the same as those suitable for the FIG. 30(a) circuit.

FIG. 30(c) illustrates an asymmetrical half bridge interleaved coupled inductor buck primary circuit similar to the FIG. 30(b) circuit but with the center leg windings eliminated thereby improving the common mode current cancellation. The suitable secondary circuits are the same as those suitable for the FIG. 26(a) circuit.

FIG. 31(a) illustrates a zero voltage switching asymmetrical half bridge interleaved coupled inductor buck primary circuit. The suitable secondary circuits are the same as those suitable for the FIG. 20(a) circuit.

FIG. 31(b) illustrates a zero voltage switching asymmetrical half bridge interleaved coupled inductor buck primary circuit with terminal ripple current cancellation achieved by applying the third synthesis method to the primary inductor of the FIG. 31(a) circuit. The suitable secondary circuits are the same as those suitable for the FIG. 20(a) circuit.

FIG. 31(c) illustrates a zero voltage switching asymmetrical half bridge interleaved coupled inductor buck primary circuit with terminal ripple current cancellation achieved by applying the third synthesis method to the winding network comprising the series combination of the primary inductor and the two transformer primary windings of the FIG. 31(a) circuit. The suitable secondary circuits are the same as those suitable for the FIG. 20(a) circuit.

FIG. 31(d) illustrates a simplification of the FIG. 31(b) circuit achieved by eliminating the primary inductor center leg winding as described in the third synthesis method. The suitable secondary circuits are the same as those suitable for the FIG. 20(a) circuit.

FIG. 31(e) illustrates a simplification of the FIG. 31(c) circuit achieved by eliminating all of the center leg windings as described in the third synthesis method. The elimination of the transformer center leg windings improves the common mode current cancellation. The suitable secondary circuits are the same as those suitable for the FIG. 20(a) circuit.

FIG. 32(a) illustrates a full bridge single winding primary circuit. The suitable secondary circuits include those illustrated in FIGS. 17(a) through 17(h), 17(s), 17(x) through 17(aa), and 17(ag) through 17(ax).

FIG. 32(b) illustrates a full bridge primary circuit with terminal ripple current cancellation achieved by applying the fourth synthesis method to the FIG. 32(a) circuit. The suitable secondary circuits are the same as those suitable for the FIG. 32(a) circuit.

FIG. 32(c) illustrates a simplification of the FIG. 32(b) circuit in which the center leg winding is eliminated, the common mode current cancellation is improved, and the number of switches is reduced to two as described in the fourth synthesis method and illustrated in FIG. 9(g). The suitable secondary circuits are the same as those suitable for the FIG. 32(a) circuit.

FIG. 33(a) illustrates a zero voltage switching full bridge primary circuit. The suitable secondary circuits include those illustrated in FIGS. 17(a) through 17(h), and 17(ak) through 17(ax).

FIG. 33(b) illustrates a zero voltage switching full bridge primary circuit with terminal ripple current cancellation achieved by applying the fourth synthesis method to the transformer primary winding of the FIG. 33(a) circuit. The suitable secondary circuits are the same as those suitable for the FIG. 33(a) circuit.

FIG. 33(c) illustrates a zero voltage switching full bridge primary circuit with terminal ripple current cancellation achieved by applying the fourth synthesis method to the primary inductor of the FIG. 33(a) circuit. The suitable secondary circuits are the same as those suitable for the FIG. 33(a) circuit.

FIG. 33(d) illustrates a zero voltage switching full bridge primary circuit with terminal ripple current cancellation achieved by applying the fourth synthesis method to the winding network comprising the series combination of the primary inductor and the transformer primary winding of the FIG. 33(a) circuit. The suitable secondary circuits are the same as those suitable for the FIG. 33(a) circuit.

FIG. 33(e) illustrates a simplification of the FIG. 33(b) circuit in which the center leg winding of the transformer is eliminated achieving improved common mode current cancellation. The suitable secondary circuits are the same as those suitable for the FIG. 33(a) circuit.

FIG. 33(f) illustrates a simplification of the FIG. 33(c) circuit in which the center leg winding of the primary inductor is eliminated. The suitable secondary circuits are the same as those suitable for the FIG. 33(a) circuit.

FIG. 33(g) illustrates a simplification of the FIG. 33(d) circuit in which the center leg windings of both the primary inductor and transformer are eliminated thereby improving the common mode current cancellation of the transformer. The suitable secondary circuits are the same as those suitable for the FIG. 33(a) circuit.

FIG. 34(a) illustrates a full bridge interleaved coupled inductor buck primary circuit. The suitable secondary circuits are the same as those suitable for the FIG. 30(a) circuit.

FIG. 34(b) illustrates a full bridge interleaved coupled inductor buck primary circuit with terminal ripple current cancellation achieved by applying the first synthesis method to each of the primary windings of the transformers of the FIG. 34(a) circuit. The suitable secondary circuits are the same as those suitable for the FIG. 30(a) circuit.

FIG. 34(c) illustrates a simplification of the FIG. 34(b) circuit in which the center leg windings are both eliminated as described in the first synthesis method and two of the switches are eliminated. The switch elimination is possible because, after the elimination of the center leg windings, the SAU and SBL switches are synchronous and positioned in series, so they operate as a single switch with twice the applied voltage. The SBU and SAL switches also operate as a single switch with twice the applied voltage. The suitable secondary circuits are the same as those suitable for the FIG. 30(a) circuit.

FIG. 34(d) illustrates a full bridge interleaved coupled inductor buck primary circuit with terminal ripple current cancellation achieved by applying the fourth synthesis method to the winding network comprising the series combination of the two transformer primary windings of the FIG. 34(a) circuit. The suitable secondary circuits are the same as those suitable for the FIG. 30(a) circuit.

FIG. 34(e) illustrates a simplification of the FIG. 34(d) circuit whereby the center leg windings are eliminated and series combinations of switches are combined to form single switches thereby eliminating two of the four switches. The suitable secondary circuits are the same as those suitable for the FIG. 30(a) circuit.

FIG. 35(a) illustrates a parallel transformer with primary inductor primary circuit. The suitable secondary circuits are the same as those suitable for the FIG. 20(a) circuit.

FIG. 35(b) illustrates a parallel transformer with primary inductor primary circuit with terminal ripple current cancellation achieved by applying the fourth synthesis method to the primary inductor of the FIG. 35(a) circuit. The suitable secondary circuits are the same as those suitable for the FIG. 20(a) circuit.

FIG. 35(c) illustrates a parallel transformer with primary inductor primary circuit with terminal ripple current cancellation achieved by applying the fourth synthesis method to a winding network comprising the parallel combination of transformer primary windings of the FIG. 35(a) circuit. The suitable secondary circuits are the same as those suitable for the FIG. 20(a) circuit.

FIG. 35(d) illustrates a parallel transformer with primary inductor primary circuit with terminal ripple current cancellation achieved by applying the fourth synthesis method to a winding network comprising the series combination of the primary inductor and the parallel combination of the two transformer primary windings of the FIG. 35(a) circuit. The suitable secondary circuits are the same as those suitable for the FIG. 20(a) circuit.

FIG. 35(e) illustrates a simplification of the FIG. 35(b) circuit in which the center leg primary inductor winding is eliminated. The suitable secondary circuits are the same as those suitable for the FIG. 20(a) circuit.

FIG. 35(f) illustrates a simplification of the FIG. 35(c) circuit in which the center leg transformer primary windings are eliminated thereby achieving a higher level of common mode current cancellation. The suitable secondary circuits are the same as those suitable for the FIG. 20(a) circuit.

FIG. 35(g) illustrates a simplification of the FIG. 35(d) circuit in which all of the center leg windings are eliminated thereby achieving a higher level of common mode current cancellation. The suitable secondary circuits are the same as those suitable for the FIG. 20(a) circuit.

FIG. 36(a) illustrates a zero voltage switching full bridge interleaved coupled inductor buck primary circuit. The suitable secondary circuits are the same as those suitable for the FIG. 31(a) circuit.

FIG. 36(b) illustrates a zero voltage switching full bridge interleaved coupled inductor buck primary circuit with terminal ripple current cancellation achieved by applying the fourth synthesis method to the primary inductor of the FIG. 36(a) circuit. The suitable secondary circuits are the same as those suitable for the FIG. 31(a) circuit.

FIG. 36(c) illustrates a zero voltage switching full bridge interleaved coupled inductor buck primary circuit with terminal ripple current cancellation achieved by applying the first synthesis method to each of the transformer primary windings of the FIG. 36(a) circuit. The suitable secondary circuits are the same as those suitable for the FIG. 31(a) circuit.

FIG. 36(d) illustrates a simplification of the FIG. 36(b) circuit in which the center leg winding of the primary induct or is eliminated. The suitable secondary circuits are the same as those suitable for the FIG. 31(a) circuit.

FIG. 36(e) illustrates a simplification of the FIG. 36(c) circuit in which the center leg transformer windings are eliminated. The suitable secondary circuits are the same as those suitable for the FIG. 31(a) circuit.

FIG. 36(f) illustrates a zero voltage switching full bridge interleaved coupled inductor buck primary circuit with terminal ripple current cancellation achieved by applying the fourth synthesis method to a winding network comprising the series combination of the primary inductor and the two transformer primary windings of FIG. 36(a). The suitable secondary circuits are the same as those suitable for the FIG. 31(a) circuit.

FIG. 36(g) illustrates a simplification of the FIG. 36(f) circuit whereby the center leg windings are eliminated according to the fourth synthesis method. The simplified circuit achieves a higher level of common mode current cancellation than the FIG. 36(f) circuit. The suitable secondary circuits are the same as those suitable for the FIG. 31(a) circuit.

FIG. 37(a) illustrates a stacked full bridge buck AC amplifier. The load current is non-pulsating but the input source terminal currents are pulsating.

FIG. 37(b) illustrates the application of the fifth synthesis method to the FIG. 37(a) circuit. The FIG. 37(b) circuit achieves non-pulsating terminal currents at both source terminals and both load terminals.

FIG. 37(c) illustrates the FIG. 37(b) circuit with a pair of windings and a pair of capacitors added in order to achieve output terminal ripple current cancellation.

FIG. 37(d) illustrates the FIG. 37(c) circuit with a pair of windings and a pair of capacitors added in order to achieve both source and load terminal ripple current cancellation.

FIG. 38(a) illustrates a stacked full bridge single winding primary circuit. The suitable secondary circuits are the same as those suitable for the FIG. 32(a) circuit.

FIG. 38(b) illustrates a stacked full bridge single winding primary circuit with non-pulsating input terminal ripple current achieved by applying the fifth synthesis method to FIG. 38(a). The suitable secondary circuits are the same as those suitable for the FIG. 32(a) circuit.

FIG. 38(c) illustrates a stacked full bridge single winding primary circuit with input terminal ripple current cancellation achieved by applying the fifth synthesis method to FIG. 38(a). The suitable secondary circuits are the same as those suitable for the FIG. 32(a) circuit.

FIG. 38(d) illustrates a simplification of the FIG. 38(b) circuit in which the center leg winding is eliminated and two of the windings connected in series are combined into a single winding with twice the number of turns of one of the original windings. The suitable secondary circuits are the same as those suitable for the FIG. 32(a) circuit.

FIG. 39(a) illustrates a zero voltage switching stacked full bridge primary circuit. The suitable secondary circuits are the same as those suitable for the FIG. 33(a) circuit.

FIG. 39(b) illustrates a zero voltage switching stacked full bridge primary circuit with non-pulsating input terminal current achieved by applying the fifth synthesis method to the primary transformer winding of the FIG. 39(a) circuit. The suitable secondary circuits are the same as those suitable for the FIG. 33(a) circuit.

FIG. 39(c) illustrates a zero voltage switching stacked full bridge primary circuit with non-pulsating input terminal current achieved by applying the fifth synthesis method to the primary inductor of the FIG. 39(a) circuit. The suitable secondary circuits are the same as those suitable for the FIG. 33(a) circuit.

FIG. 39(d) illustrates a zero voltage switching stacked full bridge primary circuit with non-pulsating input terminal current achieved by applying the fifth synthesis method to a winding network comprising the series combination of the primary inductor and the transformer primary winding of the FIG. 39(a) circuit. The suitable secondary circuits are the same as those suitable for the FIG. 33(a) circuit.

FIG. 39(e) illustrates a zero voltage switching stacked full bridge primary circuit with input terminal ripple current cancellation achieved by applying the fifth synthesis method to a winding network comprising the series combination of the primary inductor and the transformer primary winding of the FIG. 39(a) circuit. The suitable secondary circuits are the same as those suitable for the FIG. 33(a) circuit.

FIG. 39(f) illustrates a simplification of the FIG. 39(b) circuit achieved by eliminating the center leg transformer primary winding and combining two of the series connected transformer primary windings into a single winding equivalent to the two original windings. The suitable secondary circuits are the same as those suitable for the FIG. 33(a) circuit.

FIG. 39(g) illustrates a simplification of the FIG. 39(c) circuit achieved by eliminating the center leg primary inductor winding and combining two of the series connected primary inductor windings into a single winding equivalent to the two original windings. The suitable secondary circuits are the same as those suitable for the FIG. 33(a) circuit.

FIG. 39(h) illustrates a simplification of the FIG. 39(d) circuit achieved by eliminating all of the center leg windings and combining two of the series connected transformer primary windings into a single winding equivalent to the two original windings. The suitable secondary circuits are the same as those suitable for the FIG. 33(a) circuit.

FIG. 40(a) illustrates a stacked full bridge interleaved coupled inductor buck primary circuit. The suitable secondary circuits are the same as those suitable for the FIG. 30(a) circuit.

FIG. 40(b) illustrates a stacked full bridge interleaved coupled inductor buck primary circuit with non-pulsating source terminal currents achieved by applying the first synthesis method to each of the transformer primary windings in the FIG. 40(a) circuit. The suitable secondary circuits are the same as those suitable for the FIG. 30(a) circuit.

FIG. 40(c) illustrates a simplification of the FIG. 40(b) primary circuit in which the center leg windings are eliminated. The suitable secondary circuits are the same as those suitable for the FIG. 30(a) circuit. FIG. 40(d) illustrates a stacked full bridge interleaved coupled inductor buck primary circuit with non-pulsating source terminal currents achieved by applying the fifth synthesis method to a winding network comprising the series connection of the two transformer primary windings in the FIG. 40(a) circuit. The suitable secondary circuits are the same as those suitable for the FIG. 30(a) circuit.

FIG. 40(e) illustrates a stacked full bridge interleaved coupled inductor buck primary circuit with source terminal ripple current cancellation achieved by applying the fifth synthesis method to a winding network comprising the series connection of the two transformer primary windings in the FIG. 40(a) circuit. The suitable secondary circuits are the same as those suitable for the FIG. 30(a) circuit.

FIG. 40(f) illustrates a simplification of the FIG. 40(d) circuit in which the center leg windings are eliminated and two of the series connected windings of the T1 transformer connected between the SAL switch and the SBU switch are combined into a single winding equivalent to the two original windings. The suitable secondary circuits are the same as those suitable for the FIG. 30(a) circuit.

FIG. 41(a) illustrates a stacked full bridge parallel transformer primary inductor primary circuit. The suitable secondary circuits are the same as those suitable for the FIG. 35(a) circuit.

FIG. 41(b) illustrates a stacked full bridge parallel transformer primary inductor primary circuit with non-pulsating source terminal currents achieved by applying the fifth synthesis method to the primary inductor of FIG. 41(a). The suitable secondary circuits are the same as those suitable for the FIG. 35(a) circuit.

FIG. 41(c) illustrates a stacked full bridge parallel transformer primary inductor primary circuit with non-pulsating source terminal currents achieved by applying the fifth synthesis method to the winding network comprising the parallel combination of the two transformer primary windings of FIG. 41(a). The suitable secondary circuits are the same as those suitable for the FIG. 35(a) circuit.

FIG. 41(d) illustrates a stacked full bridge parallel transformer primary inductor primary circuit with non-pulsating source terminal currents achieved by applying the fifth synthesis method to the winding network comprising the combination of the two parallel transformer primary windings and the series connected primary inductor of FIG. 41(a). The suitable secondary circuits are the same as those suitable for the FIG. 35(a) circuit.

FIG. 41(e) illustrates a stacked full bridge parallel transformer primary inductor primary circuit with source terminal ripple current cancellation achieved by applying the fifth synthesis method to the primary inductor of FIG. 41(a). The suitable secondary circuits are the same as those suitable for the FIG. 35(a) circuit.

FIG. 41(f) illustrates a simplification of the FIG. 41(b) circuit in which the center leg primary inductor winding is eliminated and the two series connected primary inductor windings, connected between the SAL switch and the SBU switch, are combined into a single winding equivalent to the two original windings. The suitable secondary circuits are the same as those suitable for the FIG. 35(a) circuit.

FIG. 41(g) illustrates a simplification of the FIG. 41(c) circuit in which the center leg transformer primary windings are eliminated and the two series connected transformer primary winding pairs, connected between the SAL switch and the SBU switch, are combined into a single winding pair equivalent to the two original winding pairs. The suitable secondary circuits are the same as those suitable for the FIG. 35(a) circuit.

FIG. 41(h) illustrates a simplification of the FIG. 41(d) circuit in which all of the center leg windings are eliminated and the two series connected transformer primary winding pairs, connected between the SAL switch and the SBU switch, are combined into a single winding pair equivalent to the two original winding pairs. The suitable secondary circuits are the same as those suitable for the FIG. 35(a) circuit.

FIG. 42(a) illustrates a zero voltage switching interleaved coupled inductor buck primary circuit. The suitable secondary circuits are the same as those suitable for the FIG. 31(a) circuit.

FIG. 42(b) illustrates a zero voltage switching interleaved coupled inductor buck primary circuit with non-pulsating source terminal currents achieved by applying the fifth synthesis method to the primary inductor of the FIG. 42(a) circuit. The suitable secondary circuits are the same as those suitable for the FIG. 31(a) circuit.

FIG. 42(c) illustrates a zero voltage switching interleaved coupled inductor buck primary circuit with non-pulsating source terminal currents achieved by applying the fifth synthesis method to the winding network comprising the series connection of the primary windings of the two transformers of the FIG. 42(a) circuit. The suitable secondary circuits are the same as those suitable for the FIG. 31(a) circuit.

FIG. 42(d) illustrates a zero voltage switching interleaved coupled inductor buck primary circuit with non-pulsating source terminal currents achieved by applying the fifth synthesis method to the winding network comprising the series connection of the primary inductor and primary windings of the two transformers of the FIG. 42(a) circuit. The suitable secondary circuits are the same as those suitable for the FIG. 31(a) circuit.

FIG. 42(e) illustrates a zero voltage switching interleaved coupled inductor buck primary circuit with source terminal ripple current cancellation achieved by applying the fifth synthesis method to the primary inductor of the FIG. 42(a) circuit. The suitable secondary circuits are the same as those suitable for the FIG. 31(a) circuit.

FIG. 42(f) illustrates a zero voltage switching interleaved coupled inductor buck primary circuit with non-pulsating source terminal currents achieved by applying the first synthesis method to each of the primary windings of the two transformers of the FIG. 42(a) circuit. The suitable secondary circuits are the same as those suitable for the FIG. 31(a) circuit.

FIG. 42(g) illustrates a simplification of the FIG. 42(f) circuit in which the center leg primary windings are eliminated. The suitable secondary circuits are the same as those suitable for the FIG. 31(a) circuit.

FIG. 42(h) illustrates a simplification of the FIG. 42(b) circuit in which the center leg winding of the primary inductor is eliminated and the two windings series connected between the SAL switch and the SBU switch are combined into a single winding equivalent to the two original windings. The suitable secondary circuits are the same as those suitable for the FIG. 31(a) circuit.

FIG. 42(i) illustrates a simplification of the FIG. 42(c) circuit in which the center leg windings of the transformers are eliminated and the two T1 transformer windings, connected in series between the SAL switch and the SBU switch, are combined into a single winding equivalent to the two original T1 windings. The suitable secondary circuits are the same as those suitable for the FIG. 31(a) circuit.

FIG. 42(j) illustrates a simplification of the FIG. 42(d) circuit in which all of the center leg windings are eliminated and the two T1 transformer windings, connected in series between the SAL switch and the SBU switch, are combined into a single winding equivalent to the two original T1 windings. The suitable secondary circuits are the same as those suitable for the FIG. 31(a) circuit.

FIG. 43(a) illustrates a full bridge parallel transformer primary circuit. The suitable secondary circuits include FIGS. 17(i) through 17(o) and 17(ab) through 17(af). With the secondary circuits illustrated in FIGS. 17(ab) through 17(af) zero voltage switching can be achieved.

FIG. 43(b) illustrates a full bridge parallel transformer primary circuit with source terminal ripple current cancellation achieved by applying the fourth synthesis method to the winding network comprising the parallel transformer primary windings of FIG. 43(a). The suitable secondary circuits are the same as those suitable for the FIG. 43(a) circuit.

FIG. 43(c) illustrates a simplification of the FIG. 43(b) circuit in which the center leg windings are eliminated which also provides a higher level of common mode current cancellation. The suitable secondary circuits are the same as those suitable for the FIG. 43(a) circuit.

FIG. 43(d) illustrates a further simplification of the FIG. 43(c) circuit by eliminating two of the four switches. The elimination of the two switches precludes zero voltage switching. The suitable secondary circuits are the same as those suitable for the FIG. 43(a) circuit.

FIG. 44(a) illustrates a stacked full bridge parallel transformer primary circuit. The suitable secondary circuits are the same as those suitable for the FIG. 43(a) circuit.

FIG. 44(b) illustrates a stacked full bridge parallel transformer primary circuit with non-pulsating source terminal currents achieved by applying the fifth synthesis method to the winding network comprising the parallel transformer primary windings of FIG. 44(a). The suitable secondary circuits are the same as those suitable for the FIG. 43(a) circuit.

FIG. 44(c) illustrates a simplification of the FIG. 44(b) circuit in which the center leg windings are eliminated and the two pairs of parallel windings connected in series between the SAL switch and the SBU switch are combined into a single pair of parallel windings equivalent to the original two pairs of parallel windings. The suitable secondary circuits are the same as those suitable for the FIG. 43(a) circuit.

FIG. 44(d) illustrates a stacked full bridge parallel transformer primary circuit with source terminal ripple current cancellation achieved by applying the fifth synthesis method to the winding network comprising the parallel transformer primary windings of FIG. 44(a). The suitable secondary circuits are the same as those suitable for the FIG. 43(a) circuit.

FIG. 45(a) illustrates a split capacitor stacked full bridge primary circuit with a single primary winding. The suitable secondary circuits are the same as those suitable for the FIG. 32(a) circuit.

FIG. 45(b) illustrates a zero voltage switching split capacitor stacked full bridge primary circuit. The suitable secondary circuits are the same as those suitable for the FIG. 33(a) circuit.

FIG. 45(c) illustrates a split capacitor stacked full bridge interleaved coupled inductor buck primary circuit. The suitable secondary circuits are the same as those suitable for the FIG. 30(a) circuit.

FIG. 45(d) illustrates a zero voltage switching split capacitor stacked full bridge interleaved coupled inductor buck primary circuit. The suitable secondary circuits are the same as those suitable for the FIG. 31(a) circuit.

FIG. 46(a) illustrates a single transformer push pull primary circuit. The suitable secondary circuits are the same as those suitable for the FIG. 32(a) circuit.

FIG. 46(b) illustrates a single transformer push pull primary circuit with source terminal ripple current cancellation and common mode current cancellation achieved by applying the second synthesis method to each of the two parallel networks of FIG. 46(a). The suitable secondary circuits are the same as those suitable for the FIG. 32(a) circuit.

FIG. 47(a) illustrates a push pull interleaved coupled inductor buck converter primary circuit. The suitable secondary circuits are the same as those suitable for the FIG. 18(a) circuit.

FIG. 47(b) illustrates a push pull interleaved coupled inductor buck converter primary circuit with source terminal ripple current cancellation achieved by applying the second synthesis method to the winding network comprising the series combination of the two transformer primary windings of the FIG. 47(a) circuit. The suitable secondary circuits are the same as those suitable for the FIG. 18(a) circuit.

Conclusions, Ramifications, and Scope of Invention

Thus the reader will see that the synthesis methods of the subject invention provide simple techniques for synthesizing new power converter circuits with improved electromagnetic compatibility from known power converter circuits with electromagnetic compatibility deficiencies. In addition, in every case, these results can be achieved without adding magnetic cores.

While my above description contains many specificities and candidate circuits to which the synthesis methods can be applied, these should not be construed as limitations on the scope of the invention, but rather as exemplifications or preferred embodiments thereof. Many other variations are possible. Many known power conversion circuits to which the synthesis methods can be applied were not included herein as candidate circuits to which the synthesis methods are applicable. The large number of examples included herein should be considered as proof of the universal applicability of the synthesis methods. Previously unknown improved circuits that can be formed by application of the synthesis methods to known circuits should be considered as embodiments of this invention. For example, DC to DC converters similar to those shown but which have alternate capacitor connections yielding similar converters with equivalent AC wave forms but different DC capacitor voltages, DC to DC converters, similar to those shown in the drawings, but where the DC input source is instead a varying rectified AC signal, converters with multiple isolated outputs, cascaded converters containing multiple connected conversion networks of the type revealed here, converters in which the output is an AC voltage with a frequency less than the switching frequency of the power conversion network, converters similar to those described here but with one or both of the switches replaced by zero voltage transition switching cells. Accordingly, the scope of the invention should be determined not by the embodiments illustrated, but by the appended claims and their legal equivalents.

I claim:

1. A synthesis method for improving terminal current properties of power conversion networks applicable to an original three terminal power conversion network having, a first power conversion network terminal a second power conversion network terminal for which terminal voltage of said second power conversion network terminal differs from terminal voltage of said first power conversion network terminal by a DC voltage, a third power conversion network terminal, a first winding network, having first and second terminals, connected in series with said third power conversion network terminal, said first wind network having a single winding or a combination of windings connected to each other in a series and/or parallel structure, comprising the steps of, (a) add a second winding network, having first and second terminals, of the same structure as said first winding network with said first terminal of said second winding network connected to said first power conversion network terminal, (b) add a third winding network, having first and second terminals, of the same structure as said first winding network with said first terminal of said third winding network connected to said second power conversion network terminal, (c) add a first capacitor, having first and second terminals, with said first terminal of said first capacitor connected to said first power conversion network terminal and with said second terminal of said first capacitor connected to said second power conversion network terminal, if said original three terminal power conversion network does not already comprise a capacitor connecting said first power conversion network terminal to said second power conversion network terminal, whereby a new three terminal power conversion network, defined by said third power conversion network terminal, said second terminal of said second winding network, and said second terminal of said third winding network, is formed with reduced terminal current ripple by comparison to said original three terminal power conversion network.

2. The synthesis method of claim 1 further comprising the following step, (d) reduce the component value of the winding of said first winding network, or eliminate said first winding network by replacing said first winding network with a conducting path or lead, whereby said component value refers to winding inductance and component size, cost, and weight are reduced or eliminated by reducing said component value or eliminating said first winding network.

3. The synthesis method of claim 1 further comprising the following step, (e) magnetically couple a winding of one of said winding networks to a corresponding winding of one of said other winding networks, whereby the number of magnetic cores required to implement said three terminal power conversion network is reduced and by repeated application of step (e) if there are more than two windings in said new three terminal power conversion network.

4. The synthesis method of claim 1 further comprising the following steps, (f) add a fourth winding network, having first and second terminals, of the same structure as said first winding network with said first terminal of said fourth winding network connected to said second terminal of said second winding network, (g) add a second capacitor, having first and second terminals, with said first terminal of said second capacitor connected to said second terminal of said fourth winding network and with said second terminal of said second capacitor connected to said second terminal of said first winding network, (h) add a fifth winding network, having first and second terminals, of the same structure as said first winding network with said first terminal of said fifth winding network connected to said second terminal of said third winding network, (i) add a third capacitor, having first and second terminals, with said first terminal of said third capacitor connected to said second terminal of said fifth winding network and with said second terminal of said third capacitor connected to said second terminal of said first winding network, (j) add a sixth winding network, having first and second terminals, of the same structure as said first winding network with said second terminal of said sixth winding network connected to said first terminal of said first winding network, (k) add a fourth capacitor, having first and second terminals, with said first terminal of said fourth capacitor connected to said first terminal of said sixth winding network and with one of said terminals of said fourth capacitor connected to one of said terminals of said first capacitor, whereby terminal current ripple at each network terminal is canceled thereby providing terminal current ripple less than the current ripple of any of said winding networks connected at any of said terminals.

5. A synthesis method for improving the electromagnetic compatibility properties of power conversion networks applicable to an original two terminal power conversion network having,
- a first power conversion network terminal,
- a second power conversion network terminal,
- a first winding network, having first and second terminals, comprising a single winding or a combination of windings connected to each other in a series and/or parallel structure, with said first winding network connected in series with said first power conversion network terminal,
- a first electronic circuit network, having first and second terminals, with said first electronic circuit network connected in series with said first winding network, and, comprising,
  - switch means, comprising the steps of,
- (a) add a second winding network, having first and second terminals, of the same structure as said first winding network with said second terminal of said second winding network connected to said first power conversion network terminal,
- (b) add a third winding network, having first and second terminals, of the same structure as said first winding network with said first terminal of said third winding network connected to said second power conversion network terminal, whereby a new two terminal power conversion network, defined by said second terminal of said third winding network and said first terminal of said second winding network, is formed in which the AC parasitic currents contributed by said first terminal of said third winding network and said second terminal of said second winding network cancel thereby enhancing the electronic compatibility of said new two terminal power conversion network by comparison to said original two terminal power conversion network.

6. The synthesis method of claim 5 applicable to a two terminal power conversion network further comprising,
- a second electronic circuit network magnetically inductively coupled to either all of said winding networks or to said first electronic circuit network.

7. The synthesis method of claim 5 further comprising the following step,
- (e) reduce the component value of the winding of said first winding network, or eliminate said first winding network replacing said first winding network with a conducting path or lead, whereby said component value refers to winding inductance and component size, cost, and weight are reduced or eliminated by reducing said component value or eliminating said first winding network.

8. The synthesis method of claim 5 further comprising the following step,
- (f) magnetically couple a winding of one of said winding networks to a corresponding winding of one of said other winding networks, whereby the number of magnetic cores required to implement said three terminal power conversion network is reduced and may be further reduced by repeated application of step (f) if there are more than two windings in said two terminal power conversion network.

9. The synthesis method of claim 5 further comprising the following steps,
- (g) add a fourth winding network, having first and second terminals, of the same structure as said first winding network with said second terminal of said fourth winding network connected to said first terminal of said second winding network,
- (h) add a first capacitor, having first and second terminals, with said first terminal of said first capacitor connected to said first terminal of said fourth winding network and with said second terminal of said first capacitor connected to said first terminal of said third winding network, whereby ripple current at said first terminal of said second winding network is reduced by mutual cancellation of ripple current of said second and said fourth winding networks.

10. The synthesis method of claim 5 further comprising the following steps,
- (i) add a fifth winding network, having first and second terminals, of the same structure as said first winding network with said first terminal of said fifth winding network connected to said second terminal of said third winding network,
- (j) add a second capacitor, having first and second terminals, with said first terminal of said second capacitor connected to said second terminal of said fifth winding network and with said second terminal of said second capacitor connected to said second terminal of said second winding network, whereby ripple current at said second terminal of said third winding network is reduced by mutual cancellation of ripple current of said fifth and said third winding networks.

11. The synthesis method of claim 5 applied to an original two terminal push pull power conversion network comprising,
- a first two terminal power conversion network of an original two terminal power conversion network,
- a second parallel connected two terminal power conversion network identical to said first two terminal power conversion network wherein said second two terminal power conversion network is operated 180 degrees out of phase from said first two terminal power conversion network in a push pull manner, further comprising the following steps,
- (k) add a first capacitor, having first and second terminals, with said first terminal of said first capacitor connected to said first terminal of said third winding network of said first two terminal power conversion network and with said second terminal of said first capacitor connected to said second terminal of said second winding network of said second two terminal power conversion network,
- (l) add a second capacitor, having first and second terminals, with said first terminal of said second capacitor connected to said first terminal of said third winding network of said second two terminal power conversion network and with said second terminal of said second capacitor connected to said second terminal of said second winding network of said first two terminal power conversion network, whereby a new two terminal push pull power conversion network is formed which achieves improved terminal ripple current properties by comparison to said original two terminal push pull power conversion network.

12. A synthesis method for improving the terminal current properties of power conversion networks applicable to an original half bridge power conversion network having,
- a first half bridge network terminal,
- first switch means, having first and second terminals, with said first terminal of said first switch means connected to said first half bridge network terminal, second switch means, having first and second terminals, with said first terminal of said second switch means connected to said second terminal of said first switch means, a second half bridge network terminal connected to said second terminal of said second switch means, a first capacitor, having first and second terminals, with the first terminal of said first capacitor connected to one of said half bridge network terminals, a first winding network, having first and second terminals, connected in a center leg of said half bridge power conversion network between said second terminal of said first switch means and said second terminal of said first capacitor, comprising a single winding or a combination of windings connected to each other in a series and/or parallel structure, a first electronic circuit network, having first and second terminals, with said first electronic circuit network connected in series with said first winding network, having, a conducting path or lead, comprising the steps of, (a) add a second capacitor, having first and second terminals, with said first terminal of said second capacitor connected to said second terminal of said first capacitor, and with said second terminal of said second capacitor connected to said half bridge network terminal not connected to said first capacitor thereby forming a series capacitor leg between said first half bridge network terminal and said second half bridge network terminal, if said original half bridge power conversion network does not already comprise said second capacitor, (b) open said connection of said first terminal of said first switch means to said first half bridge network terminal and add a second winding network, having first and second terminals, of the same structure as said first winding network, with said first terminal of said second winding network connected to said first half bridge network terminal and said second terminal of said second winding network connected to said first terminal of said first switch means, (c) open said connection of said second terminal of said second switch means to said second half bridge network terminal and add a third winding network, having first and second terminals, of the same structure as said first winding network, with said first terminal of said third winding network connected to said second half bridge network terminal and said second terminal of said third winding network connected to said second terminal of said second switch means, (d) open said connection of said first half bridge network terminal to said capacitor and add a fourth winding network, having first and second terminals, of the same structure as said first winding network, with said second terminal of said fourth winding network connected to said first half bridge network terminal and with said first terminal of said fourth winding network connected to said capacitor, (e) open said connection of said second half bridge network terminal to said capacitor and add a fifth winding network, having first and second terminals, of the same structure as said first winding network, with said second terminal of said fifth winding network connected to said second half bridge network terminal and with said first terminal of said fifth winding network connected to said capacitor, whereby a new half bridge power conversion network is formed with reduced terminal current ripple by comparison to said original half bridge power conversion network.

13. The synthesis method of claim 12 further comprising the following step, (f) reduce the component value of the winding of said first winding network, or eliminate said first winding network by replacing said first winding network with a conducting path or lead, whereby said component value refers to winding inductance and component size, cost, and weight are reduced or eliminated by reducing said component value or eliminating said first winding network.

14. The synthesis method of claim 12 further comprising the following step, (g) magnetically couple a winding of one of said winding networks to a corresponding winding of one of said other winding networks, whereby the number of magnetic cores required to implement said half bridge power conversion network is reduced and may be further reduced by repeated application of step (g).

15. The synthesis method of claim 12 applicable to half bridge power conversion networks further comprising, a second electronic circuit network magnetically inductively coupled to either all of said winding networks or to said first electronic circuit network.

16. A synthesis method for improving terminal current properties of power conversion networks applicable to an original full bridge power conversion network having, a first full bridge network terminal, first switch means, having first and second terminals, with said first terminal of said first switch means connected to said first full bridge network terminal, second switch means, having first and second terminals, with said first terminal of said second switch means connected to said second terminal of said first switch means, third switch means, having first and second terminals, with said first terminal of said third switch means connected to said first full bridge network terminal, fourth switch means, having first and second terminals, with said first terminal of said fourth switch means connected to said second terminal of said third switch means, a second full bridge network terminal connected to said second terminal of said second switch means and to said second terminal of said fourth switch means, a first winding network, having first and second terminals, connected in a center leg of said full bridge power conversion network between said second terminal of said first switch means and said second terminal of said third switch means, said first winding network having a single winding or a combination of windings connected to each other in a series and/or parallel structure, a first electronic circuit network, having first and second terminals, with said first electronic circuit network connected in series with said first winding network, said first electronic circuit network, a conducting path or lead, comprising the steps of, (a) open said connection of said first terminal of said first switch means to said first full bridge network terminal and add a second winding network, having first and second terminals, of the same structure as said first winding network, with said first terminal of said second winding network connected to said first full bridge network terminal and said second terminal of said second winding network connected to said first terminal of said first switch means, (b) open said connection of said second terminal of said second switch means to said second full bridge network terminal and add a third winding network, having first and second terminals, of the same structure as said first winding network, with said first terminal of said third winding network connected to said second full bridge network terminal and said second terminal of said third winding network connected to said second terminal of said second switch means, (c) open said connection of said first terminal of said third switch means to said first full bridge network terminal and add a fourth winding network, having first and second terminals, of the same structure as said first winding network, with said second terminal of said fourth winding network connected to said first full bridge network terminal and said first terminal of said fourth winding network connected to said first terminal of said third switch means, (d) open said connection of said second terminal of said fourth switch means to said second full bridge network terminal and add a fifth winding network, having first and second terminals, of the same structure as said first winding network, with said second terminal of said fifth winding network connected to said second full bridge network terminal and said first terminal of said fifth winding network connected to said second terminal of said fourth switch means, (e) add a first capacitor, having first and second terminals, with said first terminal of said first capacitor connected to said second terminal of said second winding network and with said second terminal of said first capacitor connected to said second terminal of said third winding network, (f) add a second capacitor, having first and second terminals, with said first terminal of said second capacitor connected to said first terminal of said fourth winding network and with said second terminal of said second capacitor connected to said first terminal of said fifth winding network, whereby a new full bridge power conversion network is formed with reduced terminal current ripple by comparison to said original full bridge power conversion network.

17. The synthesis method of claim 16 further comprising the following step, (g) reduce the component value of said winding of said first winding network, or eliminate said first winding network replacing said first winding network with a conduction path or lead, whereby said component value refers to winding inductance and component size, cost, and weight are reduced or eliminated by reducing said component value or eliminating said first winding network.

18. The synthesis method of claim 17 which all of said first winding network is eliminated, applicable only to said original full bridge power conversion networks in which said center leg comprises only said first winding network, comprising the additional steps, (h) open said connection of said second terminal of said first switch means to said first terminal of said second switch means and to said center leg, (i) open said connection of said second terminal of said third switch means to said first terminal of said fourth switch means and to said center leg, (j) connect said second terminal of said first switch means to said first terminal of said fourth switch means, (k) connect said second terminal of said third switch means to said first terminal of said second switch means, (l) combine said first switch means and said fourth switch means into a single switch means of twice the applied voltage capability of said first switch means, (m) combine said second switch means and said third switch means into a single switch means of twice the applied voltage capability of said second switch means, whereby a new simplified push pull power conversion network is formed requiring only two switch means and accomplishing enhanced electromagnetic compatibility by comparison to said original full bridge power conversion network.

19. The synthesis method of claim 16 further comprising the following step, (n) magnetically couple a winding of one of said winding networks to a corresponding winding of one of said other winding networks, whereby the number of magnetic cores required to implement said full bridge power conversion network is reduced by repeated application of step (h).

20. The synthesis method of claim 16 applicable to full bridge power conversion networks further comprising, a second electronic circuit network magnetically inductively coupled to either all of said winding networks or to said first electronic circuit network.

21. A synthesis method for improving terminal current properties of power conversion networks applicable to an original stacked full bridge power conversion network having, a first stacked full bridge network terminal, first switch means, having first and second terminals, with said first terminal of said first switch means connected to said first stacked full bridge network terminal, a first capacitor, having first and second terminals with said first terminal of said first capacitor connected to said first terminal of said first switch means, second switch means, having first and second terminals, with said first terminal of said second switch means connected to said second terminal of said first switch means and with said second terminal of said second switch means connected to said second terminal of said first capacitor, third switch means, having first and second terminals, with said first terminal of said third switch means connected to said second terminal of said second switch means, a second capacitor, having first and second terminals with said first terminal of said second capacitor connected to said first terminal of said third switch means, fourth switch means, having first and second terminals, with said first terminal of said fourth switch means connected to said second terminal of said third switch means and with said second terminal of said fourth switch means connected to said second terminal of said second capacitor, a second stacked full bridge network terminal connected to said second terminal of said fourth switch means, a first winding network, having first and second terminals, connected in a center leg of said stacked full bridge between said second terminal of said first switch means and said second terminal of said third switch means, comprising a single winding or a combination of windings connected to each other in a series and/or parallel structure, a third capacitor connected in series with said first winding network in said center leg of said stacked full bridge power conversion network, a first electronic circuit network, having first and second terminals, with said first electronic circuit network connected in series with said first winding network, said first electronic circuit work at a minimum, a conducting path or lead, comprising the steps of, (a) break open said connection of said first terminal of said first switch means to said first stacked full bridge network terminal and add a second winding network, having first and second terminals, of the same structure as said first winding network, with said first terminal of said second winding network connected to said first stacked full bridge network terminal and said second terminal of said second winding network connected to said first terminal of said first switch means, (b) break open said connection of said second terminal of said second switch means to said first terminal of said third switch means and add a third winding network, having first and second terminals, of the same structure as said first winding network, with said second terminal of said third winding network connected to said second terminal of said second switch means, (c) add a fourth winding network, having first and second terminals, of the same structure as said first winding network, with said second terminal of said fourth winding network connected to said first terminal of said third winding network and said first terminal of said fourth winding network connected to said first terminal of said third switch means, (d) break open said connection of said second terminal of said fourth switch means to said second stacked full bridge network terminal and add a fifth winding network, having first and second terminals, of the same structure as said first winding network, with said second terminal of said fifth winding network connected to said second stacked full bridge network terminal and said first terminal of said fifth winding network connected to said second terminal of said fourth switch means, whereby a new stacked full bridge power conversion network is formed with reduced terminal current ripple by comparison to said original stacked full bridge power conversion network.

22. The synthesis method of claim 21 further comprising the following step, (e) reduce the component value of the winding of said first winding network, or eliminate said first winding network by replacing said first winding network with a conducting path or lead, whereby said component value refers to winding inductance and component size, cost, and weight are reduced or eliminated by reducing said component value or eliminating said first winding network.

23. The synthesis method of claim 21 further comprising the following step, (f) magnetically couple a winding of one of said winding networks to a corresponding winding of one of said other winding networks, whereby the number of magnetic cores required to implement said stacked full bridge power conversion network is reduced by repeated application of step (f).

24. The synthesis method of claim 21 applicable to stacked full bridge power conversion networks further comprising, a second electronic circuit network magnetically inductively coupled to either all of said winding networks or to said first electronic circuit network.

25. The synthesis method of claim 21 wherein said third winding network and said fourth winding network are combined into a single winding network equivalent to the series connection of said third winding network and said fourth winding network.

26. Any new stacked full bridge power conversion network that can be formed by applying said synthesis method of claim 21 to a known stacked full bridge power conversion network.

* * * * *